US010800958B2

(12) United States Patent
Itano et al.

(10) Patent No.: US 10,800,958 B2
(45) Date of Patent: Oct. 13, 2020

(54) COMPOSITION CONTAINING MIXTURE OF FLUORINATED HYDROCARBONS, AND USE THEREOF

(71) Applicant: DAIKIN INDUSTRIES, LTD., Osaka (JP)

(72) Inventors: Mitsushi Itano, Osaka (JP); Yasufu Yamada, Osaka (JP); Tatsumi Tsuchiya, Osaka (JP); Hitomi Kuroki, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/776,911

(22) PCT Filed: Nov. 15, 2016

(86) PCT No.: PCT/JP2016/083873

§ 371 (c)(1),
(2) Date: May 17, 2018

(87) PCT Pub. No.: WO2017/086328

PCT Pub. Date: May 26, 2017

(65) Prior Publication Data

US 2018/0371303 A1 Dec. 27, 2018

(30) Foreign Application Priority Data

Nov. 20, 2015 (JP) ................................ 2015-227938

(51) Int. Cl.
*C09K 5/04* (2006.01)
*F25B 9/00* (2006.01)
*F25B 1/00* (2006.01)

(52) U.S. Cl.
CPC ................ *C09K 5/045* (2013.01); *C09K 5/04* (2013.01); *F25B 9/006* (2013.01); *C09K 2205/122* (2013.01); *C09K 2205/126* (2013.01); *C09K 2205/22* (2013.01); *C09K 2205/43* (2013.01); *F25B 1/00* (2013.01)

(58) Field of Classification Search
CPC .............. C09K 5/045; C09K 2205/122; C09K 2205/126; C09K 2205/22; C09K 2205/43; C09K 5/04; C09K 5/044; F25B 9/006; F25B 1/00
USPC .............................. 252/67; 62/529, 467, 502
See application file for complete search history.

(56) References Cited

U.S. PATENT DOCUMENTS 8,168,077 B2 5/2012 Spatz
9,528,735 B2 * 12/2016 Kuroki .................. C09K 5/045
2013/0096218 A1 * 4/2013 Rached .................. C09K 5/045 521/170
2013/0234062 A1 * 9/2013 Tsuchiya ................ C09K 5/045 252/68
2014/0331697 A1 * 11/2014 Minor .................... C09K 5/045 62/77
2015/0152305 A1 * 6/2015 Minor .................... C09K 5/045 62/77
2016/0230060 A1 * 8/2016 Takahashi ............ A62D 1/0035
2016/0369145 A1 12/2016 Fukushima et al.

FOREIGN PATENT DOCUMENTS

| | | |
|---|---|---|
| EP | 0 811 670 | 12/1997 |
| JP | 2869038 | 3/1999 |
| JP | 2007-535611 | 12/2007 |
| JP | 2008-531836 | 8/2008 |
| JP | 2012-526182 | 10/2012 |
| JP | 2013-529703 | 7/2013 |
| JP | 2013-530265 | 7/2013 |
| JP | 2014-514423 | 6/2014 |
| JP | 5689068 | 3/2015 |
| JP | 2015-511262 | 4/2015 |
| JP | 2015-522672 | 8/2015 |
| WO | 2005/105947 | 11/2005 |
| WO | 2006/094303 | 9/2006 |
| WO | 2010/059677 | 5/2010 |
| WO | 2010/129920 | 11/2010 |
| WO | WO2010129920 | † 11/2010 |
| WO | 2011/140289 | 11/2011 |
| WO | 2011/163117 | 12/2011 |
| WO | WO2011163117 | † 12/2011 |
| WO | 2012/151238 | 11/2012 |
| WO | 2013/122892 | 8/2013 |
| WO | 2013/192069 | 12/2013 |
| WO | 2015/141676 | 9/2015 |

OTHER PUBLICATIONS

Extended European Search Report dated Jul. 16, 2019 in European Patent Application No. 16866329.2.
International Search Report dated Feb. 21, 2017 in International (PCT) Application No. PCT/JP2016/083873.

* cited by examiner
† cited by third party

*Primary Examiner* — Douglas J McGinty
(74) *Attorney, Agent, or Firm* — Wenderoth, Lind & Ponack, L.L.P.

(57) ABSTRACT

The present invention provides a refrigerant composition that has a low GWP and ASHRAE non-flammability performance. Specifically, the present invention provides a composition comprising a mixture of fluorinated hydrocarbons, the mixture comprising difluoromethane (R32), pentafluoroethane (R125), 1,1,1,2-tetrafluoroethane (R134a), and 2,3,3,3-tetrafluoropropene (1234yf) at specific concentrations.

19 Claims, 49 Drawing Sheets

COMPOSITION CONTAINING MIXTURE OF FLUORINATED HYDROCARBONS, AND USE THEREOF

TECHNICAL FIELD

The present invention relates to a composition comprising a mixture of fluorinated hydrocarbons that are used as, for example, a refrigerant; and use thereof. The present invention also includes a case in which the composition consists of the four basic components contained in the mixture, i.e., difluoromethane (R32), pentafluoroethane (R125), 2,3,3,3-tetrafluoropropene (1234yf), and 1,1,1,2-tetrafluoroethane (R134a).

BACKGROUND ART

Refrigerants recently used, for example, for air conditioners, refrigerating devices, and refrigerators, are mixtures of fluorinated hydrocarbons that contain no chlorine in their molecular structures, such as difluoromethane ($CH_2F_2$, R32, boiling point: −52° C.), pentafluoroethane ($CF_3CHF_2$, R125, boiling point: −48° C.), 1,1,1-trifluoroethane ($CF_3CH_3$, R143a, boiling point: −47° C.), 1,1,1,2-tetrafluoroethane ($CF_3CH_2F$, R134a, boiling point: −26° C.), 1,1-difluoroethane ($CHF_2CH_3$, R152a, boiling point: −24° C.), and 2,3,3,3-tetrafluoropropene ($CF_3CF{=}CH_2$, 1234yf, boiling point: −29° C.).

Among the above fluorinated hydrocarbons, a ternary mixed refrigerant of R32/R125/R134a in which the proportions thereof are 23/25/52 wt % (R407C), a ternary mixed refrigerant of R125/143a/R134a in which the proportions thereof are 44/52/4 wt % (R404A), etc., have been proposed, and R404A is currently widely used as a refrigerant for freezing and refrigerated storage (for example, Patent Literature 1 and 2).

However, the global warming potential (GWP) of R404A is as high as 3922, which is equal to that of $CHClF_2$ (R22), which is a chlorine-containing fluorinated hydrocarbon. There is thus a desire to develop, as alternative refrigerants for R404A, refrigerants that have a refrigerating capacity equal to that of R404A, a lower GWP, and performance of non-flammable refrigerants (ASHRAE non-flammability (class 1 refrigerants defined in ANSI/ASHRAE 34-2013)), as with R404A.

There are still many refrigerating devices that use $CHClF_2$ (R22) as chlorine-containing fluorinated hydrocarbons (HCFCs), which were used as refrigerants for freezing and refrigerated storage prior to the use of R404A; however, under the Montreal Protocol, HCFCs are required to be abolished by 2020 in developed countries, and to be phased out (first: 10%, second: 35%) in developing countries. For these refrigerating devices, there is also a desire to develop, as alternative refrigerants for R22, refrigerants that have a compressor outlet pressure equal to that of R22 used in a refrigeration cycle ("R22 retrofit refrigerants"), a lower GWP, and performance of non-flammable refrigerants (ASHRAE non-flammability (class 1 refrigerants defined in ANSI/ASHRAE 34-2013)), as with R22.

There are, for example, Patent Literature 3 and 4 as other prior art relating to the present invention.

CITATION LIST

Patent Literature

PTL 1: JP2869038B
PTL 2: U.S. Pat. No. 8,168,077

PTL 3: JP5689068B
PTL 4: JP2013-529703A

SUMMARY OF INVENTION

Technical Problem

Patent Literature 3 and 4 report, as alternative refrigerants for R404A, refrigerant compositions comprising difluoromethane (R32), pentafluoroethane (R125), 2,3,3,3-tetrafluoropropene (1234yf), and 1,1,1,2-tetrafluoroethane (R134a). However, no one has succeeded in developing a refrigerant composition that has a refrigerating capacity equal to that of R404A, a lower GWP, and ASHRAE non-flammability performance.

An object of the present invention is to provide a refrigerant composition that has a low GWP and ASHRAE non-flammability performance. Another object of the present invention is to provide, as preferable embodiments, a refrigerant composition that has a refrigerating capacity equal to that of currently widely used R404A, a lower GWP, and ASHRAE non-flammability performance, a refrigerant composition that has a compressor outlet pressure equal to that of R22, a lower GWP, and ASHRAE non-flammability performance, and the like.

Solution to Problem

The present inventors conducted extensive research to achieve the above object, and consequently found that the above object can be achieved by a composition comprising a mixture of fluorinated hydrocarbons, the mixture comprising difluoromethane (R32), pentafluoroethane (R125), 2,3,3,3-tetrafluoropropene (1234yf), and 1,1,1,2-tetrafluoroethane (R134a) at specific concentrations. Thus, the present invention has been accomplished.

Specifically, the present invention provides the following compositions and use thereof.

1. A composition comprising a mixture or mixtures of fluorinated hydrocarbons;

the composition comprising at least one member selected from the group consisting of the following mixtures 1 to 6, wherein the composition ratio of the fluorinated hydrocarbons contained in each mixture is indicated in a ternary composition diagram in which the sum of the concentrations of R125, 1234yf, and R134a is represented by (100−x) wt %, when the sum of the concentrations of R32, R125, 1234yf, and R134a is 100 wt %, and the concentration of R32 is x wt %:

mixture 1 having a composition ratio in which (1)-1. 14.8 wt %>x≥10.8 wt %, and (2)-1. the concentrations of R125, 1234yf, and 134a (R125 concentration (wt %)/1234yf concentration (wt %)/134a concentration (wt %)) fall within a pentagon having the following points as vertices:

point G (100−R32−1234yf−R134a/−0.5493x+45.325/−0.4243x+19.875), point H (100−R32−1234yf-R134a/−0.9507x+60.575/−x+38.1), point I (0/100−R32−1234yf−R134a/1.6974x+48.4), point N (0/0/100−x), and point D (0.375x+3.25/0/100−R32−R125−1234yf);

mixture 2 having a composition ratio in which (1)-2. 18.1 wt %>x≥14.8 wt %, and (2)-2. the concentrations of R125, 1234yf, and 134a (R125 concentration (wt %)/1234yf concentration (wt %)/134a concentration (wt %)) fall within a pentagon having the following points as vertices:

point G (100−R32−R125−1234yf/−0.5736x+45.669/−0.3945x+19.443),
point H (100−R32−1234yf−R134a/−0.9083x+59.936/−0.9723x+37.714),
point I (0/100−R32−1234yf−R134a/1.3625x+53.346),
point N (0/0/100−x), and
point D (0.3625x+3.4461/0/100−R32−R125−1234yf);
mixture 3 having a composition ratio in which
(1)-3. 20.0 wt %>x≥18.1 wt %, and
(2)-3. the concentrations of R125, 1234yf, and 134a (R125 concentration (wt %)/1234yf concentration (wt %)/134a concentration (wt %)) fall within a pentagon having the following points as vertices:
point G (100−R32−1234yf−R134a/−0.5258x+44.808/−0.4207x+19.907),
point H (100−R32−1234yf−R134a/−0.8948x+59.698/−1.0517x+39.117),
point I (0/100−R32−1234yf−R134a/1.0517x+58.983),
point N (0/0/100−x), and
point D (0.369x+3.31/0/100−R32−R125−1234yf);
mixture 4 having a composition ratio in which
(1)-4. 22.6 wt %>x≥20.0 wt %, and
(2)-4. the concentrations of R125, 1234yf, and 134a (R125 concentration (wt %)/1234yf concentration (wt %)/134a concentration (wt %)) fall within a quadrilateral having the following points as vertices:
point G (100−R32−1234yf−R134a/−0.5756x+45.817/−0.4244x+19.983),
point H (100−R32−1234yf−R134a/−0.9244x+60.283/−0.8488x+35.065),
point I (100−R32−1234yf−R134a/0/−2.0407x+120.8), and
point D (0.3430x+3.826/0/100−R32−R125−1234yf);
mixture 5 having a composition ratio in which
(1)-5. 24.5 wt %>x≥22.6 wt %, and
(2)-5. the concentrations of R125, 1234yf, and 134a (R125 concentration (wt %)/1234yf concentration (wt %)/134a concentration (wt %)) fall within a quadrilateral having the following points as vertices:
point G (100−R32−1234yf−R134a/−0.5283x+44.746/−0.4717x+21.054),
point H (100−R32−1234yf−R134a/−0.9435x+60.078/−0.8428x+34.949),
point I (100−R32−1234yf−R134a/0/−1.9435x+118.61), and
point D (0.3710x+3.2057/0/100−R32−R125−1234yf); and
mixture 6 having a composition ratio in which
(1)-6. 26.6 wt %≥x≥24.5 wt %, and
(2)-6. the concentrations of R125, 1234yf, and 134a (R125 concentration (wt %)/1234yf concentration (wt %)/134a concentration (wt %)) fall within a quadrilateral having the following points as vertices:
point G (100−R32−1234yf−R134a/−0.5710x+45.798/−0.4290x+20.002),
point H (100−R32−1234yf−R134a/−0.9517x+60.931/−0.7613x+32.965),
point I (100−R32−1234yf−R134a/0/−2.0000x+120.00), and
point D (0.3323x+4.1369/0/100−R32−R125−1234yf).

2. A composition comprising a mixture or mixtures of fluorinated hydrocarbons;

the composition comprising at least one member selected from the group consisting of the following mixtures 1 to 6, wherein the composition ratio of the fluorinated hydrocarbons contained in each mixture is indicated in a ternary composition diagram in which the sum of the concentrations of R125, 1234yf, and R134a is represented by (100−x) wt %, when the sum of the concentrations of R32, R125, 1234yf, and R134a is 100 wt %, and the concentration of R32 is x wt %:

mixture 1 having a composition ratio in which
(1)-1. 14.8 wt %>x≥10.8 wt %, and
(2)-1. the concentrations of R125, 1234yf, and 134a (R125 concentration (wt %)/1234yf concentration (wt %)/134a concentration (wt %)) fall within a pentagon having the following points as vertices:
point G' (100−R32−1234yf−R134a/−0.5757x+45.025/−0.4243x+20.975),
point H' (100−R32−1234yf−R134a/−0.9770x+59.575/−x+38.4),
point I' (0/100−R32−1234yf−R134a/1.7007x+52.125),
point N (0/0/100−x), and
point D (0.375x+3.25/0/100−R32−R125−1234yf);
mixture 2 having a composition ratio in which
(1)-2. 18.1 wt %>x≥14.8 wt %, and
(2)-2. the concentrations of R125, 1234yf, and 134a (R125 concentration (wt %)/1234yf concentration (wt %)/134a concentration (wt %)) fall within a pentagon having the following points as vertices:
point G' (100−R32−1234yf−R134a/−0.5458x+44.582/−0.4264x+21.031),
point H' (100−R32−1234yf−R134a/−0.9083x+58.536/−0.9723x+38.014),
point I' (0/100−R32−1234yf−R134a/1.3945x+56.657),
point N (0/0/100−x), and
point D (0.3625x+3.4461/0/100−R32−R125−1234yf);
mixture 3 having a composition ratio in which
(1)-3. 20.0 wt %>x≥18.1 wt %, and
(2)-3. the concentrations of R125, 1234yf, and 134a (R125 concentration (wt %)/1234yf concentration (wt %)/134a concentration (wt %)) fall within a quadrilateral having the following points as vertices:
point G' (100−R32−1234yf−R134a/−0.5277x+44.277/−0.4207x+20.907),
point H' (100−R32−1234yf−R134a/−0.8948x+58.298/−1.0517x+39.417),
point I' (100−R32−1234yf−R134a/0/1.9483x+117.18), and
point D (0.369x+3.31/0/100−R32−R125−1234yf);
mixture 4 having a composition ratio in which
(1)-4. 22.6 wt %>x≥20.0 wt %, and
(2)-4. the concentrations of R125, 1234yf, and 134a (R125 concentration (wt %)/1234yf concentration (wt %)/134a concentration (wt %)) fall within a quadrilateral having the following points as vertices:
point G' (100−R32−1234yf−R134a/−0.5349x+44.413/−0.4651x+21.787),
point H' (100−R32−1234yf−R134a/−0.9244x+58.883/−0.8837x+36.078),
point I' (100−R32−1234yf−R134a/0/−2.0756x+119.72), and
point D (0.343x+3.826/0/100−R32−R125−1234yf);
mixture 5 having a composition ratio in which
(1)-5. 24.5 wt %>x≥22.6 wt %, and
(2)-5. the concentrations of R125, 1234yf, and 134a (R125 concentration (wt %)/1234yf concentration (wt %)/134a concentration (wt %)) fall within a quadrilateral having the following points as vertices:
point G' (100−R32−1234yf−R134a/−0.5848x+45.537/−0.4717x+21.954),
point H' (100−R32−1234yf−R134a/−0.9435x+59.308/−0.8428x+35.149),
point I' (100−R32−1234yf−R134a/0/−1.9435x+116.71), and
point D (0.3710x+3.2057/0/100−R32−R125−1234yf); and
mixture 6 having a composition ratio in which (1)-6. 26.6 wt %≥x≥24.5 wt %, and
(2)-6. the concentrations of R125, 1234yf, and 134a (R125 concentration (wt %)/1234yf concentration (wt %)/134a concentration (wt %)) fall within a quadrilateral having the following points as vertices:
point G' (100−R32−1234yf−R134a/−0.5242x+44.035/−0.4290x+20.902),
point H' (100−R32−1234yf−R134a/−x+60.7/−0.7145x+32.001),
point I' (100−R32−1234yf−R134a/0/−2.0468x+119.26), and
point D (0.3323x+4.1369/0/100−R32−R125−1234yf).

3. A composition comprising a mixture or mixtures of fluorinated hydrocarbons;

the composition comprising at least one member selected from the group consisting of the following mixtures 1 to 7, wherein the composition ratio of the fluorinated hydrocarbons contained in each mixture is indicated in a ternary composition diagram in which the sum of the concentrations of R125, 1234yf, and R134a is represented by (100−x) wt %, when the sum of the concentrations of R32, R125, 1234yf, and R134a is 100 wt %, and the concentration of R32 is x wt %:
mixture 1 having a composition ratio in which
(1)-1. 14.1 wt %>x≥10.8 wt %, and
(2)-1. the concentrations of R125, 1234yf, and 134a (R125 concentration (wt %)/1234yf concentration (wt %)/134a concentration (wt %)) fall within a quadrilateral having the following points as vertices:
point B (−2.6665x+62.786/0.7204x+31.027/100−R32−R125−1234yf),
point C (0.0914$x^2$−4.2444x+69.184/0.1181$x^2$−6.3648x+93.765/100−R32−R125−1234yf),
point F (0.0323$x^2$−2.5621x+50.802/0.0346$x^2$−3.9904x+67.56/100−R32−R125−1234yf), and
point E (0.0501$x^2$−3.9756x+61.989/−0.0296$x^2$+1.5133x+30.248/100−R32−R125−1234yf);
mixture 2 having a composition ratio in which
(1)-2. 16.1 wt %>x≥14.1 wt %, and
(2)-2. the concentrations of R125, 1234yf, and 134a (R125 concentration (wt %)/1234yf concentration (wt %)/134a concentration (wt %)) fall within a pentagon having the following points as vertices:
point B (−2.6456x+62.484/0.7929x+29.984/100−R32−R125−1234yf),
point C (0.0495$x^2$−3.1434x+61.991/0.1723$x^2$−8.1236x+107.78/100−R32−R125−1234yf),
point F (−1.5049x+42.339/−2.6349x+55.315/100−R32−R125−1234yf),
point E (0.2747$x^2$−9.7967x+99.415/0.6366$x^2$−25.375x+276.93/100−R32−R125−1234yf), and
when 14.8 wt %>x≥14.1 wt %,
point H' (100−R32−1234yf−R134a/−0.9770x+59.575/−x+38.4), or
when 16.1 wt %>x≥14.8 wt %,
point H' (100−R32−1234yf−R134a/−0.9083x+58.536/−0.9723x+38.014);
mixture 3 having a composition ratio in which
(1)-3. 16.8 wt %>x≥16.1 wt %, and
(2)-3. the concentrations of R125, 1234yf, and 134a (R125 concentration (wt %)/1234yf concentration (wt %)/134a concentration (wt %)) fall within a pentagon having the following points as vertices:
point B (−2.2857x+56.7/0.7747x+30.285/100−R32−R125−1234yf),
point C (−1.5714x+49.5/−2.8043x+66.812/100−R32−R125−1234yf),
point F (−1.2857x+38.8/−2.4954x+53.076/100−R32−R125−1234yf),
point E (−1.1429x+31.3/−5.3142x+118.96/100−R32−R125−1234yf), and
point H' (100−R32−1234yf−R134a/−0.9083x+58.536/−0.9723x+38.014);
mixture 4 having a composition ratio in which
(1)-4. 18.1 wt %>x≥16.8 wt %, and
(2)-4. the concentrations of R125, 1234yf, and 134a (R125 concentration (wt %)/1234yf concentration (wt %)/134a concentration (wt %)) fall within a quadrilateral having the following points as vertices:
point B (−1.4615x+42.854/−5.931x+142.94/100−R32−1234yf−R134a),
point C (−1.3846x+46.362/−2.5156x+61.961/100−R32−R125−1234yf),
point F (−1.3846x+40.462/−2.5401x+53.827/100−R32−R125−1234yf), and
point E (−1.0769x+30.192/−4.9692x+113.16/100−R32−R125−1234yf);
mixture 5 having a composition ratio in which
(1)-5. 20.0 wt %>x≥18.1 wt %, and
(2)-5. the concentrations of R125, 1234yf, and 134a (R125 concentration (wt %)/1234yf concentration (wt %)/134a concentration (wt %)) fall within a quadrilateral having the following points as vertices:
point B (−1.0442x+35.27/0.2703$x^2$−15.221x+222.52/100−R32−1234yf-R134a),
point C (−1.3145x+45.088/−2.4404x+60.615/100−R32−1234yf−R134a),
point F (−1.2138x+37.381/−0.1576$x^2$+3.716x−7.7649/100−R32−1234yf−R134a), and
point E (−0.8869x+26.726/−4.3267x+101.52/100−R32−1234yf−R134a);
mixture 6 having a composition ratio in which
(1)-6. 21.6 wt %>x≥20.0 wt %, and
(2)-6. the concentrations of R125, 1234yf, and 134a (R125 concentration (wt %)/1234yf concentration (wt %)/134a concentration (wt %)) fall within a quadrilateral having the following points as vertices:
point B (−0.875x+31.9/−4.3372x+112.98/100−R32−1234yf−R134a),
point C (−1.25x+43.8/−2.375x+59.3/100−R32−1234yf−R134a),
point F (−1.125x+35.6/−2.1875x+47.25/100−R32−1234yf−R134a), and
point E (−0.75x+24/−3.8831x+92.657/100−R32−1234yf−R134a); and
mixture 7 having a composition ratio in which
(1)-7. 24.2 wt %>x≥21.6 wt, and
(2)-7. the concentrations of R125, 1234yf, and 134a (R125 concentration (wt %)/1234yf concentration (wt %)/134a concentration (wt %)) fall within a quadrilateral having the following points as vertices:
point B (−0.7267x+28.67/0.1603$x^2$−10.987x+181.821/00−R32−1234yf−R134a),
point C (0.0529$x^2$−3.5375x+68.536/0.0431$x^2$−4.1038x+76.546/100−R32−1234yf−R134a),
point F (−1.9651x+53.771/0/100−R32−1234yf−R134a), and
point E (−0.6163x+21.118/0.0663$x^2$−6.4133x+116.38/100−R32−1234yf−R134a).

4. A composition comprising a mixture or mixtures of fluorinated hydrocarbons, the composition comprising at least one member selected from the group consisting of the following mixtures 1 to 9, wherein the composition ratio of the fluorinated hydrocarbons contained in each mixture is indicated in a ternary composition diagram in which the sum of the concentrations of R125, 1234yf, and R134a is represented by (100−x) wt %, when the sum of the concentrations of R32, R125, 1234yf, and R134a is 100 wt %, and the concentration of R32 is x wt %:

mixture 1 having a composition ratio in which (1)-1. 14.2 wt %>x≥11.6 wt %, and (2)-1. the concentrations of R125, 1234yf, and 134a (R125 concentration (wt %)/1234yf concentration (wt %)/134a concentration (wt %)) fall within a triangle having the following points as vertices:

point G' (100−R32−1234yf−R134a/−0.5757x+45.025/−0.4243x+20.975), point J (−3.5769x+75.492/1.2204x+24.143/100−R32−R125−1234yf), and point K (−2.3846x+61.662/−4.0172x+84.9/100−R32−R125−1234yf);

mixture 2 having a composition ratio in which (1)-2. 15.3 wt %>x≥14.2 wt %, and (2)-2. the concentrations of R125, 1234yf, and 134a (R125 concentration (wt %)/1234yf concentration (wt %)/134a concentration (wt %)) fall within a triangle having the following points as vertices:

when 14.8 wt %>x≥14.2 wt %, point G' (100−R32−1234yf−R134a/−0.5757x+45.025/−0.4243x+20.975) or when 15.3 wt %>x≥14.8 wt %, point G' (100−R32−1234yf−R134a/−0.5458x+44.582/−0.4264x+21.031), and point J (−3.4381x+73.493/1.1236x+25.522/100−R32−R125−1234yf), and point K ($0.9091x^2$−29.091x+257.58/$0.8579x^2$−29.085x+267.88/100−R32−R125−1234yf);

mixture 3 having a composition ratio in which (1)-3. 16.2 wt %>x≥15.3 wt %, and (2)-3. the concentrations of R125, 1234yf, and 134a (R125 concentration (wt %)/1234yf concentration (wt %)/134a concentration (wt %)) fall within a triangle having the following points as vertices:

point G' (100−R32−1234yf−R134a/−0.5458x+44.582/−0.4264x+21.031), point J (−3.5556x+75.3/1.2095x+24.209/100−R32−R125−1234yf), and point K (−2x+55.9/−3.4439x+76.392/100−R32−R125−1234yf);

mixture 4 having a composition ratio in which (1)-4. 17.5 wt %>x≥16.2 wt %, and (2)-4. the concentrations of R125, 1234yf, and 134a (R125 concentration (wt %)/1234yf concentration (wt %)/134a concentration (wt %)) fall within a quadrilateral having the following points as vertices:

point G' (100−R32−1234yf−R134a/−0.5458x+44.582/−0.4264x+21.031), point H' (100−R32−1234yf−R134a/−0.9083x+58.536/−0.9723x+38.014), point J (−1.6163x+43.882/−6.3674x+146.95/100−R32−R125−1234yf), and point K (−1.8488x+53.445/−3.1206x+71.153/100−R32−R125−1234yf);

mixture 5 having a composition ratio in which (1)-5. 19.0 wt %>x≥17.5 wt %, and (2)-5. the concentrations of R125, 1234yf, and 134a (R125 concentration (wt %)/1234yf concentration (wt %)/134a concentration (wt %)) fall within a pentagon having the following points as vertices:

when 18.1 wt %>x≥17.5 wt %, point G' (100−R32−1234yf−R134a/−0.5458x+44.582/−0.4264x+21.031), and point H' (100−R32−1234yf−R134a/−0.9083x+58.536/−0.9723x+38.014), or when 19.0 wt %>x≥18.1 wt %, point G' (100−R32−1234yf−R134a/−0.5277x+44.277/−0.4207x+20.907), and point H' (100−R32−1234yf−R134a/−0.8948x+58.298/−1.0517x+39.417), and point J ($0.1273x^2$−6.1109x+83.553/$0.1532x^2$−11.484x+189.57/100−R32−R125−1234yf), point X ($-0.1696x^2$+1.0575x+54.537/$-0.2271x^2$+15.05x−177.28/100−R32−R125−1234yf), and point R ($-0.0401x^2$+3.0217x−19.198/$-0.0297x^2$+2.7774x−22.544/100−R32−R125−1234yf);

mixture 6 having a composition ratio in which (1)-6. 20.8 wt %>x≥19.0 wt %, and (2)-6. the concentrations of R125, 1234yf, and 134a (R125 concentration (wt %)/1234yf concentration (wt %)/134a concentration (wt %)) fall within a quadrilateral having the following points as vertices:

when 20.0 wt %>x≥19.0 wt %, point G' (100−R32−1234yf−R134a/−0.5277x+44.277/−0.4207x+20.907), and point H' (100−R32−1234yf−R134a/−0.8948x+58.298/−1.0517x+39.417), or when 20.8 wt %>x≥20.0 wt %, point G' (100−R32−1234yf−R134a/−0.5349x+44.413/−0.4651x+21.787), and point H' (100−R32−1234yf−R134a/−0.9244x+58.883/−0.8837x+36.078), and point Q ($-0.0198x^2$+27.157x−31.225/$-0.0377x^2$+3.0486x−17.594/100−R32−R125−1234yf), and point R ($-0.0401x^2$+3.0217x−19.198/$-0.0297x^2$+2.7774x−22.544/100−R32−R125−1234yf);

mixture 7 having a composition ratio in which (1)-7. 23.2 wt %>x≥20.8 wt %, and (2)-7. the concentrations of R125, 1234yf, and 134a (R125 concentration (wt %)/1234yf concentration (wt %)/134a concentration (wt %)) fall within a quadrilateral having the following points as vertices:

when 22.6 wt %>x≥20.8 wt %, point G' (100−R32−1234yf−R134a/−0.5349x+44.413/−0.4651x+21.787), and point H' (100−R32−1234yf−R134a/−0.9244x+58.883/−0.8837x+36.078), or when 23.2 wt %>x≥22.6 wt %, point G' (100−R32−1234yf−R134a/−0.5848x+45.537/−0.4717x+21.954), and point H' (100−R32−1234yf−R134a/−0.9435x+59.308/−0.8428x+35.149), and point Q ($-0.0984x^2$+6.1633x−68.728/$-0.0617x^2$+3.9141x−25.243/100−R32−R125−1234yf), and point R ($-0.0031x^2$+1.5234x−4.0783/$-0.0503x^2$+3.6856x−32.627/100−R32−R125−1234yf);

mixture 8 having a composition ratio in which (1)-8. 25.6 wt %>x≥23.2 wt %, and (2)-8. the concentrations of R125, 1234yf, and 134a (R125 concentration (wt %)/1234yf concentration (wt %)/134a concentration (wt %)) fall within a quadrilateral having the following points as vertices:

when 24.5 wt %>x≥23.2 wt %, point G' (100−R32−1234yf−R134a/−0.5848x+45.537/−0.4717x+21.954), and point H' (100−R32−1234yf−R134a/−0.9435x+59.308/−0.8428x+35.149), or when 25.6 wt %>x≥24.5 wt %,
point G' (100−R32−1234yf−R134a/−0.5242x+44.035/−0.4290x+20.902), and
point H' (100−R32−1234yf−R134a/−x+60.7/−0.7145x+32.001), and
point Q (−0.0115$x^2$+2.3422x−26.868/−0.1077$x^2$+6.4104x−58.357/100−R32−R125−1234yf), and
point R (−0.1398$x^2$+8.0281x−81.391/−0.0932$x^2$+5.7935x−58.514/100−R32−R125−1234yf); and
mixture 9 having a composition ratio in which
(1)-9. 26.6 wt %≥x≥25.6 wt %, and
(2)-9. the concentrations of R125, 1234yf, and 134a (R125 concentration (wt %)/1234yf concentration (wt %)/134a concentration (wt %)) fall within a triangle having the following points as vertices:
point G' (100−R32−1234yf−R134a/−0.5242x+44.035/−0.4290x+20.902),
point Q (8.2x−184.32/−5x+163.1/100−R32−R125−1234yf), and
point R (1.2x+1.88/1.246x−3.0431/100−R32−R125−1234yf).

5. A composition comprising a mixture or mixtures of fluorinated hydrocarbons;

the composition comprising at least one member selected from the group consisting of the following mixtures 1 to 7, wherein the composition ratio of the fluorinated hydrocarbons contained in each mixture is indicated in a ternary composition diagram in which the sum of the concentrations of R125, 1234yf, and R134a is represented by (100−x) wt %, when the sum of the concentrations of R32, R125, 1234yf, and R134a is 100 wt %, and the concentration of R32 is x wt %:
mixture 1 having a composition ratio in which
(1)-1. 15.3 wt %>x≥14.2 wt %, and
(2)-1. the concentrations of R125, 1234yf, and 134a (R125 concentration (wt %)/1234yf concentration (wt %)/134a concentration (wt %)) fall within a triangle having the following points as vertices:
point T (100−R32−1234yf−R134a/0.0415$x^2$+1.0547x+21.254/0.0863$x^2$−3.628x+64.252),
point K (0.9091$x^2$−29.091x+257.58/0.8579$x^2$−29.085x+267.88/100−R32−R125−1234yf), and
point U (1.3896$x^2$−47.266x+418.78/−2.8422$x^2$+97.299x−780.65/100−R32−R125−1234yf);
mixture 2 having a composition ratio in which
(1)-2. 16.2 wt %>x≥15.3 wt %, and
(2)-2. the concentrations of R125, 1234yf, and 134a (R125 concentration (wt %)/1234yf concentration (wt %)/134a concentration (wt %)) fall within a quadrilateral having the following points as vertices:
point S (100−R32−1234yf−R134a/0.0508$x^2$−2.3591x+66.946/−0.0008$x^2$−0.6861x+31.798),
point T (100−R32−1234yf−R134a/−0.0415$x^2$+1.0547x+21.254/0.0863$x^2$−3.628x+64.252),
point K (−2x+55.9/−3.4439x+76.392/100−R32−R125−1234yf), and
point J (−3.5556x+75.3/1.2095x+24.209/100−R32−R125−1234yf);
mixture 3 having a composition ratio in which
(1)-3. 17.5 wt %>x≥16.2 wt %, and
(2)-3. the concentrations of R125, 1234yf, and 134a (R125 concentration (wt %)/1234yf concentration (wt %)/134a concentration (wt %)) fall within a pentagon having the following points as vertices:
when 17.0 wt %>x≥16.2 wt %,
point S (100−R32−1234yf−R134a/0.0508$x^2$−2.3591x+66.946/−0.0008$x^2$−0.6861x+31.798), and
point T (100−R32−1234yf−R134a/−0.0415$x^2$+1.0547x+21.254/0.0863$x^2$−3.628x+64.252), or
when 17.5 wt %>x≥17.0 wt %,
point S (100−R32−1234yf−R134a/0.1108$x^2$−4.5904x+87.503/0.0939$x^2$−4.1798x+63.826), and
point T (100−R32−1234yf−R134a/−0.0766$x^2$+2.5779x+5.5242/0.2286$x^2$−9.3441x+120.28), and
point K (−1.8488x+53.445/−3.1206x+71.153/100−R32−R125−1234yf),
point J (−1.6163x+43.882/−6.3674x+146.95/100−R32−R125−1234yf), and
point H' (100−R32−1234yf−R134a/−0.9083x+58.536/−0.9723x+38.014);
mixture 4 having a composition ratio in which
(1)-4. 19.0 wt %>x≥17.5 wt %, and
(2)-4. the concentrations of R125, 1234yf, and 134a (R125 concentration (wt %)/1234yf concentration (wt %)/134a concentration (wt %)) fall within a hexagon having the following points as vertices:
point S (100−R32−1234yf−R134a/0.1108$x^2$−4.5904x+87.503/0.0939$x^2$−4.1798x+63.826),
point T (100−R32−1234yf−R134a/−0.0766$x^2$+2.5779x+5.5242/0.2286$x^2$−9.3441x+120.28),
point R (−0.0401$x^2$+3.0217x−19.198/−0.0297$x^2$+2.7774x−22.544/100−R32−R125−1234yf),
point X (−0.1696$x^2$+1.0575x+54.537/−0.2271$x^2$+15.05x−177.28/100−R32−R125−1234yf),
point J (0.1273$x^2$−6.1109x+83.553/0.1532$x^2$−11.484x+189.57/100−R32−R125−1234yf), and
when 18.1 wt %>x≥17.5 wt %,
point H' (100−R32−1234yf−R134a/−0.9083x+58.536/−0.9723x+38.014), or
when 19.0 wt %>x≥18.1 wt %,
point H' (100−R32−1234yf−R134a/−0.8948x+58.298/−1.0517x+39.417);
mixture 5 having a composition ratio in which
(1)-5. 20.8 wt %>x≥19.0 wt %, and
(2)-5. the concentrations of R125, 1234yf, and 134a (R125 concentration (wt %)/1234yf concentration (wt %)/134a concentration (wt %)) fall within a pentagon having the following points as vertices:
point S (100−R32−1234yf−R134a/0.1263$x^2$−5.6749x+102.56/−0.029$x^2$+0.4298x+20.594),
point T (100−R32−1234yf−R134a/0.1451$x^2$−6.0744x+89.981/−0.2364$x^2$+8.5372x−51.582),
point R (−0.0401$x^2$+3.0217x−19.198/−0.0297$x^2$+2.7774x−22.544/100−R32−R125−1234yf),
point Q (−0.0198$x^2$+27.157x−31.225/−0.0377$x^2$+3.0486x−17.594/100−R32−R125−1234yf), and
when 20.0 wt %>x≥19.0 wt %,
point H' (100−R32−1234yf−R134a/−0.8948x+58.298/−1.0517x+39.417), or
when 20.8 wt %>x≥20.0 wt %,
point H' (100−R32−1234yf−R134a/−0.9244x+58.883/−0.8837x+36.078);
mixture 6 having a composition ratio in which
(1)-6. 23.2 wt %>x≥20.8 wt %, and
(2)-6. the concentrations of R125, 1234yf, and 134a (R125 concentration (wt %)/1234yf concentration (wt %)/134a concentration (wt %)) fall within a pentagon having the following points as vertices:
point S (100−R32−1234yf−R134a/0.1017$x^2$−5.1872x+102.99/0.0034$x^2$−0.7313x+30.692),
point T (100−R32−1234yf−R134a/−0.0318$x^2$+1.1657x+15.869/−0.123$x^2$+4.4541x−15.735),
point R (−0.0031x+1.5234x−4.0783/−0.0503$x^2$+3.6856x−32.627/100−R32−R125−1234yf), point Q ($-0.0984x^2+6.1633x-68.728/-0.0617x^2+3.9141x-25.243/100-R32-R125-1234yf$), and when 22.6 wt %>x≥20.8 wt %, point H' (100−R32−1234yf−R134a/−0.9244x+58.883/−0.8837x+36.078), or when 23.2 wt %>x≥22.6 wt %, point H' (100−R32−1234yf−R134a/−0.9435x+59.308/−0.8428x+35.149); and mixture 7 having a composition ratio in which (1)-7. 25.4 wt %≥x≥23.2 wt %, and (2)-7. the concentrations of R125, 1234yf, and 134a (R125 concentration (wt %)/1234yf concentration (wt %)/134a concentration (wt %)) fall within a triangle having the following points as vertices:

point S ($100-R32-1234yf-R134a/-0.0317x^2+0.4511x+43.979/0.075x^2-4.1913x+72.494$), point α ($0.0324x^2-3.5746x+95.092/0.0193x^2+3.2487x-59.944/100-R32-R125-1234yf$), and point Q ($-0.0115x^2+2.3422x-26.868/-0.1077x^2+6.4104x-58.357/100-R32-R125-1234yf$).

6. A composition comprising a mixture of fluorinated hydrocarbons, the mixture comprising R32, R125, R134a, 1234yf, and at least one fluorinated hydrocarbon selected from the group consisting of HCFC-1122, HCFC-124, CFC-1113, and 3,3,3-trifluoropropyne.

7. A composition comprising a mixture of fluorinated hydrocarbons, the mixture comprising R32, R125, R134a, 1234yf, and at least one halogenated organic compound represented by formula (1): $C_mH_nX_p$, wherein each X independently represents a fluorine atom, a chlorine atom, or a bromine atom, m is 1 or 2, 2m+2≥n+p, and p≥1.

8. A composition comprising a mixture of fluorinated hydrocarbons, the mixture comprising R32, R125, R134a, 1234yf, and at least one organic compound represented by formula (2): $C_mH_nX_p$, wherein each X independently represents an atom that is not a halogen atom, m is 1 or 2, 2m+2≥n+p, and p≥1.

9. A composition comprising a mixture of fluorinated hydrocarbons, the mixture comprising R32, R125, R134a, 1234yf, and water.

10. The composition according to any one of items 1 to 9, comprising a refrigerant oil.

11. The composition according to item 10, wherein the refrigerant oil comprises at least one polymer selected from the group consisting of polyalkylene glycol (PAG), polyol ester (POE), and polyvinyl ether (PVE).

12. The composition according to any one of items 1, 2, and 4 to 11, wherein the composition is an alternative refrigerant for R404A (R125/R134a/R143a=44/4/52 wt %), which is a mixed refrigerant.

13. The composition according to any one of items 1 to 3 and 6 to 11, wherein the composition is an alternative refrigerant for R22, which is an HCFC refrigerant.

14. The composition according to any one of items 1 to 13, comprising at least one substance selected from the group consisting of tracers, compatibilizers, ultraviolet fluorescence dyes, stabilizers, and polymerization inhibitors.

15. The composition according to any one of items 1 to 14, wherein the composition consists of the mixture of fluorinated hydrocarbons.

16. A refrigeration method comprising the step of operating a refrigeration cycle using the composition according to any one of items 1 to 15.

17. A method for operating a refrigerating device, comprising operating a refrigeration cycle using the composition according to any one of items 1 to 15.

18. A refrigerating device comprising the composition according to any one of items 1 to 15.

19. The composition according to any one of items 1 to 15, which is used for at least one member selected from the group consisting of refrigerators, freezers, water coolers, ice machines, refrigerating showcases, freezing showcases, freezing and refrigerating units, refrigerating devices for freezing and refrigerating warehouses, chillers (chilling units), turbo refrigerators, and screw refrigerators.

Advantageous Effects of Invention

The composition of the present invention is a composition comprising a mixture of fluorinated hydrocarbons, the mixture comprising difluoromethane (R32), pentafluoroethane (R125), 2,3,3,3-tetrafluoropropene (1234yf), and 1,1,1,2-tetrafluoroethane (R134a) at specific concentrations, whereby the composition has a GWP of 1500 or less and ASHRAE non-flammability performance.

DESCRIPTION OF EMBODIMENTS

Figure 1:
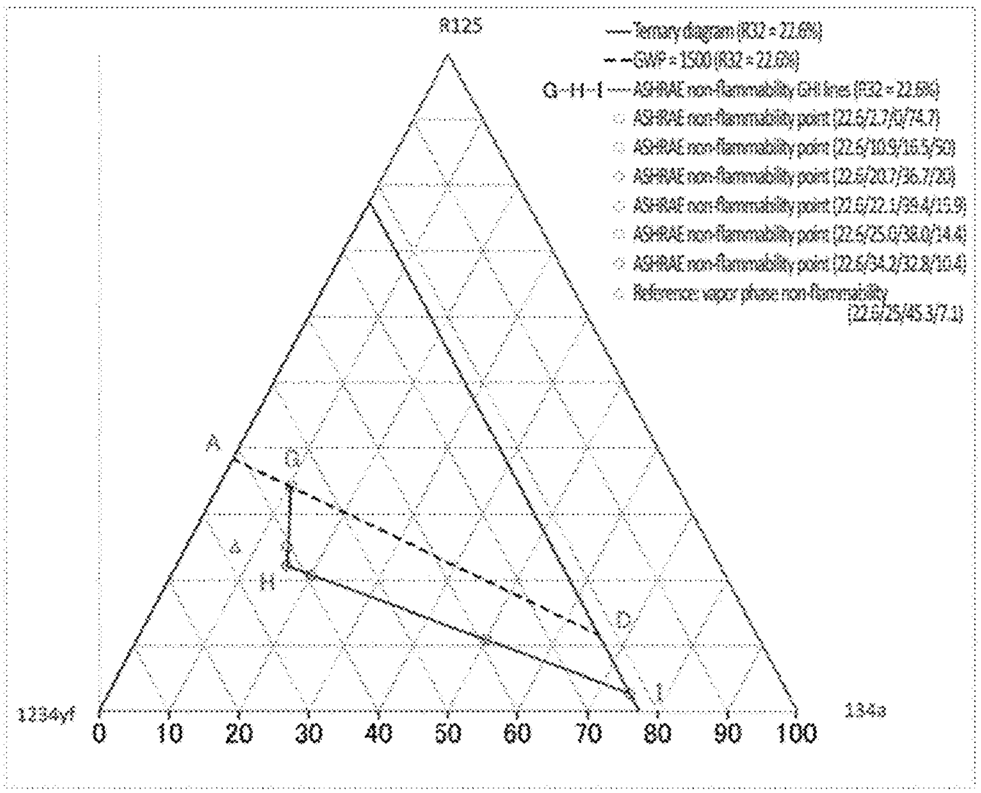
FIG. 1 shows ASHRAE non-flammability limit compositions (six open circles) of a mixture of the four basic components: difluoromethane (R32), pentafluoroethane (R125), 2,3,3,3-tetrafluoropropene (1234yf), and 1,1,1,2-tetrafluoroethane (R134a), and regression lines connecting these points (a straight line connecting points G and H; and a straight line connecting points H and I), in a ternary composition diagram of R125, 1234yf, and R134a when the concentration of R32 is 22.6 wt %, determined from Experimental Example 1.
Figure 2:
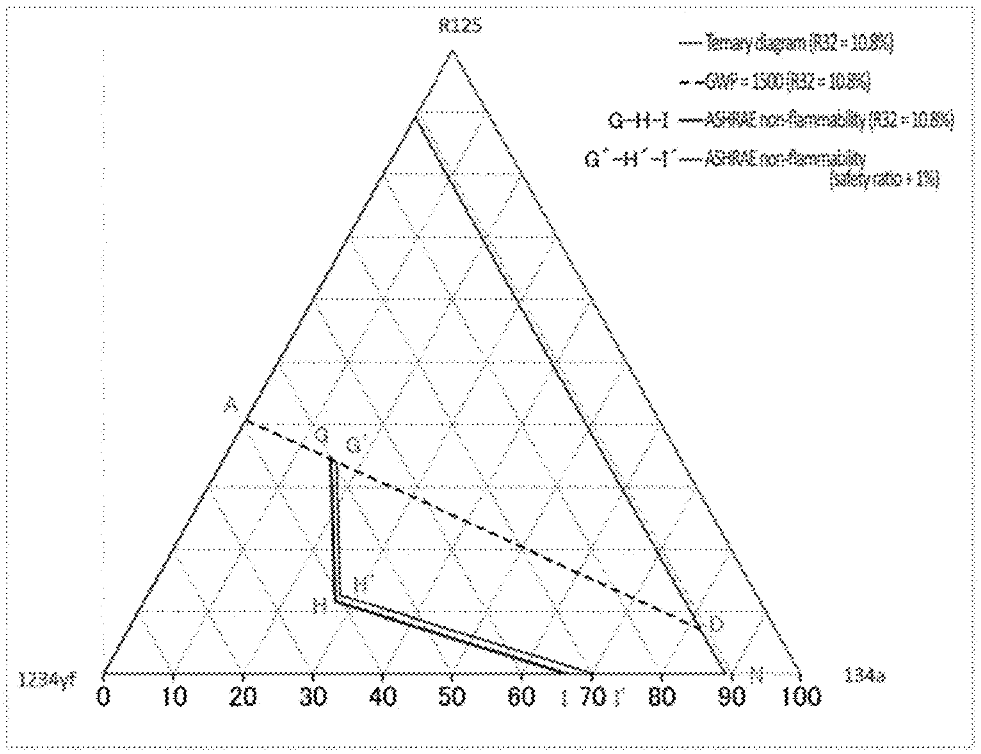
FIGS. 2 to 7 show the compositions of the above mixture (a pentagon surrounded by points G, H, I, N, and D; and a pentagon surrounded by points G', H', I', N, and D) in a ternary composition diagram of R125, 1234yf, and R134a, when the concentration of R32 is 10.8, 12.4, 14.8, 16.1, 18.1, and 19.0 wt %. The 1234yf side from line segment AD shows a region with a GWP of 1500 or less, and the R125 side from line segments GHI (which mean line segment GH and line segment HI, which are collectively referred to as "line segments GHI"; hereinafter the same) shows a region showing ASHRAE non-flammability. The pentagon surrounded by points G, H, I, N, and D represents a region with a GWP of 1500 or less and showing ASHRAE non-flammability. The pentagon surrounded by points G', H', I', N, and D represents a region with a GWP of 1500 or less and showing ASHRAE non-flammability in which safety ratio, described later, are taken into consideration for nonflammable refrigerants R134a and R125.
Figure 3:
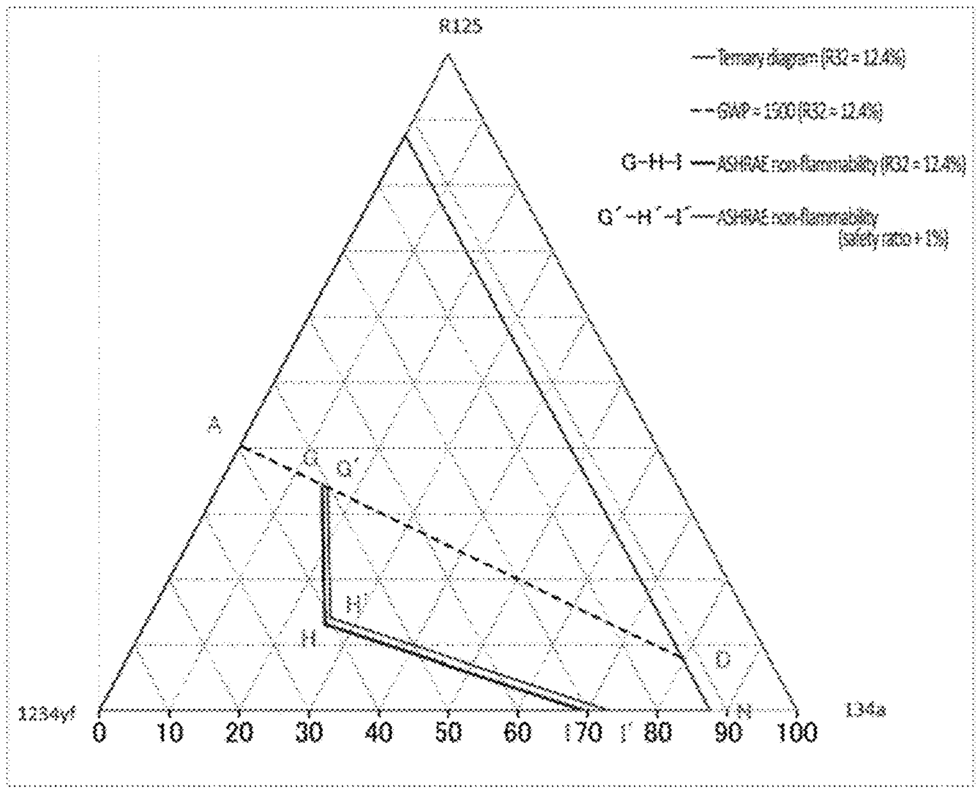
Figure 4:
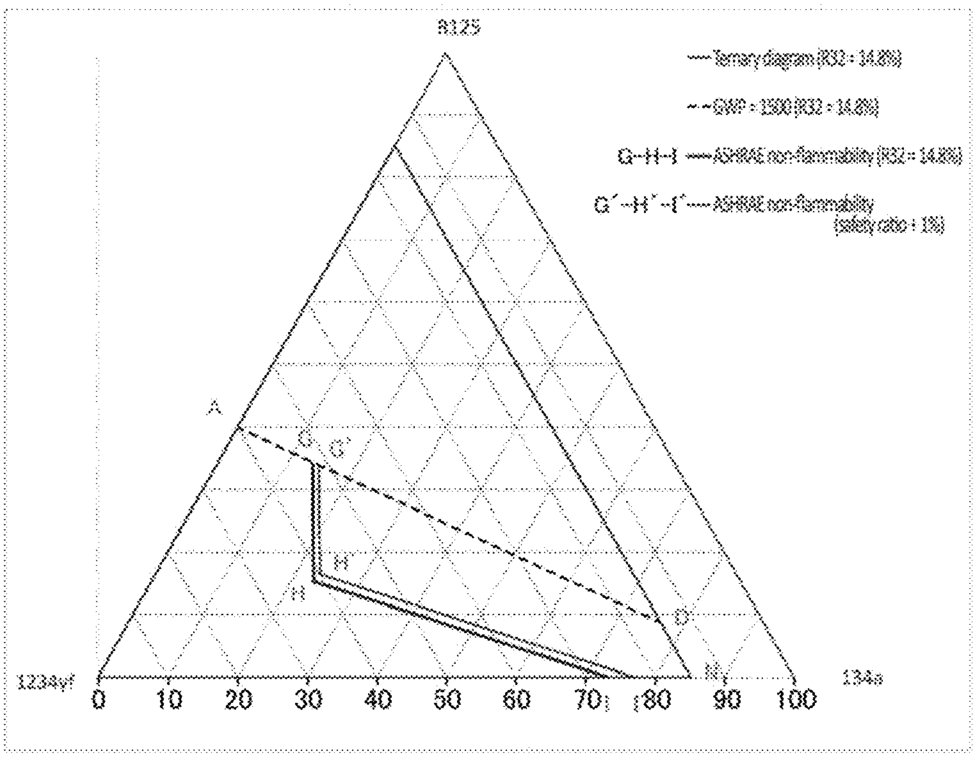
Figure 5:
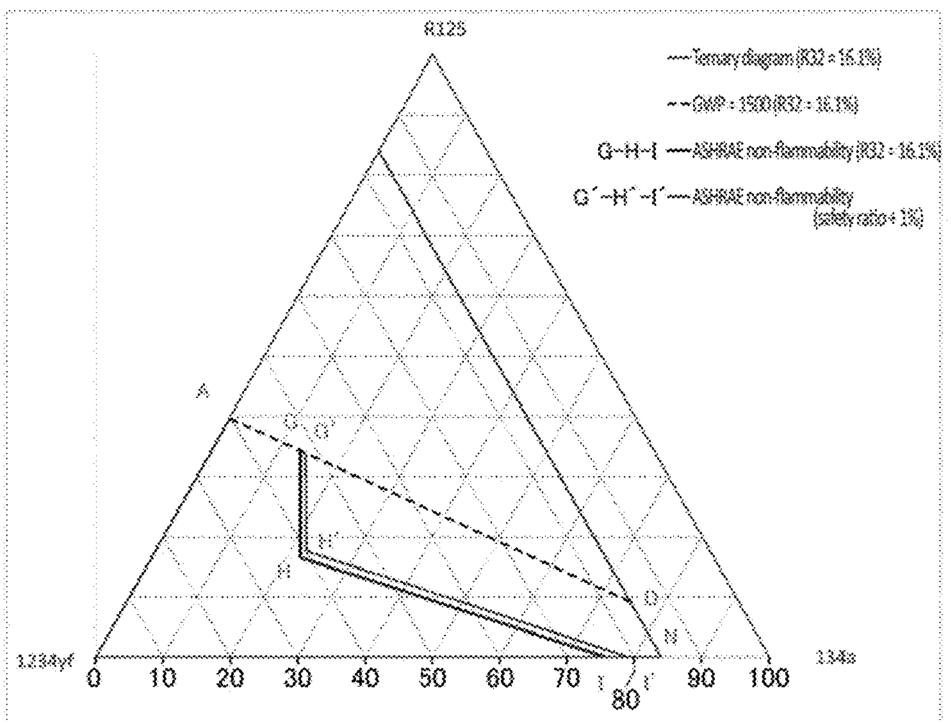
Figure 6:
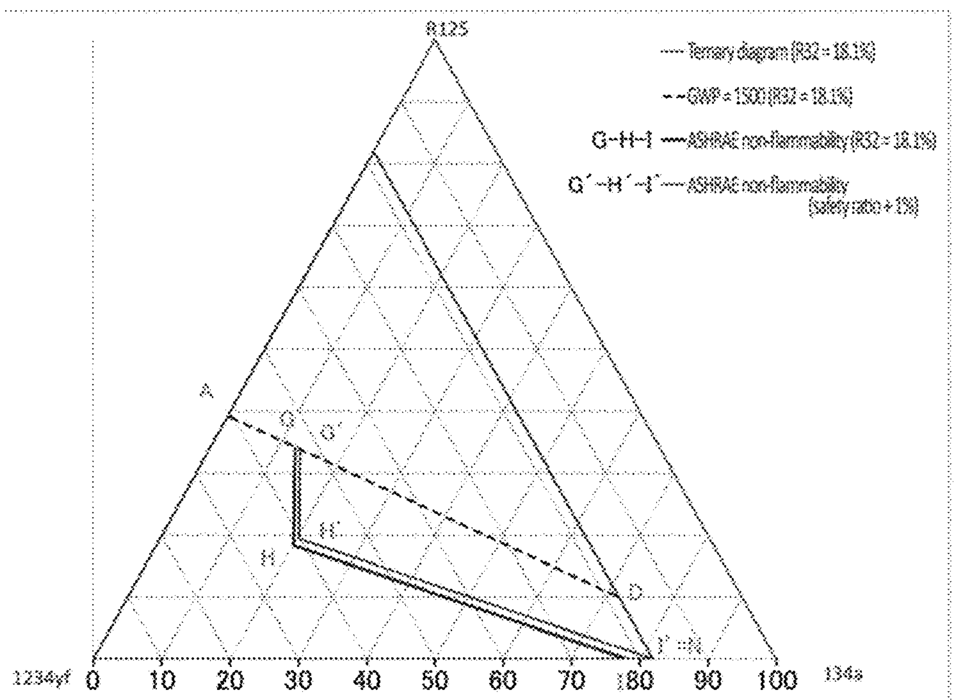
Figure 7:
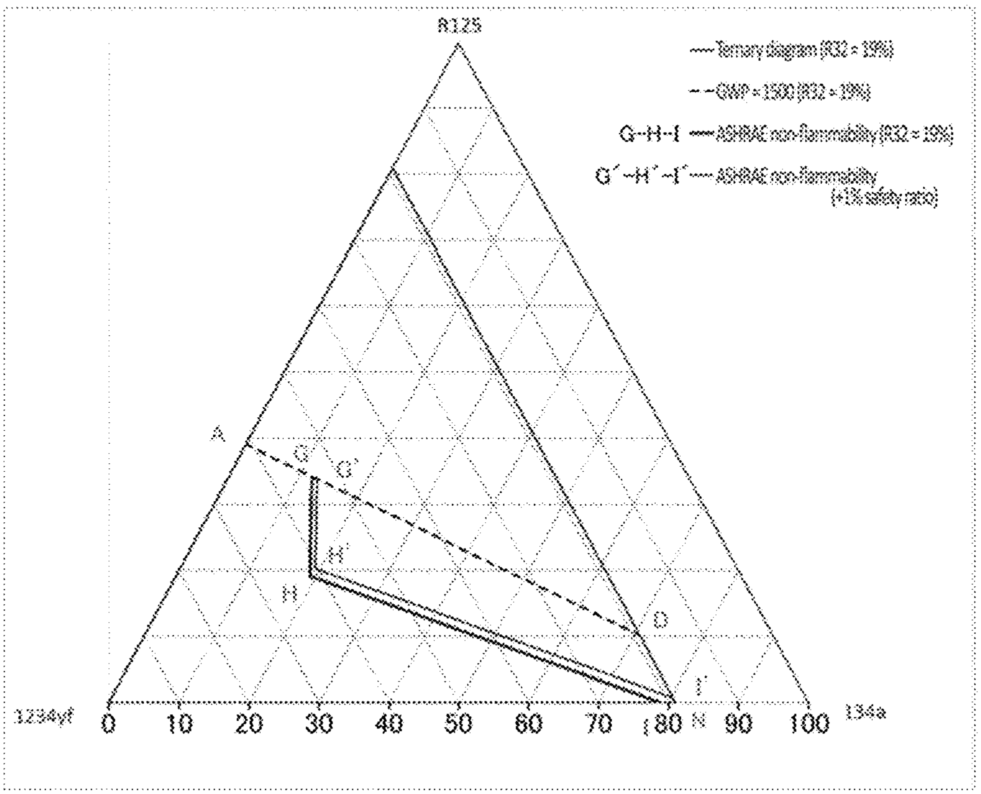
Figure 8:
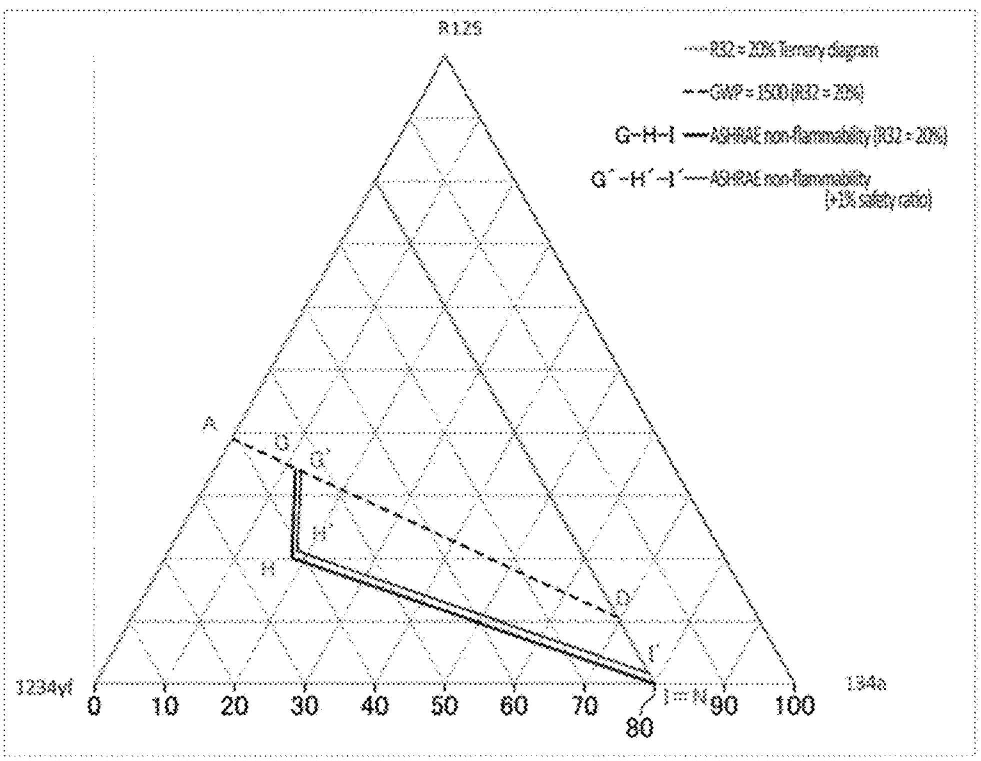
FIGS. 8 to 14 show the compositions of the above mixture (a quadrilateral surrounded by points G, H, I, and D; and a quadrilateral surrounded by points G', H', I', and D) in a ternary composition diagram of R125, 1234yf, and R134a, when the concentration of R32 is 20.0, 21.6, 22.6, 23.2, 24.5, 25.6, and 26.6 wt %. The quadrilateral surrounded by points G, H, I, and D represents a region with a GWP of 1500 or less, and showing ASHRAE non-flammability. The quadrilateral surrounded by points G', H', I', and D represents a region with a GWP of 1500 or less and showing ASHRAE non-flammability in which safety ratio, described later, are taken into consideration for nonflammable refrigerants R134a and R125.
Figure 9:
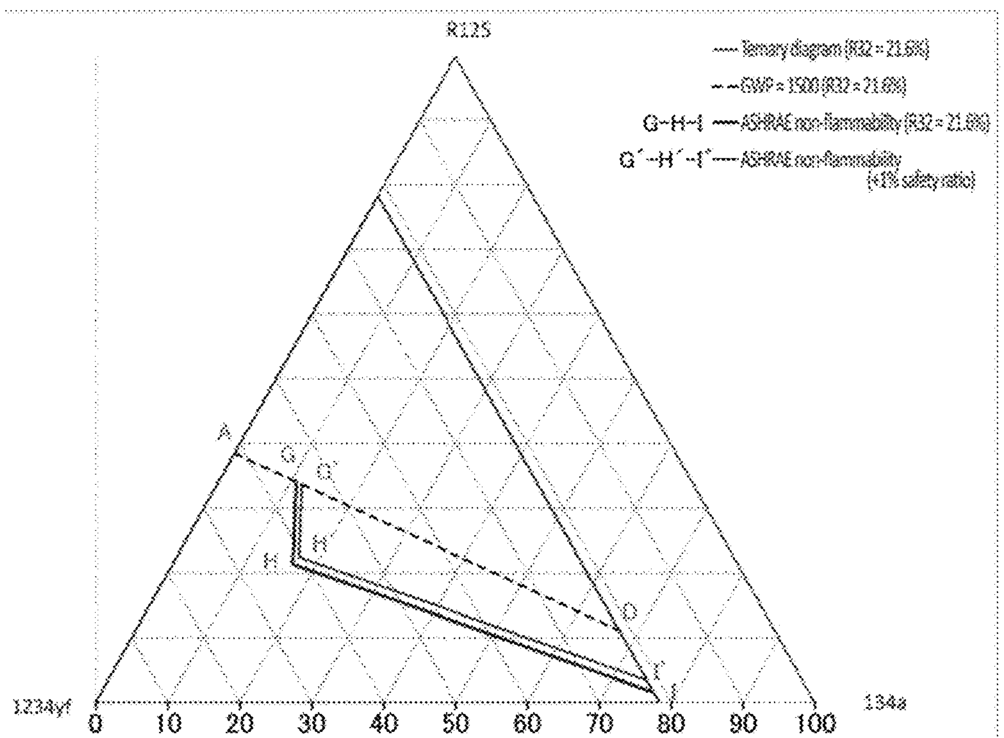
Figure 10:
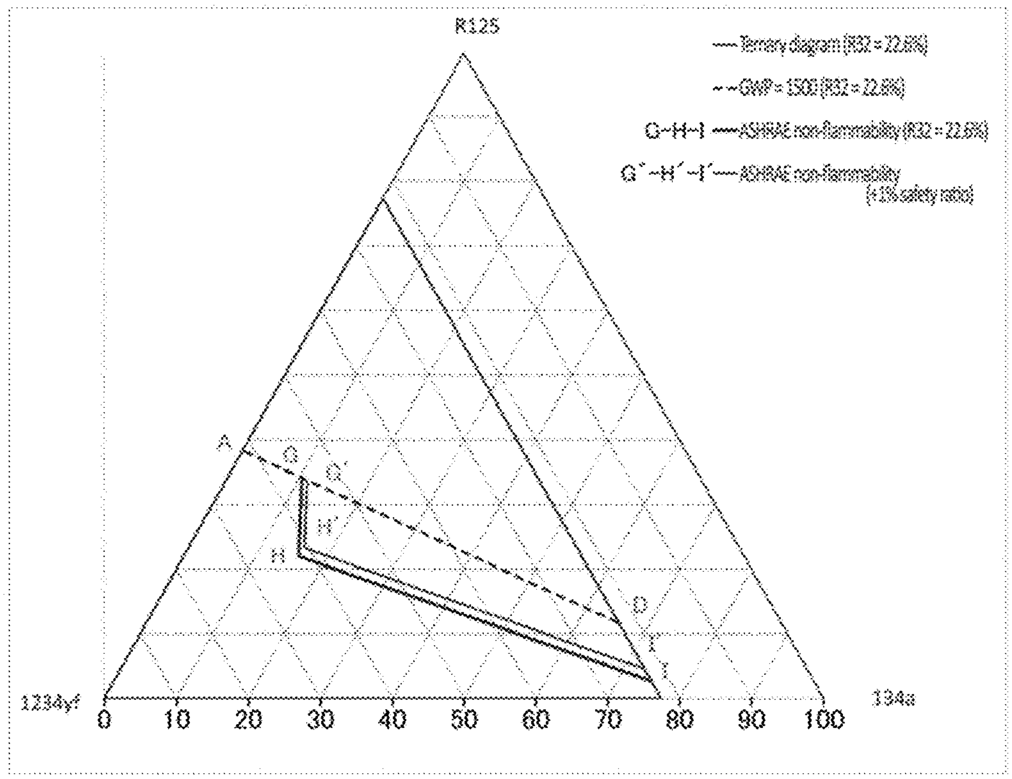
Figure 11:
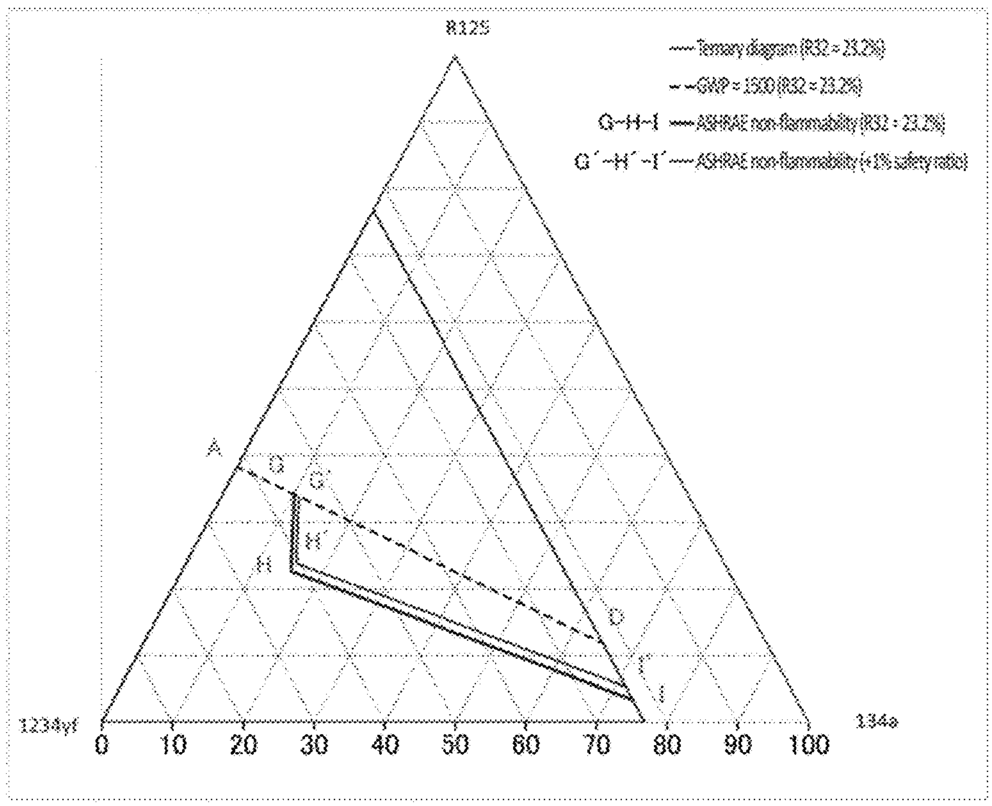
Figure 12:
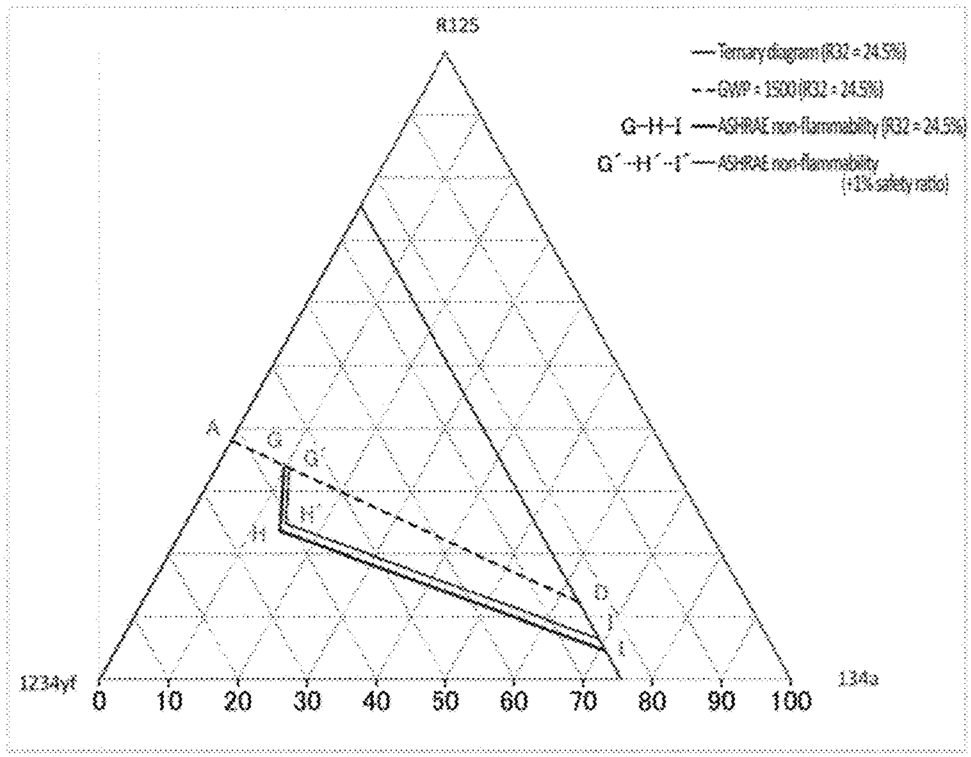
Figure 13:
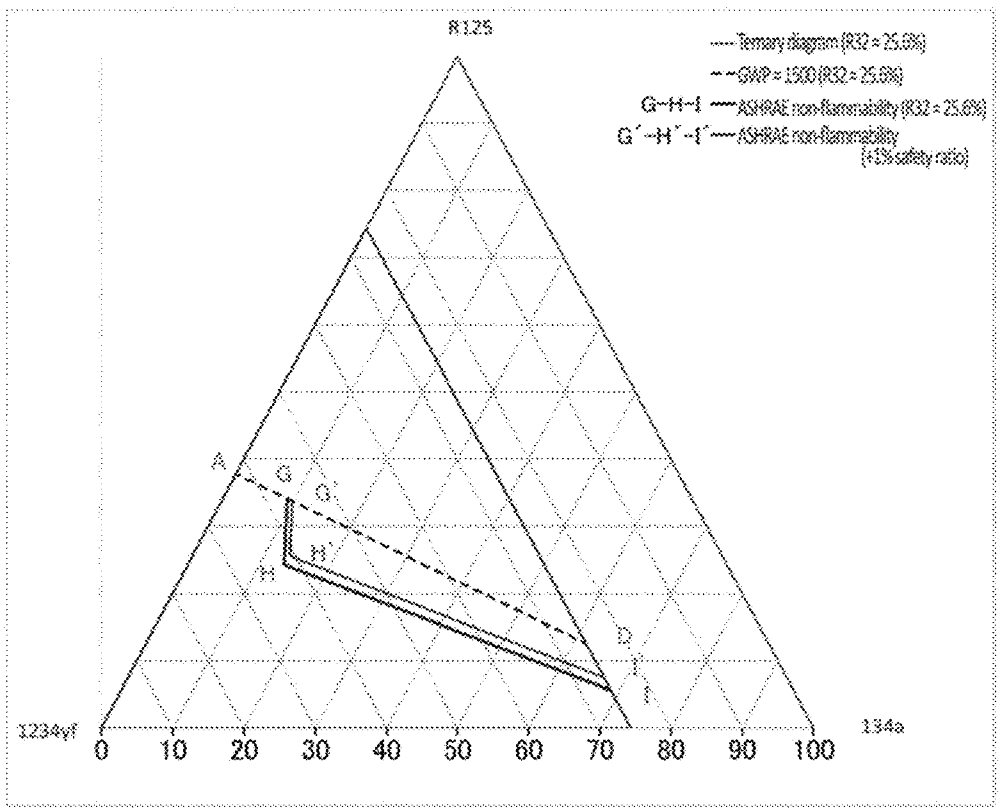
Figure 14:
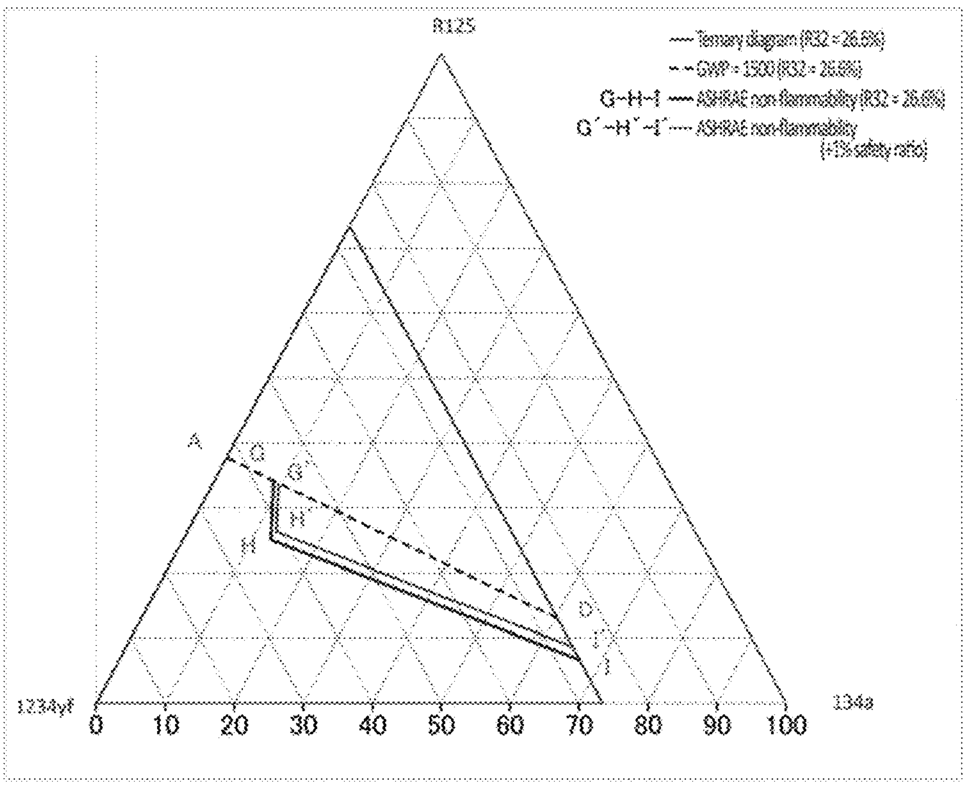
Figure 15:
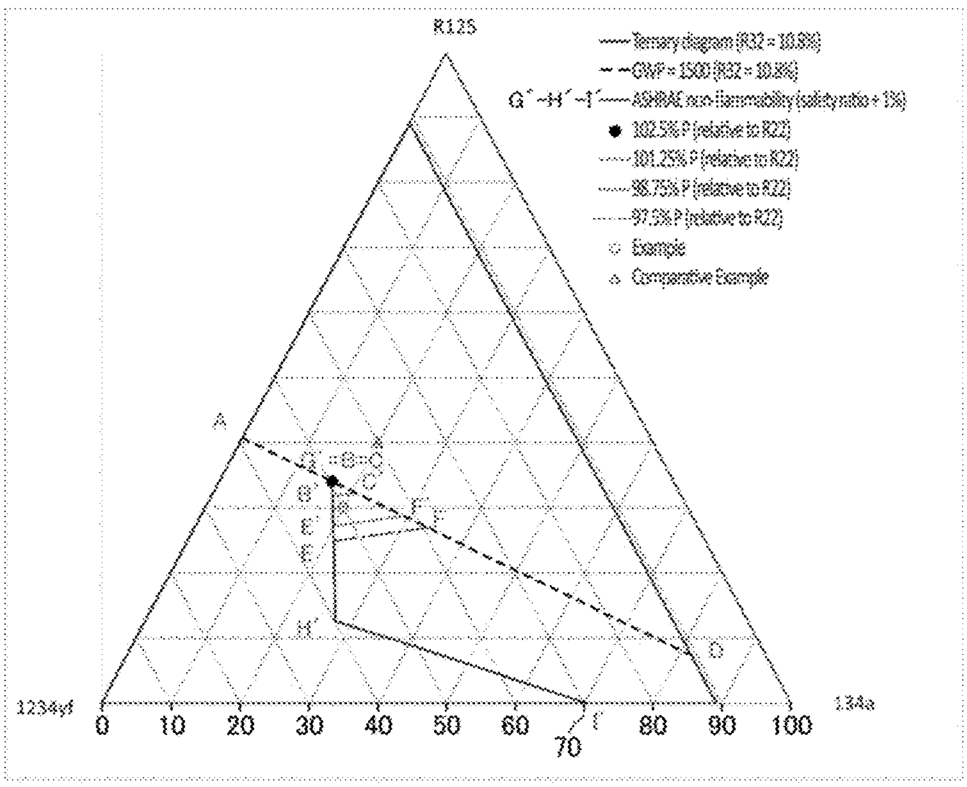
FIG. 15 shows the compositions of the above mixture (a triangle surrounded by points B (B=C=G'), F, and E; and a quadrilateral surrounded by points B', C', F', and E') in a ternary composition diagram of R125, 1234yf, and R134a, when the concentration of R32 is 10.8 wt %. The triangle surrounded by points B, F, and E represents a region with a GWP of 1500 or less, showing ASHRAE non-flammability in which safety ratio are taken into consideration, and having a compressor outlet pressure within ±2.5% of the pressure of R22. The quadrilateral surrounded by points B', C', F', and E' represents a region with a GWP of 1500 or less, showing ASHRAE non-flammability in which safety ratio are taken into consideration, and having a compressor outlet pressure within ±1.25% of the pressure of R22.
Figure 16:
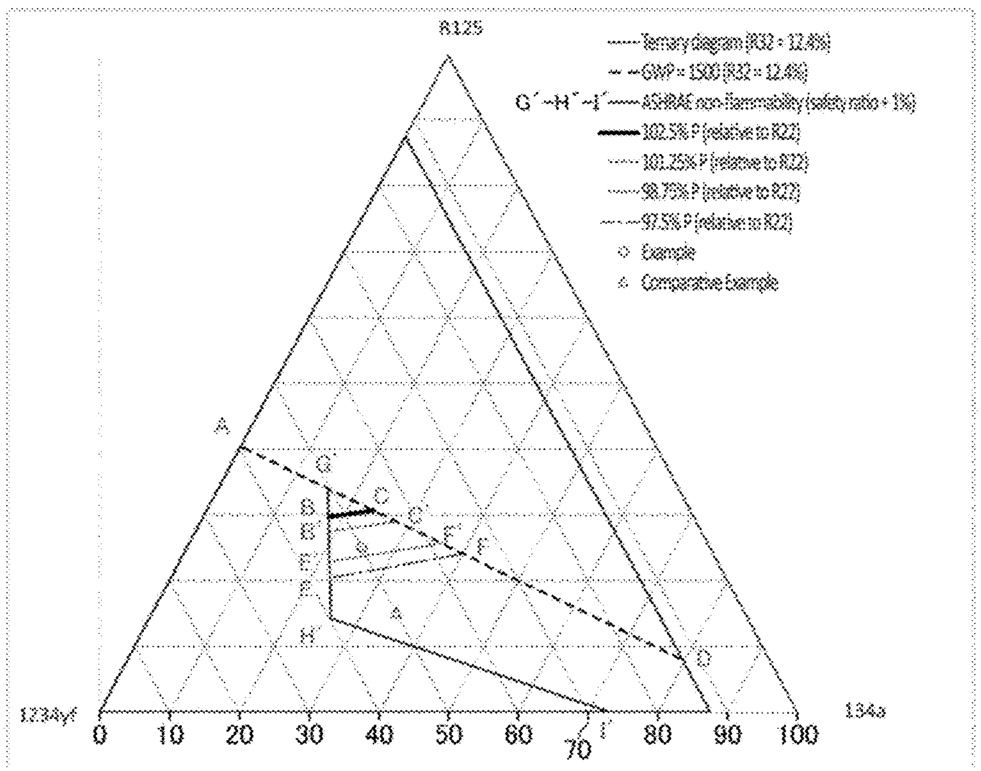
FIGS. 16 and 17 show the compositions of the above mixture (a quadrilateral surrounded by points B, C, F, and E; and a quadrilateral surrounded by points B', C', F', and E') in a ternary composition diagram of R125, 1234yf, and R134a, when the concentration of R32 is 12.4 and 14.1 wt %. The quadrilateral surrounded by points B, C, F, and E represents a region with a GWP of 1500 or less, showing ASHRAE non-flammability in which safety ratio are taken into consideration, and having a compressor outlet pressure within ±2.5% of the pressure of R22. The quadrilateral surrounded by points B', C', F', and E' represents a region with a GWP of 1500 or less, showing ASHRAE non-flammability in which safety ratio are taken into consideration, and having a compressor outlet pressure within ±1.25% of the pressure of R22.
Figure 17:
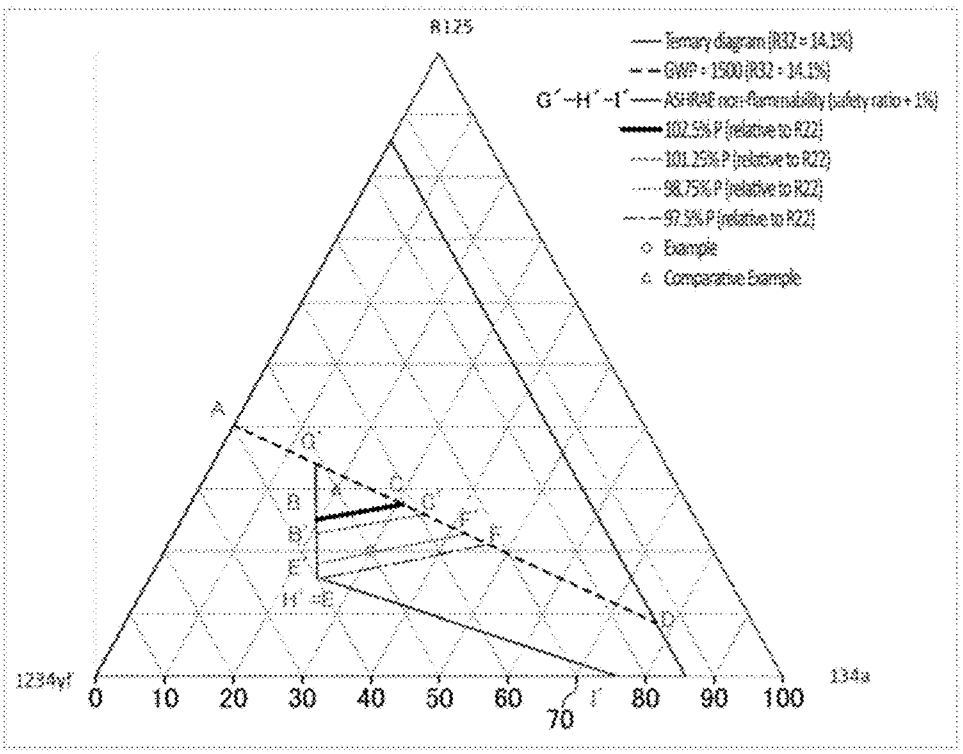
Figure 18:
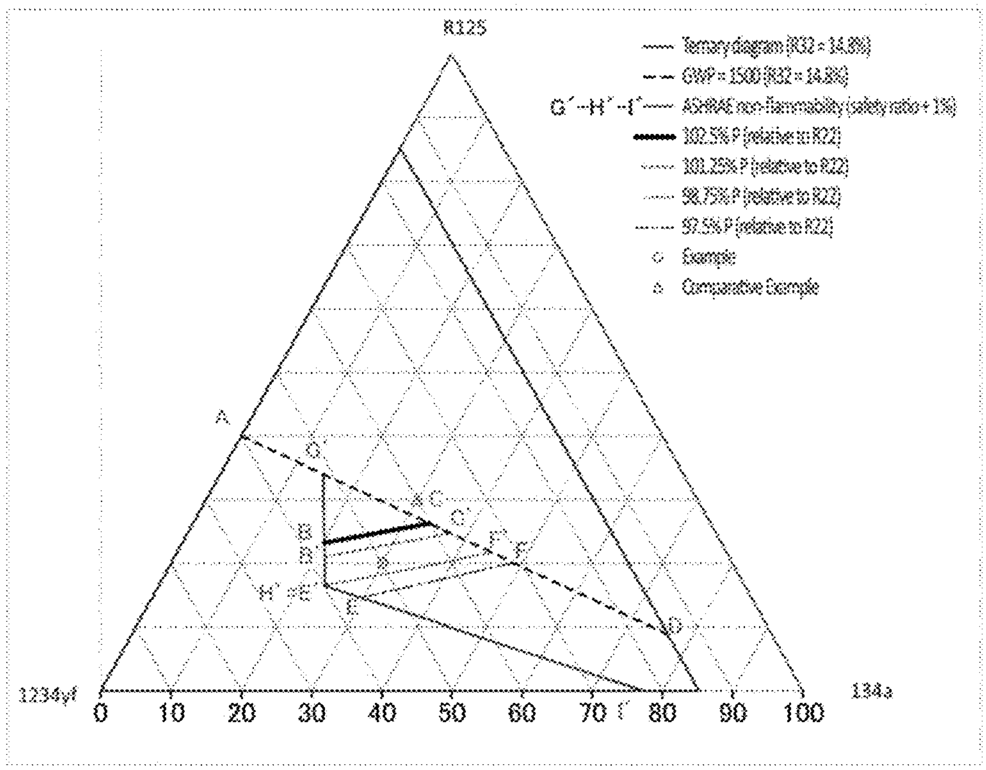
FIGS. 18 and 19 show the compositions of the above mixture (a pentagon surrounded by points B, C, F, E, and H'; and a quadrilateral surrounded by points B', C', F', and E') in a ternary composition diagram of R125, 1234yf, and R134a, when the concentration of R32 is 14.8 and 16.1 wt %. The pentagon surrounded by points B, C, F, E, and H' represents a region with a GWP of 1500 or less, showing ASHRAE non-flammability in which safety ratio are taken into consideration, and having a compressor outlet pressure within ±2.5% of the pressure of R22. The quadrilateral surrounded by points B', C', F', and E' represents a region with a GWP of 1500 or less, showing ASHRAE non-flammability in which safety ratio are taken into consideration, and having a compressor outlet pressure within ±1.25% of the pressure of R22.
Figure 19:
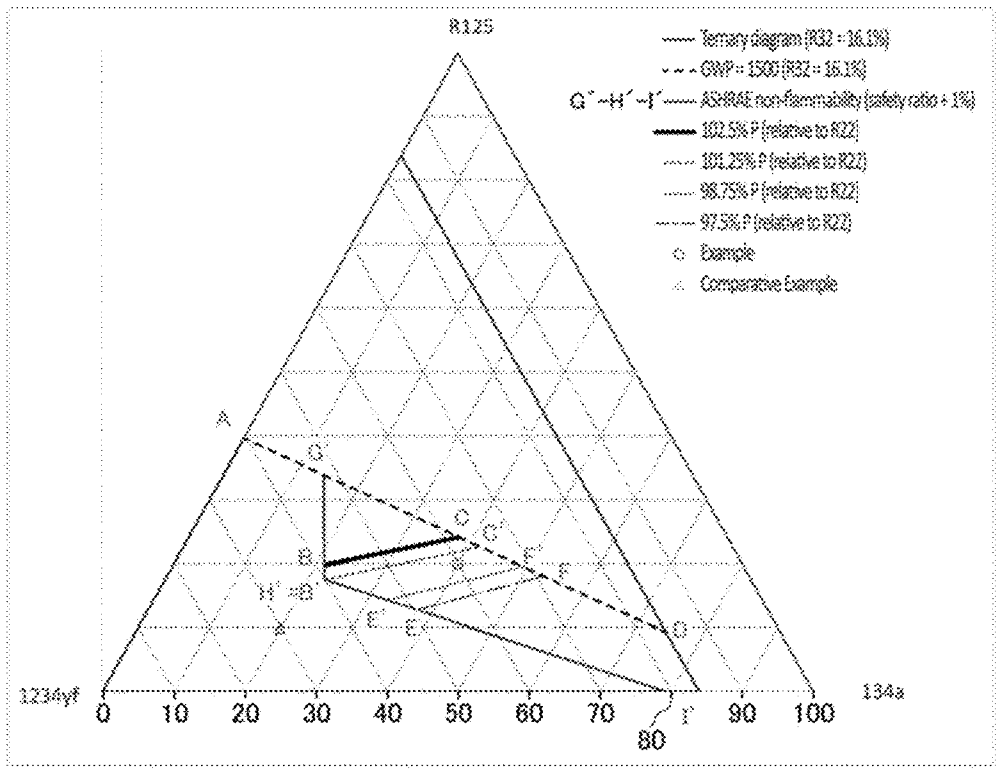
Figure 20:
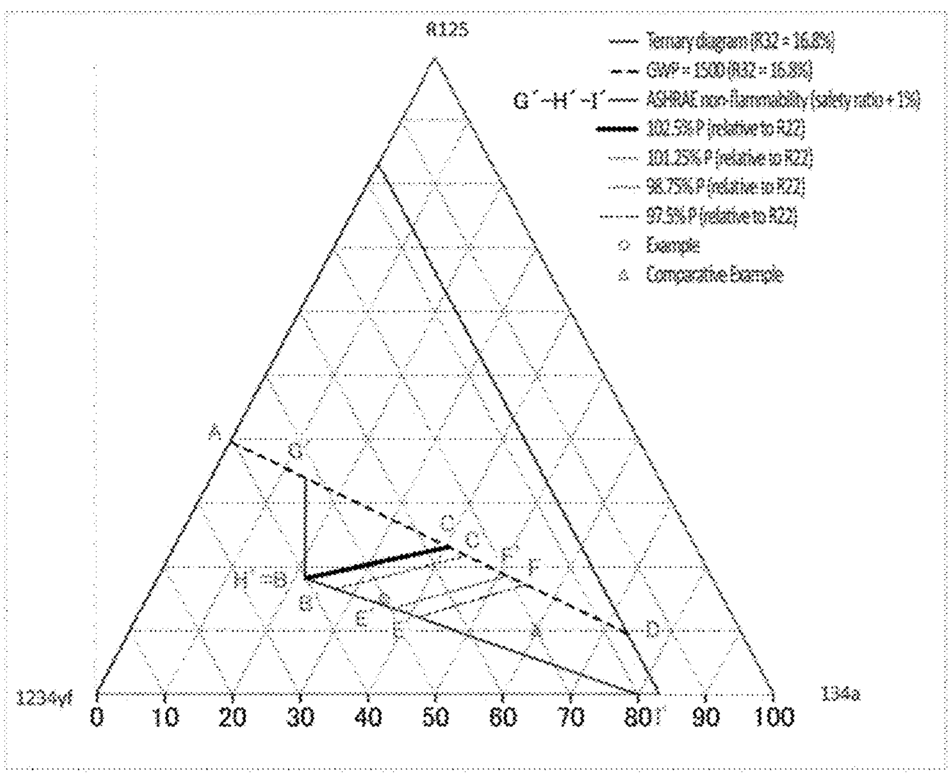
FIGS. 20 to 24 show the compositions of the above mixture (a quadrilateral surrounded by points B, C, F, and E; and a quadrilateral surrounded by points B', C', F', and E') in a ternary composition diagram of R125, 1234yf, and R134a, when the concentration of R32 is 16.8, 18.1, 18.7, 20.0, and 21.6 wt %. The quadrilateral surrounded by points B, C, F, and E represents a region with a GWP of 1500 or less, showing ASHRAE non-flammability in which safety ratio are taken into consideration, and having a compressor outlet pressure within ±2.5% of the pressure of R22. The quadrilateral surrounded by points B', C', F', and E' represents a region with a GWP of 1500 or less, showing ASHRAE non-flammability in which safety ratio are taken into consideration, and having a compressor outlet pressure within ±1.25% of the pressure of R22.
Figure 21:
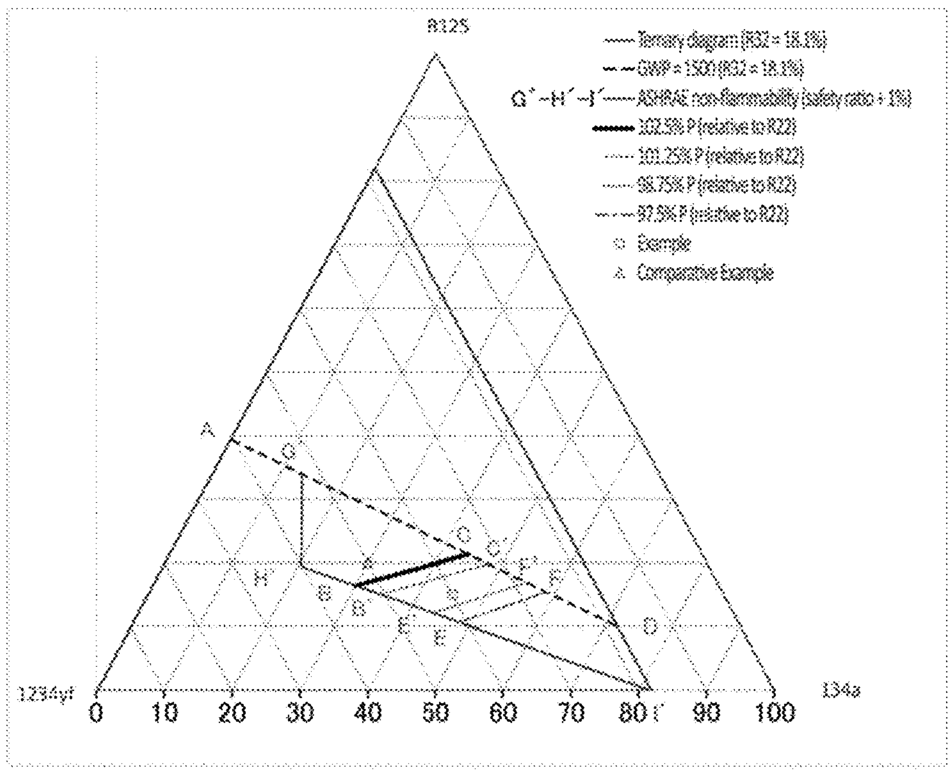
Figure 22:
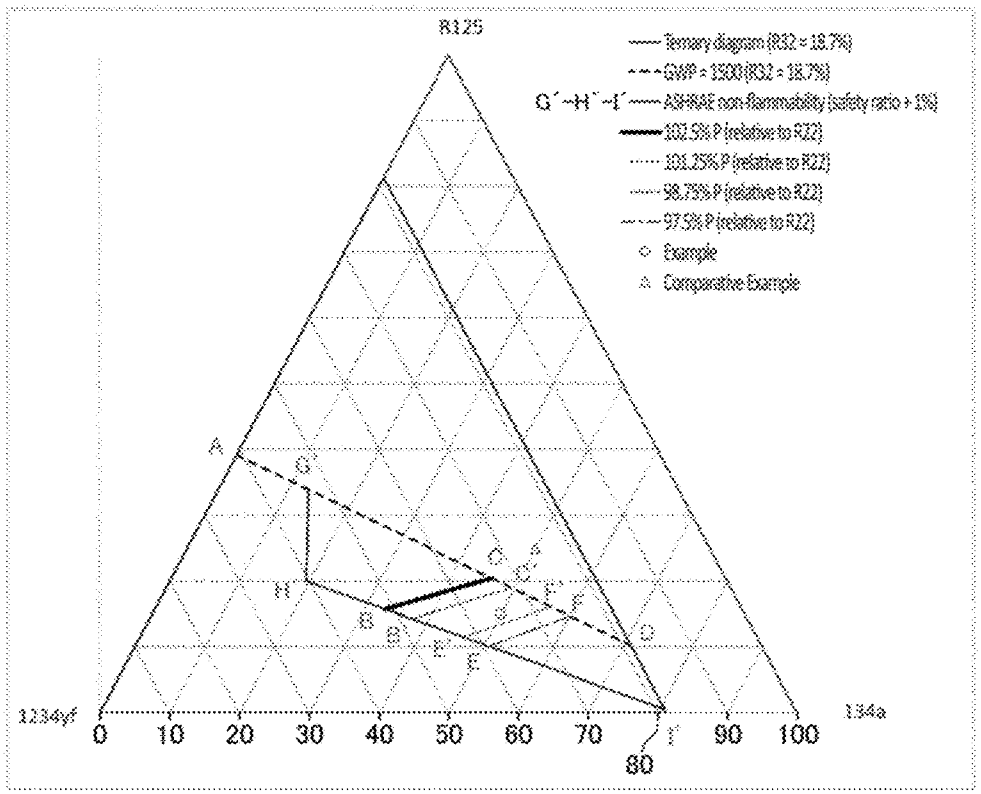
Figure 23:
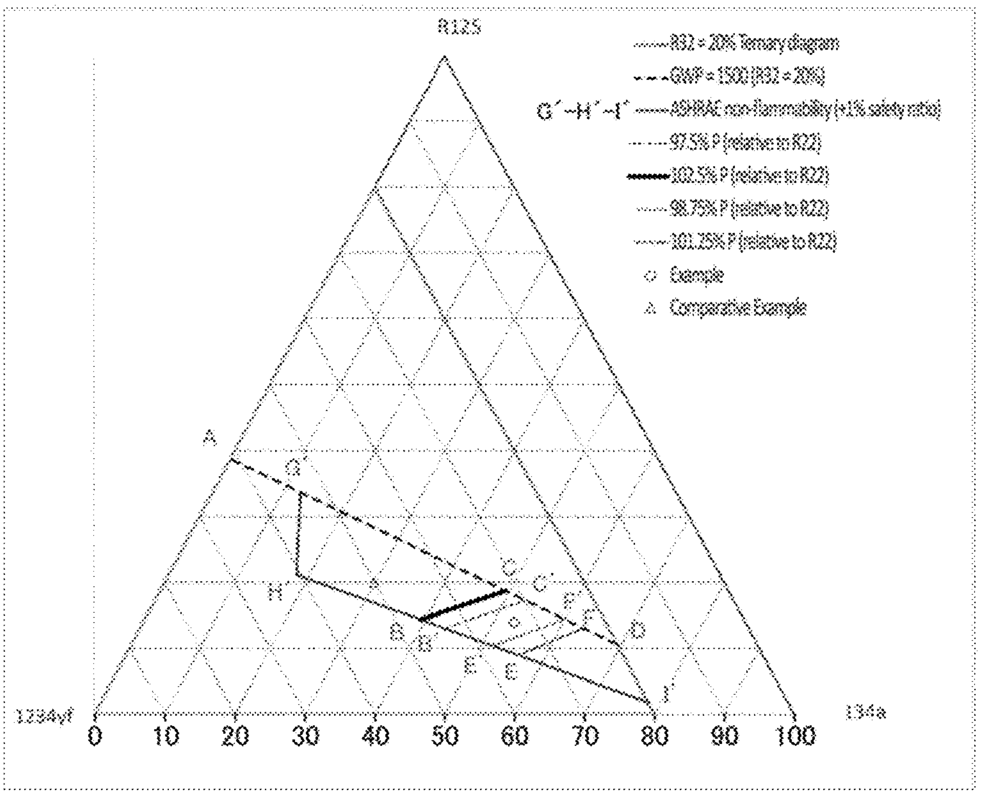
Figure 24:
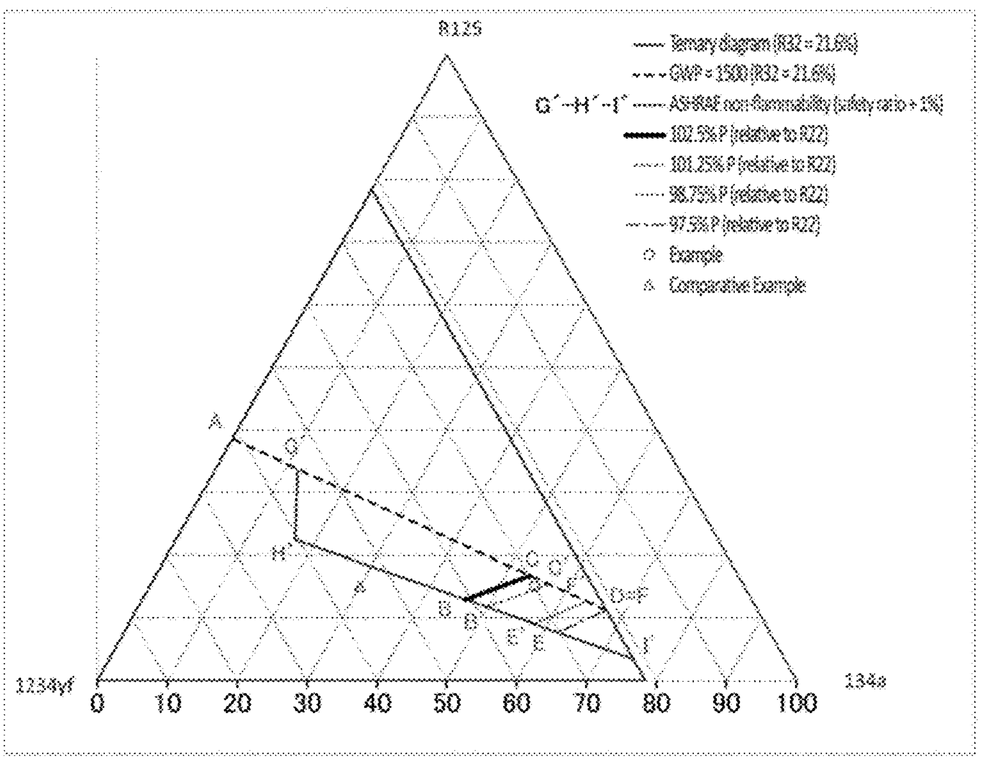
Figure 25:
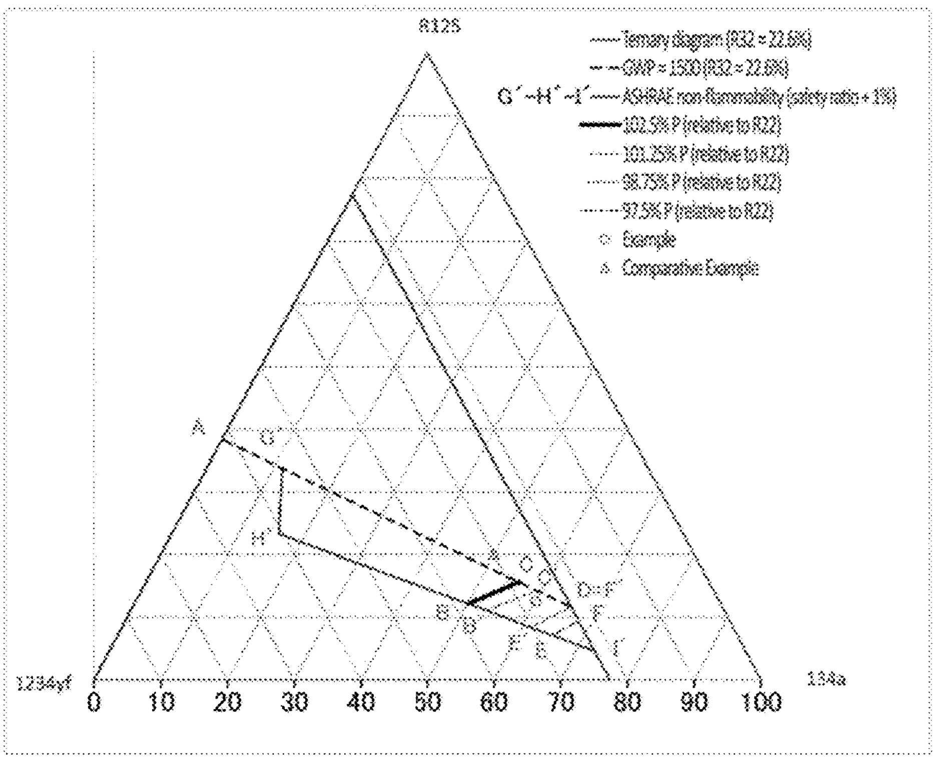
FIG. 25 shows the compositions of the above mixture (a pentagon surrounded by points B, C, D, F, and E; and a quadrilateral surrounded by points B', C', F' (=D), and E') in a ternary composition diagram of R125, 1234yf, and R134a, when the concentration of R32 is 22.6 wt %. The pentagon surrounded by points B, C, D, F, and E represents a region with a GWP of 1500 or less, showing ASHRAE non-flammability in which safety ratio are taken into consideration, and having a compressor outlet pressure within ±2.5% of the pressure of R22. The quadrilateral surrounded by points B', C', F', and E' represents a region with a GWP of 1500 or less, showing ASHRAE non-flammability in which safety ratio are taken into consideration, and having a compressor outlet pressure within ±1.25% of the pressure of R22.
Figure 26:
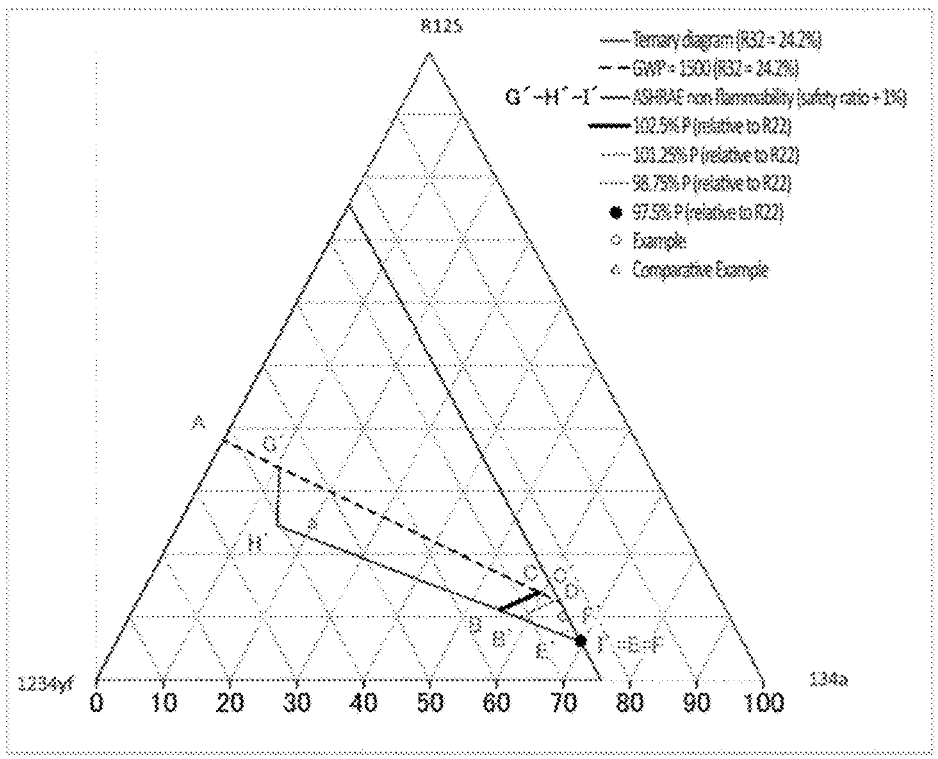
FIG. 26 shows the compositions of the above mixture (a quadrilateral surrounded by points B, C, D, and F (F=E=I'); and a pentagon surrounded by points B', C', D, F', and E') in a ternary composition diagram of R125, 1234yf, and R134a, when the concentration of R32 is 24.2 wt %. The quadrilateral surrounded by points B, C, D, and F represents a region with a GWP of 1500 or less, showing ASHRAE non-flammability in which safety ratio are taken into consideration, and having a compressor outlet pressure within ±2.5% of the pressure of R22. The pentagon surrounded by points B', C', D, F', and E' represents a region with a GWP of 1500 or less, showing ASHRAE non-flammability in which safety ratio are taken into consideration, and having a compressor outlet pressure within ±1.25% of the pressure of R22.
Figure 27:
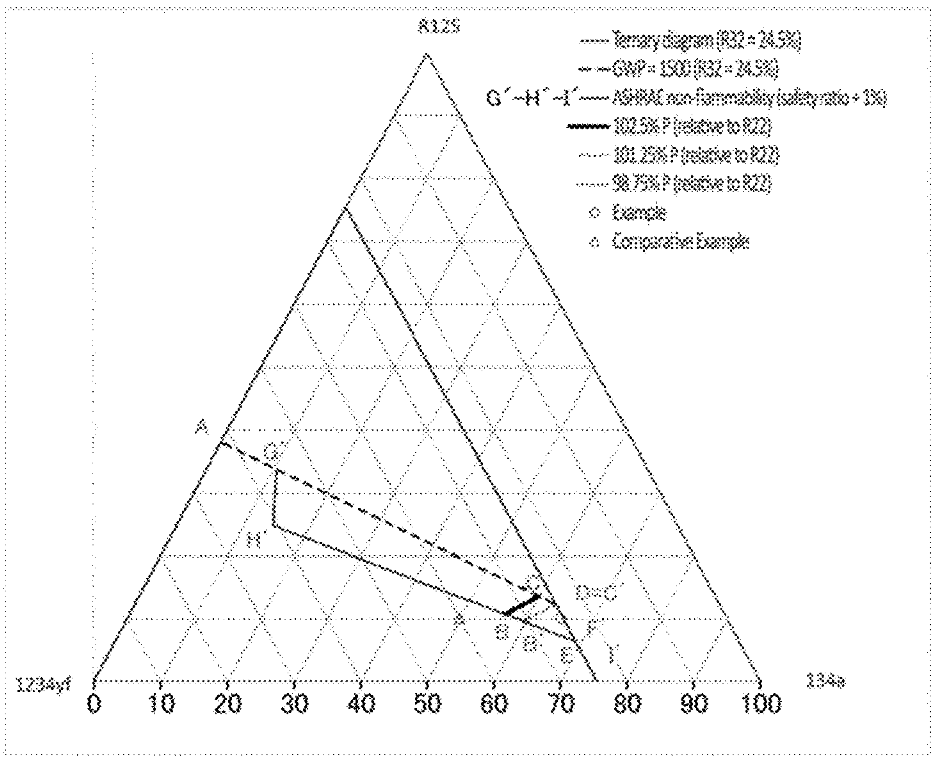
FIG. 27 shows the compositions of the above mixture (a quadrilateral surrounded by points B, C, D, and I'; and a quadrilateral surrounded by points B', C' (=D), F', and E') in a ternary composition diagram of R125, 1234yf, and R134a, when the concentration of R32 is 24.5 wt %. The quadrilateral surrounded by points B, C, D, and I' represents a region with a GWP of 1500 or less, showing ASHRAE non-flammability in which safety ratio are taken into consideration, and having a compressor outlet pressure within ±2.5% of the pressure of R22. The quadrilateral surrounded by points B', C', F', and E' represents a region with a GWP of 1500 or less, showing ASHRAE non-flammability in which safety ratio are taken into consideration, and having a compressor outlet pressure within ±1.25% of the pressure of R22.
Figure 28:
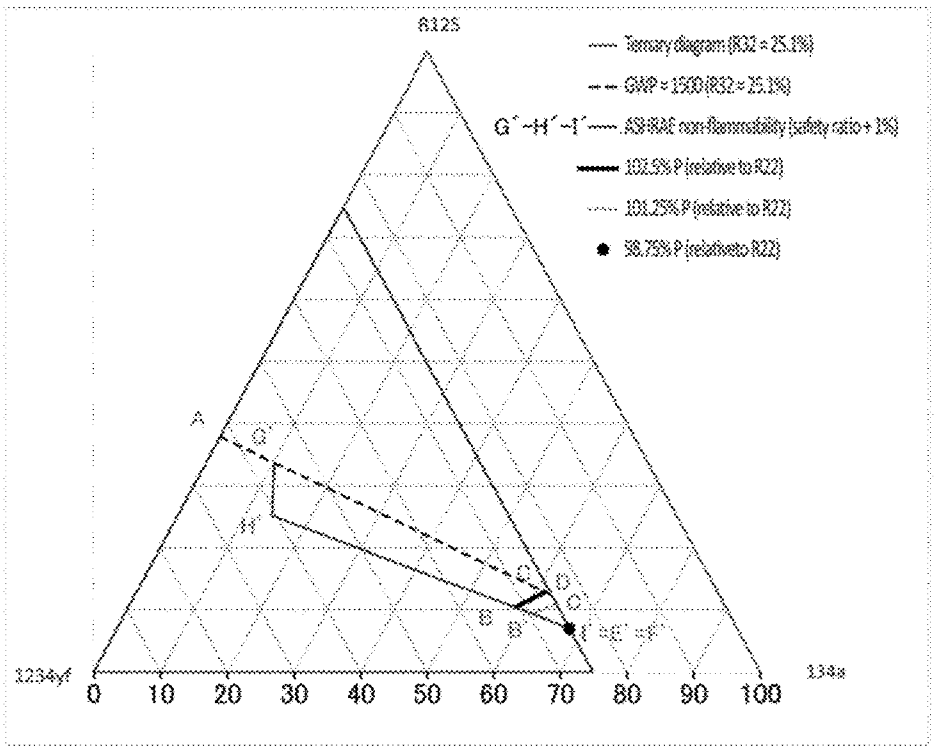
FIG. 28 shows the compositions of the above mixture (a quadrilateral surrounded by points B, C, D, and I'; and a triangle surrounded by points B', C', and F' (F'=E'=I')) in a ternary composition diagram of R125, 1234yf, and R134a, when the concentration of R32 is 25.1 wt %. The quadrilateral surrounded by points B, C, D, and I' represents a region with a GWP of 1500 or less, showing ASHRAE non-flammability in which safety ratio are taken into consideration, and having a compressor outlet pressure within ±2.5% of the pressure of R22. The triangle surrounded by points B', C', and F' represents a region with a GWP of 1500 or less, showing ASHRAE non-flammability in which safety ratio are taken into consideration, and having a compressor outlet pressure within ±1.25% of the pressure of R22.
Figure 29:
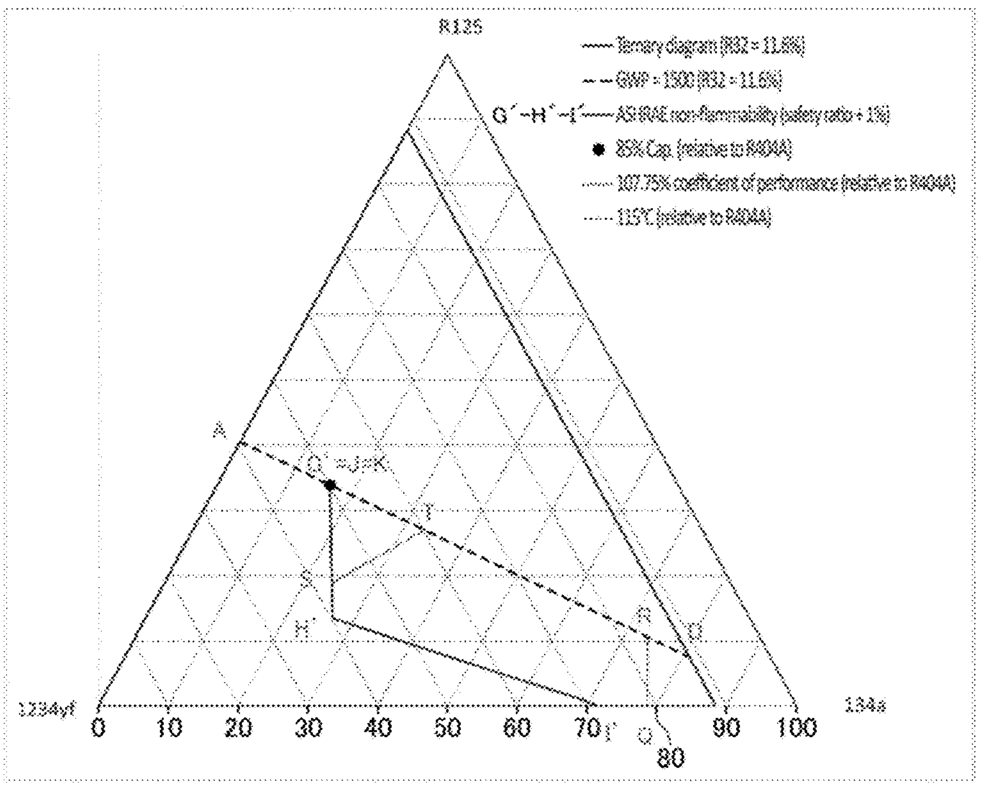
FIG. 29 shows the composition of the above mixture (represented by point J (J=K=G')) in a ternary composition diagram of R125, 1234yf, and R134a, when the concentration of R32 is 11.6 wt %. The 1234yf side from line segment QR represents a region having a compressor outlet temperature of 115° C. or less, and the R134 side from line segment ST represents a region having a COP of 107.75% or more. Moreover, point J represents a point with a GWP of 1500 or less, showing ASHRAE non-flammability in which safety ratio are taken into consideration, and having a compressor outlet temperature of 115° C. or less and a refrigerating capacity of 85% of that of R404A.
Figure 30:
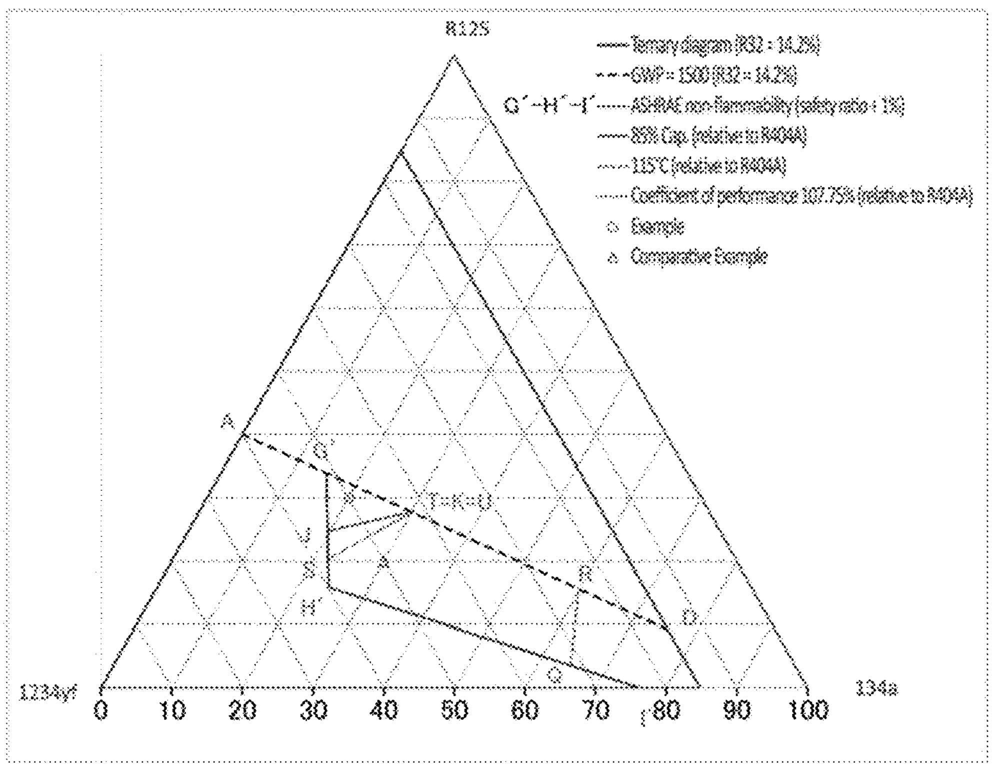
FIG. 30 shows the composition of the above mixture (a triangle surrounded by points G', J, and K) in a ternary composition diagram of R125, 1234yf, and R134a, when the concentration of R32 is 14.2 wt %. The triangle surrounded by points G', J, and K represents a region with a GWP of 1500 or less, showing ASHRAE non-flammability in which safety ratio are taken into consideration, and having a compressor outlet temperature of 115° C. or less and a refrigerating capacity of 85% or more of that of R404A.
Figure 31:
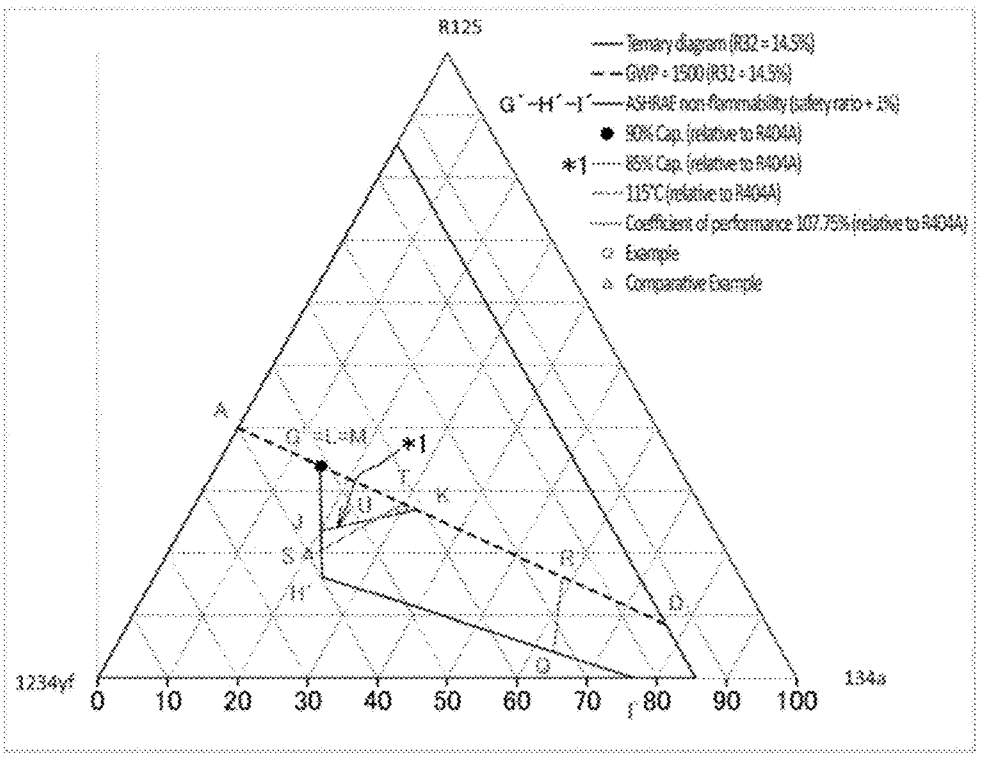
FIG. 31 shows the compositions of the above mixture (a triangle surrounded by points G', J, and K; a triangle surrounded by points T, K, and U; and point L (L=M=G')) in a ternary composition diagram of R125, 1234yf, and R134a, when the concentration of R32 is 14.5 wt %. The triangle surrounded by points G', J, and K represents a region with a GWP of 1500 or less, showing ASHRAE non-flammability in which safety ratio are taken into consideration, and having a compressor outlet temperature of 115° C. or less and a refrigerating capacity of 85% or more of that of R404A. The triangle surrounded by points T, K, and U represents a region with a GWP of 1500 or less, showing ASHRAE non-flammability in which safety ratio are taken into consideration, and having a compressor outlet temperature of 115° C. or less, a COP of 107.75% or more of that of R404A, and a refrigerating capacity of 85% or more of that of R404A. Point L represents a point with a GWP of 1500 or less, showing ASHRAE non-flammability in which safety ratio are taken into consideration, and having a compressor outlet temperature of 115° C. or less and a refrigerating capacity of 90% of that of R404A.
Figure 32:
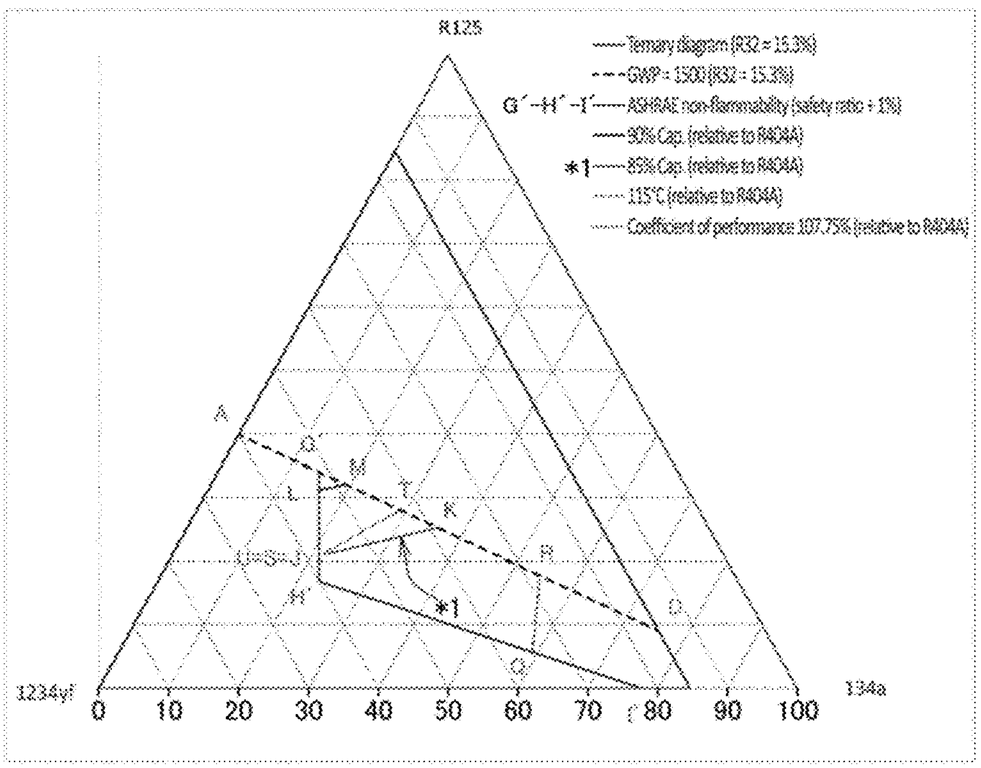
FIG. 32 shows the compositions of the above mixture (a triangle surrounded by points G', J, and K; a triangle surrounded by points T, K, and U (U=J=S); and a triangle surrounded by points G', L, and M) in a ternary composition diagram of R125, 1234yf, and R134a, when the concentration of R32 is 15.3 wt %. The triangle surrounded by points G', J, and K represents a region with a GWP of 1500 or less, showing ASHRAE non-flammability in which safety ratio are taken into consideration, and having a compressor outlet temperature of 115° C. or less and a refrigerating capacity of 85% or more of that of R404A. The triangle surrounded by points T, K, and U represents a region with a GWP of 1500 or less, showing ASHRAE non-flammability in which safety ratio are taken into consideration, and having a compressor outlet temperature of 115° C. or less, a COP of 107.75% or more of that of R404A, and a refrigerating capacity of 85% or more of that of R404A. The triangle surrounded by points G', L, and M represents a region with a GWP of 1500 or less, showing ASHRAE non-flammability in which safety ratio are taken into consideration, and having a compressor outlet temperature of 115° C. or less and a refrigerating capacity of 90% or more of that of R404A.
Figure 33:
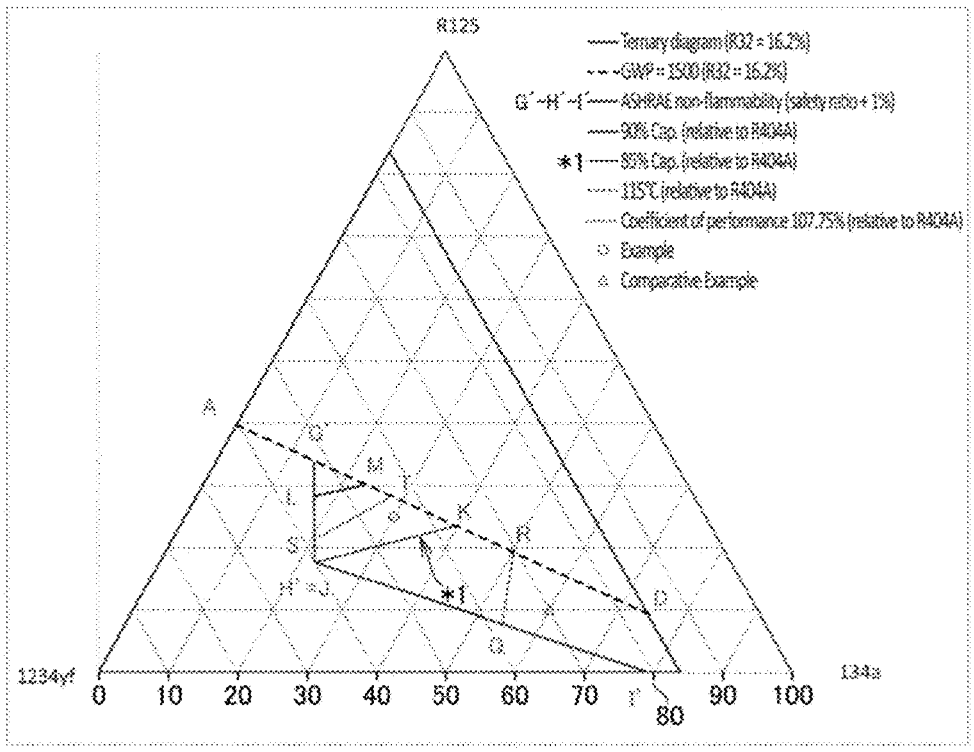
FIG. 33 shows the compositions of the above mixture (a triangle surrounded by points G', J (J=H'), and K; a quadrilateral surrounded by points S, T, K, and J (J=H'); and a triangle surrounded by points G', L, and M) in a ternary composition diagram of R125, 1234yf, and R134a, when the concentration of R32 is 16.2 wt %. The triangle surrounded by points G', J, and K represents a region with a GWP of 1500 or less, showing ASHRAE non-flammability in which safety ratio are taken into consideration, and having a compressor outlet temperature of 115° C. or less and a refrigerating capacity of 85% or more of that of R404A. The quadrilateral surrounded by points S, T, K, and J represents a region with a GWP of 1500 or less, showing ASHRAE non-flammability in which safety ratio are taken into consideration, and having a compressor outlet temperature of 115° C. or less, a COP of 107.75% or more of that of R404A, and a refrigerating capacity of 85% or more of that of R404A. The triangle surrounded by points G', L, and M represents a region with a GWP of 1500 or less, showing ASHRAE non-flammability in which safety ratio are taken into consideration, and having a compressor outlet temperature of 115° C. or less and a refrigerating capacity of 90% or more of that of R404A.
Figure 34:
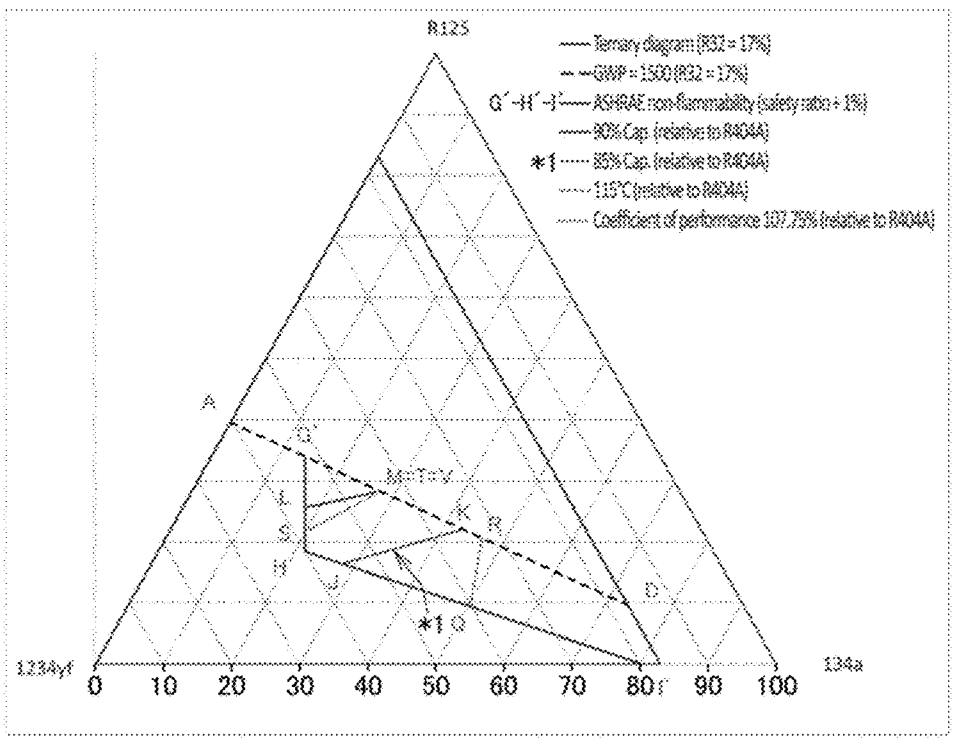
FIG. 34 shows the compositions of the above mixture (a quadrilateral surrounded by points G', H', J, and K; a pentagon surrounded by points S, T, K, J, and H'; and a triangle surrounded by points G', L, and M (M=T)) in a ternary composition diagram of R125, 1234yf, and R134a, when the concentration of R32 is 17.0 wt %. The quadrilateral surrounded by points G', H', J, and K represents a region with a GWP of 1500 or less, showing ASHRAE non-flammability in which safety ratio are taken into consideration, and having a compressor outlet temperature of 115° C. or less and a refrigerating capacity of 85% or more of that of R404A. The pentagon surrounded by points S, T, K, J, and H' represents a region with a GWP of 1500 or less, showing ASHRAE non-flammability in which safety ratio are taken into consideration, and having a compressor outlet temperature of 115° C. or less, a COP of 107.75% or more of that of R404A, and a refrigerating capacity of 85% or more of that of R404A. The triangle surrounded by points G', L, and M represents a region with a GWP of 1500 or less, showing ASHRAE non-flammability in which safety ratio are taken into consideration, and having a compressor outlet temperature of 115° C. or less and a refrigerating capacity of 90% or more of that of R404A.
Figure 35:
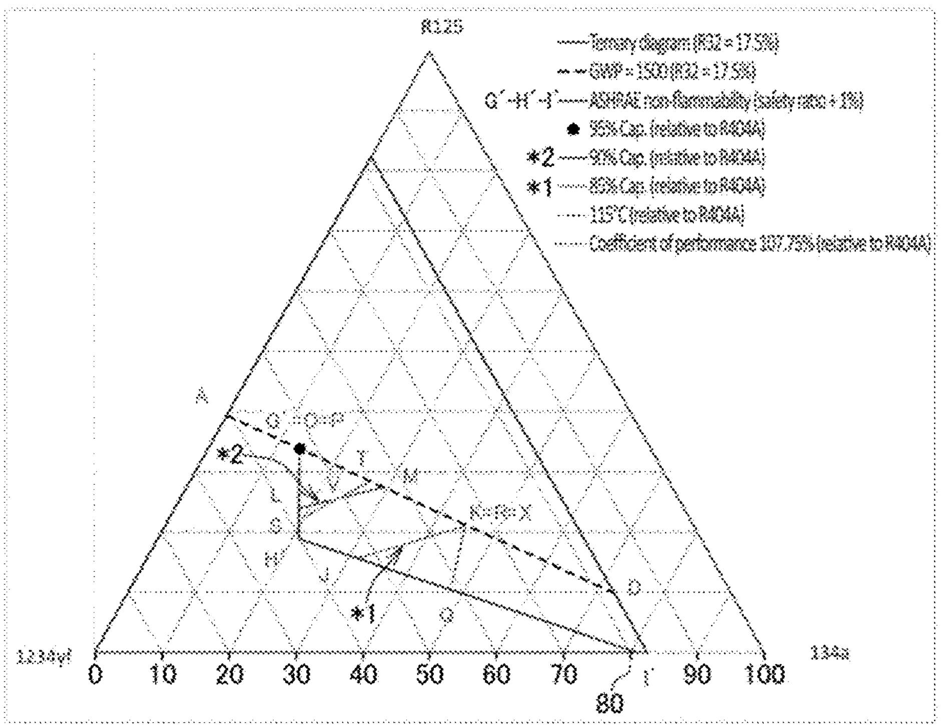
FIG. 35 shows the compositions of the above mixture (a quadrilateral surrounded by points G', H', J, and K (K=R); a pentagon surrounded by points S, T, K (K=R), J, and H'; a triangle surrounded by points G', L, and M; a triangle surrounded by points T, M, and V; and point O (O=P=G')) in a ternary composition diagram of R125, 1234yf, and R134a, when the concentration of R32 is 17.5 wt %. The quadrilateral surrounded by points G', H', J and K represents a region with a GWP of 1500 or less, showing ASHRAE non-flammability in which safety ratio are taken into consideration, and having a compressor outlet temperature of 115° C. or less and a refrigerating capacity of 85% or more of that of R404A. The pentagon surrounded by points S, T, K, J, and H' represents a region with a GWP of 1500 or less, showing ASHRAE non-flammability in which safety ratio are taken into consideration, and having a compressor outlet temperature of 115° C. or less, a COP of 107.75% or more of that of R404A, and a refrigerating capacity of 85% or more of that of R404A. The triangle surrounded by points G', L, and M represents a region with a GWP of 1500 or less, showing ASHRAE non-flammability in which safety ratio are taken into consideration, and having a compressor outlet temperature of 115° C. or less and a refrigerating capacity of 90% or more of that of R404A. The triangle surrounded by points T, M, and V represents a region with a GWP of 1500 or less, showing ASHRAE non-flammability in which safety ratio are taken into consideration, and having a compressor outlet temperature of 115° C. or less, a COP of 107.75% or more of that of R404A, and a refrigerating capacity of 90% or more of that of R404A. Point O (O=P=G') represents a point with a GWP of 1500, showing ASHRAE non-flammability in which safety ratio are taken into consideration, and having a refrigerating capacity of 95% of that of R404A.
Figure 36:
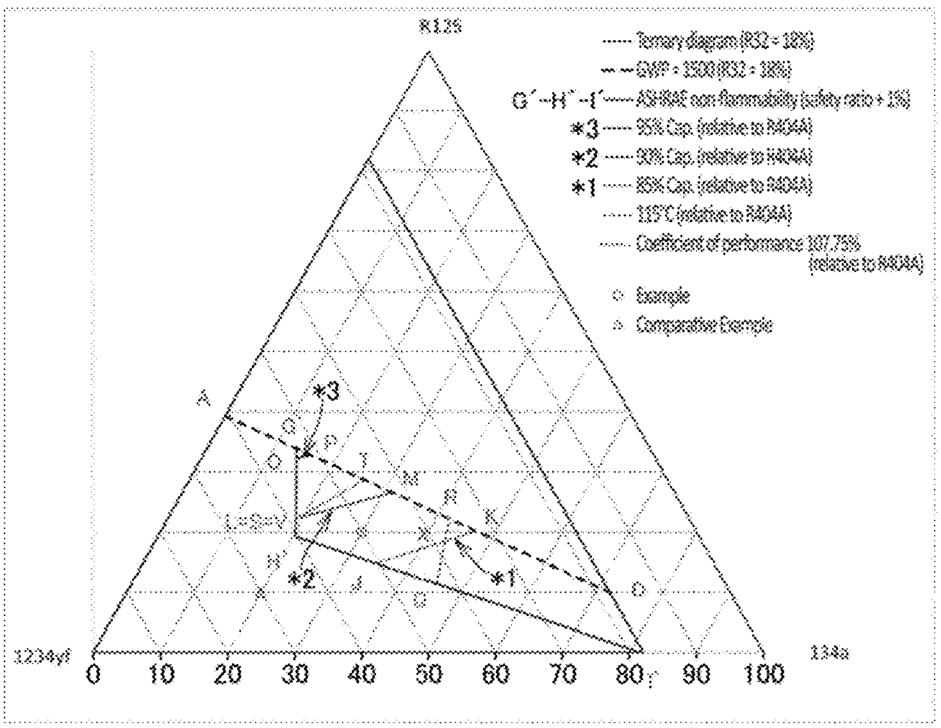
FIG. 36 shows the compositions of the above mixture (a quadrilateral surrounded by points G', H', J, and K; a hexagon surrounded by points S, T, R, X, J, and H'; a triangle surrounded by points G', L (L=S), and M; a triangle surrounded by points T, M, and V (V=L=S); and a triangle surrounded by points G', O, and P) in a ternary composition diagram of R125, 1234yf, and R134a, when the concentration of R32 is 18.0 wt %. The quadrilateral surrounded by points G', H', J, and K represents a region with a GWP of 1500 or less, showing ASHRAE non-flammability in which safety ratio are taken into consideration, and having a compressor outlet temperature of 115° C. or less and a refrigerating capacity of 85% or more of that of R404A. The hexagon surrounded by points S, T, R, X, J, and H' represents a region with a GWP of 1500 or less, showing ASHRAE non-flammability in which safety ratio are taken into consideration, and having a compressor outlet temperature of 115° C. or less, a COP of 107.75% or more of that of R404A, and a refrigerating capacity of 85% or more of that of R404A. The triangle surrounded by points G', L, and M represents a region with a GWP of 1500 or less, showing ASHRAE non-flammability in which safety ratio are taken into consideration, and having a compressor outlet temperature of 115° C. or less and a refrigerating capacity of 90% or more of that of R404A. The triangle surrounded by points T, M, and V represents a region with a GWP of 1500 or less, showing ASHRAE non-flammability in which safety ratio are taken into consideration, and having a compressor outlet temperature of 115° C. or less, a COP of 107.75% or more of that of R404A, and a refrigerating capacity of 90% or more of that of R404A. The triangle surrounded by points G', O, and P represents a region with a GWP of 1500 or less, showing ASHRAE non-flammability in which safety ratio are taken into consideration, and having a refrigerating capacity of 95% or more of that of R404A.
Figure 37:
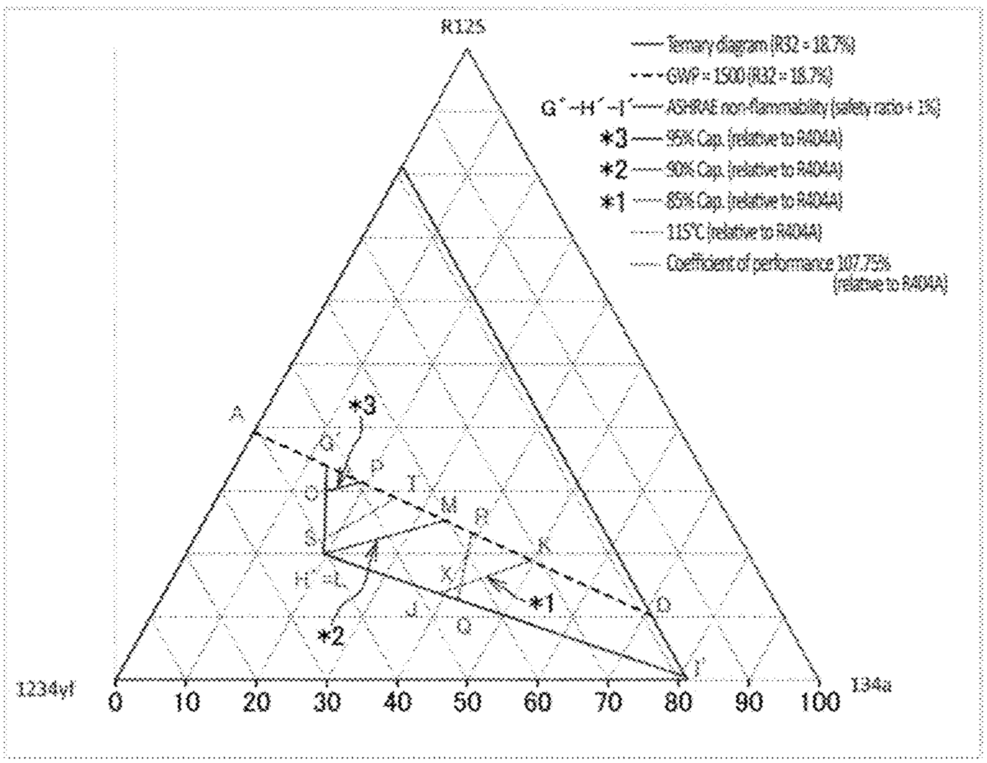
FIG. 37 shows the compositions of the above mixture (a pentagon surrounded by points G', H', J, X, and R; a hexagon surrounded by points S, T, R, X, J, and H'; a triangle surrounded by points G', L (L=H'), and M; a quadrilateral surrounded by points S, T, M, and L (L=H'); and a triangle surrounded by points G', O, and P) in a ternary composition diagram of R125, 1234yf, and R134a, when the concentration of R32 is 18.7 wt %. The pentagon surrounded by points G', H', J, X, and K represents a region with a GWP of 1500 or less, showing ASHRAE non-flammability in which safety ratio are taken into consideration, and having a compressor outlet temperature of 115° C. or less and a refrigerating capacity of 85% or more of that of R404A. The hexagon surrounded by points S, T, R, X, J, and H' represents a region with a GWP of 1500 or less, showing ASHRAE non-flammability in which safety ratio are taken into consideration, and having a compressor outlet temperature of 115° C. or less, a COP of 107.75% or more of that of R404A, and a refrigerating capacity of 85% or more of that of R404A. The triangle surrounded by points G', L, and M represents a region with a GWP of 1500 or less, showing ASHRAE non-flammability in which safety ratio are taken into consideration, and having a compressor outlet temperature of 115° C. or less and a refrigerating capacity of 90% or more of that of R404A. The quadrilateral surrounded by points S, T, M, and L represents a region with a GWP of 1500 or less, showing ASHRAE non-flammability in which safety ratio are taken into consideration, and having a compressor outlet temperature of 115° C. or less, a COP of 107.75% or more of that of R404A, and a refrigerating capacity of 90% or more of that of R404A. The triangle surrounded by points G', O, and P represents a region with a GWP of 1500 or less, showing ASHRAE non-flammability in which safety ratio are taken into consideration, and having a refrigerating capacity of 95% or more of that of R404A.
Figure 38:
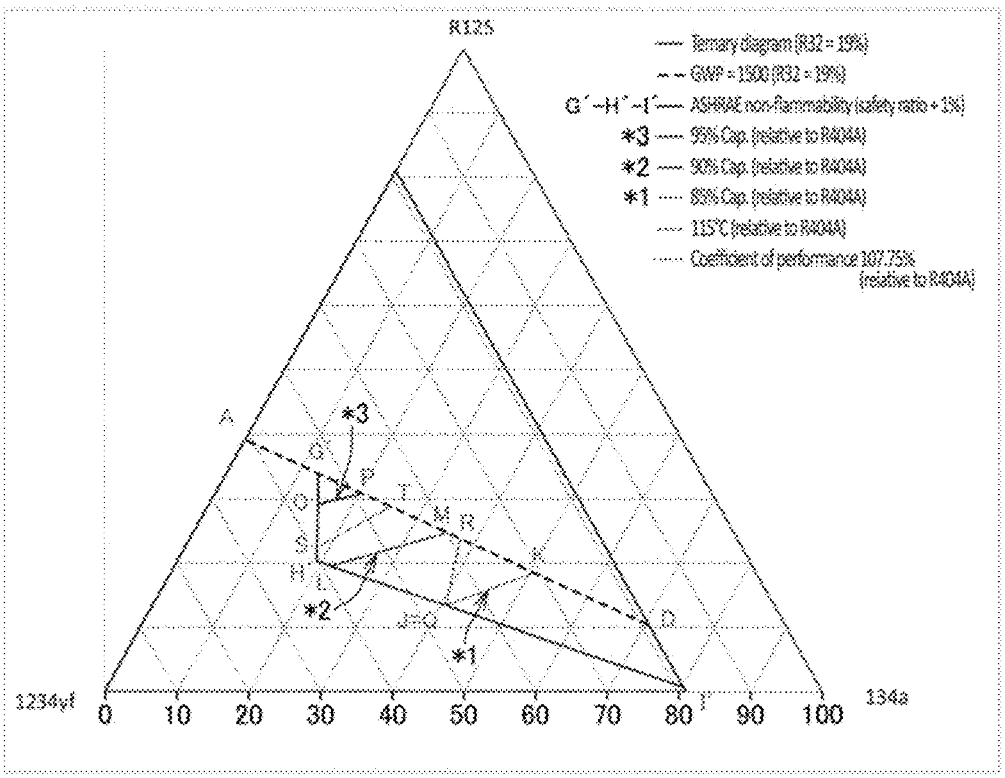
FIG. 38 shows the compositions of the above mixture (a quadrilateral surrounded by points G', H', Q (Q=J), and R; a pentagon surrounded by points S, T, R, Q (Q=J), and H'; a quadrilateral surrounded by points G', H', L, and M; a pentagon surrounded by points S, T, M, L, and H'; and a triangle surrounded by points G', O, and P) in a ternary composition diagram of R125, 1234yf, and R134a, when the concentration of R32 is 19.0 wt %. The quadrilateral surrounded by points G', H', Q, and R represents a region with a GWP of 1500 or less, showing ASHRAE non-flammability in which safety ratio are taken into consideration, and having a compressor outlet temperature of 115° C. or less and a refrigerating capacity of 85% or more of that of R404A. The pentagon surrounded by points S, T, R, Q, and H' represents a region with a GWP of 1500 or less, showing ASHRAE non-flammability in which safety ratio are taken into consideration, and having a compressor outlet temperature of 115° C. or less, a COP of 107.75% or more of that of R404A, and a refrigerating capacity of 85% or more of that of R404A. The quadrilateral surrounded by points G', H', L, and M represents a region with a GWP of 1500 or less, showing ASHRAE non-flammability in which safety ratio are taken into consideration, and having a compressor outlet temperature of 115° C. or less and a refrigerating capacity of 90% or more of that of R404A. The pentagon surrounded by points S, T, M, L, and H' represents a region with a GWP of 1500 or less, showing ASHRAE non-flammability in which safety ratio are taken into consideration, and having a compressor outlet temperature of 115° C. or less, a COP of 107.75% or more of that of R404A, and a refrigerating capacity of 90% or more of that of R404A. The triangle surrounded by points G', O, and P represents a region with a GWP of 1500 or less, showing ASHRAE non-flammability in which safety ratio are taken into consideration, and having a refrigerating capacity of 95% or more of that of R404A.
Figure 39:
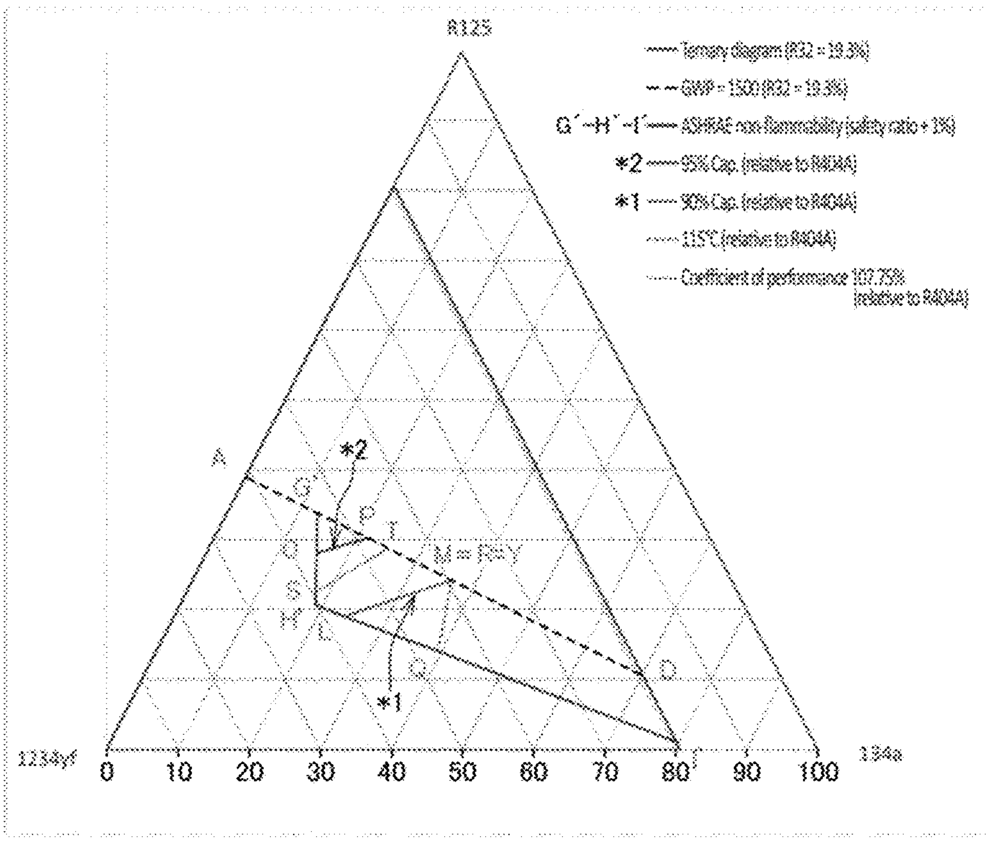
FIG. 39 shows the compositions of the above mixture (a quadrilateral surrounded by points G', H', Q, and R; a pentagon surrounded by points S, T, R, Q, and H'; a quadrilateral surrounded by points G', H', L, and M (M=R); a pentagon surrounded by points S, T, M (M=R), L, and H'; and a triangle surrounded by points G', O, and P) in a ternary composition diagram of R125, 1234yf, and R134a, when the concentration of R32 is 19.3 wt %. The quadrilateral surrounded by points G', H', Q, and R represents a region with a GWP of 1500 or less, showing ASHRAE non-flammability in which safety ratio are taken into consideration, and having a compressor outlet temperature of 115° C. or less and a refrigerating capacity of 85% or more of that of R404A. The pentagon surrounded by points S, T, R, Q, and H' represents a region with a GWP of 1500 or less, showing ASHRAE non-flammability in which safety ratio are taken into consideration, and having a compressor outlet temperature of 115° C. or less, a COP of 107.75% or more of that of R404A, and a refrigerating capacity of 85% or more of that of R404A. The quadrilateral surrounded by points G', H', L, and M represents a region with a GWP of 1500 or less, showing ASHRAE non-flammability in which safety ratio are taken into consideration, and having a compressor outlet temperature of 115° C. or less and a refrigerating capacity of 90% or more of that of R404A. The pentagon surrounded by points S, T, M, L, and H' represents a region with a GWP of 1500 or less, showing ASHRAE non-flammability in which safety ratio are taken into consideration, and having a compressor outlet temperature of 115° C. or less, a COP of 107.75% or more of that of R404A, and a refrigerating capacity of 90% or more of that of R404A. The triangle surrounded by points G', O, and P represents a region with a GWP of 1500 or less, showing ASHRAE non-flammability in which safety ratio are taken into consideration, and having a refrigerating capacity of 95% or more of that of R404A.
Figure 40:
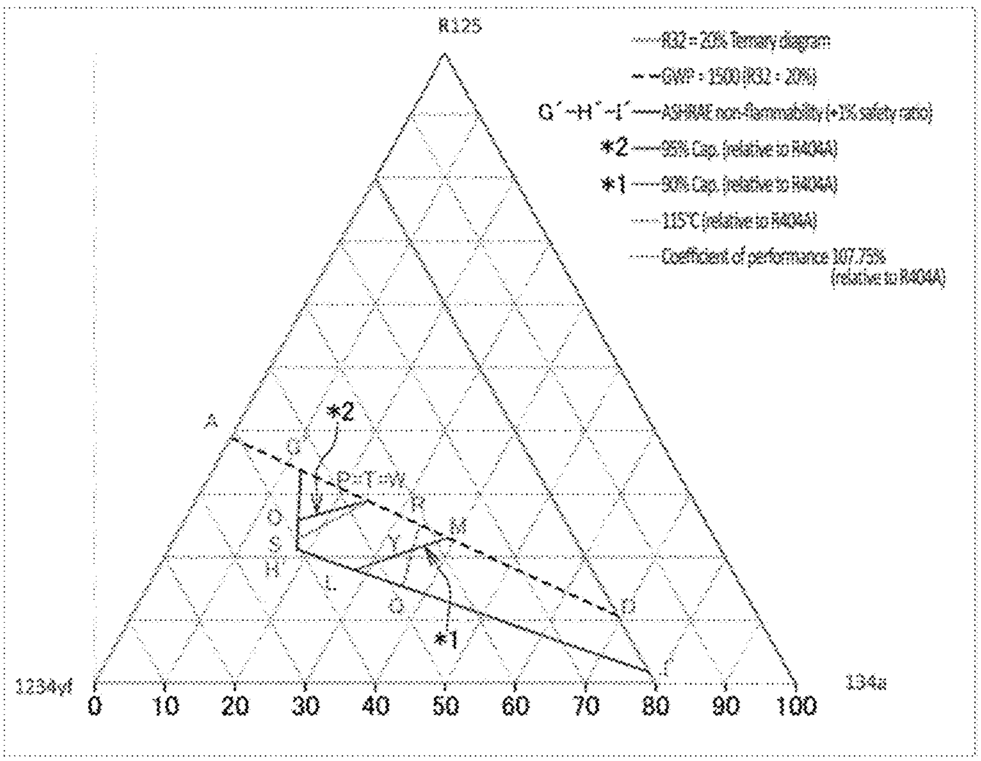
FIG. 40 shows the compositions of the above mixture (a quadrilateral surrounded by points G', H', Q, and R; a pentagon surrounded by points S, T, R, Q, and H'; a pentagon surrounded by points G', H', L, Y, and R; a hexagon surrounded by points S, T, R, Y, L, and H'; and a triangle surrounded by points G', O, and P (P=T=W)) in a ternary composition diagram of R125, 1234yf, and R134a, when the concentration of R32 is 20.0 wt %. The quadrilateral surrounded by points G', H', Q, and R represents a region with a GWP of 1500 or less, showing ASHRAE non-flammability in which safety ratio are taken into consideration, and having a compressor outlet temperature of 115° C. or less and a refrigerating capacity of 85% or more of that of R404A. The pentagon surrounded by points S, T, R, Q, and H' represents a region with a GWP of 1500 or less, showing ASHRAE non-flammability in which safety ratio are taken into consideration, and having a compressor outlet temperature of 115° C. or less, a COP of 107.75% or more of that of R404A, and a refrigerating capacity of 85% or more of that of R404A. The pentagon surrounded by points G', H', L, Y, and M represents a region with a GWP of 1500 or less, showing ASHRAE non-flammability in which safety ratio are taken into consideration, and having a compressor outlet temperature of 115° C. or less and a refrigerating capacity of 90% or more of that of R404A. The hexagon surrounded by points S, T, R, Y, L, and H' represents a region with a GWP of 1500 or less, showing ASHRAE non-flammability in which safety ratio are taken into consideration, and having a compressor outlet temperature of 115° C. or less, a COP of 107.75% or more of that of R404A, and a refrigerating capacity of 90% or more of that of R404A. The triangle surrounded by points G', O, and P represents a region with a GWP of 1500 or less, showing ASHRAE non-flammability in which safety ratio are taken into consideration, and having a refrigerating capacity of 95% or more of that of R404A.
Figure 41:
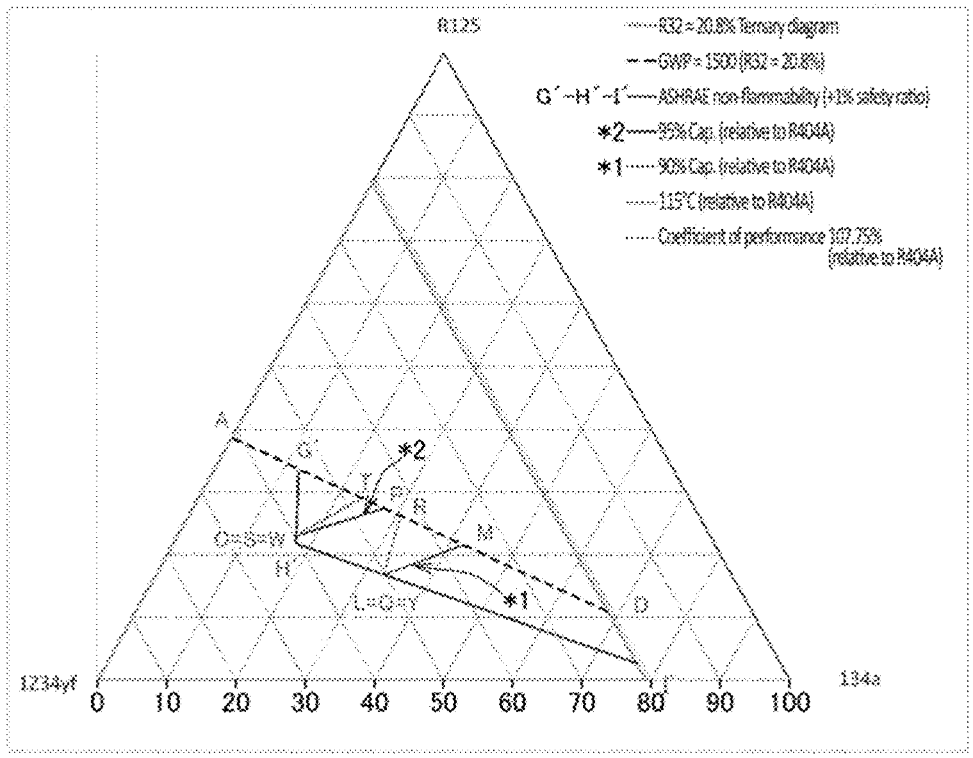
FIG. 41 shows the compositions of the above mixture (a quadrilateral surrounded by points G', H', Q, and R; a pentagon surrounded by points S, T, R, Q, and H'; a triangle surrounded by points G', O (O=S=W), and P; and a triangle surrounded by points T, P, and W (W=S=O)) in a ternary composition diagram of R125, 1234yf, and R134a, when the concentration of R32 is 20.8 wt %. The quadrilateral surrounded by points G', H', Q, and R represents a region with a GWP of 1500 or less, showing ASHRAE non-flammability in which safety ratio are taken into consideration, and having a compressor outlet temperature of 115° C. or less and a refrigerating capacity of 90% or more of that of R404A. The pentagon surrounded by points S, T, R, Q, and H' represents a region with a GWP of 1500 or less, showing ASHRAE non-flammability in which safety ratio are taken into consideration, and having a compressor outlet temperature of 115° C. or less, a COP of 107.75% or more of that of R404A, and a refrigerating capacity of 90% or more of that of R404A. The triangle surrounded by points G', O, and P represents a region with a GWP of 1500 or less, showing ASHRAE non-flammability in which safety ratio are taken into consideration, and having a refrigerating capacity of 95% or more of that of R404A. The triangle surrounded by points T, P, and W represents a region with a GWP of 1500 or less, showing ASHRAE non-flammability in which safety ratio are taken into consideration, and having a compressor outlet temperature of 115° C. or less, a COP of 107.75% or more of that of R404A, and a refrigerating capacity of 95% or more of that of R404A.
Figure 42:
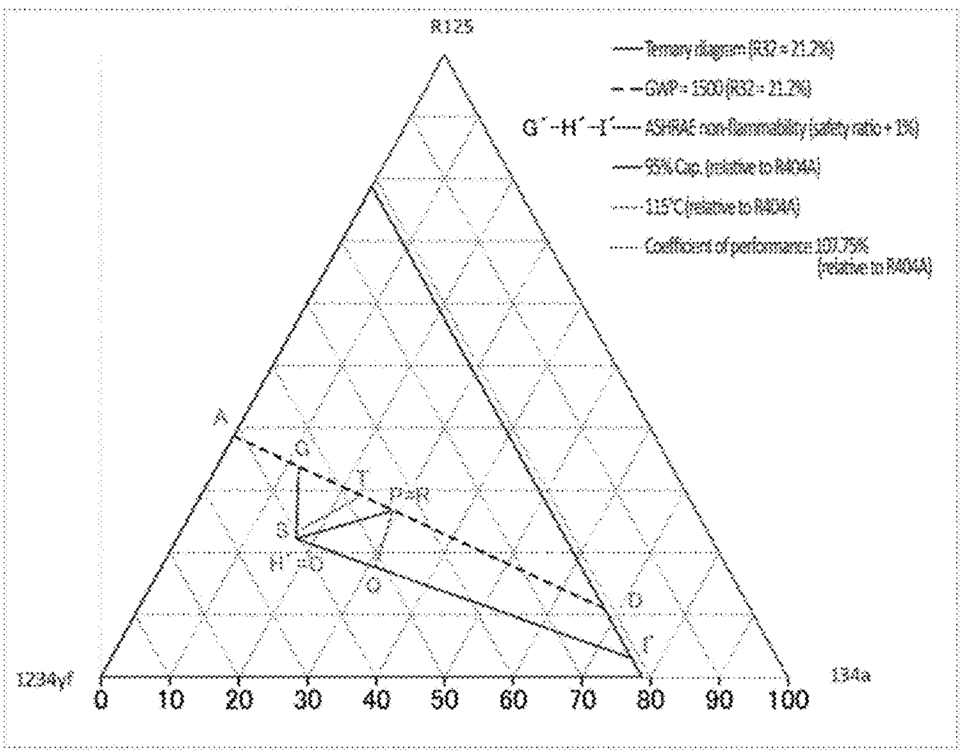
FIG. 42 shows the compositions of the above mixture (a quadrilateral surrounded by points G', H', Q, and R; a pentagon surrounded by points S, T, R, Q, and H'; a triangle surrounded by points G', O (O=H'), and P (P=R); and a quadrilateral surrounded by points S, T, P, and O (O=H')) in a ternary composition diagram of R125, 1234yf, and R134a, when the concentration of R32 is 21.2 wt %. The quadrilateral surrounded by points G', H', Q, and R represents a region with a GWP of 1500 or less, showing ASHRAE non-flammability in which safety ratio are taken into consideration, and having a compressor outlet temperature of 115° C. or less and a refrigerating capacity of 90% or more of that of R404A. The pentagon surrounded by points S, T, R, Q, and H' represents a region with a GWP of 1500 or less, showing ASHRAE non-flammability in which safety ratio are taken into consideration, and having a compressor outlet temperature of 115° C. or less, a COP of 107.75% or more of that of R404A, and a refrigerating capacity of 90% or more of that of R404A. The triangle surrounded by points G', 0, and P represents a region with a GWP of 1500 or less, showing ASHRAE non-flammability in which safety ratio are taken into consideration, and having a refrigerating capacity of 95% or more of that of R404A. The quadrilateral surrounded by points S, T, P, and O represents a region with a GWP of 1500 or less, showing ASHRAE non-flammability in which safety ratio are taken into consideration, and having a compressor outlet temperature of 115° C. or less, a COP of 107.75% or more of that of R404A, and a refrigerating capacity of 95% or more of that of R404A.
Figure 43:
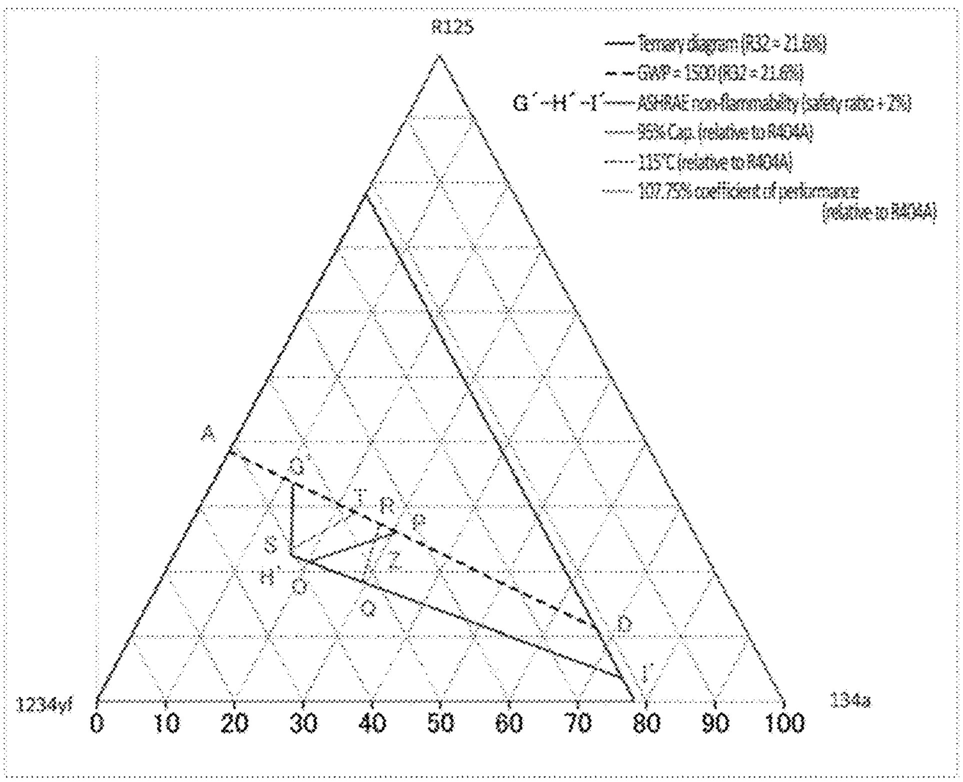
FIG. 43 shows the compositions of the above mixture (a quadrilateral surrounded by points G', H', Q, and R; a pentagon surrounded by points S, T, R, Q, and H'; a quadrilateral surrounded by points G', H', O, and P; and a hexagon surrounded by points S, T, R, Z, O, and H') in a ternary composition diagram of R125, 1234yf, and R134a, when the concentration of R32 is 21.6 wt %. The quadrilateral surrounded by points G', H', Q, and R represents a region with a GWP of 1500 or less, showing ASHRAE non-flammability in which safety ratio are taken into consideration, and having a compressor outlet temperature of 115° C. or less and a refrigerating capacity of 90% or more of that of R404A. The pentagon surrounded by points S, T, R, Q, and H' represents a region with a GWP of 1500 or less, showing ASHRAE non-flammability in which safety ratio are taken into consideration, and having a compressor outlet temperature of 115° C. or less, a COP of 107.75% or more of that of R404A, and a refrigerating capacity of 90% or more of that of R404A. The quadrilateral surrounded by points G', H', O, and P represents a region with a GWP of 1500 or less, showing ASHRAE non-flammability in which safety ratio are taken into consideration, and having a refrigerating capacity of 95% or more of that of R404A. The hexagon surrounded by points S, T, R, Z, O, and H' represents a region with a GWP of 1500 or less, showing ASHRAE non-flammability in which safety ratio are taken into consideration, a compressor outlet temperature of 115° C. or less, a COP of 107.75% or more of that of R404A, and a refrigerating capacity of 95% or more of that of R404A.
Figure 44:
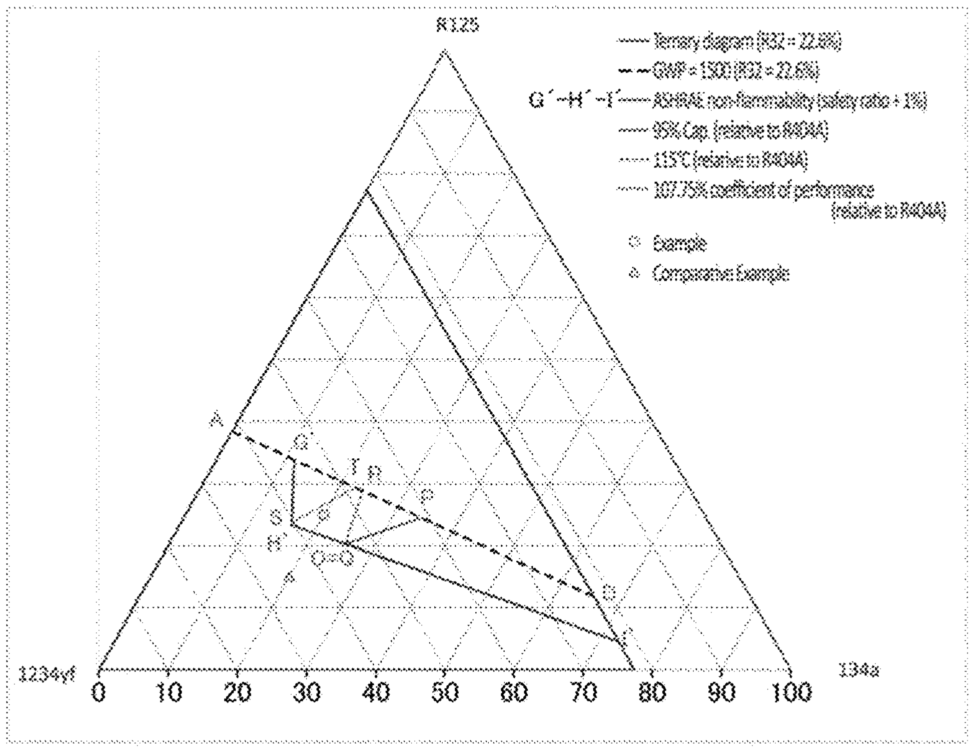
FIG. 44 shows the compositions of the above mixture (a quadrilateral surrounded by points G', H', Q, and R; and a pentagon surrounded by points S, T, R, Q, and H') in a ternary composition diagram of R125, 1234yf, and R134a, when the concentration of R32 is 22.6 wt %. The quadrilateral surrounded by points G', H', Q, and R represents a region with a GWP of 1500 or less, showing ASHRAE non-flammability in which safety ratio are taken into consideration, and having a compressor outlet temperature of 115° C. or less and a refrigerating capacity of 95% or more of that of R404A. The pentagon surrounded by points S, T, R, Q, and H' represents a region with a GWP of 1500 or less, showing ASHRAE non-flammability in which safety ratio are taken into consideration, and having a compressor outlet temperature of 115° C. or less, a COP of 107.75% or more of that of R404A, and a refrigerating capacity of 95% or more of that of R404A.
Figure 45:
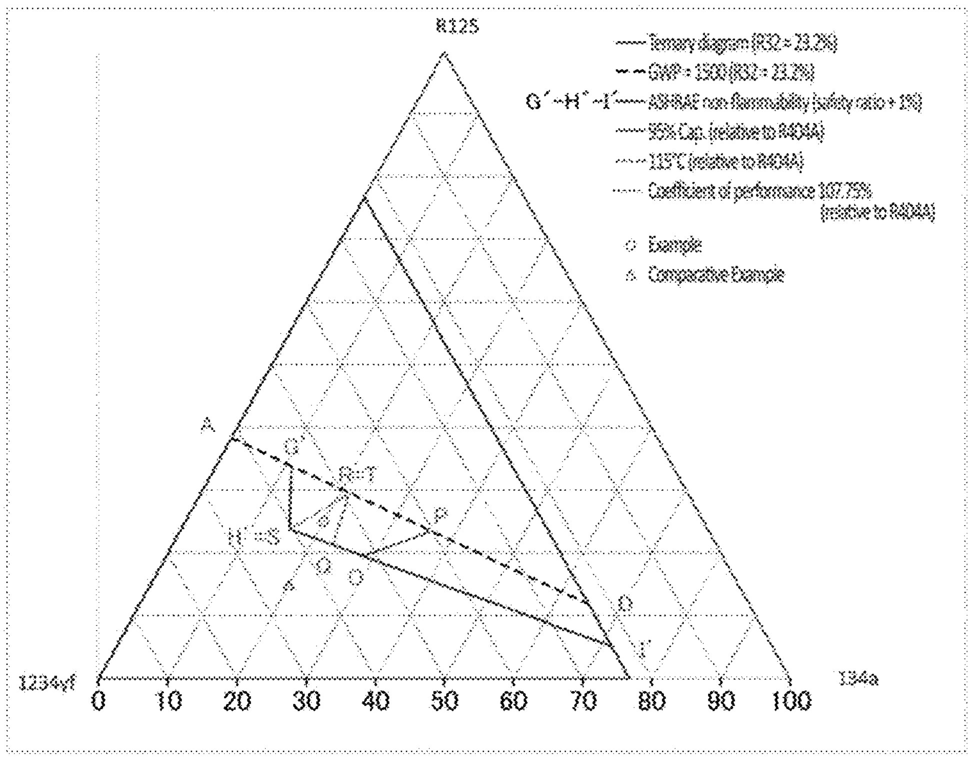
FIG. 45 shows the compositions of the above mixture (a quadrilateral surrounded by points G', H', Q, and R; and a triangle surrounded by points S (S=H'), T (T=R), and Q) in a ternary composition diagram of R125, 1234yf, and R134a, when the concentration of R32 is 23.2 wt %. The quadrilateral surrounded by points G', H', Q, and R represents a region with a GWP of 1500 or less, showing ASHRAE non-flammability in which safety ratio are taken into consideration, and having a compressor outlet temperature of 115° C. or less and a refrigerating capacity of 95% or more of that of R404A. The triangle surrounded by points S, T, and Q represents a region with a GWP of 1500 or less, showing ASHRAE non-flammability in which safety ratio are taken into consideration, and having a compressor outlet temperature of 115° C. or less, a COP of 107.75% or more of that of R404A, and a refrigerating capacity of 95% or more of that of R404A.
Figure 46:
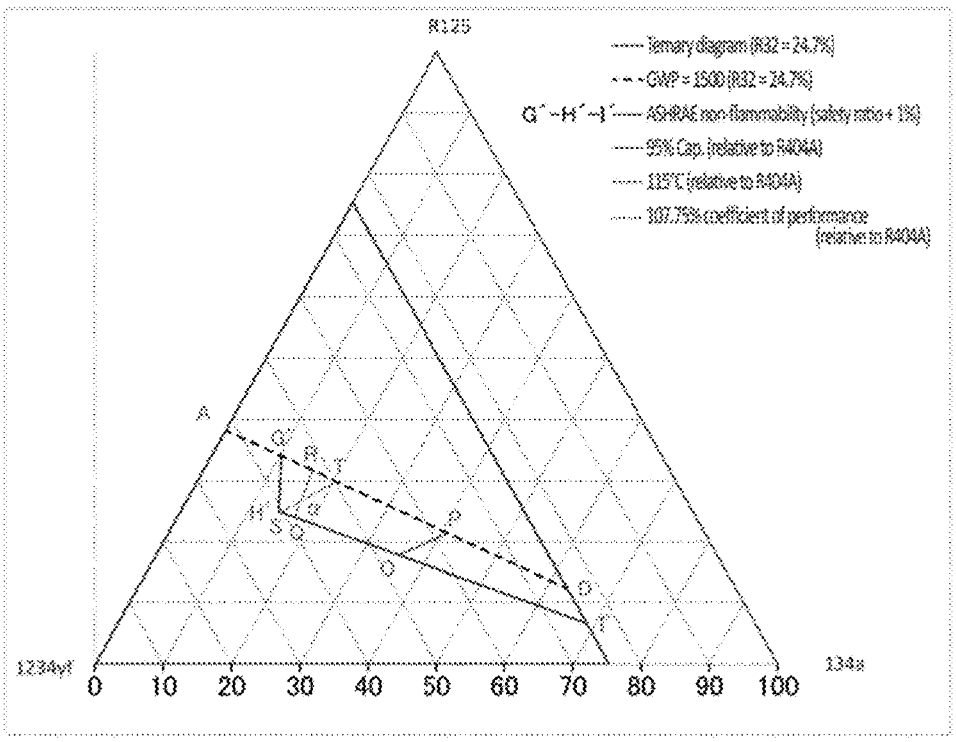
FIG. 46 shows the compositions of the above mixture (a quadrilateral surrounded by points G', H', Q, and R; and a triangle surrounded by points S, a, and Q) in a ternary composition diagram of R125, 1234yf, and R134a, when the concentration of R32 is 24.7 wt %. The quadrilateral surrounded by points G', H', Q, and R represents a region with a GWP of 1500 or less, showing ASHRAE non-flammability in which safety ratio are taken into consideration, and having a compressor outlet temperature of 115° C. or less and a refrigerating capacity of 95% or more of that of R404A. The triangle surrounded by points S, a, and Q represents a region with a GWP of 1500 or less, showing ASHRAE non-flammability in which safety ratio are taken into consideration, and having a compressor outlet temperature of 115° C. or less, a COP of 107.75% or more of that of R404A, and a refrigerating capacity of 95% or more of that of R404A.
Figure 47:
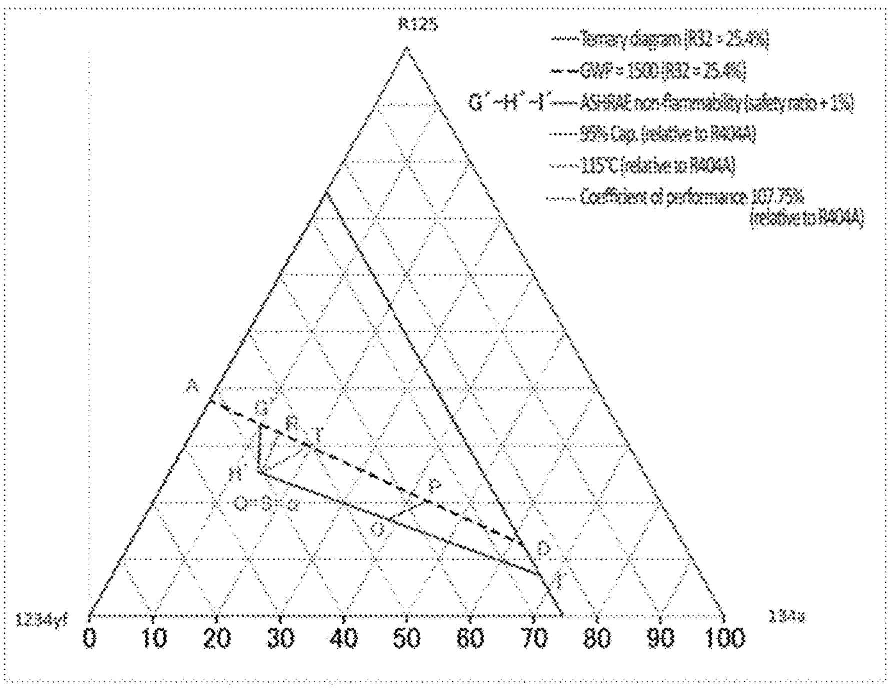
FIG. 47 shows the composition of the above mixture (a quadrilateral surrounded by points G', H', Q (Q=S), and R) in a ternary composition diagram of R125, 1234yf, and R134a, when the concentration of R32 is 25.4 wt %. The quadrilateral surrounded by points G', H', Q, and R represents a region with a GWP of 1500 or less, showing ASHRAE non-flammability in which safety ratio are taken into consideration, and having a compressor outlet temperature of 115° C. or less and a refrigerating capacity of 95% or more of that of R404A.
Figure 48:
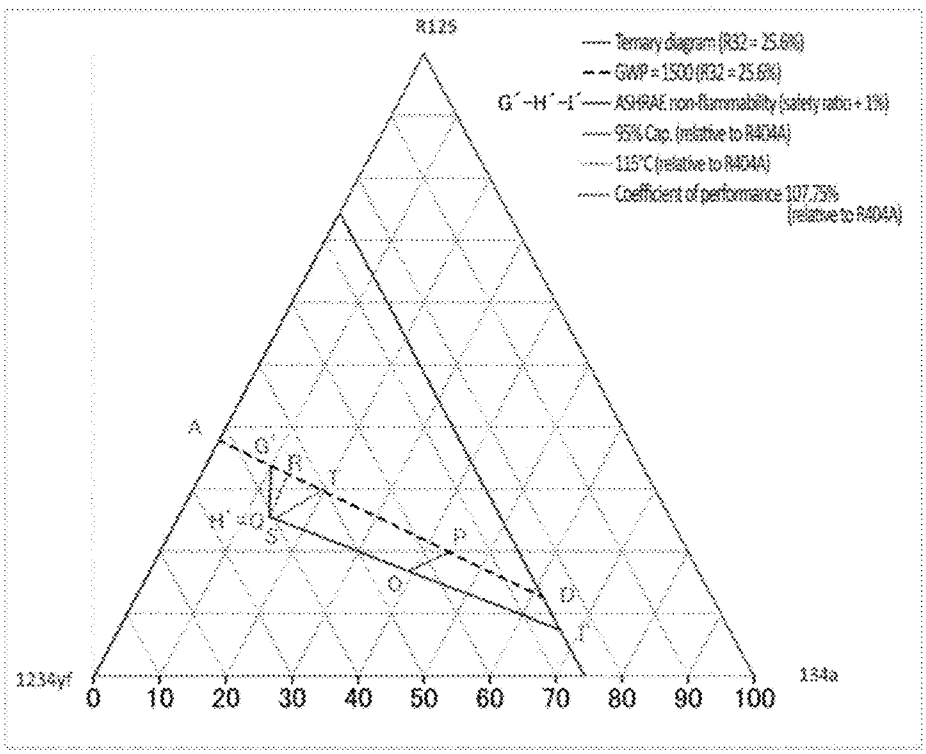
FIG. 48 shows the composition of the above mixture (a triangle surrounded by points G', Q (Q=H'), and R) in a ternary composition diagram of R125, 1234yf, and R134a, when the concentration of R32 is 25.6 wt %. The triangle surrounded by points G', Q, and R represents a region with a GWP of 1500 or less, showing ASHRAE non-flammability in which safety ratio are taken into consideration, and having a compressor outlet temperature of 115° C. or less and a refrigerating capacity of 95% or more of that of R404A.
Figure 49:
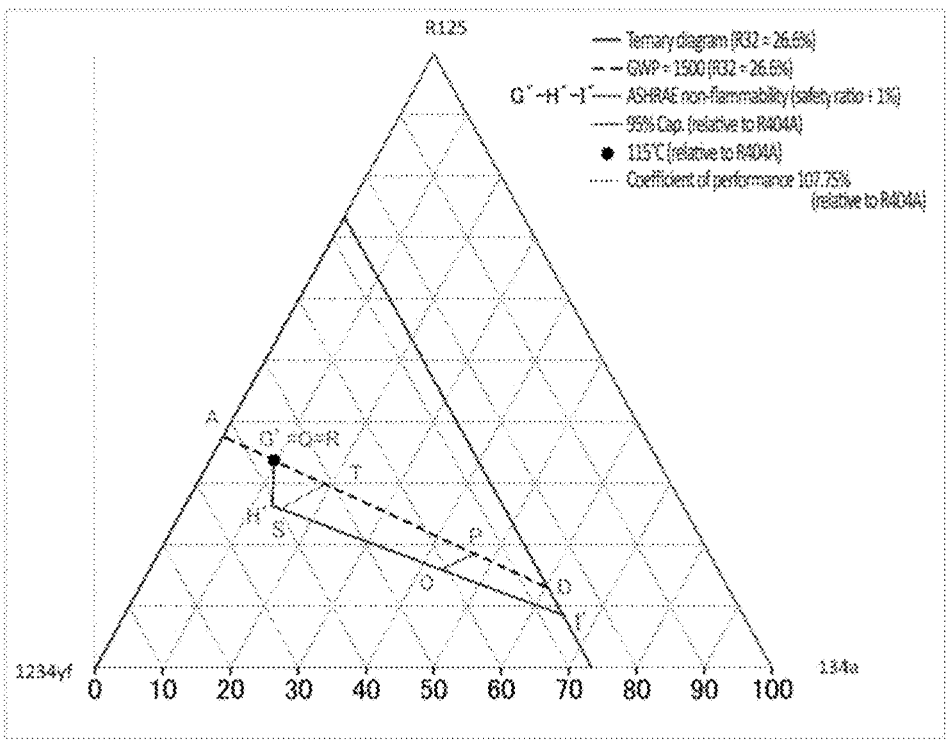
FIG. 49 shows the composition of the above mixture (point Q (Q=R=G')) in a ternary composition diagram of R125, 1234yf, and R134a, when the concentration of R32 is 26.6 wt %. Point Q represents a point with a GWP of 1500 or less, showing ASHRAE non-flammability in which safety ratio are taken into consideration, and having a compressor outlet temperature of 115° C. or less and a refrigerating capacity of 95% of that of R404A.

The present invention is roughly divided into a first embodiment to a fifth embodiment. Each embodiment is described in detail below. Hereinafter, "x2" in the explanation of each point and the explanation of approximate expressions represents "$x^2$."

First Embodiment

The first embodiment of the present invention is described in detail below.

Composition

The composition of the first embodiment of the present invention (hereinafter also referred to as "the composition of the present invention" in the section of the first embodiment) is a composition comprising a mixture of fluorinated hydrocarbons, the mixture comprising difluoromethane (R32), pentafluoroethane (R125), 2,3,3,3-tetrafluoropropene (1234yf), and 1,1,1,2-tetrafluoroethane (R134a) at specific concentrations.

The composition of the present invention has a GWP of 1500 or less and ASHRAE non-flammability performance. Because the GWP is 1500 or less, the composition of the present invention can notably reduce the burden on the environment from a global warming perspective, compared with other general-purpose refrigerants. Moreover, since the composition of the present invention is non-flammable according to ASHRAE, it is safer than flammable refrigerants, and can be used in a wide range of applications.

The composition of the present invention preferably has refrigerating capacity equal to that of R404A. Specifically, the refrigerating capacity relative to that of R404A is preferably 85% or more, more preferably 90% or more, even more preferably 95% or more, and particularly preferably 100% or more. R404A is a refrigerant currently widely used as a refrigerant for freezing and refrigerated storage. The composition of the present invention can be an alternative refrigerant for R404A.

The compressor outlet temperature of the composition of the present invention in a refrigeration cycle is preferably 130° C. or less, more preferably 120° C. or less, and particularly preferably 115° C. or less, in terms of preventing deterioration of the refrigerant oil.

In the composition of the present invention, the ratio of refrigerating capacity to power consumed in a refrigeration cycle (coefficient of performance (COP)) is preferably high. Specifically, the COP is preferably 95 or more, more preferably 100 or more, and particularly preferably 107.75 or more.

In the composition of the present invention, the compressor outlet pressure in a refrigeration cycle is preferably equal to that of R22 (R22 retrofit). R22 was widely used as a refrigerant for freezing and refrigerated storage before the spread of R404A. Many refrigerating devices using R22 as a refrigerant still remain. However, R22 will be abolished in developed countries in 2020 due to the regulation of HCFC, and there is thus a strong demand for alternative refrigerants. It is essential for alternative refrigerants for refrigerating devices using R22 that the compressor outlet pressure, which is the maximum pressure in a refrigeration cycle, is equal to that of R22. The compressor outlet pressure is preferably within ±2.5%, and more preferably within ±1.25%, of that of R22.

In the composition of the present invention, the mixture may consist of the four basic components, i.e., difluoromethane (R32), pentafluoroethane (R125), 2,3,3,3-tetrafluoropropene (1234yf), and 1,1,1,2-tetrafluoroethane (R134a), or may comprise, in addition to the four basic components, components different from the four basic components (hereinafter referred to as "other components"). These are referred to as the "four basic components" and "other components" below. The details of the other components are described later. The composition of the present invention may consist of the above mixture, or may comprise any additives, such as refrigerant oil, described later, in addition to the mixture.

When the mixture comprises other components, the other components are preferably contained in amounts that do not inhibit the function of the four basic components. From this viewpoint, the content of other components in the mixture is preferably 0.5 wt % or less, more preferably 0.3 wt % or less, and particularly preferably 0.1 wt % or less.

Mixture of Fluorinated Hydrocarbons

The mixture of fluorinated hydrocarbons used in the present invention comprises difluoromethane (R32), pentafluoroethane (R125), 1,1,1,2-tetrafluoroethane (R134a), and 2,3,3,3-tetrafluoropropene (1234yf). The following explains Embodiment 1-1, Embodiment 1-2, Embodiment 1-3 (having Embodiment 1-3-A as a subordinate concept), Embodiment 1-4 (having Embodiments 1-4-A and 1-4-B as subordinate concepts), and Embodiment 1-5 (having Embodiments 1-5-A and 1-5-B as subordinate concepts), which are divided according to the difference in the concentrations of the four basic components.

Embodiment 1-1

In one embodiment (Embodiment 1-1) of the first embodiment, the mixture comprises at least one member selected from the group consisting of the following mixtures 1 to 6 each having a composition ratio indicated in a ternary composition diagram in which the sum of the concentrations of R125, 1234yf, and R134a is represented by (100−x) wt %, when the sum of the concentrations of R32, R125, 1234yf, and R134a is 100 wt %, and the concentration of R32 is x wt %:

mixture 1 having a composition ratio in which (1)-1. 14.8 wt %>x≥10.8 wt %, and (2)-1. the concentrations of R125, 1234yf, and 134a (R125 concentration (wt %)/1234yf concentration (wt %)/134a concentration (wt %)) fall within a pentagon having the following points as vertices:

point G (100−R32−1234yf−R134a/−0.5493x+45.325/−0.4243x+19.875), point H (100−R32−1234yf−R134a/−0.9507x+60.575/−x+38.1), point I (0/100−R32−1234yf−R134a/1.6974x+48.4), point N (0/0/100−x), and point D (0.375x+3.25/0/100−R32−R125−1234yf);

mixture 2 having a composition ratio in which (1)-2. 18.1 wt %>x≥14.8 wt %, and (2)-2. the concentrations of R125, 1234yf, and 134a (R125 concentration (wt %)/1234yf concentration (wt %)/134a concentration (wt %)) fall within a pentagon having the following points as vertices:

point G (100−R32−R125−1234yf/−0.5736x+45.669/−0.3945x+19.443), point H (100−R32−1234yf−R134a/−0.9083x+59.936/−0.9723x+37.714), point I (0/100−R32−1234yf−R134a/1.3625x+53.346), point N (0/0/100−x), and point D (0.3625x+3.4461/0/100−R32−R125−1234yf);

mixture 3 having a composition ratio in which (1)-3. 20.0 wt %>x≥18.1 wt %, and (2)-3. the concentrations of R125, 1234yf, and 134a (R125 concentration (wt %)/1234yf concentration (wt %)/134a concentration (wt %)) fall within a pentagon having the following points as vertices:

point G (100−R32−1234yf−R134a/−0.5258x+44.808/−0.4207x+19.907), point H (100−R32−1234yf−R134a/−0.8948x+59.698/−1.0517x+39.117), point I (0/100−R32−1234yf−R134a/1.0517x+58.983), point N (0/0/100−x), and point D (0.369x+3.31/0/100−R32−R125−1234yf);

mixture 4 having a composition ratio in which (1)-4. 22.6 wt %>x≥20.0 wt %, and (2)-4. the concentrations of R125, 1234yf, and 134a (R125 concentration (wt %)/1234yf concentration (wt %)/134a concentration (wt %)) fall within a quadrilateral having the following points as vertices:

point G (100−R32−1234yf−R134a/−0.5756x+45.817/−0.4244x+19.983), point H (100−R32−1234yf−R134a/−0.9244x+60.283/−0.8488x+35.065), point I (100−R32−1234yf−R134a/0/−2.0407x+120.8), and point D (0.3430x+3.826/0/100−R32−R125−1234yf);

mixture 5 having a composition ratio in which (1)-5. 24.5 wt %>x≥22.6 wt %, and (2)-5. the concentrations of R125, 1234yf, and 134a (R125 concentration (wt %)/1234yf concentration (wt %)/134a concentration (wt %)) fall within a quadrilateral having the following points as vertices:

point G (100−R32−1234yf−R134a/−0.5283x+44.746/−0.4717x+21.054), point H (100−R32−1234yf−R134a/−0.9435x+60.078/−0.8428x+34.949), point I (100−R32−1234yf−R134a/0/−1.9435x+118.61), and point D (0.3710x+3.2057/0/100−R32−R125−1234yf); and mixture 6 having a composition ratio in which (1)-6. 26.6 wt %≥x≥24.5 wt %, and (2)-6. the concentrations of R125, 1234yf, and 134a (R125 concentration (wt %)/1234yf concentration (wt %)/134a concentration (wt %)) fall within a quadrilateral having the following points as vertices:

point G (100−R32−1234yf−R134a/−0.5710x+45.798/−0.4290x+20.002), point H (100−R32−1234yf−R134a/−0.9517x+60.931/−0.7613x+32.965), point I (100−R32−1234yf−R134a/0/−2.0000x+120.00), and point D (0.3323x+4.1369/0/100−R32−R125−1234yf).

Such a mixture (at least one of mixtures 1 to 6) is preferable in terms of reducing GWP and ensuring ASHRAE non-flammability performance.

Embodiment 1-2

In one embodiment (Embodiment 1-2) of the first embodiment, the mixture comprises at least one member selected from the group consisting of the following mixtures 1 to 6 each having a composition ratio indicated in a ternary composition diagram in which the sum of the concentrations of R125, 1234yf, and R134a is represented by (100−x) wt %, when the sum of the concentrations of R32, R125, 1234yf, and R134a is 100 wt %, and the concentration of R32 is x wt %:

mixture 1 having a composition ratio in which (1)-1. 14.8 wt %>x≥10.8 wt %, and (2)-1. the concentrations of R125, 1234yf, and 134a (R125 concentration (wt %)/1234yf concentration (wt %)/134a concentration (wt %)) fall within a pentagon having the following points as vertices:

point G' (100−R32−1234yf−R134a/−0.5757x+45.025/−0.4243x+20.975), point H' (100−R32−1234yf−R134a/−0.9770x+59.575/−x+38.4), point I' (0/100−R32−1234yf−R134a/1.7007x+52.125), point N (0/0/100−x), and point D (0.375x+3.25/0/100−R32−R125−1234yf);

mixture 2 having a composition ratio in which (1)-2. 18.1 wt %>x≥14.8 wt %, and (2)-2. the concentrations of R125, 1234yf, and 134a (R125 concentration (wt %)/1234yf concentration (wt %)/134a concentration (wt %)) fall within a pentagon having the following points as vertices:

point G' (100−R32−1234yf−R134a/−0.5458x+44.582/−0.4264x+21.031), point H' (100−R32−1234yf−R134a/−0.9083x+58.536/−0.9723x+38.014), point I' (0/100−R32−1234yf−R134a/1.3945x+56.657), point N (0/0/100−x), and point D (0.3625x+3.4461/0/100−R32−R125−1234yf);

mixture 3 having a composition ratio in which (1)-3. 20.0 wt %>x≥18.1 wt %, and (2)-3. the concentrations of R125, 1234yf, and 134a (R125 concentration (wt %)/1234yf concentration (wt %)/134a concentration (wt %)) fall within a quadrilateral having the following points as vertices:

point G' (100−R32−1234yf−R134a/−0.5277x+44.277/−0.4207x+20.907), point H' (100−R32−1234yf−R134a/−0.8948x+58.298/−1.0517x+39.417), point I' (100−R32−1234yf−R134a/0/1.9483x+117.18), and point D (0.369x+3.31/0/100−R32−R125−1234yf);

mixture 4 having a composition ratio in which (1)-4. 22.6 wt %>x≥20.0 wt %, and (2)-4. the concentrations of R125, 1234yf, and 134a (R125 concentration (wt %)/1234yf concentration (wt %)/134a concentration (wt %)) fall within a quadrilateral having the following points as vertices:

point G' (100−R32−1234yf−R134a/−0.5349x+44.413/−0.4651x+21.787), point H' (100−R32−1234yf−R134a/−0.9244x+58.883/−0.8837x+36.078), point I' (100−R32−1234yf−R134a/0/−2.0756x+119.72), and point D (0.343x+3.826/0/100−R32−R125−1234yf);

mixture 5 having a composition ratio in which (1)-5. 24.5 wt %>x≥22.6 wt %, and (2)-5. the concentrations of R125, 1234yf, and 134a (R125 concentration (wt %)/1234yf concentration (wt %)/134a concentration (wt %)) fall within a quadrilateral having the following points as vertices:

point G' (100−R32−1234yf−R134a/−0.5848x+45.537/−0.4717x+21.954), point H' (100−R32−1234yf−R134a/−0.9435x+59.308/−0.8428x+35.149), point I' (100−R32−1234yf−R134a/0/−1.9435x+116.71), and point D (0.3710x+3.2057/0/100−R32−R125−1234yf); and mixture 6 having a composition ratio in which (1)-6. 26.6 wt %≥x≥24.5 wt %, and (2)-6. the concentrations of R125, 1234yf, and 134a (R125 concentration (wt %)/1234yf concentration (wt %)/134a concentration (wt %)) fall within a quadrilateral having the following points as vertices:

point G' (100−R32−1234yf−R134a/−0.5242x+44.035/−0.4290x+20.902), point H' (100−R32−1234yf−R134a/−x+60.7/−0.7145x+32.001), point I' (100−R32−1234yf−R134a/0/−2.0468x+119.26), and point D (0.3323x+4.1369/0/100−R32−R125−1234yf).

Such a mixture (at least one of mixtures 1 to 6) is preferable in terms of reducing GWP and ensuring ASHRAE non-flammability performance (in which safety ratio are further taken into consideration).

Embodiment 1-3

In one embodiment (Embodiment 1-3) of the first embodiment, the mixture comprises at least one member selected from the group consisting of the following mixtures 1 to 7 each having a composition ratio indicated in a ternary composition diagram in which the sum of the concentrations of R125, 1234yf, and R134a is represented by (100−x) wt %, when the sum of the concentrations of R32, R125, 1234yf, and R134a is 100 wt %, and the concentration of R32 is x wt %:

mixture 1 having a composition ratio in which (1)-1. 14.1 wt %>x≥10.8 wt %, and (2)-1. the concentrations of R125, 1234yf, and 134a (R125 concentration (wt %)/1234yf concentration (wt %)/134a concentration (wt %)) fall within a quadrilateral having the following points as vertices:

point B (−2.6665x+62.786/0.7204x+31.027/100−R32−R125−1234yf), point C (0.0914x2−4.2444x+69.184/0.1181x2−6.3648x+93.765/100−R32−R125−1234yf), point F (0.0323x2−2.5621x+50.802/0.0346x2−3.9904x+67.56/100−R32−R125−1234yf), and point E (0.0501x2−3.9756x+61.989/−0.0296x2+1.5133x+30.248/100−R32−R125−1234yf);

mixture 2 having a composition ratio in which (1)-2. 16.1 wt %>x≥14.1 wt %, and (2)-2. the concentrations of R125, 1234yf, and 134a (R125 concentration (wt %)/1234yf concentration (wt %)/134a concentration (wt %)) fall within a pentagon having the following points as vertices:

point B (−2.6456x+62.484/0.7929x+29.984/100−R32−R125−1234yf), point C (0.0495x2−3.1434x+61.991/0.1723x2−8.1236x+107.78/100−R32−R125−1234yf), point F (−1.5049x+42.339/−2.6349x+55.315/100−R32−R125−1234yf), point E (0.2747x2−9.7967x+99.415/0.6366x2−25.375x+276.93/100−R32−R125−1234yf), and when 14.8 wt %>x≥14.1 wt %, point H' (100−R32−1234yf−R134a/−0.9770x+59.575/−x+38.4), or when 16.1 wt %>x≥14.8 wt %, point H' (100−R32−1234yf−R134a/−0.9083x+58.536/−0.9723x+38.014);

mixture 3 having a composition ratio in which (1)-3. 16.8 wt %>x≥16.1 wt %, and (2)-3. the concentrations of R125, 1234yf, and 134a (R125 concentration (wt %)/1234yf concentration (wt %)/134a concentration (wt %)) fall within a pentagon having the following points as vertices:

point B (−2.2857x+56.7/0.7747x+30.285/100−R32−R125−1234yf),
point C (−1.5714x+49.5/−2.8043x+66.812/100−R32−R125−1234yf),
point F (−1.2857x+38.8/−2.4954x+53.076/100−R32−R125−1234yf),
point E (−1.1429x+31.3/−5.3142x+118.96/100−R32−R125−1234yf), and
point H' (100−R32−1234yf−R134a/−0.9083x+58.536/−0.9723x+38.014);
mixture 4 having a composition ratio in which
(1)-4. 18.1 wt %>x≥16.8 wt %, and
(2)-4. the concentrations of R125, 1234yf, and 134a (R125 concentration (wt %)/1234yf concentration (wt %)/134a concentration (wt %)) fall within a quadrilateral having the following points as vertices:
point B (−1.4615x+42.854/−5.931x+142.94/100−R32−1234yf−R134a),
point C (−1.3846x+46.362/−2.5156x+61.961/100−R32−R125−1234yf),
point F (−1.3846x+40.462/−2.5401x+53.827/100−R32−R125−1234yf), and
point E (−1.0769x+30.192/−4.9692x+113.16/100−R32−R125−1234yf);
mixture 5 having a composition ratio in which
(1)-5. 20.0 wt %>x≥18.1 wt %, and
(2)-5. the concentrations of R125, 1234yf, and 134a (R125 concentration (wt %)/1234yf concentration (wt %)/134a concentration (wt %)) fall within a quadrilateral having the following points as vertices:
point B (−1.0442x+35.27/0.2703x2−15.221x+222.52/100−R32−1234yf−R134a),
point C (−1.3145x+45.088/−2.4404x+60.615/100−R32−1234yf−R134a),
point F (−1.2138x+37.381/−0.1576x2+3.716x−7.7649/100−R32−1234yf−R134a), and
point E (−0.8869x+26.726/−4.3267x+101.52/100−R32−1234yf−R134a);
mixture 6 having a composition ratio in which
(1)-6. 21.6 wt %>x≥20.0 wt %, and
(2)-6. the concentrations of R125, 1234yf, and 134a (R125 concentration (wt %)/1234yf concentration (wt %)/134a concentration (wt %)) fall within a quadrilateral having the following points as vertices:
point B (−0.875x+31.9/−4.3372x+112.98/100−R32−1234yf−R134a),
point C (−1.25x+43.8/−2.375x+59.3/100−R32−1234yf−R134a),
point F (−1.125x+35.6/−2.1875x+47.25/100−R32−1234yf−R134a), and
point E (−0.75x+24/−3.8831x+92.657/100−R32−1234yf−R134a); and
mixture 7 having a composition ratio in which
(1)-7. 24.2 wt %>x≥21.6 wt %, and
(2)-7. the concentrations of R125, 1234yf, and 134a (R125 concentration (wt %)/1234yf concentration (wt %)/134a concentration (wt %)) fall within a quadrilateral having the following points as vertices:
point B (−0.7267x+28.67/0.1603x2−10.987x+181.821/00−R32−1234yf−R134a),
point C (0.0529x2−3.5375x+68.536/0.0431x2−4.1038x+76.546/100−R32−1234yf−R134a),
point F (−1.9651x+53.771/0/100−R32−1234yf−R134a), and
point E (−0.6163x+21.118/0.0663x2−6.4133x+116.38/100−R32−1234yf−R134a).

Such a mixture (at least one of mixtures 1 to 7) is preferable in terms of reducing GWP, ensuring ASHRAE non-flammability performance (in which safety ratio are further taken into consideration), and obtaining a compressor outlet pressure equal to that of R22 (R22 retrofit).

Embodiment 1-3-A

Moreover, in Embodiment 1-3-A, which is a subordinate concept of Embodiment 1-3, the mixture comprises at least one member selected from the group consisting of the following mixtures 1 to 7 each having a composition ratio indicated in a ternary composition diagram in which the sum of the concentrations of R125, 1234yf, and R134a is represented by (100−x) wt %, when the sum of the concentrations of R32, R125, 1234yf, and R134a is 100 wt %, and the concentration of R32 is x wt %:
mixture 1 having a composition ratio in which
(1)-1. 14.1 wt %>x≥10.8 wt %, and
(2)-1. the concentrations of R125, 1234yf, and 134a (R125 concentration (wt %)/1234yf concentration (wt %)/134a concentration (wt %)) fall within a quadrilateral having the following points as vertices:
point B' (−2.6665x+62.786/0.7204x+31.027/100−R32−R125−1234yf),
point C' (0.0902x2−4.1561x+66.56/0.117x2−6.2764x+90.341/100−R32−R125−1234yf),
point F' (0.0702x2−3.5658x+59.024/0.0958x2−5.5978x+80.381/100−R32−R125−1234yf), and
point E' (−2.7576x+56.987/0.784x+33.578/100−R32−R125−1234yf);
mixture 2 having a composition ratio in which
(1)-2. 14.8 wt %>x≥14.1 wt %, and
(2)-2. the concentrations of R125, 1234yf, and 134a (R125 concentration (wt %)/1234yf concentration (wt %)/134a concentration (wt %)) fall within a quadrilateral having the following points as vertices:
point B' (−2.2857x+56.7/0.7747x+30.285/100−R32−R125−1234yf),
point C' (−1.7143x+50.071/−2.8571x+65.386/100−R32−R125−1234yf),
point F' (−1.5714x+44.857/−2.7143x+58.771/100−R32−R125−1234yf), and point E' (−2.2857x+50.329/0.6717x+35.158/100−R32−R125−1234yf);
mixture 3 having a composition ratio in which
(1)-3. 16.1 wt %>x≥14.8 wt %, and
(2)-3. the concentrations of R125, 1234yf, and 134a (R125 concentration (wt %)/1234yf concentration (wt %)/134a concentration (wt %)) fall within a pentagon having the following points as vertices:
point B' (−1.4615x+42.854/−5.931x+142.94/100−R32−R125−1234yf),
point C' (−1.5385x+47.469/−2.7834x+64.295/100−R32−R125−1234yf),
point F' (−1.5385x+44.369/−2.7889x+59.876/100−R32−R125−1234yf),
point E' (−1.6154x+40.408/−6.3915x+139.69/100−R32−R125−1234yf), and
point H' (100−R32−1234yf−R134a/−0.9083x+58.536/−0.9723x+38.014);
mixture 4 having a composition ratio in which
(1)-4. 18.1 wt %>x≥16.1 wt %, and
(2)-4. the concentrations of R125, 1234yf, and 134a (R125 concentration (wt %)/1234yf concentration (wt %)/134a concentration (wt %)) fall within a quadrilateral having the following points as vertices:
point B' (−2.6456x+62.484/0.7929x+29.984/100−R32−R125−1234yf), point C' (−1.4515x+46.075/−2.5842x+61.058/100−R32−R125−1234yf), point F' (−1.3447x+41.226/0.0959x2−5.7176x+82.165/100−R32−R125−1234yf), and point E' (0.1044x2−4.7203x+63.337/0.3836x2−18.386x+233.37/100−R32−R125−1234yf);

mixture 5 having a composition ratio in which (1)-5. 20.0 wt %>x≥18.1 wt %, and (2)-5. the concentrations of R125, 1234yf, and 134a (R125 concentration (wt %)/1234yf concentration (wt %)/134a concentration (wt %)) fall within a quadrilateral having the following points as vertices:

point B' (−1.0442x+33.87/0.2539x2−14.531x+212.38/100−R32−1234yf−R134a), point C' (−1.3145x+43.588/−2.4717x+59.031/100−R32−1234yf−R134a), point F' (−1.258x+39.651/0.0607x2−4.7348x+75.905/100−R32−1234yf−R134a), and point E' (−0.8869x+28.126/0.1994x2−11.991x+177.97/100−R32−1234yf−R134a);

mixture 6 having a composition ratio in which (1)-6. 22.6 wt %>x≥20.0 wt %, and (2)-6. the concentrations of R125, 1234yf, and 134a (R125 concentration (wt %)/1234yf concentration (wt %)/134a concentration (wt %)) fall within a quadrilateral having the following points as vertices:

point B' (−0.7733x+28.448/0.0598x2−6.503x+129.46/100−R32−1234yf−R134a), point C' (−1.157x+40.426/−2.1919x+53.439/100−R32−1234yf−R134a), point F' (−1.1163x+36.822/0.0721x2−5.1875x+80.404/100−R32−1234yf−R134a), and point E' (−0.7733x+25.848/0.1578x2−10.613x+167.02/100−R32−1234yf−R134a); and mixture 7 having a composition ratio in which (1)-7. 25.1 wt %≥x≥22.6 wt %, and (2)-7. the concentrations of R125, 1234yf, and 134a (R125 concentration (wt %)/1234yf concentration (wt %)/134a concentration (wt %)) fall within a quadrilateral having the following points as vertices:

point B' (−0.6809x+26.385/0.1536x2−10.827x+179.27/100−R32−1234yf−R134a), point C' (−0.2417x2+10.247x−93.86/0.5728x2−28.884x+364.1/100−R32−1234yf−R134a), point F' (0.1528x2−9.0875x+138.94/0/100−R32−1234yf−R134a), and point E' (0.1167x2−6.085x+86.332/0.2787x2−16.413x+236.4/100−R32−1234yf−R134a).

Such a mixture (at least one of mixtures 1 to 7) is preferable in terms of reducing GWP, ensuring ASHRAE non-flammability performance (in which safety ratio are further taken into consideration), and obtaining a compressor outlet pressure equal to that of R22 (R22 retrofit).

Embodiment 1-4

In one embodiment (Embodiment 1-4) of the first embodiment, the mixture comprises at least one member selected from the group consisting of the following mixtures 1 to 9 each having a composition ratio indicated in a ternary composition diagram in which the sum of the concentrations of R125, 1234yf, and R134a is represented by (100−x) wt %, when the sum of the concentrations of R32, R125, 1234yf, and R134a is 100 wt %, and the concentration of R32 is x wt %:

mixture 1 having a composition ratio in which (1)-1. 14.2 wt %>x≥11.6 wt %, and (2)-1. the concentrations of R125, 1234yf, and 134a (R125 concentration (wt %)/1234yf concentration (wt %)/134a concentration (wt %)) fall within a triangle having the following points as vertices:

point G' (100−R32−1234yf−R134a/−0.5757x+45.025/−0.4243x+20.975), point J (−3.5769x+75.492/1.2204x+24.143/100−R32−R125−1234yf), and point K (−2.3846x+61.662/−4.0172x+84.9/100−R32−R125−1234yf);

mixture 2 having a composition ratio in which (1)-2. 15.3 wt %>x≥14.2 wt %, and (2)-2. the concentrations of R125, 1234yf, and 134a (R125 concentration (wt %)/1234yf concentration (wt %)/134a concentration (wt %)) fall within a triangle having the following points as vertices:

when 14.8 wt %>x≥14.2 wt %, point G' (100−R32−1234yf−R134a/−0.5757x+45.025/−0.4243x+20.975) or when 15.3 wt %>x≥14.8 wt %, point G' (100−R32−1234yf−R134a/−0.5458x+44.582/−0.4264x+21.031), and point J (−3.4381x+73.493/1.1236x+25.522/100−R32−R125−1234yf), and point K (0.9091x2−29.091x+257.58/0.8579x2−29.085x+267.88/100−R32−R125−1234yf);

mixture 3 having a composition ratio in which (1)-3. 16.2 wt %>x≥15.3 wt %, and (2)-3. the concentrations of R125, 1234yf, and 134a (R125 concentration (wt %)/1234yf concentration (wt %)/134a concentration (wt %)) fall within a triangle having the following points as vertices:

point G' (100−R32−1234yf−R134a/−0.5458x+44.582/−0.4264x+21.031), point J (−3.5556x+75.3/1.2095x+24.209/100−R32−R125−1234yf), and point K (−2x+55.9/−3.4439x+76.392/100−R32−R125−1234yf);

mixture 4 having a composition ratio in which (1)-4. 17.5 wt %>x≥16.2 wt %, and (2)-4. the concentrations of R125, 1234yf, and 134a (R125 concentration (wt %)/1234yf concentration (wt %)/134a concentration (wt %)) fall within a quadrilateral having the following points as vertices:

point G' (100−R32−1234yf−R134a/−0.5458x+44.582/−0.4264x+21.031), point H' (100−R32−1234yf−R134a/−0.9083x+58.536/−0.9723x+38.014), point J (−1.6163x+43.882/−6.3674x+146.95/100−R32−R125−1234yf), and point K (−1.8488x+53.445/−3.1206x+71.153/100−R32−R125−1234yf);

mixture 5 having a composition ratio in which (1)-5. 19.0 wt %>x≥17.5 wt %, and (2)-5. the concentrations of R125, 1234yf, and 134a (R125 concentration (wt %)/1234yf concentration (wt %)/134a concentration (wt %)) fall within a pentagon having the following points as vertices:

when 18.1 wt %>x≥17.5 wt %, point G' (100−R32−1234yf−R134a/−0.5458x+44.582/−0.4264x+21.031), and point H' (100−R32−1234yf−R134a/−0.9083x+58.536/−0.9723x+38.014), or when 19.0 wt %>x≥18.1 wt %, point G' (100−R32−1234yf−R134a/−0.5277x+44.277/−0.4207x+20.907), and point H' (100−R32−1234yf−R134a/−0.8948x+58.298/−1.0517x+39.417), and point J (0.1273x2−6.1109x+83.553/0.1532x2−11.484x+189.57/100−R32−R125−1234yf), point X (−0.1696x2+1.0575x+54.537/−0.2271x2+15.05x−177.28/100−R32−R125−1234yf), and point R (−0.0401x2+3.0217x−19.198/−0.0297x2+2.7774x−22.544/100−R32−R125−1234yf);

mixture 6 having a composition ratio in which (1)-6. 20.8 wt %>x≥19.0 wt %, and (2)-6. the concentrations of R125, 1234yf, and 134a (R125 concentration (wt %)/1234yf concentration (wt %)/134a concentration (wt %)) fall within a quadrilateral having the following points as vertices:

when 20.0 wt %>x≥19.0 wt %, point G' (100−R32−1234yf−R134a/−0.5277x+44.277/−0.4207x+20.907), and point H' (100−R32−1234yf−R134a/−0.8948x+58.298/−1.0517x+39.417), or when 20.8 wt %>x≥20.0 wt %, point G' (100−R32−1234yf−R134a/−0.5349x+44.413/−0.4651x+21.787), and point H' (100−R32−1234yf−R134a/−0.9244x+58.883/−0.8837x+36.078), and point Q (−0.0198x2+27.157x−31.225/−0.0377x2+3.0486x−17.594/100−R32−R125−1234yf), and point R (−0.0401x2+3.0217x−19.198/−0.0297x2+2.7774x−22.544/100−R32−R125−1234yf);

mixture 7 having a composition ratio in which (1)-7. 23.2 wt %>x≥20.8 wt %, and (2)-7. the concentrations of R125, 1234yf, and 134a (R125 concentration (wt %)/1234yf concentration (wt %)/134a concentration (wt %)) fall within a quadrilateral having the following points as vertices:

when 22.6 wt %>x≥20.8 wt %, point G' (100−R32−1234yf−R134a/−0.5349x+44.413/−0.4651x+21.787), and point H' (100−R32−1234yf−R134a/−0.9244x+58.883/−0.8837x+36.078), or when 23.2 wt %>x≥22.6 wt %, point G' (100−R32−1234yf−R134a/−0.5848x+45.537/−0.4717x+21.954), and point H' (100−R32−1234yf−R134a/−0.9435x+59.308/−0.8428x+35.149), and point Q (−0.0984x2+6.1633x−68.728/−0.0617x2+3.9141x−25.243/100−R32−R125−1234yf), and point R (−0.0031x2+1.5234x−4.0783/−0.0503x2+3.6856x−32.627/100−R32−R125−1234yf);

mixture 8 having a composition ratio in which (1)-8. 25.6 wt %>x≥23.2 wt %, and (2)-8. the concentrations of R125, 1234yf, and 134a (R125 concentration (wt %)/1234yf concentration (wt %)/134a concentration (wt %)) fall within a quadrilateral having the following points as vertices:

when 24.5 wt %>x≥23.2 wt %, point G' (100−R32−1234yf−R134a/−0.5848x+45.537/−0.4717x+21.954), and point H' (100−R32−1234yf−R134a/−0.9435x+59.308/−0.8428x+35.149), or when 25.6 wt %>x≥24.5 wt %, point G' (100−R32−1234yf−R134a/−0.5242x+44.035/−0.4290x+20.902), and point H' (100−R32−1234yf−R134a/−x+60.7/−0.7145x+32.001), and point Q (−0.0115x2+2.3422x−26.868/−0.1077x2+6.4104x−58.357/100−R32−R125−1234yf), and point R (−0.1398x2+8.0281x−81.391/−0.0932x2+5.7935x−58.514/100−R32−R125−1234yf); and mixture 9 having a composition ratio in which (1)-9. 26.6 wt %≥x≥25.6 wt %, and (2)-9. the concentrations of R125, 1234yf, and 134a (R125 concentration (wt %)/1234yf concentration (wt %)/134a concentration (wt %)) fall within a triangle having the following points as vertices:

point G' (100−R32−1234yf−R134a/−0.5242x+44.035/−0.4290x+20.902), point Q (8.2x−184.32/−5x+163.1/100−R32−R125−1234yf), and point R (1.2x+1.88/1.246x−3.0431/100−R32−R125−1234yf).

Such a mixture (at least one of mixtures 1 to 9) is preferable in terms of reducing GWP, ensuring ASHRAE non-flammability performance (in which safety ratio are further taken into consideration), exhibiting refrigerating capacity equal to that of R404A, and reducing the compressor outlet temperature in a refrigeration cycle.

Embodiment 1-4-A

Moreover, in Embodiment 1-4-A, which is a subordinate concept of Embodiment 1-4, the mixture comprises at least one member selected from the group consisting of the following mixtures 1 to 8:

mixture 1 having a composition ratio in which (1)-1. 17.0 wt %>x≥14.5 wt %, and (2)-1. the concentrations of R125, 1234yf, and 134a (R125 concentration (wt %)/1234yf concentration (wt %)/134a concentration (wt %)) fall within a triangle having the following points as vertices:

when 14.8 wt %>x≥14.5 wt %, point G' (100−R32−1234yf−R134a/−0.5757x+45.025/−0.4243x+20.975), or when 17.0 wt %>x≥14.8 wt %, point G' (100−R32−1234yf−R134a/−0.5458x+44.582/−0.4264x+21.031), and point L (−3.3215x+82.089/1.1147x+20.535/100−R32−R125−1234yf), and point M (−2.238x+66.348/−3.8006x+91.779/100−R32−R125−1234yf);

mixture 2 having a composition ratio in which (1)-2. 18.0 wt %>x≥17.0 wt %, and (2)-2. the concentrations of R125, 1234yf, and 134a (R125 concentration (wt %)/1234yf concentration (wt %)/134a concentration (wt %)) fall within a triangle having the following points as vertices:

point G' (100−R32−1234yf−R134a/−0.5458x+44.582/−0.4264x+21.031), point L (−3.4x+83.4/1.3x+17.378/100−R32−R125−1234yf), and point M (−1.7x+57.217/−0.6939x2+21.203x−132.72/100−R32−R125−1234yf);

mixture 3 having a composition ratio in which (1)-3. 18.7 wt %>x≥18.0 wt %, and (2)-3. the concentrations of R125, 1234yf, and 134a (R125 concentration (wt %)/1234yf concentration (wt %)/134a concentration (wt %)) fall within a triangle having the following points as vertices:

when 18.1 wt %>x≥18.0 wt %, point G' (100−R32−1234yf−R134a/−0.5458x+44.582/−0.4264x+21.031), or when 18.7 wt %>x≥18.1 wt %, point G' (100−R32−1234yf−R134a/−0.5277x+44.277/−0.4207x+20.907), and point L (−3.1429x+78.771/1.1429x+20.229/100−R32−R125−1234yf), and point M (−1.8571x+60.029/−3.1386x+80.613/100−R32−R125−1234yf);

mixture 4 having a composition ratio in which (1)-4. 19.3 wt %>x≥18.7 wt %, and (2)-4. the concentrations of R125, 1234yf, and 134a (R125 concentration (wt %)/1234yf concentration (wt %)/134a concentration (wt %)) fall within a quadrilateral having the following points as vertices:

point G' (100−R32−1234yf−R134a/−0.5277x+44.277/−0.4207x+20.907), point H' (100−R32−1234yf−R134a/−0.8948x+58.298/−1.0517x+39.417), point L (−1.6667x+51.167/−6.2835x+159.1/100−R32−R125−1234yf), and point M (−1.8333x+59.567/−3.1952x+81.665/100−R32−R125−1234yf);

mixture 5 having a composition ratio in which (1)-5. 20.8 wt %>x≥19.3 wt %, and (2)-5. the concentrations of R125, 1234yf, and 134a (R125 concentration (wt %)/1234yf concentration (wt %)/134a concentration (wt %)) fall within a pentagon having the following points as vertices:

when 20.0 wt %>x≥19.3 wt %, point G' (100−R32−1234yf−R134a/−0.5277x+44.277/−0.4207x+20.907), and point H' (100−R32−1234yf−R134a/−0.8948x+58.298/−1.0517x+39.417), or when 20.8 wt %>x≥20.0 wt %, point G' (100−R32−1234yf−R134a/−0.5349x+44.413/−0.4651x+21.787), and point H' (100−R32−1234yf−R134a/−0.9244x+58.883/−0.8837x+36.078), and point L (−1.3994x+46.001/−5.5605x+145.15/100−R32−R125−1234yf), point Y (−0.4421x2+12.862x−59.353/0.4405$x^2$−11.34x+74.783/100−R32−R125−1234yf), and point R (−0.0401x2+3.0217x−19.198/−0.0297x2+2.7774x−22.544/100−R32−R125−1234yf);

mixture 6 having a composition ratio in which (1)-6. 23.2 wt %>x≥20.8 wt %, and (2)-6. the concentrations of R125, 1234yf, and 134a (R125 concentration (wt %)/1234yf concentration (wt %)/134a concentration (wt %)) fall within a quadrilateral having the following points as vertices:

when 22.6 wt %>x≥20.8 wt %, point G' (100−R32−1234yf−R134a/−0.5349x+44.413/−0.4651x+21.787), and point H' (100−R32−1234yf−R134a/−0.9244x+58.883/−0.8837x+36.078), or when 23.2 wt %>x≥22.6 wt %, point G' (100−R32−1234yf−R134a/−0.5848x+45.537/−0.4717x+21.954), and point H' (100−R32−1234yf−R134a/−0.9435x+59.308/−0.8428x+35.149), and point Q (−0.0984x2+6.1633x−68.728/−0.0617x2+3.9141x−25.243/100−R32−R125−1234yf), and point R (−0.0031x2+1.5234x−4.0783/−0.0503x2+3.6856x−32.627/100−R32−R125−1234yf);

mixture 7 having a composition ratio in which (1)-7. 25.6 wt %>x≥23.2 wt %, and (2)-7. the concentrations of R125, 1234yf, and 134a (R125 concentration (wt %)/1234yf concentration (wt %)/134a concentration (wt %)) fall within a quadrilateral having the following points as vertices:

when 24.5 wt %>x≥23.2 wt %, point G' (100−R32−1234yf−R134a/−0.5848x+45.537/−0.4717x+21.954), and point H' (100−R32−1234yf−R134a/−0.9435x+59.308/−0.8428x+35.149), or when 25.6 wt %>x≥24.5 wt %, point G' (100−R32−1234yf−R134a/−0.5242x+44.035/−0.4290x+20.902), and point H' (100−R32−1234yf−R134a/−x+60.7/−0.7145x+32.001), and point Q (−0.0115x2+2.3422x−26.868/−0.1077x2+6.4104x−58.357/100−R32−R125−1234yf), and point R (−0.1398x2+8.0281x−81.391/−0.0932x2+5.7935x−58.514/100−R32−R125−1234yf); and mixture 8 having a composition ratio in which (1)-8. 26.6 wt %≥x≥25.6 wt %, and (2)-8. the concentrations of R125, 1234yf, and 134a (R125 concentration (wt %)/1234yf concentration (wt %)/134a concentration (wt %)) fall within a triangle having the following points as vertices:

point G' (100−32−1234yf−R134a/−0.5242x+44.035/−0.4290x+20.902), point Q (8.2x−184.32/−5x+163.1/100−R32−R125−1234yf), and point R (1.2x+1.88/1.246x−3.0431/100−R32−R125−1234yf).

Such a mixture (at least one of mixtures 1 to 8) is preferable in terms of reducing GWP, ensuring ASHRAE non-flammability performance (in which safety ratio are further taken into consideration), exhibiting refrigerating capacity equal to that of R404A (refrigerating capacity higher than that of Embodiment 1-4), and reducing the compressor outlet temperature in a refrigeration cycle.

Embodiment 1-4-B

Moreover, in Embodiment 1-4-B, which is a subordinate concept of Embodiment 1-4, the mixture comprises at least one member selected from the group consisting of the following mixtures 1 to 7:

mixture 1 having a composition ratio in which (1)-1. 20.0 wt %>x≥17.5 wt %, and (2)-1. the concentrations of R125, 1234yf, and 134a (R125 concentration (wt %)/1234yf concentration (wt %)/134a concentration (wt %)) fall within a triangle having the following points as vertices:

when 18.1 wt %>x≥17.5 wt %, point G' (100−R32−1234yf−R134a/−0.5458x+44.582/−0.4264x+21.031), or when 20.0 wt %>x≥18.1 wt %, point G' (100−R32−1234yf−R134a/−0.5277x+44.277/−0.4207x+20.907), and point O (−3.1554x+89.013/1.1108x+15.673/100−R32−R125−1234yf), and point P (0.0698x2−4.6141x+93.254/0.1361x2−8.5106x+142.27/100−R32−R125−1234yf);

mixture 2 having a composition ratio in which (1)-2. 20.8 wt %>x≥20.0 wt %, and (2)-2. the concentrations of R125, 1234yf, and 134a (R125 concentration (wt %)/1234yf concentration (wt %)/134a concentration (wt %)) fall within a triangle having the following points as vertices:

point G' (100−R32−1234yf−R134a/−0.5349x+44.413/−0.4651x+21.787), point O (−3.5x+95.9/1.5661x+6.5807/100−R32−R125−1234yf), and point P (−1.75x+63.9/−2.9691x+85.881/100−R32−R125−1234yf);

mixture 3 having a composition ratio in which (1)-3. 21.2 wt %>x≥20.8 wt %, and (2)-3. the concentrations of R125, 1234yf, and 134a (R125 concentration (wt %)/1234yf concentration (wt %)/134a concentration (wt %)) fall within a triangle having the following points as vertices:

point G' (100−R32−1234yf−R134a/−0.5349x+44.413/−0.4651x+21.787), point O (−2.25x+69.9/0.3629x+31.605/100−R32−R125−1234yf), and point P (−1.75x+63.9/−3.0619x+87.812/100−R32−R125−1234yf);

mixture 4 having a composition ratio in which (1)-4. 22.6 wt %>x≥21.2 wt %, and (2)-4. the concentrations of R125, 1234yf, and 134a (R125 concentration (wt %)/1234yf concentration (wt %)/134a concentration (wt %)) fall within a pentagon having the following points as vertices:

point G' (100−R32−1234yf−R134a/−0.5349x+44.413/−0.4651x+21.787), point H' (100−R32−1234yf−R134a/−0.9244x+58.883/−0.8837x+36.078), point O (0.3214x2−15.507x+206.49/1.2477x2−60.003x+750.62/100−R32−R125−1234yf), point Z (−0.0118x2−4.1976x+121.09/−0.0544x2+8.7425x−137.98/100−R32−R125−1234yf), and point R (−0.0031x2+1.5234x−4.0783/−0.0503x2+3.6856x−32.627/100−R32−R125−1234yf);

mixture 5 having a composition ratio in which (1)-5. 23.2 wt %>x≥22.6 wt %, and (2)-5. the concentrations of R125, 1234yf, and 134a (R125 concentration (wt %)/1234yf concentration (wt %)/134a concentration (wt %)) fall within a quadrilateral having the following points as vertices:

point G' (100−R32−1234yf−R134a/−0.5848x+45.537/−0.4717x+21.954), point H' (100−R32−1234yf−R134a/−0.9435x+59.308/−0.8428x+35.149), point Q (−0.0984x2+6.1633x−68.728/−0.0617x2+3.9141x−25.243/100−R32−R125−1234yf), and point R (−0.0031x2+1.5234x−4.0783/−0.0503x2+3.6856x−32.627/100−R32−R125−1234yf);

mixture 6 having a composition ratio in which (1)-6. 25.6 wt %>x≥23.2 wt %, and (2)-6. the concentrations of R125, 1234yf, and 134a (R125 concentration (wt %)/1234yf concentration (wt %)/134a concentration (wt %)) fall within a quadrilateral having the following points as vertices:

when 24.5 wt %>x≥23.2 wt %, point G' (100−R32−1234yf−R134a/−0.5848x+45.537/−0.4717x+21.954), and point H' (100−R32−1234yf−R134a/−0.9435x+59.308/−0.8428x+35.149), or when 25.6 wt %>x≥24.5 wt %, point G' (100−R32−1234yf−R134a/−0.5242x+44.035/−0.4290x+20.902), and point H' (100−R32−1234yf−R134a/−x+60.7/−0.7145x+32.001), and point Q (−0.0115x2+2.3422x−26.868/−0.1077x2+6.4104x−58.357/100−R32−R125−1234yf), and point R (−0.1398x2+8.0281x−81.391/−0.0932x2+5.7935x−58.514/100−R32−R125−1234yf); and mixture 7 having a composition ratio in which (1)-7. 26.6 wt %≥x≥25.6 wt %, and (2)-7. the concentrations of R125, 1234yf, and 134a (R125 concentration (wt %)/1234yf concentration (wt %)/134a concentration (wt %)) fall within a triangle having the following points as vertices:

point G' (100−R32−1234yf−R134a/−0.5242x+44.035/−0.4290x+20.902), point Q (8.2x−184.32/−5x+163.1/100−R32−R125−1234yf), and point R (1.2x+1.88/1.246x−3.0431/100−R32−R125−1234yf).

Such a mixture (at least one of mixtures 1 to 7) is preferable in terms of reducing GWP, ensuring ASHRAE non-flammability performance (in which safety ratio are further taken into consideration), exhibiting refrigerating capacity equal to that of R404A (refrigerating capacity higher than that of Embodiment 1-4-A), and reducing the compressor outlet temperature in a refrigeration cycle.

Embodiment 1-5

In one embodiment (Embodiment 1-5) of the first embodiment, the mixture comprises at least one member selected from the group consisting of the following mixtures 1 to 7 each having a composition ratio indicated in a ternary composition diagram in which the sum of the concentrations of R125, 1234yf, and R134a is (100−x) wt %, when the sum of the concentrations of R32, R125, 1234yf, and R134a is 100 wt %, and the concentration of R32 is x wt %:

mixture 1 having a composition ratio in which (1)-1. 15.3 wt %>x≥14.2 wt %, and (2)-1. the concentrations of R125, 1234yf, and 134a (R125 concentration (wt %)/1234yf concentration (wt %)/134a concentration (wt %)) fall within a triangle having the following points as vertices:

point T (100−R32−1234yf−R134a/0.0415x2+1.0547x+21.254/0.0863x2−3.628x+64.252), point K (0.9091x2−29.091x+257.58/0.8579x2−29.085x+267.88/100−R32−R125−1234yf), and point U (1.3896x2−47.266x+418.78/−2.8422x2+97.299x−780.65/100−R32−R125−1234yf);

mixture 2 having a composition ratio in which (1)-2. 16.2 wt %>x≥15.3 wt %, and (2)-2. the concentrations of R125, 1234yf, and 134a (R125 concentration (wt %)/1234yf concentration (wt %)/134a concentration (wt %)) fall within a quadrilateral having the following points as vertices:

point S (100−R32−1234yf−R134a/0.0508x2−2.3591x+66.946/−0.0008x2−0.6861x+31.798), point T (100−R32−1234yf−R134a/−0.0415x2+1.0547x+21.254/0.0863x2−3.628x+64.252), point K (−2x+55.9/−3.4439x+76.392/100−R32−R125−1234yf), and point J (−3.5556x+75.3/1.2095x+24.209/100−R32−R125−1234yf);

mixture 3 having a composition ratio in which (1)-3. 17.5 wt %>x≥16.2 wt %, and (2)-3. the concentrations of R125, 1234yf, and 134a (R125 concentration (wt %)/1234yf concentration (wt %)/134a concentration (wt %)) fall within a pentagon having the following points as vertices:

when 17.0 wt %>x≥16.2 wt %, point S (100−R32−1234yf−R134a/0.0508x2−2.3591x+66.946/−0.0008x2−0.6861x+31.798), and point T (100−R32−1234yf−R134a/−0.0415x2+1.0547x+21.254/0.0863x2−3.628x+64.252), or when 17.5 wt %>x≥17.0 wt %, point S (100−R32−1234yf−R134a/0.1108x2−4.5904x+87.503/0.0939x2−4.1798x+63.826), and point T (100−R32−1234yf−R134a/−0.0766x2+2.5779x+5.5242/0.2286x2−9.3441x+120.28), and
point K (−1.8488x+53.445/−3.1206x+71.153/100−R32−R125−1234yf),
point J (−1.6163x+43.882/−6.3674x+146.95/100−R32−R125−1234yf), and
point H' (100−R32−1234yf−R134a/−0.9083x+58.536/−0.9723x+38.014);
mixture 4 having a composition ratio in which
(1)-4. 19.0 wt %>x≥17.5 wt %, and
(2)-4. the concentrations of R125, 1234yf, and 134a (R125 concentration (wt %)/1234yf concentration (wt %)/134a concentration (wt %)) fall within a hexagon having the following points as vertices:
point S (100−R32−1234yf−R134a/0.1108x2−4.5904x+87.503/0.0939x2−4.1798x+63.826),
point T (100−R32−1234yf−R134a/−0.0766x2+2.5779x+5.5242/0.2286x2−9.3441x+120.28),
point R (−0.0401x2+3.0217x−19.198/−0.0297x2+2.7774x−22.544/100−R32−R125−1234yf),
point X (−0.1696x2+1.0575x+54.537/−0.2271x2+15.05x−177.28/100−R32−R125−1234yf),
point J (0.1273x2−6.1109x+83.553/0.1532x2−11.484x+189.57/100−R32−R125−1234yf), and
when 18.1 wt %>x≥17.5 wt %,
point H' (100−R32−1234yf−R134a/−0.9083x+58.536/−0.9723x+38.014), or
when 19.0 wt %>x≥18.1 wt %,
point H' (100−R32−1234yf−R134a/−0.8948x+58.298/−1.0517x+39.417);
mixture 5 having a composition ratio in which
(1)-5. 20.8 wt %>x≥19.0 wt %, and
(2)-5. the concentrations of R125, 1234yf, and 134a (R125 concentration (wt %)/1234yf concentration (wt %)/134a concentration (wt %)) fall within a pentagon having the following points as vertices:
point S (100−R32−1234yf−R134a/0.1263x2−5.6749x+102.56/−0.029x2+0.4298x+20.594),
point T (100−R32−1234yf−R134a/0.1451x2−6.0744x+89.981/−0.2364x2+8.5372x−51.582),
point R (−0.0401x2+3.0217x−19.198/−0.0297x2+2.7774x−22.544/100−R32−R125−1234yf),
point Q (−0.0198x2+27.157x−31.225/−0.0377x2+3.0486x−17.594/100−R32−R125−1234yf), and
when 20.0 wt %>x≥19.0 wt %,
point H' (100−R32−1234yf−R134a/−0.8948x+58.298/−1.0517x+39.417), or
when 20.8 wt %>x≥20.0 wt %,
point H' (100−R32−1234yf−R134a/−0.9244x+58.883/−0.8837x+36.078);
mixture 6 having a composition ratio in which
(1)-6. 23.2 wt %>x≥20.8 wt %, and
(2)-6. the concentrations of R125, 1234yf, and 134a (R125 concentration (wt %)/1234yf concentration (wt %)/134a concentration (wt %)) fall within a pentagon having the following points as vertices:
point S (100−R32−1234yf−R134a/0.1017x2−5.1872x+102.99/0.0034x2−0.7313x+30.692),
point T (100−R32−1234yf−R134a/−0.0318x2+1.1657x+15.869/−0.123x2+4.4541x−15.735),
point R (−0.0031x2+1.5234x−4.0783/−0.0503x2+3.6856x−32.627/100−R32−R125−1234yf),
point Q (−0.0984x2+6.1633x−68.728/−0.0617x2+3.9141x−25.243/100−R32−R125−1234yf), and
when 22.6 wt %>x≥20.8 wt %,
point H' (100−R32−1234yf−R134a/−0.9244x+58.883/−0.8837x+36.078), or
when 23.2 wt %>x≥22.6 wt %,
point H' (100−R32−1234yf−R134a/−0.9435x+59.308/−0.8428x+35.149); and
mixture 7 having a composition ratio in which
(1)-7. 25.4 wt %≥x≥23.2 wt %, and
(2)-7. the concentrations of R125, 1234yf, and 134a (R125 concentration (wt %)/1234yf concentration (wt %)/134a concentration (wt %)) fall within a triangle having the following points as vertices:
point S (100−R32−1234yf−R134a/−0.0317x2+0.4511x+43.979/0.075x2−4.1913x+72.494),
point α (0.0324x2−3.5746x+95.092/0.0193x2+3.2487x−59.944/100−R32−R125−1234yf), and
point Q (−0.0115x2+2.3422x−26.868/−0.1077x2+6.4104x−58.357/100−R32−R125−1234yf).

Such a mixture (at least one of mixtures 1 to 7) is preferable in terms of reducing GWP, ensuring ASHRAE non-flammability performance (in which safety ratio are further taken into consideration), exhibiting refrigerating capacity equal to that of R404A, reducing the compressor outlet temperature in a refrigeration cycle, and improving the coefficient of performance (COP).

Embodiment 1-5-A

Moreover, in Embodiment 1-5-A, which is a subordinate concept of Embodiment 1-5, the mixture comprises at least one member selected from the group consisting of the following mixtures 1 to 6:
mixture 1 having a composition ratio in which
(1)-1. 18.0 wt %>x≥17.0 wt %, and
(2)-1. the concentrations of R125, 1234yf, and 134a (R125 concentration (wt %)/1234yf concentration (wt %)/134a concentration (wt %)) fall within a triangle having the following points as vertices:
point T (100−R32−1234yf−R134a/−0.0766x2+2.5779x+5.5242/0.2286x2−9.3441x+120.28),
point M (−1.7x+57.217/−0.6939x2+21.203x−132.72/100−R32−R125−1234yf), and
point V (−1.3362x2+40.667x−276.87/2.2412x2−64.842x+481.81/100−R32−R125−1234yf);
mixture 2 having a composition ratio in which
(1)-2. 18.7 wt %>x≥18.0 wt %, and
(2)-2. the concentrations of R125, 1234yf, and 134a (R125 concentration (wt %)/1234yf concentration (wt %)/134a concentration (wt %)) fall within a quadrilateral having the following points as vertices:
point S (100−R32−1234yf−R134a/0.1108x2−4.5904x+87.503/0.0939x2−4.1798x+63.826),
point T (100−R32−1234yf−R134a/−0.0766x2+2.5779x+5.5242/0.2286x2−9.3441x+120.28),
point M (−1.8571x+60.029/−3.1386x+80.613/100−R32−R125−1234yf), and
point L (−3.1429x+78.771/1.1429x+20.229/100−R32−R125−1234yf);
mixture 3 having a composition ratio in which
(1)-3. 19.3 wt %>x≥18.7 wt %, and
(2)-3. the concentrations of R125, 1234yf, and 134a (R125 concentration (wt %)/1234yf concentration (wt %)/134a concentration (wt %)) fall within a pentagon having the following points as vertices:
when 19.0 wt %>x≥18.7 wt %,
point S (100−R32−1234yf−R134a/0.1108x2−4.5904x+87.503/0.0939x2−4.1798x+63.826), and
point T (100−R32−1234yf−R134a/−0.0766x2+2.5779x+5.5242/0.2286x2−9.3441x+120.28), or
when 19.3 wt %>x≥19.0 wt %, point S (100−R32−1234yf−R134a/0.1263x2−5.6749x+102.56/−0.029x2+0.4298x+20.594), and
point T (100−R32−1234yf−R134a/0.1451x2−6.0744x+89.981/−0.2364x2+8.5372x−51.582), and
point M (−1.8333x+59.567/−3.1952x+81.665/100−R32−R125−1234yf),
point L (−1.6667x+51.167/−6.2835x+159.1/100−R32−R125−1234yf), and
point H' (100−R32−1234yf−R134a/−0.8948x+58.298/−1.0517x+39.417);
mixture 4 having a composition ratio in which
(1)-4. 20.8 wt %>x≥19.3 wt %, and
(2)-4. the concentrations of R125, 1234yf, and 134a (R125 concentration (wt %)/1234yf concentration (wt %)/134a concentration (wt %)) fall within a hexagon having the following points as vertices:
point S (100−R32−1234yf−R134a/0.1017x2−5.1872x+102.99/0.0034x2−0.7313x+30.692),
point T (100−R32−1234yf−R134a/0.1451x2−6.0744x+89.981/−0.2364x2+8.5372x−51.582),
point R (−0.0401x2+3.0217x−19.198/−0.0297x2+2.7774x−22.544/100−R32−R125−1234yf),
point Y (−0.4421x2+12.862x−59.353/0.4405x2−11.34x+74.783/100−R32−R125−1234yf),
point L (−1.3994x+46.001/−5.5605x+145.15/100−R32−R125−1234yf), and
when 20.0 wt %>x≥19.3 wt %,
point H' (100−R32−1234yf−R134a/−0.8948x+58.298/−1.0517x+39.417), or
when 20.8 wt %>x≥20.0 wt %,
point H' (100−R32−1234yf−R134a/−0.9244x+58.883/−0.8837x+36.078);
mixture 5 having a composition ratio in which
(1)-5. 23.2 wt %>x≥20.8 wt %, and
(2)-5. the concentrations of R125, 1234yf, and 134a (R125 concentration (wt %)/1234yf concentration (wt %)/134a concentration (wt %)) fall within a pentagon having the following points as vertices:
point S (100−R32−1234yf−R134a/0.1017x2−5.1872x+102.99/0.0034x2−0.7313x+30.692),
point T (100−R32−1234yf−R134a/−0.0318x2+1.1657x+15.869/−0.123x2+4.4541x−15.735),
point R (−0.0031x2+1.5234x−4.0783/−0.0503x2+3.6856x−32.627/100−R32−R125−1234yf),
point Q (−0.0984x2+6.1633x−68.728/−0.0617x2+3.9141x−25.243/100−R32−R125−1234yf), and
when 22.6 wt %>x≥20.8 wt %,
point H' (100−R32−1234yf−R134a/−0.9244x+58.883/−0.8837x+36.078), or
when 23.2 wt %>x≥22.6 wt %,
point H' (100−R32−1234yf−R134a/−0.9435x+59.308/−0.8428x+35.149); and
mixture 6 having a composition ratio in which
(1)-6. 25.4 wt %≥x≥23.2 wt %, and
(2)-6. the concentrations of R125, 1234yf, and 134a (R125 concentration (wt %)/1234yf concentration (wt %)/134a concentration (wt %)) fall within a triangle having the following points as vertices:
point S (100−R32−1234yf−R134a/−0.0317x2+0.4511x+43.979/0.075x2−4.1913x+72.494),
point α (0.0324x2−3.5746x+95.092/0.0193x2+3.2487x−59.944/100−R32−R125−1234yf), and
point Q (−0.0115x2+2.3422x−26.868/−0.1077x2+6.4104x−58.357/100−R32−R125−1234yf).

Such a mixture (at least one of mixtures 1 to 6) is preferable in terms of reducing GWP, ensuring ASHRAE non-flammability performance (in which safety ratio are further taken into consideration), exhibiting refrigerating capacity equal to that of R404A (refrigerating capacity higher than that of Embodiment 1-5), reducing the compressor outlet temperature in a refrigeration cycle, and improving the coefficient of performance (COP).

Embodiment 1-5-B

Moreover, in Embodiment 1-5-B, which is a subordinate concept of Embodiment 1-5, the mixture comprises at least one member selected from the group consisting of the following mixtures 1 to 5:
mixture 1 having a composition ratio in which
(1)-1. 20.8 wt %>x≥20 wt %, and
(2)-1. the concentrations of R125, 1234yf, and 134a (R125 concentration (wt %)/1234yf concentration (wt %)/134a concentration (wt %)) fall within a triangle having the following points as vertices:
point T (100−R32−1234yf−R134a/0.1451x2−6.0744x+89.981/−0.2364x2+8.5372x−51.582),
point P (−1.75x+63.9/−2.9691x+85.881/100−R32−R125−1234yf), and
point W (−1.4439x2+51.537x−424.27/2.1733x2−72.785x+612.88/100−R32−R125−1234yf);
mixture 2 having a composition ratio in which
(1)-2. 21.2 wt %>x≥20.8 wt %, and
(2)-2. the concentrations of R125, 1234yf, and 134a (R125 concentration (wt %)/1234yf concentration (wt %)/134a concentration (wt %)) fall within a quadrilateral having the following points as vertices:
point S (100−R32−1234yf−R134a/0.1017x2−5.1872x+102.99/0.0034x2−0.7313x+30.692),
point T (100−R32−1234yf−R134a/−0.0318x2+1.1657x+15.869/−0.123x2+4.4541x−15.735),
point P (−1.75x+63.9/−3.0619x+87.812/100−R32−R125−1234yf), and
point O (−2.25x+69.9/0.3629x+31.605/100−R32−R125−1234yf);
mixture 3 having a composition ratio in which
(1)-3. 22.6 wt %>x≥21.2 wt %, and
(2)-3. the concentrations of R125, 1234yf, and 134a (R125 concentration (wt %)/1234yf concentration (wt %)/134a concentration (wt %)) fall within a hexagon having the following points as vertices:
point S (100−R32−1234yf−R134a/0.1017x2−5.1872x+102.99/0.0034x2−0.7313x+30.692),
point T (100−R32−1234yf−R134a/−0.0318x2+1.1657x+15.869/−0.123x2+4.4541x−15.735),
point R (−0.0031x2+1.5234x−4.0783/−0.0503x2+3.6856x−32.627/100−R32−R125−1234yf),
point Z (−0.0118x2−4.1976x+121.09/−0.0544x2+8.7425x−137.98/100−R32−R125−1234yf),
point O (0.3214x2−15.507x+206.49/1.2477x2−60.003x+750.62/100−R32−R125−1234yf), and
point H' (100−R32−1234yf−R134a/−0.9244x+58.883/−0.8837x+36.078);
mixture 4 having a composition ratio in which
(1)-4. 23.2 wt %>x≥22.6 wt %, and
(2)-4. the concentrations of R125, 1234yf, and 134a (R125 concentration (wt %)/1234yf concentration (wt %)/134a concentration (wt %)) fall within a pentagon having the following points as vertices:
point S (100−R32−1234yf−R134a/0.1017x2−5.1872x+102.99/0.0034x2−0.7313x+30.692),
point T (100−R32−1234yf−R134a/−0.0318x2+1.1657x+15.869/−0.123x2+4.4541x−15.735),
point R (−0.0031x2+1.5234x−4.0783/−0.0503x2+3.6856x−32.627/100−R32−R125−1234yf),
point Q (−0.0984x2+6.1633x−68.728/−0.0617x2+3.9141x−25.243/100−R32−R125−1234yf), and
point H' (100−R32−1234yf−R134a/−0.9435x+59.308/−0.8428x+35.149); and
mixture 5 having a composition ratio in which
(1)-5. 25.4 wt %>x≥23.2 wt %, and
(2)-5. the concentrations of R125, 1234yf, and 134a (R125 concentration (wt %)/1234yf concentration (wt %)/134a concentration (wt %)) fall within a triangle having the following points as vertices:

point S (100−R32−1234yf−R134a/−0.0317x2+0.4511x+43.979/0.075x2−4.1913x+72.494), point α (0.0324x2−3.5746x+95.092/0.0193x2+3.2487x−59.944/100−R32−R125−1234yf), and point Q (−0.0115x2+2.3422x−26.868/−0.1077x2+6.4104x−58.357/100−R32−R125−1234yf).

Such a mixture (at least one of mixtures 1 to 5) is preferable in terms of reducing GWP, ensuring ASHRAE non-flammability performance (in which safety ratio are further taken into consideration), exhibiting refrigerating capacity equal to that of R404A (refrigerating capacity higher than that of Embodiment 1-5-A), reducing the compressor outlet temperature in a refrigeration cycle, and improving the coefficient of performance (COP).

The ASHRAE flammability classification of refrigerants is now described.

The ASHRAE flammability classification of refrigerants is performed based on ANSI/ASHRAE Standard 34-2013. Refrigerants classified as Class 1 are non-flammable refrigerants. That is, the composition of the present invention being non-flammable according to ASHRAE means that the mixture of fluorinated hydrocarbons used in the present invention (in particular, the four basic components) is classified as Class 1 in flammability classification.

More specifically, a leak test during storage, shipping, and use is performed based on ANSI/ASHRAE 34-2013 to specify the worst case of fractionation for flammability (WCFF). When the WCFF composition can be identified as being non-flammable in a test based on ASTM E681-2009 (a standard test method for concentration limits of flammability of chemicals (vapors and gases)), it is classified as Class 1.

The following shows a case in which the sum of the concentrations of R32, R125, 1234yf, and R134a is 100 wt %, and the concentration of R32 is 22.6 wt %, and explains a method for specifying ASHRAE non-flammability limits in a ternary composition diagram in which the sum of the concentrations of R125, 1234yf, and R134a is 77.4 wt %.

To specify ASHRAE non-flammability limits in the ternary composition diagram, it is first necessary to determine the non-flammability limits of a binary mixed refrigerant of a flammable refrigerant (R32 or 1234yf) and a non-flammable refrigerant (R134a or R125). The non-flammability limits of the binary mixed refrigerant were determined in Experimental Example 1.

Experimental Example 1 (Non-Flammability Limits of Binary Mixed Refrigerant of Flammable Refrigerant (R32 or 1234yf) and Non-Flammable Refrigerant (R134a or R125))

The non-flammability limits of the binary mixed refrigerant were determined based on the measuring apparatus and measuring method of a flammability test according to ASTM E681-2009.

Specifically, a 12-L spherical glass flask was used so that the combustion state could be visually observed and photographically recorded. When excessive pressure was generated by combustion in the glass flask, gas was allowed to escape from the upper lid. Ignition was achieved by electric discharge from electrodes disposed at one-third the distance from the bottom. The test conditions are as follows.

Test Conditions

Test vessel: 280 mm p spherical (internal volume: 12 liters)

Test temperature: 60° C.±3° C.

Pressure: 101.3 kPa±0.7 kPa

Water: 0.0088 g±0.0005 g per gram of dry air

Mixing ratio of binary refrigerant composition/air: 1 vol. % increments±0.2 vol. %

Binary refrigerant composition mixture: ±0.1 wt %

Ignition method: AC discharge, voltage: 15 kV, electric current: 30 mA, neon transformer Electrode spacing: 6.4 mm (¼ inch)

Spark: 0.4 seconds±0.05 seconds

Evaluation Criteria:

When the flame propagation extended at an angle of 900 or more from the ignition point, it was evaluated as flammable (propagation).

When the flame propagation extended at an angle of less than 900 from the ignition point, it was evaluated as non-flammable (no flame propagation).

As a result, in the mixed refrigerant of flammable refrigerant R32 and non-flammable refrigerant R134a, no flame propagation was observed from R32=43.0 wt % and R134a=57.0 wt %. These compositions were regarded as non-flammability limits. Moreover, in the case of flammable refrigerant R32 and non-flammable refrigerant R125, no flame propagation was observed from R32=63.0 wt % and R125=37.0 wt %; in the case of flammable refrigerant 1234yf and non-flammable refrigerant R134a, no flame propagation was observed from 1234yf=62.0 wt % and R134a=38.0 wt %; and in the case of flammable refrigerant 1234yf and non-flammable refrigerant R125, no flame propagation was observed from 1234yf=79.0 wt % and R125=21.0 wt %. These compositions were regarded as non-flammability limits. The results are summarized in Table 1.

TABLE 1

| Item | Flammable refrigerants | Non-flammable refrigerant |
|---|---|---|
| Binary mixed refrigerant combination | R32 | R134a |
| Non-flammability limit (wt %) | 43.0 | 57.0 |
| Binary mixed refrigerant combination | R32 | R125 |
| Non-flammability limit (wt %) | 63.0 | 37.0 |
| Binary mixed refrigerant combination | 1234yf | R134a |
| Non-flammability limit (wt %) | 62.0 | 38.0 |
| Binary mixed refrigerant combination | 1234yf | R125 |
| Non-flammability limit (wt %) | 79.0 | 21.0 |

Next, based on the non-flammability limits of the binary mixed refrigerants determined in Experimental Example 1, ASHRAE non-flammability limits when R32=22.6% were determined in the following manner.

1) Case in which R32=22.6 wt % and 1234yf=0 wt %

When R125+R134a=77.4 wt %, WCFF compositions in mixture compositions close to the ASHRAE non-flammability limits were calculated by REFPROP 9.0. Table 2-1 shows the results. Moreover, whether the calculated WCFF composition was a non-flammability limit composition was examined in the following manner.

(1) Non-flammability limit R134a concentration (wt %) relative to 1234yf concentration of WCFF=1234yf of WCFF (wt %)×38/62=0

(2) Excess R134a concentration (wt %)=R134a concentration of WCFF (wt %)−(1)

(3) Non-flammability limit R32 concentration (wt %) relative to R125 concentration of WCFF=R125 concentration of WCFF composition (wt %)×63/37

(4) Non-flammability limit R134a concentration relative to R32 concentration of (R32 concentration of WCFF−(3))=(R32 concentration of WCFF−(3))×57/43

The composition that satisfied (2)-(4)>0 was regarded as a calculation ASHRAE non-flammability limit.

TABLE 2-1

| Item | R32 (wt %) | R125 (wt %) | 1234yf (wt %) | R134a (wt %) | (2) | (4) | (2) − (4) | Calculation WCFF |
|---|---|---|---|---|---|---|---|---|
| Composition | 22.6 | 2.6 | 0 | 74.8 | | | | Storage (storage |
| WCFF | 45.6 | 4.8 | 0 | 49.6 | 49.60 | 49.61 | −0.01 | condition)/ |
| Composition | 22.6 | 2.7 | 0 | 74.7 | | | | shipping (shipping |
| WCFF | 45.6 | 4.9 | 0 | 49.5 | 49.50 | 49.39 | 0.11 | condition) |
| Composition | 22.6 | 2.8 | 0 | 74.6 | | | | Boiling point + 10° C. |
| WCFF | 45.6 | 5.1 | 0 | 49.3 | 49.30 | 48.94 | 0.36 | Vapor phase initial leak |

2) Case in which R32=22.6 wt % and R134a=50.0 wt % (R32/R125≤1.70)

When R125+1234yf=27.4 wt %, WCFF compositions in mixture compositions close to the ASHRAE non-flammability limits were calculated by REFPROP 9.0. Table 2-2 shows the results. Moreover, whether the calculated WCFF composition was a non-flammability limit composition was examined in the following manner.

(1) Non-flammability limit R134a concentration (wt %) relative to 1234yf concentration of WCFF=1234yf of WCFF (wt %)×38/62

(2) Excess R134a concentration (wt %)=R134a concentration of WCFF (wt %)−(1)

(3) Non-flammability limit R32 concentration (wt %) relative to R125 concentration of WCFF=R125 concentration of WCFF composition (wt %)×63/37

(4) Non-flammability limit R134a concentration relative to R32 concentration of (R32 concentration of WCFF−(3))=(R32 concentration of WCFF−(3))×57/43

The composition that satisfied (2)-(4)>0 was regarded as a calculation ASHRAE non-flammability limit.

TABLE 2-2

| Item | R32 (wt %) | R125 (wt %) | 1234yf (wt %) | R134a (wt %) | (2) | (4) | (2) − (4) | Calculation WCFF |
|---|---|---|---|---|---|---|---|---|
| Composition | 22.6 | 10.8 | 16.6 | 50.0 | | | | Storage (storage |
| WCFF | 41.7 | 16.1 | 14.5 | 27.7 | 18.81 | 18.94 | −0.12 | condition)/ |
| Composition | 22.6 | 10.9 | 16.5 | 50.0 | | | | shipping (shipping |
| WCFF | 41.7 | 16.2 | 14.4 | 27.7 | 18.87 | 18.71 | 0.16 | condition) |
| Composition | 22.6 | 11.0 | 16.4 | 50.0 | | | | Boiling point + 10° C. |
| WCFF | 41.6 | 16.4 | 14.3 | 27.7 | 18.94 | 18.13 | 0.81 | Vapor phase initial leak |

3) Case in which R32=22.6 wt % and R134a=20.0 wt % (R32/R125≤1.70)

When R125+1234yf=57.4 wt %, WCFF compositions in mixture compositions close to the ASHRAE non-flammability limits were calculated by REFPROP 9.0. Table 2-3 shows the results. Moreover, whether the calculated WCFF composition was a non-flammability limit composition was examined in the following manner.

(1) Non-flammability limit R134a concentration (wt %) relative to 1234yf concentration of WCFF=1234yf of WCFF (wt %)×38/62

(2) Excess R134a concentration (wt %)=R134a concentration of WCFF (wt %)−(1)

(3) Non-flammability limit R32 concentration (wt %) relative to R125 concentration of WCFF=R125 concentration of WCFF composition (wt %)×63/37

(4) Non-flammability limit R134a concentration relative to R32 concentration of (R32 concentration of WCFF−(3))=(R32 concentration of WCFF−(3))×57/43

The composition that satisfied (2)-(4)>0 was regarded as a calculation ASHRAE non-flammability limit.

TABLE 2-3

| Item | R32 (wt %) | R125 (wt %) | 1234yf (wt %) | R134a (wt %) | (2) | (4) | (2) − (4) | Calculation WCFF |
|---|---|---|---|---|---|---|---|---|
| Composition | 22.6 | 20.6 | 36.8 | 20.0 | | | | Storage (storage |
| WCFF | 39.8 | 25.7 | 24.9 | 9.6 | 2.325 | 2.455 | −0.130 | condition)/ |
| Composition | 22.6 | 20.7 | 36.7 | 20.0 | | | | shipping (shipping |
| WCFF | 39.7 | 25.8 | 24.9 | 9.6 | 2.484 | 2.455 | 0.029 | condition) |
| Composition | 22.6 | 20.8 | 36.6 | 20.0 | | | | Boiling point + 10° C. |
| WCFF | 39.7 | 25.9 | 24.8 | 9.6 | 2.584 | 2.429 | 0.155 | Vapor phase initial leak |

4) R32=22.6%, R134a=15.9% (Calculation WCFF Change Point)

When R125+R134a=61.5 wt %, WCFF compositions in mixture compositions close to the ASHRAE non-flammability limits were calculated by REFPROP 9.0. Table 2-4 shows the results. Moreover, whether the calculated WCFF composition was a non-flammability limit composition was examined in the following manner.

(1) R125 non-flammability limit concentration (wt %) relative to R32 concentration of WCFF=R32 of WCFF (wt %)×37/63

(2) Excess R125 concentration (wt %)=R125 concentration of WCFF (wt %)−(1)

(3) Non-flammability limit 1234yf concentration (wt %) relative to R134a of WCFF=134a concentration of WCFF composition (wt %)×62/38

(4) R125 non-flammability limit concentration relative to 1234yf concentration of (1234yf concentration of WCFF−(3))=(1234 concentration of WCFF−(3))×21/79

The composition that satisfied (2)-(4)>0 was regarded as a calculation ASHRAE non-flammability limit.

TABLE 2-4

| Item | R32 (wt %) | R125 (wt %) | 1234yf (wt %) | R134a (wt %) | (2) | (4) | (2) − (4) | Calculation WCFF |
|---|---|---|---|---|---|---|---|---|
| Composition | 22.6 | 22.0 | 39.5 | 15.9 | | | | Storage (storage |
| WCFF | 39.6 | 26.9 | 26.0 | 7.5 | 3.64 | 3.66 | −0.02 | condition)/ |
| Composition | 22.6 | 22.1 | 39.4 | 15.9 | | | | shipping (shipping |
| WCFF | 39.6 | 27.0 | 25.9 | 7.5 | 3.74 | 3.63 | 0.11 | condition) |
| Composition | 22.6 | 22.2 | 39.3 | 15.9 | | | | Boiling point + 10° C. |
| WCFF | 39.6 | 27.1 | 25.8 | 7.5 | 3.84 | 3.61 | 0.24 | Vapor phase initial leak |

The above calculation WCFF being a change point was confirmed by calculating the WCFF composition from the liquid phase side by REFPROP 9.0 when R134a=15.8, 15.9, and 16.0 wt %. Table 2-5 shows the results. Moreover, whether the determined WCFF composition was a non-flammability limit composition was examined in the following manner.

(1) R125 non-flammability limit concentration (wt %) relative to R32 concentration of WCFF=R32 of WCFF (wt %)×37/63

(2) Excess R125 concentration (wt %)=R125 concentration of WCFF (wt %)−(1)

(3) Non-flammability limit 1234yf concentration (wt %) relative to R134a of WCFF=134a concentration of WCFF composition (wt %)×62/38

(4) R125 non-flammability limit concentration relative to 1234yf concentration of (1234yf concentration of WCFF−(3))=(1234 concentration of WCFF−(3))×21/79

The composition that satisfied (2)-(4)>0 was regarded as a calculation ASHRAE non-flammability limit.

TABLE 2-5

| Item | R32 (wt %) | R125 (wt %) | 1234yf (wt %) | R134a (wt %) | (2) | (4) | (2) − (4) | Calculation WCFF |
|---|---|---|---|---|---|---|---|---|
| Composition | 22.6 | 22.1 | 39.5 | 15.8 | | | | Storage (storage |
| WCFF | 0.8 | 4.5 | 64.7 | 30.0 | 4.03 | 4.19 | −0.16 | condition)/ |
| Composition | 22.6 | 22.1 | 39.4 | 15.9 | | | | shipping (shipping |
| WCFF | 0.8 | 4.5 | 64.4 | 30.3 | 4.03 | 3.98 | 0.05 | condition) 0° C. |
| Composition | 22.6 | 22.1 | 39.3 | 16.0 | | | | Liquid phase 95% |
| WCFF | 0.8 | 4.5 | 64.2 | 30.5 | 4.03 | 3.84 | 0.19 | leak |

The above results show that WCFF was vapor phase initial leak when R134a≥16.0 wt %, and liquid phase 95% leak when R134a≤15.8 wt %. Thus, R134a=15.9 wt % is a change point of the WCFF composition.

5) ASHRAE Non-Flammability Limit when R32=22.6 and R125=25.0%

When 1234yf+R134a=52.4 wt %, WCFF compositions in mixture compositions close to the ASHRAE non-flammability limit were calculated by REFPROP 9.0. Table 2-6 shows the results. WCFF was liquid phase 95% leak because R134a≤15.8 wt %. Moreover, whether the calculated WCFF composition was a non-flammability limit composition was examined in the following manner.

(1) R125 non-flammability limit concentration (wt %) relative to R32 concentration of WCFF=R32 of WCFF (wt %)×37/63

(2) Excess R125 concentration (wt %)=R125 concentration of WCFF (wt %)−(1)

(3) Non-flammability limit 1234yf concentration (wt %) relative to R134a of WCFF=134a concentration of WCFF composition (wt %)×62/38

(4) R125 non-flammability limit concentration relative to 1234yf concentration of (1234yf concentration of WCFF−(3))=(1234 concentration of WCFF−(3))×21/79

The composition that satisfied (2)-(4)>0 was regarded as a calculation ASHRAE non-flammability limit.

TABLE 2-6

| Item | R32 (wt %) | R125 (wt %) | 1234yf (wt %) | R134a (wt %) | (2) | (4) | (2) − (4) | Calculation WCFF |
|---|---|---|---|---|---|---|---|---|
| Composition | 22.6 | 25.0 | 38.1 | 14.3 | | | | Storage (storage |
| WCFF | 0.5 | 4.5 | 65.2 | 29.8 | 4.21 | 4.41 | −0.20 | condition)/ |
| Composition | 22.6 | 25.0 | 38.0 | 14.4 | | | | shipping (shipping |
| WCFF | 0.5 | 4.5 | 64.9 | 30.1 | 4.21 | 4.20 | 0.01 | condition) −10° C. |
| Composition | 22.6 | 25.0 | 37.9 | 14.5 | | | | Liquid phase 95% |
| WCFF | 0.5 | 4.5 | 64.7 | 30.3 | 4.21 | 4.06 | 0.15 | leak |
| Composition | 22.6 | 24.9 | 45.4 | 7.1 | | | | Storage (storage |
| WCFF | 39.4 | 29.1 | 28.2 | 3.3 | 5.96 | 6.06 | −0.10 | condition)/ |
| Composition | 22.6 | 25.0 | 45.3 | 7.1 | | | | shipping (shipping |
| WCFF | 39.4 | 29.2 | 28.1 | 3.3 | 6.06 | 6.04 | 0.02 | condition) |
| Composition | 22.6 | 25.1 | 45.2 | 7.1 | | | | Boiling point + 10° C. |
| WCFF | 39.4 | 29.3 | 28.0 | 3.3 | 6.16 | 6.01 | 0.15 | Vapor phase initial leak |

6) ASHRAE Non-Flammability Limit when GWP=1500

The WCFF composition of a composition in which GWP was 1500 (22.6/34.2/32.8/10.4) (R32 concentration (wt %)/R125 concentration (wt %)/1234yf concentration (wt %)/R134a concentration (wt %)), and WCFF compositions in mixture compositions close to the ASHRAE non-flammability limits were calculated by REFPROP 9.0. Table 2-7 shows the results. Moreover, whether the calculated WCFF composition was a non-flammability limit composition was examined in the following manner.

(1) R125 non-flammability limit concentration (wt %) relative to R32 concentration of WCFF=R32 of WCFF (wt %)×37/63

(2) Excess R125 concentration (wt %)=R125 concentration of WCFF (wt %)−(1)

(3) Non-flammability limit 1234yf concentration (wt %) relative to R134a of WCFF=134a concentration of WCFF composition (wt %)×62/38

(4) R125 non-flammability limit concentration relative to 1234yf concentration of (1234yf concentration of WCFF−(3))=(1234 concentration of WCFF−(3))×21/79

The composition that satisfied (2)-(4)>0 was regarded as a calculation ASHRAE non-flammability limit.

TABLE 2-7

| Item | R32 (wt %) | R125 (wt %) | 1234yf (wt %) | R134a (wt %) | (2) | (4) | (2) − (4) | Calculation WCFF |
|---|---|---|---|---|---|---|---|---|
| Composition | 22.6 | 34.2 | 32.9 | 10.3 | | | | Storage (storage |
| WCFF | 0.2 | 5.4 | 66.2 | 28.2 | 5.28 | 5.37 | −0.08 | condition)/ |
| Composition | 22.6 | 34.2 | 32.8 | 10.4 | | | | shipping (shipping |
| WCFF | 0.2 | 5.4 | 65.8 | 28.6 | 5.28 | 5.09 | 0.20 | condition) −32° C. |
| Composition | 22.6 | 34.2 | 32.7 | 10.5 | | | | Liquid phase 95% |
| WCFF | 0.2 | 5.4 | 65.5 | 28.9 | 5.28 | 4.88 | 0.41 | leak |

The results of examining the above calculation ASHRAE non-flammability limit compositions are shown in a ternary composition diagram. The results of determining regression lines connecting these points are a straight line connecting points G and H, and a straight line connecting points H and I shown in FIG. 1.

Experimental Example 2 (Examination of Calculation Non-Flammability Limits Obtained in Experimental Example 1 by Combustion Test)

A combustion test was carried out according to ASTM E681 shown in Experimental Example 1 using, as representative examples, the WCFF composition (41.7/16.2/14.4/27.7) of the composition (R32/R125/1234yf/R134a)=(22.6/10.9/16.5/50.0), and the WCFF composition (0.2/5.4/65.8/28.6) of the composition (R32/R125/1234yf/R134a)=(22.6/34.2/32.8/10.4). As a result, flame propagation was not observed in these WCFF compositions.

Therefore, the ASHRAE non-flammability limits determined by calculation in Experimental Example 1 based on the non-flammability limits of the binary compositions determined in Experimental Example 1 satisfy the requirements for ASHRAE non-flammability based on ANSI/ASHRAE Standard 34-2013.

Moreover, as shown in FIG. 1 (a ternary diagram when R32=22.6%), the ASHRAE non-flammability limit with a GWP of 1500 or less is represented by a straight line (line HI) connecting 1234yf=0 wt % (the point determined by method 1) above; point I in FIG. 1) and R32=30%, R134a=10.3% (calculation WCFF change point) (the point determined by method 4) above; point H in FIG. 1), and a straight line (line GH) connecting point H and GWP=1500 (the point determined by method 6) above; point G in FIG. 1).

Hereinafter, the ASHRAE non-flammability limits in the present specification are represented by regression lines (line HI and line GH) determined by methods 1), 4), and 6) above based on the non-flammability limits of the binary compositions determined in Experimental Example 1. Table 2-8 shows the R32 concentration, R125 concentration, 1234yf concentration, and R134a concentration of point G, point H, and point I when the R32 concentration is 10.8, 12.4, 14.8, 16.1, 18.1, 19.0, 20.0, 21.6, 22.6, 23.2, 24.5, 25.6, and 26.6 wt %.

TABLE 2-8

| | Point G | | | Point H | | | Point I | | |
|---|---|---|---|---|---|---|---|---|---|
| R32 (wt %) | R125 (wt %) | 1234yf (wt %) | R134a (wt %) | R125 (wt %) | 1234yf (wt %) | R134a (wt %) | R125 (wt %) | 1234yf (wt %) | R134a (wt %) |
| 10.8 | 34.5 | 39.4 | 15.3 | 11.6 | 50.3 | 27.3 | 0.0 | 22.5 | 66.7 |
| 12.4 | 34.5 | 38.5 | 14.6 | 13.1 | 48.8 | 25.7 | 0.0 | 18.2 | 69.4 |
| 14.8 | 34.4 | 37.2 | 13.6 | 15.4 | 46.5 | 23.3 | 0.0 | 11.7 | 73.5 |
| 16.1 | 34.4 | 36.4 | 13.1 | 16.5 | 45.3 | 22.1 | 0.0 | 8.6 | 75.3 |
| 18.1 | 34.3 | 35.3 | 12.3 | 18.3 | 43.5 | 20.1 | 0.0 | 3.9 | 78.0 |
| 19.0 | 34.3 | 34.8 | 11.9 | 19.2 | 42.7 | 19.1 | 0.0 | 2.0 | 79.0 |
| 20.0 | 34.2 | 34.3 | 11.5 | 20.1 | 41.8 | 18.1 | 0.0 | 0.0 | 80.0 |
| 21.6 | 34.2 | 33.4 | 10.8 | 21.4 | 40.3 | 16.7 | 1.7 | 0.0 | 76.7 |
| 22.6 | 34.2 | 32.8 | 10.4 | 22.1 | 39.4 | 15.9 | 2.7 | 0.0 | 74.7 |
| 23.2 | 34.2 | 32.5 | 10.1 | 22.6 | 38.8 | 15.4 | 3.3 | 0.0 | 73.5 |
| 24.5 | 34.2 | 31.8 | 9.5 | 23.6 | 37.6 | 14.3 | 4.5 | 0.0 | 71.0 |
| 25.6 | 34.2 | 31.2 | 9.0 | 24.3 | 36.6 | 13.5 | 5.6 | 0.0 | 68.8 |
| 26.6 | 34.2 | 30.6 | 8.6 | 25.1 | 25.6 | 12.7 | 6.6 | 0.0 | 66.8 |

In the ASHRAE non-flammability limits determined by calculation as described above, safety ratio are preferably further taken into consideration, in view of the purity of each refrigerant during production, error during mixing, etc. ASHRAE non-flammability limit line GH was moved in parallel so that the concentration of non-flammable refrigerant R134a was higher by 1 wt % (because ±1 wt % is often expected as the allowable concentration during production), by reducing the 1234yf concentration by 1.63 wt % (63/37) based on the non-flammability limit mixing ratio of R134a and 1234yf. Thus, line segment G'H' in which safety ratio were taken into consideration was obtained. Moreover, ASHRAE non-flammability limit line HI was moved in parallel so that the concentration of non-flammable refrigerant R125 was higher by 1 wt % (because ±1 wt % is often expected as the allowable concentration during production), by reducing the 1234yf concentration by 3.76 wt % (79/21) based on the non-flammability limit mixing ratio of R134a and 1234yf. Thus, line segment H'I' in which safety ratio were taken into consideration was obtained.

Regarding ASHRAE non-flammability lines G'H'I' in which safety ratio are taken into consideration, for example, in the case of R32=22.6 wt %, when R125=y wt %, 1234yf=z wt %, and R134a=w wt %, line segment GH was represented by $z=1.2w+42.92$ in a ternary diagram in which $y+z+w=100$ wt %; thus, 1.63 was subtracted from 42.92, line segment G'H' was represented by $z=1.2w+41.29$, and the intersection of line segment G'H' and line segment AD was regarded as G'. Line segment HI was represented by $z=2.0309y+17.116$; thus, 3.76 was subtracted from 17.116, line segment H'I' was represented by $z=2.0309y+13.356$, and the intersection of line segment H'I' and line segment DI was regarded as I'. Moreover, H' was determined as an intersection of line segment G'H' represented by the formula $z=1.2w+41.29$, and line segment H'I' represented by the formula $z=2.0309y+13.356$.

Table 2-9 shows ASHRAE non-flammability points G', H', and I' in which safety ratio were taken into consideration in the above manner.

TABLE 2-9

| | Point G' | | | Point H' | | | Point I' | | |
|---|---|---|---|---|---|---|---|---|---|
| R32 (wt %) | R125 (wt %) | 1234yf (wt %) | R134a (wt %) | R125 (wt %) | 1234yf (wt %) | R134a (wt %) | R125 (wt %) | 1234yf (wt %) | R134a (wt %) |
| 10.8 | 34.0 | 38.8 | 16.4 | 12.6 | 49.0 | 27.6 | 0.0 | 18.7 | 70.5 |
| 12.4 | 34.0 | 37.9 | 15.7 | 14.1 | 47.5 | 26.0 | 0.0 | 14.4 | 73.2 |
| 14.8 | 34.0 | 36.5 | 14.7 | 16.5 | 45.1 | 23.6 | 0.0 | 7.9 | 77.3 |
| 16.1 | 33.9 | 35.8 | 14.2 | 17.6 | 43.9 | 22.4 | 0.0 | 4.8 | 79.1 |
| 18.1 | 33.9 | 34.7 | 13.3 | 19.4 | 42.1 | 20.4 | 0.0 | 0.0 | 81.9 |
| 19.0 | 33.8 | 34.3 | 12.9 | 20.3 | 41.3 | 19.3 | 0.8 | 0.0 | 80.2 |
| 20.0 | 33.8 | 33.7 | 12.5 | 21.2 | 40.4 | 18.4 | 1.8 | 0.0 | 78.2 |
| 21.6 | 33.8 | 32.9 | 11.7 | 22.5 | 38.9 | 17.0 | 3.5 | 0.0 | 74.9 |
| 22.6 | 33.8 | 32.3 | 11.3 | 23.3 | 38.0 | 16.1 | 4.6 | 0.0 | 72.8 |
| 23.2 | 33.8 | 32.0 | 11.0 | 23.8 | 37.4 | 15.6 | 5.2 | 0.0 | 71.6 |
| 24.5 | 33.9 | 31.4 | 32.0 | 24.8 | 36.2 | 14.5 | 6.4 | 0.0 | 69.1 |
| 25.6 | 33.9 | 30.6 | 9.9 | 25.6 | 35.1 | 13.7 | 7.5 | 0.0 | 66.9 |
| 26.6 | 33.8 | 30.1 | 9.5 | 26.3 | 34.1 | 13.0 | 8.6 | 0.0 | 64.8 |

The composition ratio of R32, R125, 1234yf, and R134a contained in the mixture can be represented by points in a ternary composition diagram of R125, 1234yf, and R134a under the restriction by the condition of R32 concentration.

Specifically, when the concentration of R32 is x wt %, the sum of the concentrations of R125, 1234yf, and R134a is (100−x) wt %; and the composition ratio of R32, R125, 1234yf, and R134a contained in the mixture can be represented by coordinate points in a ternary composition diagram in which the sum of the concentrations of R125, 1234yf, and R134a is (100−x). The following shows a specific method for determining the coordinate points.

Hereinafter, cases were classified according to the range of x. The meaning of each of points A, B, C, D, E, F, B', C', E', F', G, H, I, G', H', I', J, K, L, M, N, O, P, Q, R, S, T, U, V, W, X, Y, Z, and α is as described below. The concentration of each point is determined in Example 1, described later, and the determined values are shown.

A: Composition ratio in which GWP=1500 and the concentration (wt %) of R134a is 0 wt %

D: Composition ratio in which GWP=1500 and the concentration (wt %) of 1234yf is 0 wt %

G: Composition ratio in which GWP=1500 and which shows an ASHRAE non-flammability limit (when the WCFF becomes a liquid phase composition after 95% leak under the storage/shipping conditions)

H: Composition ratio showing an ASHRAE non-flammability limit (when the WCFF becomes a liquid phase composition after 95% leak under the storage/shipping conditions, and becomes a vapor phase composition at the time of 0% leak)

I: Composition ratio showing an ASHRAE non-flammability limit, in which the concentration (wt %) of 1234yf is 0 wt % (the WCFF is a vapor phase composition at the time of 0% leak under the storage/shipping conditions)

G': Composition ratio showing an intersection of a line segment in which GWP=1500 and a line segment obtained by adding 1 wt of non-flammable refrigerant R134a to line segment GH, which shows an ASHRAE non-flammability limit, in order to take into consideration safety ratio of non-flammability H': Composition ratio showing an intersection of a line segment obtained by adding 1 wt % of non-flammable refrigerant R134a to line segment GH, which shows an ASHRAE non-flammability limit, and a line segment obtained by adding 1 wt % of non-flammable refrigerant R125 to line segment HI I': Composition ratio on a line segment obtained by adding 1 wt % of non-flammable refrigerant R125 to line segment HI, which shows an ASHRAE non-flammability limit, in order to take into consideration safety ratio of non-flammability, in which the concentration (wt %) of 1234yf is 0 wt %

B: Composition ratio present on line segments G'H'I', in which the compressor outlet pressure is 102.5% of the R22 pressure C: Composition ratio in which GWP=1500 and the compressor outlet pressure is 102.5% of the R22 pressure E: Composition ratio present on line segments G'H'I', in which the compressor outlet pressure is 97.5% of the R22 pressure F: Composition ratio in which GWP=1500 and the compressor outlet pressure is 97.5% of the R22 pressure B': Composition ratio present on line segments G'H'I', in which the compressor outlet pressure is 101.25% of the R22 pressure C': Composition ratio in which GWP=1500 and the compressor outlet pressure is 101.25% of the R22 pressure E': Composition ratio present on line segments G'H'I', in which the compressor outlet pressure is 98.75% of the R22 pressure F': Composition ratio in which GWP=1500 and the compressor outlet pressure is 98.75% of the R22 pressure J: Composition ratio present on line segments G'H'I', in which the refrigerating capacity relative to that of R404 is 85%

K: Composition ratio in which GWP=1500 and the refrigerating capacity relative to that of R404 is 85%

L: Composition ratio present on line segments G'H'I', in which the refrigerating capacity relative to that of R404 is 90%

M: Composition ratio in which GWP=1500 and the refrigerating capacity relative to that of R404 is 90%

O: Composition ratio present on line segments G'H'I', in which the refrigerating capacity relative to that of R404 is 95%

P: Composition ratio in which GWP=1500 and the refrigerating capacity relative to that of R404 is 95%

Q: Composition ratio present on line segments G'H'I', in which the compressor outlet temperature is 115° C.

R: Composition ratio in which GWP=1500 and the compressor outlet temperature is 115° C.

S: Composition ratio present on line segments G'H'I', in which COP is 107.75% of that of R404A T: Composition ratio in which GWP=1500, and COP is 107.75% of that of R404A U: Intersection of line segment ST and line segment JK V: Intersection of line segment ST and line segment LM W: Intersection of line segment ST and line segment OP
X: Intersection of line segment QR and line segment JK
Y: Intersection of line segment OR and line segment LM
Z: Intersection of line segment QR and line segment OP
α: Intersection of line segment ST and line segment QR
N: Point in which R125=0 and R134a=0 (0/0/100−x)
(1) Method for Determining Points a, D, G, H, I, G', H', and I'
(1-1) Point a
14.8 wt %≥x≥10.8 wt %

When the concentration of x=R32 is 10.8 wt %, point A in the ternary composition diagram in which the sum of the concentrations of R125, 1234yf, and 134a is (100−x) wt % is: (R125 concentration (wt %)/1234yf concentration (wt %)/134a concentration (wt %))=(40.7/40.5/0);

when the concentration of R32 is 12.4 wt %, point A in the ternary composition diagram in which the sum of the concentrations of R125, 1234yf, and 134a is (100−x) wt % is:

(R125 concentration (wt %)/1234yf concentration (wt %)/134a concentration (wt %))=(40.4/47.2/0); and when the concentration of R32 is 14.8 wt %, point A in the ternary composition diagram in which the sum of the concentrations of R125, 1234yf, and 134a is (100−x) wt % is:

(R125 concentration (wt %)/1234yf concentration (wt %)/134a concentration (wt %))=(40.0/45.2/0).

Accordingly, in the case where the concentration of R125 is regarded as y wt % when the sum of the concentrations of R32, R125, 1234yf, and 134a is 100 wt %, a regression line determined from the above three points plotted in the x-y coordinate is represented by the formula:

$$y=-1.743x+42.575.$$

Moreover, since the R134a concentration of point A is 0 wt %, the 1234yf concentration of point A is represented by (100−R32 concentration (wt %)−R125 concentration (wt %)).

In light of the above, point A in the ternary composition diagram in which the sum of the concentrations of R125, 1234yf, and R134a is (100−x) (R125 concentration (wt %)/1234yf concentration (wt %)/134a concentration (wt %)) is represented by (42.575−1.743x/100−R32 concentration-R125 concentration/0).

The same calculations were performed for the following ranges: 18.1 wt %≥x≥14.8 wt %, 20.0 wt %≥x≥18.1 wt %, 22.6 wt %≥x≥20.0 wt %, 24.5 wt %≥x≥22.6 wt %, and 26.6 wt %≥x≥24.5 wt %. Table 3-1 shows (R125 concentration (wt %)/1234yf concentration (wt %)/134a concentration (wt %)) for each concentration range, determined by the approximate expression of x when R32=x wt %.

TABLE 3-1

| Point A | | | | | | | | | |
|---|---|---|---|---|---|---|---|---|---|
| Item | 14.8 ≥ x ≥ 10.8 | | | 18.1 ≥ x ≥ 14.8 | | | 20.0 ≥ x ≥ 18.1 | | |
| R32 | 10.8 | 12.4 | 14.8 | 14.8 | 16.1 | 18.1 | 18.1 | 19.0 | 20.0 |
| R125 | 40.7 | 40.4 | 40.0 | 40.0 | 39.7 | 39.3 | 39.3 | 39.1 | 38.9 |
| 1234yf | 48.5 | 47.2 | 45.2 | 45.2 | 44.2 | 42.6 | 42.6 | 41.9 | 41.1 |
| R134a | 0.0 | 0.0 | 0.0 | 0.0 | 0.0 | 0.0 | 0.0 | 0.0 | 0.0 |
| R32 | x | | | x | | | x | | |
| R125 approximate expression | −0.1743x + 42.575 | | | −0.2111x + 43.115 | | | −0.2103x + 43.103 | | |
| 1234yf approximate expression | 100-R32-R125-R134a | | | 100-R32-R125-R134a | | | 100-R32-R125-R134a | | |
| R134a approximate expression | 0 | | | 0 | | | 0 | | |

| Point A | | | | | | | | | |
|---|---|---|---|---|---|---|---|---|---|
| Item | 22.6 ≥ x ≥ 20.0 | | | 24.5 ≥ x ≥ 22.6 | | | 26.6 ≥ x ≥ 24.5 | | |
| R32 | 20.0 | 21.6 | 22.6 | 22.6 | 23.2 | 24.5 | 24.5 | 25.6 | 26.6 |
| R125 | 38.9 | 38.6 | 38.4 | 38.4 | 38.3 | 38.1 | 38.1 | 37.9 | 37.7 |
| 1234yf | 41.1 | 39.8 | 39.0 | 39.0 | 38.5 | 37.4 | 37.4 | 36.5 | 35.7 |
| R134a | 0.0 | 0.0 | 0.0 | 0.0 | 0.0 | 0.0 | 0.0 | 0.0 | 0.0 |
| R32 | x | | | x | | | x | | |
| R125 approximate expression | −0.1919x + 42.739 | | | −0.1572x + 41.951 | | | −0.1903x + 42.766 | | |
| 1234yf approximate expression | 100-R32-R125-R134a | | | 100-R32-R125-R134a | | | 100-R32-R125-R134a | | |
| R134a approximate expression | 0 | | | 0 | | | 0 | | |

(1-2) Point D

For point D, the same calculations as those of point A were performed for the following ranges: 14.8 wt %≥x≥10.8 wt %, 18.1 wt %≥x≥14.8 wt %, 20.0 wt %≥x≥18.1 wt %, 22.6 wt %≥x≥20.0 wt %, 24.5 wt %≥x≥22.6 wt, and 26.6 wt %≥x≥24.5 wt %. Table 3-2 shows (R125 concentration (wt %)/1234yf concentration (wt %)/134a concentration (wt %)) for each concentration range, determined by the approximate expression of x when R32=x wt %.

TABLE 3-2

| Point D | | | | | | | | | |
|---|---|---|---|---|---|---|---|---|---|
| Item | 14.8 ≥ x ≥ 10.8 | | | 18.1 ≥ x ≥ 14.8 | | | 20.0 ≥ x ≥ 18.1 | | |
| R32 | 10.8 | 12.4 | 14.8 | 14.8 | 16.1 | 18.1 | 18.1 | 19.0 | 20.0 |
| R125 | 0.0 | 0.0 | 0.0 | 0.0 | 0.0 | 0.0 | 0.0 | 0.8 | 1.8 |
| 1234yf | 18.7 | 14.4 | 7.9 | 7.9 | 4.8 | 0.0 | 0.0 | 0.0 | 0.0 |
| R134a | 70.5 | 73.2 | 77.3 | 77.3 | 79.1 | 81.9 | 81.9 | 80.2 | 78.2 |
| R32 | x | | | x | | | x | | |
| R125 approximate expression | 0.375x + 3.25 | | | 0.3625x + 3.4461 | | | 0.369x + 3.31 | | |
| 1234yf approximate expression | 0 | | | 0 | | | 0 | | |
| R134a approximate expression | 100-R32-R125-1234yf | | | 100-R32-R125-1234yf | | | 100-R32-R125-1234yf | | |

| Point D | | | | | | | | | |
|---|---|---|---|---|---|---|---|---|---|
| Item | 22.6 ≥ x ≥ 20.0 | | | 24.5 ≥ x ≥ 22.6 | | | 26.6 ≥ x ≥ 24.5 | | |
| R32 | 20.0 | 21.6 | 22.6 | 22.6 | 23.2 | 24.5 | 24.5 | 25.6 | 26.6 |
| R125 | 1.8 | 3.5 | 4.6 | 4.6 | 5.2 | 6.4 | 6.4 | 7.5 | 8.6 |
| 1234yf | 0.0 | 0.0 | 0.0 | 0.0 | 0.0 | 0.0 | 0.0 | 0.0 | 0.0 |
| R134a | 78.2 | 74.9 | 72.8 | 72.8 | 71.6 | 69.1 | 69.1 | 66.9 | 64.8 |
| R32 | x | | | x | | | x | | |
| R125 approximate expression | 0.3430x + 3.826 | | | 0.3710x + 3.2057 | | | 0.3323x + 4.1369 | | |
| 1234yf approximate expression | 0 | | | 0 | | | 0 | | |
| R134a approximate expression | 100-R32-R125-1234yf | | | 100-R32-R125-1234yf | | | 100-R32-R125-1234yf | | |

(1-3) Point G

For point G, the same calculations as those of point A were performed for the following ranges: 14.8 wt %≥x≥10.8 wt %, 18.1 wt %≥x≥14.8 wt %, 20.0 wt %≥x≥18.1 wt %, 22.6 wt %≥x≥20.0 wt %, 24.5 wt %≥x≥22.6 wt %, and 26.6 wt %≥x≥24.5 wt %. Table 3-3 shows (R125 concentration (wt %)/1234yf concentration (wt %)/134a concentration (wt %)) for each concentration range, determined by the approximate expression of x when R32=x wt %.

TABLE 3-3

| Point G | | | | | | | | | |
|---|---|---|---|---|---|---|---|---|---|
| Item | 14.8 ≥ x ≥ 10.8 | | | 18.1 ≥ x ≥ 14.8 | | | 20.0 ≥ x ≥ 18.1 | | |
| R32 | 10.8 | 12.4 | 14.8 | 14.8 | 16.1 | 18.1 | 18.1 | 19.0 | 20.0 |
| R125 | 34.5 | 34.5 | 34.4 | 34.4 | 34.4 | 34.3 | 34.3 | 34.3 | 34.2 |
| 1234yf | 39.4 | 38.5 | 37.2 | 37.2 | 36.4 | 35.3 | 35.3 | 34.8 | 34.3 |
| R134a | 15.3 | 14.6 | 13.6 | 13.6 | 13.1 | 12.3 | 12.3 | 11.9 | 11.5 |
| R32 | x | | | x | | | x | | |
| R125 approximate expression | 100-R32-1234yf-R134a | | | 100-R32-1234yf-R134a | | | 100-R32-1234yf-R134a | | |
| 1234yf approximate expression | −0.5493x + 45.325 | | | −0.5736x + 45.669 | | | −0.5258x + 44.808 | | |
| R134a approximate expression | −0.4243x + 19.875 | | | −0.3945x + 19.443 | | | −0.4207x + 19.907 | | |

| Point G | | | | | | | | | |
|---|---|---|---|---|---|---|---|---|---|
| Item | 22.6 ≥ x ≥ 20.0 | | | 24.5 ≥ x ≥ 22.6 | | | 26.6 ≥ x ≥ 24.5 | | |
| R32 | 20.0 | 21.6 | 22.6 | 22.6 | 23.2 | 24.5 | 24.5 | 25.6 | 26.6 |
| R125 | 34.2 | 34.2 | 34.2 | 34.2 | 34.2 | 34.2 | 34.2 | 34.2 | 34.2 |
| 1234yf | 34.3 | 33.4 | 32.8 | 32.8 | 32.5 | 31.8 | 31.8 | 31.2 | 30.6 |
| R134a | 11.5 | 10.8 | 10.4 | 10.4 | 10.1 | 9.5 | 9.5 | 9.0 | 8.6 |
| R32 | x | | | x | | | x | | |
| R125 approximate expression | 100-R32-1234yf-R134a | | | 100-R32-1234yf-R134a | | | 100-R32-1234yf-R134a | | |

TABLE 3-3-continued

| | | | |
|---|---|---|---|
| 1234yf approximate expression | −0.5756x + 45.817 | −0.5283x + 44.746 | −0.5710x + 45.798 |
| R134a approximate expression | −0.4244x + 19.983 | −0.4717x + 21.054 | −0.4290x + 20.002 |

(1-4) Point H

For point H, the same calculations as those of point A were performed for the following ranges: 14.8 wt %≥x≥10.8 wt %, 18.1 wt %≥x≥14.8 wt %, 20.0 wt %≥x≥18.1 wt %, 22.6 wt %≥x≥20.0 wt %, 24.5 wt %≥x≥22.6 wt %, and 26.6 wt %≥x≥24.5 wt %. Table 3-4 shows (R125 concentration (wt %)/1234yf concentration (wt %)/134a concentration (wt %)) for each concentration range, determined by the approximate expression of x when R32=x wt %.

TABLE 3-4

| Point H | | | | | | | | | |
|---|---|---|---|---|---|---|---|---|---|
| Item | 14.8 ≥ x ≥ 10.8 | | | 18.1 ≥ x ≥ 14.8 | | | 20.0 ≥ x ≥ 18.1 | | |
| R32 | 10.8 | 12.4 | 14.8 | 14.8 | 16.1 | 18.1 | 18.1 | 19.0 | 20.0 |
| R125 | 11.6 | 13.1 | 15.4 | 15.4 | 16.5 | 18.3 | 18.3 | 19.2 | 20.1 |
| 1234yf | 50.3 | 48.8 | 46.5 | 46.5 | 45.3 | 43.5 | 43.5 | 42.7 | 41.8 |
| R134a | 27.3 | 25.7 | 23.3 | 23.3 | 22.1 | 20.1 | 20.1 | 19.1 | 18.1 |
| R32 | x | | | x | | | x | | |
| R125 approximate expression | 100-R32-1234yf-R134a | | | 100-R32-1234yf-R134a | | | 100-R32-1234yf-R134a | | |
| 1234yf approximate expression | −0.9507x + 60.575 | | | −0.9083x + 59.936 | | | −0.8948x + 59.698 | | |
| R134a approximate expression | −x + 38.1 | | | −0.9723x + 37.714 | | | −1.0517x + 39.117 | | |

| Point H | | | | | | | | | |
|---|---|---|---|---|---|---|---|---|---|
| Item | 22.6 ≥ x ≥ 20.0 | | | 24.5 ≥ x ≥ 22.6 | | | 26.6 ≥ x ≥ 24.5 | | |
| R32 | 20.0 | 21.6 | 22.6 | 22.6 | 23.2 | 24.5 | 24.5 | 25.6 | 26.6 |
| R125 | 20.1 | 21.4 | 22.1 | 22.1 | 22.6 | 23.6 | 23.6 | 24.3 | 25.1 |
| 1234yf | 41.8 | 40.3 | 39.4 | 39.4 | 38.8 | 37.6 | 37.6 | 36.6 | 25.6 |
| R134a | 18.1 | 16.7 | 15.9 | 15.9 | 15.4 | 14.3 | 14.3 | 13.5 | 12.8 |
| R32 | x | | | x | | | x | | |
| R125 approximate expression | 100-R32-1234yf-R134a | | | 100-R32-1234yf-R134a | | | 100-R32-1234yf-R134a | | |
| 1234yf approximate expression | −0.9244x + 60.283 | | | −0.9435x + 60.078 | | | −0.9517x + 60.931 | | |
| R134a approximate expression | −0.8488x + 35.065 | | | −0.8428x + 34.949 | | | −0.7613x + 32.965 | | |

(1-5) Point I

For point I, the same calculations as those of point A were performed for the following ranges: 14.8 wt %≥x≥10.8 wt %, 18.1 wt %≥x≥14.8 wt %, 20.0 wt %≥x≥18.1 wt %, 22.6 wt %≥x≥20.0 wt %, 24.5 wt %≥x≥22.6 wt %, and 26.6 wt %≥x≥24.5 wt %. Table 3-5 shows (R125 concentration (wt %)/1234yf concentration (wt %)/134a concentration (wt %)) for each concentration range, determined by the approximate expression of x when R32=x wt %.

TABLE 3-5

| Point I | | | | | | | | | |
|---|---|---|---|---|---|---|---|---|---|
| Item | 14.8 ≥ x ≥ 10.8 | | | 18.1 ≥ x ≥ 14.8 | | | 20.0 ≥ x ≥ 18.1 | | |
| R32 | 10.8 | 12.4 | 14.8 | 14.8 | 16.1 | 18.1 | 18.1 | 19.0 | 20.0 |
| R125 | 0.0 | 0.0 | 0.0 | 0.0 | 0.0 | 0.0 | 0.0 | 0.0 | 0.0 |
| 1234yf | 22.5 | 18.1 | 11.7 | 11.7 | 8.6 | 3.9 | 3.9 | 2.0 | 0.0 |
| R134a | 66.7 | 69.5 | 73.5 | 73.5 | 75.3 | 78.0 | 78.0 | 79.0 | 80.0 |

TABLE 3-5-continued

| | | | |
|---|---|---|---|
| R32 | x | x | x |
| R125 approximate expression | 0 | 0 | 0 |
| 1234yf approximate expression | 100-R32-1234yf-R134a | 100-R32-1234yf-R134a | 100-R32-1234yf-R134a |
| R134a approximate expression | 1.6974x + 48.4 | 1.3625x + 53.346 | 1.0517x + 58.983 |

| Point I | | | | | | | | | |
|---|---|---|---|---|---|---|---|---|---|
| Item | 22.6 ≥ x ≥ 20.0 | | | 24.5 ≥ x ≥ 22.6 | | | 26.6 ≥ x ≥ 24.5 | | |
| R32 | 20.0 | 21.6 | 22.6 | 22.6 | 23.2 | 24.5 | 24.5 | 25.6 | 26.6 |
| R125 | 0.0 | 1.7 | 2.7 | 2.7 | 3.3 | 4.5 | 4.5 | 5.7 | 6.6 |
| 1234yf | 0.0 | 0.0 | 0.0 | 0.0 | 0.0 | 0.0 | 0.0 | 0.0 | 0.0 |
| R134a | 80.0 | 76.7 | 74.7 | 74.7 | 73.5 | 71.0 | 71.0 | 68.7 | 66.8 |
| R32 | x | | | x | | | x | | |
| R125 approximate expression | 100-R32-1234yf-R134a | | | 100-R32-1234yf-R134a | | | 100-R32-1234yf-R134a | | |
| 1234yf approximate expression | 0 | | | 0 | | | 0 | | |
| R134a approximate expression | −2.0407x + 120.8 | | | −1.9435x + 118.61 | | | −2.0000x + 120.00 | | |

(1-6) Point G'

For point G', the same calculations as those of point A were performed for the following ranges: 14.8 wt %≥x≥10.8 wt %, 18.1 wt %≥x≥14.8 wt %, 20.0 wt %≥x≥18.1 wt %, 22.6 wt %≥x≥20.0 wt %, 24.5 wt %≥x≥22.6 wt %, and 26.6 wt %≥x≥24.5 wt %. Table 3-6 shows (R125 concentration (wt %)/1234yf concentration (wt %)/134a concentration (wt %)) for each concentration range, determined by the approximate expression of x when R32=x wt %.

TABLE 3-6

| Point G' | | | | | | | | | |
|---|---|---|---|---|---|---|---|---|---|
| Item | 14.8 ≥ x ≥ 10.8 | | | 18.1 ≥ x ≥ 14.8 | | | 20.0 ≥ x ≥ 18.1 | | |
| R32 | 10.8 | 12.4 | 14.8 | 14.8 | 16.1 | 18.1 | 18.1 | 19.0 | 20.0 |
| R125 | 34.0 | 34.0 | 34.0 | 34.0 | 33.9 | 33.9 | 33.9 | 33.8 | 33.8 |
| 1234yf | 38.8 | 37.9 | 36.5 | 36.5 | 35.8 | 34.7 | 34.7 | 34.3 | 33.7 |
| R134a | 16.4 | 15.7 | 14.7 | 14.6 | 14.2 | 13.3 | 13.3 | 12.9 | 12.5 |
| R32 | x | | | x | | | x | | |
| R125 approximate expression | 100-R32-1234yf-R134a | | | 100-R32-1234yf-R134a | | | 100-R32-1234yf-R134a | | |
| 1234yf approximate expression | −0.5757x + 45.025 | | | −0.5458x + 44.582 | | | −0.5277x + 44.277 | | |
| R134a approximate expression | −0.4243x + 20.975 | | | −0.4264x + 21.031 | | | −0.4207x + 20.907 | | |

| Point G' | | | | | | | | | |
|---|---|---|---|---|---|---|---|---|---|
| Item | 22.6 ≥ x ≥ 20.0 | | | 24.5 ≥ x ≥ 22.6 | | | 26.6 ≥ x ≥ 24.5 | | |
| R32 | 20.0 | 21.6 | 22.6 | 22.6 | 23.2 | 24.5 | 24.5 | 25.6 | 26.6 |
| R125 | 33.8 | 33.8 | 33.8 | 33.8 | 33.8 | 33.9 | 33.9 | 33.9 | 33.8 |
| 1234yf | 33.7 | 32.9 | 32.3 | 32.3 | 32.0 | 21 2 | 21.2 | 30.6 | 30.1 |
| R134a | 12.5 | 11.7 | 11.3 | 11.3 | 11.0 | 10.4 | 10.4 | 9.9 | 9.5 |
| R32 | x | | | x | | | x | | |
| R125 approximate expression | 100-R32-1234yf-R134a | | | 100-R32-1234yf-R134a | | | 100-R32-1234yf-R134a | | |
| 1234yf approximate expression | −0.5349x + 44.413 | | | −0.5848x + 45.537 | | | −0.5242x + 44.035 | | |
| R134a approximate expression | −0.4651 x + 21.787 | | | −0.4717x + 21.954 | | | −0.4290x + 20.902 | | |

(1-7) Point H'

For point H', the same calculations as those of point A were performed for the following ranges: 14.8 wt %≥x≥10.8 wt. %, 18.1 wt %≥x≥14.8 wt %, 20.0 wt %≥x≥18.1 wt %, 22.6 wt %≥x≥20.0 wt %, 24.5 wt %≥x≥22.6 wt %, and 26.6 wt %≥x≥24.5 wt %. Table 3-7 shows (R125 concentration (wt %)/1234yf concentration (wt %)/134a concentration (wt %)) for each concentration range, determined by the approximate expression of x when R32=x wt %.

TABLE 3-7

| Point H' | | | | | | | | | |
|---|---|---|---|---|---|---|---|---|---|
| Item | 14.8 ≥ x ≥ 10.8 | | | 18.1 ≥ x ≥ 14.8 | | | 20.0 ≥ x ≥ 18.1 | | |
| R32 | 10.8 | 12.4 | 14.8 | 14.8 | 16.1 | 18.1 | 18.1 | 19.0 | 20.0 |
| R125 | 12.6 | 14.1 | 16.5 | 16.5 | 17.6 | 19.4 | 19.4 | 20.3 | 21.2 |
| 1234yf | 49.0 | 47.5 | 45.1 | 45.1 | 43.9 | 42.1 | 42.1 | 41.3 | 40.4 |
| R134a | 27.6 | 26.0 | 23.6 | 23.6 | 22.4 | 20.4 | 20.4 | 19.3 | 18.4 |
| R32 | x | | | x | | | x | | |
| R125 approximate expression | 100-R32-1234yf-R134a | | | 100-R32-1234yf-R134a | | | 100-R32-1234yf-R134a | | |
| 1234yf approximate expression | −0.9770x + 59.575 | | | −0.9083x + 58.536 | | | −0.8948x + 58.298 | | |
| R134a approximate expression | −x + 38.4 | | | −0.9723x + 38.014 | | | −1.0517x + 39.417 | | |

| Point H' | | | | | | | | | |
|---|---|---|---|---|---|---|---|---|---|
| Item | 22.6 ≥ x ≥ 20.0 | | | 24.5 ≥ x ≥ 22.6 | | | 26.6 ≥ x ≥ 24.5 | | |
| R32 | 20.0 | 21.6 | 22.6 | 22.6 | 23.2 | 24.5 | 24.5 | 25.6 | 26.6 |
| R125 | 21.2 | 22.5 | 23.3 | 23.3 | 23.8 | 24.8 | 24.8 | 25.6 | 26.3 |
| 1234yf | 40.4 | 38.9 | 38.0 | 38.0 | 37.4 | 36.2 | 36.2 | 35.1 | 34.1 |
| R134a | 18.4 | 17.0 | 16.1 | 16.1 | 15.6 | 14.5 | 14.5 | 13.7 | 13.0 |
| R32 | x | | | x | | | x | | |
| R125 approximate expression | 100-R32-1234yf-R134a | | | 100-R32-1234yf-R134a | | | 100-R32-1234yf-R134a | | |
| 1234yf approximate expression | −0.9244x + 58.883 | | | −0.9435x + 59.308 | | | −x + 60.7 | | |
| R134a approximate expression | −0.8837x + 36.078 | | | −0.8428x + 35.149 | | | −0.7145x + 32.001 | | |

(1-8) Point I'

For point I', the same calculations as those of point A were performed for the following ranges: 14.8 wt %≥x≥10.8 wt %, 18.1 wt %≥x≥14.8 wt %, 20.0 wt %≥x≥18.1 wt %, 22.6 wt %≥x≥20.0 wt %, 24.5 wt %≥x≥22.6 wt %, and 26.6 wt %≥x≥24.5 wt %. Table 3-7 shows (R125 concentration (wt %)/1234yf concentration (wt %)/134a concentration (wt %)) for each concentration range, determined by the approximate expression of x when R32=x wt %.

TABLE 3-8

| Point I' | | | | | | | | | |
|---|---|---|---|---|---|---|---|---|---|
| Item | 14.8 ≥ x ≥ 10.8 | | | 18.1 ≥ x ≥ 14.8 | | | 20.0 ≥ x ≥ 18.1 | | |
| R32 | 10.8 | 12.4 | 14.8 | 14.8 | 16.1 | 18.1 | 18.1 | 19.0 | 20.0 |
| R125 | 0.0 | 0.0 | 0.0 | 0.0 | 0.0 | 0.0 | 0.0 | 0.8 | 1.8 |
| 1234yf | 18.7 | 14.4 | 7.9 | 7.9 | 4.8 | 0.0 | 0.0 | 0.0 | 0.0 |
| R134a | 70.5 | 73.2 | 77.3 | 77.3 | 79.1 | 81.9 | 81.9 | 80.2 | 78.2 |
| R32 | x | | | x | | | x | | |
| R125 approximate expression | 0 | | | 0 | | | 100-R32-1234yf-R134a | | |
| 1234yf approximate expression | 100-R32-1234yf-R134a | | | 100-R32-1234yf-R134a | | | 0 | | |
| R134a approximate expression | 1.7007x + 52.125 | | | 1.3945x + 56.657 | | | 1.9483x + 117.18 | | |

TABLE 3-8-continued

| Point I' | | | | | | | | | |
|---|---|---|---|---|---|---|---|---|---|
| Item | 22.6 ≥ x ≥ 20.0 | | | 24.5 ≥ x ≥ 22.6 | | | 26.6 ≥ x ≥ 24.5 | | |
| R32 | 20.0 | 21.6 | 22.6 | 22.6 | 23.2 | 24.5 | 24.5 | 25.6 | 26.6 |
| R125 | 1.8 | 3.5 | 4.6 | 4.6 | 5.2 | 6.4 | 6.4 | 7.5 | 8.6 |
| 1234yf | 0.0 | 0.0 | 0.0 | 0.0 | 0.0 | 0.0 | 0.0 | 0.0 | 0.0 |
| R134a | 78.2 | 74.9 | 72.8 | 72.8 | 71.6 | 69.1 | 69.1 | 66.9 | 64.8 |
| R32 | x | | | x | | | x | | |
| R125 approximate expression | 100-R32-1234yf-R134a | | | 100-R32-1234yf-R134a | | | 100-R32-1234yf-R134a | | |
| 1234yf approximate expression | 0 | | | 0 | | | 0 | | |
| R134a approximate expression | −2.0756x + 119.72 | | | −1.9435x + 116.71 | | | −2.0468x + 119.26 | | |

(2) Method for Determining Points B, C, E, F, B', C', E', and F'

(2-1) Point B

For point B, the same calculations as those of point A were performed for the following ranges: 14.1 wt %≥x≥10.8 wt %, 16.1 wt %≥x≥14.1 wt %, 16.8 wt %≥x≥16.1 wt %, 18.1 wt %≥x≥16.8 wt %, 20.0 wt %≥x≥18.1 wt %, 21.6 wt %≥x≥20.0 wt %, and 24.2 wt %≥x≥21.6 wt %. Table 3-9 shows (R125 concentration (wt %)/1234yf concentration (wt %)/134a concentration (wt %)) for each concentration range, determined by the approximate expression of x when R32=x wt %.

(2-2) Point C

For point C, the same calculations as those of point A were performed for the following ranges: 14.1 wt %≥x≥10.8 wt %, 16.1 wt %≥x≥14.1 wt %, 16.8 wt %≥x≥16.1 wt %, 18.1 wt %≥x≥16.8 wt %, 20.0 wt %≥x≥18.1 wt %, 21.6 wt %≥x≥20.0 wt %, and 24.2 wt %≥x≥21.6 wt %. Table 3-10 shows (R125 concentration (wt %)/1234yf concentration (wt %)/134a concentration (wt %)) for each concentration range, determined by the approximate expression of x when R32=x wt %.

TABLE 3-9

| Point B | | | | | | | | | | |
|---|---|---|---|---|---|---|---|---|---|---|
| Item | 14.1 ≥ x ≥ 10.8 | | | 16.1 ≥ x ≥ 14.1 | | | 16.8 ≥ x ≥ 16.1 | | 18.1 ≥ x ≥ 16.8 | |
| R32 | 10.8 | 12.4 | 14.1 | 14.1 | 14.8 | 16.1 | 16.1 | 16.8 | 16.8 | 18.1 |
| R125 | 34.0 | 29.7 | 25.2 | 25.2 | 23.3 | 19.9 | 19.9 | 18.3 | 18.3 | 16.4 |
| 1234yf | 38.8 | 40.0 | 41.2 | 41.2 | 41.8 | 42.8 | 42.8 | 43.3 | 43.3 | 35.6 |
| R134a | 16.4 | 17.9 | 19.5 | 19.5 | 20.1 | 21.2 | 21.2 | 21.6 | 21.6 | 29.9 |
| R32 | x | | | x | | | x | | x | |
| R125 approximate expression | −2.6665x + 62.786 | | | −2.6456x + 62.484 | | | −2.2857x + 56.7 | | −1.4615x + 42.854 | |
| 1234yf approximate expression | 0.7204x + 31.027 | | | 0.7929x + 29.984 | | | 0.7747x + 30.285 | | −5.931x + 142.94 | |
| R134a approximate expression | 100-R32-R125-1234yf | | | 100-R32-R125-1234yf | | | 100-R32-R125-1234yf | | 100-R32-R125-1234yf | |

| Point B | | | | | | | | |
|---|---|---|---|---|---|---|---|---|
| Item | 20 ≥ x ≥ 18.1 | | | 21.6 ≥ x ≥ 20.0 | | 24.2 ≥ x ≥ 21.6 | | |
| R32 | 18.1 | 18.7 | 20.0 | 20.0 | 21.6 | 21.6 | 22.6 | 24.2 |
| R125 | 16.4 | 15.7 | 14.4 | 14.4 | 13.0 | 13.0 | 12.2 | 11.1 |
| 1234yf | 35.6 | 32.4 | 26.2 | 26.2 | 19.3 | 19.3 | 15.4 | 9.8 |
| R134a | 29.9 | 33.2 | 39.4 | 39.4 | 46.1 | 46.1 | 49.8 | 54.9 |
| R32 | x | | | x | | x | | |
| R125 approximate expression | −1.0442x + 35.27 | | | −0.875x + 31.9 | | −0.7267x + 28.67 | | |
| 1234yf approximate expression | 0.2703x2 − 15.221x + 222.52 | | | −4.3372x + 112.98 | | 0.1603x2 − 10.987x + 181.82 | | |
| R134a approximate expression | 100-R32-1234yf-R134a | | | 100-R32-1234yf-R134a | | 100-R32-1234yf-R134a | | |

TABLE 3-10

| Posnt C | | | | | | | | | | |
|---|---|---|---|---|---|---|---|---|---|---|
| Item | 14.1 ≥ x ≥ 10.8 | | | 16.1 ≥ x ≥ 14.1 | | | 16.8 ≥ x ≥ 16.1 | | 18.1 ≥ x ≥ 16.8 | |
| R32 | 10.8 | 12.4 | 14.1 | 14.1 | 14.8 | 16.1 | 16.1 | 16.8 | 16.8 | 18.1 |
| R125 | 34.0 | 30.6 | 27.5 | 27.5 | 26.3 | 24.2 | 24.2 | 23.1 | 23.1 | 21.3 |
| 1234yf | 38.8 | 33.0 | 27.5 | 27.5 | 25.3 | 21.7 | 21.7 | 19.7 | 19.7 | 16.4 |
| R134a | 16.4 | 24.0 | 30.9 | 30.9 | 33.6 | 38.0 | 38.0 | 40.4 | 40.4 | 44.2 |
| R32 | x | | | x | | | x | | X | |
| R125 approximate expression | 0.0914x2 − 4.2444x + 69.184 | | | 0.0495x2 − 3.1434x + 61.991 | | | −1.5714x + 49.5 | | −1.3846x + 46.362 | |
| 1234yf approximate expression | 0.1181x2 − 6.3648x + 93.765 | | | 0.1723x2 − 8.1236x + 107.78 | | | −2.8043x + 66.812 | | −2.5156x + 61.961 | |
| R134a approximate expression | 100-R32-R125-1234yf | | | 100-R32-R125-1234yf | | | 100-R32-R125-1234yf | | 100-R32-R125-1234yf | |

| Point C | | | | | | | | |
|---|---|---|---|---|---|---|---|---|
| item | 20 ≥ x ≥ 18.1 | | | 21.6 ≥ x ≥ 20 | | 24.2 ≥ x ≥ 21.6 | | |
| R32 | 18.1 | 18.7 | 20.0 | 20.0 | 21.6 | 21.6 | 22.6 | 24.2 |
| R125 | 21.3 | 20.5 | 18.8 | 18.8 | 16.8 | 16.8 | 15.6 | 13.9 |
| 1234yf | 16.4 | 15.0 | 11.8 | 11.8 | 8.0 | 8.0 | 5.8 | 2.5 |
| R134a | 44.2 | 45.8 | 49.4 | 49.4 | 53.6 | 53.6 | 56.0 | 59.4 |
| R32 | x | | | x | | x | | |
| R125 approximate expression | −1.3145x + 45.088 | | | −1.25x + 43.8 | | 0.0529x2 − 3.5375x + 68.536 | | |
| 1234yf approximate expression | −2.4404x + 60.615 | | | −2.375x + 59.3 | | 0.0431x2 − 4.1038x + 76.546 | | |
| R134a approximate expression | 100-R32-1234yf-R134a | | | 100-R32-1234yf-R134a | | 100-R32-1234yf-R134a | | |

(2-3) Point E

For point E, the same calculations as those of point A were performed for the following ranges: 14.1 wt %≥x≥10.8 wt %, 16.1 wt %≥x≥14.1 wt %, 16.8 wt %≥x≥16.1 wt %, 18.1 wt %≥x≥16.8 wt %, 20.0 wt %≥x≥18.1 wt %, 21.6 wt %≥x≥20.0 wt, and 24.2 wt %≥x≥21.6 wt %. Table 3-11 shows (R125 concentration (wt %)/1234yf concentration (wt %)/134a concentration (wt %)) for each concentration range, determined by the approximate expression of x when R32=x wt %.

TABLE 3-11

| Point E | | | | | | | | | | |
|---|---|---|---|---|---|---|---|---|---|---|
| Item | 14.1 ≥ x ≥ 10.8 | | | 16.1 ≥ x ≥14.1 | | | 16.8 ≥ x ≥ 16.1 | | 18.1 ≥ x ≥ 16.8 | |
| R32 | 10.8 | 12.4 | 14.1 | 14.1 | 14.8 | 16.1 | 16.1 | 16.8 | 16.8 | 18.1 |
| R125 | 24.9 | 20.4 | 15.9 | 15.9 | 14.6 | 12.9 | 12.9 | 12.1 | 12.1 | 10.7 |
| 1234yf | 43.1 | 44.5 | 45.7 | 45.7 | 40.8 | 33.4 | 33.4 | 29.7 | 29.7 | 23.2 |
| R134a | 21.2 | 22.7 | 24.3 | 24.3 | 29.8 | 37.6 | 37.6 | 41.4 | 41.4 | 48.0 |
| R32 | x | | | x | | | x | | x | |
| R125 approximate expression | 0.0501x2 − 3.9756x + 61.989 | | | 0.2747x2 − 9.7967x + 99.415 | | | −1.1429x + 31.3 | | −1.0769x + 30.192 | |
| 1234yf approximate expression | −0.0296x2 + 1.5133x + 30.248 | | | 0.6366x2 − 25.375x + 276.93 | | | −5.3142x + 118.96 | | −4.9692x + 113.16 | |
| R134a approximate expression | 100-R32-R125-1234yf | | | 100-R32-R125-1234yf | | | 100-R32-R125-1234yf | | 100-R32-R125-1234yf | |

| Point E | | | | | | | | |
|---|---|---|---|---|---|---|---|---|
| Item | 20 ≥ x ≥ 18.1 | | | 21.6 ≥ x ≥ 20 | | 24.2 ≥ x ≥ 21.6 | | |
| R32 | 18.1 | 18.7 | 20.0 | 20.0 | 21.6 | 21.6 | 22.6 | 24.2 |
| R125 | 10.7 | 10.1 | 9.0 | 9.0 | 7.8 | 7.8 | 7.2 | 6.2 |
| 1234yf | 23.2 | 20.5 | 15.0 | 15.0 | 8.8 | 8.8 | 5.3 | 0.0 |
| R134a | 48.0 | 50.7 | 56.0 | 56.0 | 61.8 | 61.8 | 64.9 | 69.6 |
| R32 | x | | | x | | x | | |
| R125 approximate expression | −0.8869x + 26.726 | | | −0.75x + 24 | | −0.6163x + 21.118 | | |

TABLE 3-11-continued

| | | | |
|---|---|---|---|
| 1234yf approximate expression | −4.3267x + 101.52 | −3.8831x + 92.657 | 0.0663x2 − 6.4133x + 116.38 |
| R134a approximate expression | 100-R32-1234yf-R134a | 100-R32-1234yf-R134a | 100-R32-1234yf-R134a |

(2-4) Point F

For point F, the same calculations as those of point A were performed for the following ranges: 14.1 wt %≥x≥10.8 wt %, 16.1 wt %≥x≥14.1 wt %, 16.8 wt %≥x≥16.1 wt %, 18.1 wt %≥x≥16.8 wt %, 20.0 wt %≥x≥18.1 wt, 21.6 wt %≥x≥20.0 wt %, and 24.2 wt %≥x≥21.6 wt %. Table 3-12 shows (R125 concentration (wt %)/1234yf concentration (wt %)/134a concentration (wt %)) for each concentration range, determined by the approximate expression of x when R32=x wt %.

TABLE 3-12

| Point F | | | | | | | | | | |
|---|---|---|---|---|---|---|---|---|---|---|
| Item | 14.1 ≥ x ≥ 10.8 | | | 16.1 ≥ x ≥ 14.1 | | | 16.8 ≥ x ≥ 16.1 | | 18.1 ≥ x ≥ 16.8 | |
| R32 | 10.8 | 12.4 | 14.1 | 14.1 | 14.8 | 16.1 | 16.1 | 16.8 | 16.8 | 18.1 |
| R125 | 26.9 | 24.0 | 21.1 | 21.1 | 20.1 | 18.1 | 18.1 | 17.2 | 17.2 | 15.4 |
| 1234yf | 28.5 | 23.4 | 18.2 | 18.2 | 16.4 | 12.9 | 12.9 | 11.2 | 11.2 | 7.9 |
| R134a | 33.8 | 40.2 | 46.6 | 46.6 | 48.7 | 52.9 | 52.9 | 54.8 | 54.8 | 58.6 |
| R32 | x | | | x | | | x | | x | |
| R125 approximate expression | 0.0323x2 − 2.5621 x + 50.802 | | | −1.5049x + 42.339 | | | −1.2857x + 38.8 | | −1.3846x + 40.462 | |
| 1234yf approximate expression | 0.0346x2 − 3.9904x + 67.56 | | | −2.6349x + 55.315 | | | −2.4954x + 53.076 | | −2.5401x + 53.827 | |
| R134a approximate expression | 100-R32-R125-1234yf | | | 100-R32-R125-1234yf | | | 100-R32-R125-1234yf | | 100-R32-R125-1234yf | |

| Point F | | | | | | | | |
|---|---|---|---|---|---|---|---|---|
| Item | 20 ≥ x ≥ 18.1 | | | 21.6 ≥ x ≥ 20 | | 24.2 ≥ x ≥ 21.6 | | |
| R32 | 18.1 | 18.7 | 20.0 | 20.0 | 21.6 | 21.6 | 22.6 | 24.2 |
| R125 | 15.4 | 14.7 | 13.1 | 13.1 | 11.3 | 11.3 | 9.4 | 6.2 |
| 1234yf | 7.9 | 6.6 | 3.5 | 3.5 | 0.0 | 0.0 | 0.0 | 0.0 |
| R134a | 58.6 | 60.0 | 63.4 | 63.4 | 67.1 | 67.1 | 68.0 | 69.6 |
| R32 | x | | | x | | x | | |
| R125 approximate expression | −1.2138x + 37.381 | | | −1.125x + 35.6 | | −1.9651x + 53.771 | | |
| 1234yf approximate expression | −0.1576x2 + 3.716x − 7.7649 | | | −2.1875x + 47.25 | | 0 | | |
| R134a approximate expression | 100-R32-1234yf-R134a | | | 100-R32-1234yf-R134a | | 100-R32-1234yf-R134a | | |

(2-5) Point B'

For point B', the same calculations as those of point A were performed for the following ranges: 14.1 wt %≥x≥10.8 wt %, 14.8 wt %≥x≥14.1 wt %, 16.1 wt %≥x≥14.8 wt %, 18.1 wt %≥x≥16.1 wt %, 20.0 wt %≥x≥18.1 wt %, 22.6 wt %≥x≥20.0 wt %, and 25.1 wt %≥x≥22.6 wt %. Table 3-13 shows (R125 concentration (wt %)/1234yf concentration (wt %)/134a concentration (wt %)) for each concentration range, determined by the approximate expression of x when R32=x wt %.

TABLE 3-13

| Point B' | | | | | | | | | | |
|---|---|---|---|---|---|---|---|---|---|---|
| Item | 14.1 ≥ x ≥ 10.8 | | | 14.8 ≥ x ≥ 14.1 | | 16.1 ≥ x ≥ 14.8 | | 18.1 ≥ x ≥ 16.1 | | |
| R32 | 10.8 | 12.4 | 14.1 | 14.1 | 14.8 | 14.8 | 16.1 | 16.1 | 16.8 | 18.1 |
| R125 | 31.8 | 27.4 | 22.9 | 22.9 | 21.0 | 21.0 | 17.6 | 17.6 | 16.6 | 15.0 |
| 1234yf | 39.9 | 41.1 | 42.3 | 42.3 | 42.9 | 42.9 | 43.9 | 43.9 | 39.6 | 32.6 |

TABLE 3-13-continued

| | | | | | | | | | | | |
|---|---|---|---|---|---|---|---|---|---|---|---|
| R134a | 17.5 | 19.1 | 20.7 | 20.7 | 21.3 | 21.3 | 22.4 | 22.4 | 27.0 | 34.3 |
| R32 | x | | | x | | x | | x | | |
| R125 approximate expression | −2.6665x + 62.786 | | | −2.2857x + 56.7 | | −1.4615x + 42.854 | | −2.6456x + 62.484 | | |
| 1234yf approximate expression | 0.7204x + 31.027 | | | 0.7747x + 30.285 | | −5.931x + 142.94 | | 0.7929x + 29.984 | | |
| R134a approximate expression | 100-R32-R125-1234yf | | | 100-R32-R125-1234yf | | 100-R32-R125-1234yf | | 100-R32-R125-1234yf | | |

| | Point B' | | | | | | | | |
|---|---|---|---|---|---|---|---|---|---|
| Item | 20 ≥ x ≥ 18.1 | | | 22.6 ≥ x ≥ 20.0 | | | 25.1 ≥ x ≥ 22.6 | | |
| R32 | 18.1 | 18.7 | 20.0 | 20.0 | 21.6 | 22.6 | 22.6 | 24.2 | 25.1 |
| R125 | 15.0 | 14.3 | 13.0 | 13.0 | 11.7 | 11.0 | 11.0 | 9.9 | 9.3 |
| 1234yf | 32.6 | 29.4 | 23.3 | 23.3 | 16.9 | 13.0 | 13.0 | 7.2 | 4.3 |
| R134a | 34.3 | 37.6 | 43.7 | 43.7 | 49.8 | 53.4 | 53.4 | 58.7 | 61.3 |
| R32 | x | | | x | | | x | | |
| R125 approximate expression | −1.0442x + 33.87 | | | −0.7733x + 28.448 | | | −0.6809x + 26.385 | | |
| 1234yf approximate expression | 0.2539x2 − 14.531x + 212.38 | | | 0.0598x2 − 6.503x + 129.46 | | | 0.1536x2 − 10.827x + 179.27 | | |
| R134a approximate expression | 100-R32-1234yf-R134a | | | 100-R32-1234yf-R134a | | | 100-R32-1234yf-R134a | | |

(2-6) Point C'

For point C', the same calculations as those of point A were performed for the following ranges: 14.1 wt %≥x≥10.8 wt %, 14.8 wt %≥x≥14.1 wt %, 16.1 wt %≥x≥14.8 wt %, 18.1 wt %≥x≥16.1 wt %, 20.0 wt %≥x≥18.1 wt %, 22.6 wt. %≥x≥20.0 wt %, and 25.1 wt %≥x≥22.6 wt %. Table 3-14 shows (R125 concentration (wt %)/1234yf concentration (wt %)/134a concentration (wt %)) for each concentration range, determined by the approximate expression of x when R32=x wt %.

TABLE 3-14

| | Point C' | | | | | | | | | |
|---|---|---|---|---|---|---|---|---|---|---|
| Item | 14.1 ≥ x ≥ 10.8 | | | 14.8 ≥ x ≥ 14.1 | | 16.1 ≥ x ≥ 14.8 | | 18.1 ≥ x ≥ 16.1 | | |
| R32 | 10.8 | 12.4 | 14.1 | 14.1 | 14.8 | 14.8 | 16.1 | 16.1 | 16.8 | 18.1 |
| R125 | 32.2 | 28.9 | 25.9 | 25.9 | 24.7 | 24.7 | 22.7 | 22.7 | 21.6 | 19.8 |
| 1234yf | 36.2 | 30.5 | 25.1 | 25.1 | 23.1 | 23.1 | 19.5 | 19.5 | 17.6 | 14.3 |
| R134a | 20.8 | 28.2 | 34.9 | 34.9 | 37.4 | 37.4 | 41.7 | 41.7 | 44.0 | 47.8 |
| R32 | x | | | x | | x | | x | | |
| R125 approximate expression | 0.0902x2 − 4.1561x + 66.56 | | | −1.7143x + 50.071 | | −1.5385x + 47.469 | | −1.4515x + 46.075 | | |
| 1234yf approximate expression | 0.117x2 − 6.2764x + 90.341 | | | −2.8571x + 65.386 | | −2.7834x + 64.295 | | −2.5842x + 61.058 | | |
| R134a approximate expression | 100-R32-R125-1234yf | | | 100-R32-R125-1234yf | | 100-R32-R125-1234yf | | 100-R32-R125-1234yf | | |

| | Point C' | | | | | | | | |
|---|---|---|---|---|---|---|---|---|---|
| Item | 20 ≥ x ≥ 18.1 | | | 22.6 ≥ x ≥ 20.0 | | | 25.1 ≥ x ≥ 22.6 | | |
| R32 | 18.1 | 18.7 | 20.0 | 20.0 | 21.6 | 22.6 | 22.6 | 24.2 | 25.1 |
| R125 | 19.8 | 19.0 | 17.3 | 17.3 | 15.4 | 14.3 | 14.3 | 12.6 | 11.1 |
| 1234yf | 14.3 | 12.8 | 9.6 | 9.6 | 6.0 | 3.9 | 3.9 | 0.6 | 0.0 |
| R134a | 47.8 | 49.5 | 53.1 | 53.1 | 57.0 | 59.2 | 59.2 | 62.6 | 63.8 |
| R32 | x | | | x | | | x | | |
| R125 approximate expression | −1.3145x + 43.588 | | | −1.157x + 40.426 | | | −0.2417x2 + 10.247x − 93.86 | | |
| 1234yf approximate expression | −2.4717x + 59.031 | | | −2.1919x + 53.439 | | | 0.5728x2 − 28.884x + 364.1 | | |
| R134a approximate expression | 100-R32-1234yf-R134a | | | 100-R32-1234yf-R134a | | | 100-R32-1234yf-R134a | | |

(2-7) Point E'

For point E', the same calculations as those of point A were performed for the following ranges: 14.1 wt %≥x≥10.8 wt %, 14.8 wt %≥x≥14.1 wt %, 16.1 wt %≥x≥14.8 wt %, 18.1 wt %≥x≥16.1 wt %, 20.0 wt %≥x≥18.1 wt %, 22.6 wt %≥x≥20.0 wt %, and 25.1 wt %≥x≥22.6 wt %. Table 3-15 shows (R125 concentration (wt %)/1234yf concentration (wt %)/134a concentration (wt %)) for each concentration range, determined by the approximate expression of x when R32=x wt.

TABLE 3-15

| Point E' | | | | | | | | | | |
|---|---|---|---|---|---|---|---|---|---|---|
| Item | 14.1 ≥ x ≥ 10.8 | | | 14.8 ≥ x ≥ 14.1 | | 16.1 ≥ x ≥ 14.8 | | 18.1 ≥ x ≥ 16.1 | | |
| R32 | 10.8 | 12.4 | 14.1 | 14.1 | 14.8 | 14.8 | 16.1 | 16.1 | 16.8 | 18.1 |
| R125 | 27.2 | 22.8 | 18.1 | 18.1 | 16.5 | 16.5 | 14.4 | 14.4 | 13.5 | 12.1 |
| 1234yf | 42.0 | 43.3 | 44.6 | 44.6 | 45.1 | 45.1 | 36.8 | 36.8 | 32.8 | 26.3 |
| R134a | 20.0 | 21.5 | 23.2 | 23.2 | 23.6 | 23.6 | 32.7 | 32.7 | 36.9 | 43.5 |
| R32 | x | | | x | | x | | x | | |
| R125 approximate expression | −2.7576x + 56.987 | | | −2.2857x + 50.329 | | −1.6154x + 40.408 | | 0.1044x2 − 4.7203x + 63.337 | | |
| 1234yf approximate expression | 0.784x + 33.578 | | | 0.6717x + 35.158 | | −6.3915x + 139.69 | | 0.3836x2 − 18.386x + 233.37 | | |
| R134a approximate expression | 100-R32-R125-1234yf | | | 100-R32-R125-1234yf | | 100-R32-R125-1234yf | | 100-R32-R125-1234yf | | |

| Point E' | | | | | | | | | |
|---|---|---|---|---|---|---|---|---|---|
| Item | 20 ≥ x ≥ 18.1 | | | 22.6 ≥ x ≥ 20.0 | | | 25.1 ≥ x ≥ 22.6 | | |
| R32 | 18.1 | 18.7 | 20.0 | 20.0 | 21.6 | 22.6 | 22.6 | 24.2 | 25.1 |
| R125 | 12.1 | 11.5 | 10.4 | 10.4 | 9.1 | 8.4 | 8.4 | 7.4 | 7.1 |
| 1234yf | 26.3 | 23.5 | 17.9 | 17.9 | 11.4 | 7.7 | 7.7 | 2.4 | 0.0 |
| R134a | 43.5 | 46.3 | 51.7 | 51.7 | 57.9 | 61.3 | 61.3 | 66.0 | 67.8 |
| R32 | x | | | x | | | x | | |
| R125 approximate expression | −0.8869x + 28.126 | | | −0.7733x + 25.848 | | | 0.1167x2 − 6.085x + 86.332 | | |
| 1234yf approximate expression | 0.1994x2 − 11.991x + 177.97 | | | 0.1578x2 − 10.613x + 167.02 | | | 0.2787x2 − 16.413x + 236.4 | | |
| R134a approximate expression | 100-R32-1234yf-R134a | | | 100-R32-1234yf-R134a | | | 100-R32-1234yf-R134a | | |

(2-8) Point F'

For point F', the same calculations as those of point A were performed for the following ranges: 14.1 wt %≥x≥10.8 wt %, 14.8 wt %≥x≥14.1 wt %, 16.1 wt %≥x≥14.8 wt %, 18.1 wt %≥x≥16.1 wt %, 20.0 wt %≥x≥18.1 wt %, 22.6 wt %≥x≥20.0 wt %, and 25.1 wt %≥x≥22.6 wt %. Table 3-16 shows (R125 concentration (wt %)/1234yf concentration (wt %)/134a concentration (wt %)) for each concentration range, determined by the approximate expression of x when R32=x wt %.

TABLE 3-16

| Point F' | | | | | | | | | | |
|---|---|---|---|---|---|---|---|---|---|---|
| Item | 14.1 ≥ x ≥ 10.8 | | | 14.8 ≥ x ≥ 14.1 | | 16.1 ≥ x ≥ 14.8 | | 18.1 ≥ x ≥ 16.1 | | |
| R32 | 10.8 | 12.4 | 14.1 | 14.1 | 14.8 | 14.8 | 16.1 | 16.1 | 16.8 | 18.1 |
| R125 | 28.7 | 25.6 | 22.7 | 22.7 | 21.6 | 21.6 | 19.6 | 19.6 | 18.6 | 16.9 |
| 1234yf | 31.1 | 25.7 | 20.5 | 20.5 | 18.6 | 18.6 | 15.0 | 15.0 | 13.2 | 10.1 |
| R134a | 29.4 | 36.3 | 42.7 | 42.7 | 45.0 | 45.0 | 49.3 | 49.3 | 51.4 | 54.9 |
| R32 | x | | | x | | x | | x | | |
| R125 approximate expression | 0.0702x2 − 3.5658x4 − 59.024 | | | −1.5714x + 44.857 | | −1.5385x + 44.369 | | −1.3447x + 41.226 | | |
| 1234yf approximate expression | 0.0958x2 − 5.5978x4 − 80.381 | | | −2.7143x + 58.771 | | −2.7889x + 59.876 | | 0.0959x2 − 5.7176x + 82.165 | | |
| R134a approximate expression | 100-R32-R125-1234yf | | | 100-R32-R125-1234yf | | 100-R32-R125-1234yf | | 100-R32-R125-1234yf | | |

TABLE 3-16-continued

| Point F' | | | | | | | | | |
|---|---|---|---|---|---|---|---|---|---|
| Item | 20 ≥ x ≥ 18.1 | | | 22.6 ≥ x ≥ 20.0 | | | 25.1 ≥ x ≥ 22.6 | | |
| R32 | 18.1 | 18.7 | 20.0 | 20.0 | 21.6 | 22.6 | 22.6 | 24.2 | 25.1 |
| R125 | 16.9 | 16.1 | 14.5 | 14.5 | 12.7 | 11.6 | 11.6 | 8.5 | 7.1 |
| 1234yf | 10.1 | 8.6 | 5.5 | 5.5 | 2.0 | 0.0 | 0.0 | 0.0 | 0.0 |
| R134a | 54.9 | 56.6 | 60.0 | 60.0 | 63.7 | 65.8 | 65.8 | 67.3 | 67.8 |
| R32 | x | | | x | | | x | | |
| R125 approximate expression | −1.258x + 39.651 | | | −1.1163x + 36.822 | | | 0.1528x2 − 9.0875x + 138.94 | | |
| 1234yf approximate expression | 0.0607x2 − 4.7348x + 75.905 | | | 0.0721x2 − 5.1875x + 80.404 | | | 0 | | |
| R134a approximate expression | 100-R32-1234yf-R134a | | | 100-R32-1234yf-R134a | | | 100-R32-1234yf-R134a | | |

(3) Method for Determining Points J, K, L, M, O, P, Q, R, S, and T (3-1) Point J For point J, the same calculations as those of point A were performed for the following ranges: 14.2 wt %≥x≥11.6 wt %, 15.3 wt %≥x≥14.2 wt %, 16.2 wt %≥x≥15.3 wt %, 17.5 wt %≥x≥16.2 wt %, and 19.0 wt %≥x≥17.5 wt %. Table 3-17 shows (R125 concentration (wt %)/1234yf concentration (wt %)/134a concentration (wt %)) for each concentration range, determined by the approximate expression of x when R32=x wt %.

TABLE 3-17

| Point J | | | | | | | |
|---|---|---|---|---|---|---|---|
| Item | 14.2 ≥ x ≥ 11.6 | | 15.3 ≥ x ≥ 14.2 | | | 16.2 ≥ x ≥ 15.3 | |
| R32 | 11.6 | 14.2 | 14.2 | 14.5 | 15.3 | 15.3 | 16.2 |
| R125 | 34.0 | 24.7 | 24.7 | 23.6 | 20.9 | 20.9 | 17.7 |
| 1234yf | 38.3 | 41.5 | 41.5 | 41.8 | 42.7 | 42.7 | 43.8 |
| R134a | 16.1 | 19.6 | 19.6 | 20.1 | 21.1 | 21.1 | 22.3 |
| R32 | x | | x | | | x | |
| R125 approximate expression | −3.5769x + 75.492 | | −3.4381x + 73.493 | | | −3.5556x + 75.3 | |
| 1234yf approximate expression | 1.2204x + 24.143 | | 1.1236x + 25.522 | | | 1.2095x + 24.209 | |
| R134a approximate expression | 100-R32-R125-1234yf | | 100-R32-R125-1234yf | | | 100-R32-R125-1234yf | |

| Point J | | | | | | | |
|---|---|---|---|---|---|---|---|
| Item | 17.5 ≥ x ≥ 16.2 | | | 19.0 ≥ x ≥ 17.5 | | | |
| R32 | 16.2 | 17.0 | 17.5 | 17.5 | 18.0 | 18.7 | 19.0 |
| R125 | 17.7 | 16.4 | 15.6 | 15.6 | 14.8 | 13.8 | 13.4 |
| 1234yf | 43.8 | 38.7 | 35.5 | 35.5 | 32.5 | 28.4 | 26.7 |
| R134a | 22.3 | 27.9 | 31.4 | 31.4 | 34.7 | 39.1 | 40.9 |
| R32 | x | | | x | | | |
| R125 approximate expression | −1.6163x + 43.882 | | | 0.1273x2 − 6.1109x + 83.553 | | | |
| 1234yf approximate expression | −6.3674x + 146.95 | | | 0.1532x2 − 11.484x + 189.57 | | | |
| R134a approximate expression | 100-R32-R125-1234yf | | | 100-R32-R125-1234yf | | | |

(3-2) Point K

For point K, the same calculations as those of point A were performed for the following ranges: 14.2 wt %≥x≥11.6 wt. %, 15.3 wt %≥x≥14.2 wt %, 16.2 wt %≥x≥15.3 wt %, 17.5 wt %≥x≥16.2 wt %, and 19.0 wt %≥x≥17.5 wt %. Table 3-18 shows (R125 concentration (wt %%)/1234yf concentration (wt %)/134a concentration (wt %)) for each concentration range, determined by the approximate expression of x when R32=x wt %.

TABLE 3-18

| Point K | | | | | | | |
|---|---|---|---|---|---|---|---|
| Item | 14.2 ≥ x ≥ 11.6 | | 15.3 ≥ x ≥ 14.2 | | | 16.2 ≥ x ≥ 15.3 | |
| R32 | 11.6 | 14.2 | 14.2 | 14.5 | 15.3 | 15.3 | 16.2 |
| R125 | 34.0 | 27.8 | 27.8 | 26.9 | 25.3 | 25.3 | 23.5 |
| 1234yf | 38.3 | 27.9 | 27.9 | 26.5 | 23.7 | 23.7 | 20.6 |
| R134a | 16.1 | 30.1 | 30.1 | 32.1 | 35.7 | 35.7 | 39.7 |
| R32 | x | | x | | | x | |
| R125 approximate expression | −2.3846x + 61.662 | | 0.9091x2 − 29.091x + 257.58 | | | −2x + 55.9 | |
| 1234yf approximate expression | −4.0172x + 84.9 | | 0.8579x2 − 29.085x + 267.88 | | | −3.4439x + 76.392 | |
| R134a approximate expression | 100-R32-R125-1234yf | | 100-R32-R125-1234yf | | | 100-R32-R125-1234yf | |

| Point K | | | | | | | |
|---|---|---|---|---|---|---|---|
| Item | 17.5 ≥ x ≥ 16.2 | | | 19.0 ≥ x ≥ 17.5 | | | |
| R32 | 16.2 | 17.0 | 17.5 | 17.5 | 18.0 | 18.7 | 19.0 |
| R125 | 23.5 | 22.0 | 21.1 | 21.1 | 20.2 | 19.0 | 18.5 |
| 1234yf | 20.6 | 18.1 | 16.5 | 16.5 | 14.9 | 12.8 | 11.9 |
| R134a | 39.7 | 42.9 | 44.9 | 44.8 | 46.9 | 49.5 | 50.5 |
| R32 | x | | | x | | | |
| R125 approximate expression | −1.8488x + 53.445 | | | 0.0637x2 − 4.0554x + 72.576 | | | |
| 1234yf approximate expression | −3.1206x + 71.153 | | | 0.2514x2 − 12.247x + 153.88 | | | |
| R134a approximate expression | 100-R32-R125-1234yf | | | 100-R32-R125-1234yf | | | |

(3-3) Point L

For point L, the same calculations as those of point A were performed for the following ranges: 17.0 wt %≥x≥14.5 wt %, 18.0 wt %≥x≥17.0 wt %, 18.7 wt %≥x≥18.0 wt %, 19.3 wt %≥x≥18.7 wt %, and 20.8 wt %≥x≥19.3 wt %. Table 3-19 shows (R125 concentration (wt %)/1234yf concentration (wt %)/134a concentration (wt %)) for each concentration range, determined by the approximate expression of x when R32=x wt %.

TABLE 3-19

| Point L | | | | | | | | | |
|---|---|---|---|---|---|---|---|---|---|
| Item | 17.0 ≥ x ≥ 14.5 | | | | 18.0 ≥ x ≥ 17.0 | | | 18.7 ≥ x ≥ 18.0 | |
| R32 | 14.5 | 15.3 | 16.2 | 17.0 | 17.0 | 17.5 | 18.0 | 18.0 | 18.7 |
| R125 | 33.9 | 31.3 | 28.3 | 25.6 | 25.6 | 23.9 | 22.2 | 22.2 | 20.0 |
| 1234yf | 36.7 | 37.6 | 38.6 | 39.5 | 39.5 | 40.1 | 40.8 | 40.8 | 41.6 |
| R134a | 14.9 | 15.9 | 16.9 | 17.9 | 17.9 | 18.5 | 19.0 | 19.0 | 19.7 |
| R32 | x | | | | x | | | x | |
| R125 approximate expression | −3.3215x + 82.089 | | | | −3.4x + 83.4 | | | −3.1429x + 78.771 | |
| 1234yf approximate expression | 1.1147x + 20.535 | | | | 1.3x + 17.378 | | | 1.1429x + 20.229 | |
| R134a approximate expression | 100-R32-R125-1234yf | | | | 100-R32-R125-1234yf | | | 100-R32-R125-1234yf | |

TABLE 3-19-continued

| Point L | | | | | | |
|---|---|---|---|---|---|---|
| Item | 19.3 ≥ x ≥ 18.7 | | | 20.8 ≥ x ≥ 19.3 | | |
| R32 | 18.7 | 19.0 | 19.3 | 19.3 | 20.0 | 20.8 |
| R125 | 20.0 | 19.5 | 19.0 | 19.0 | 18.0 | 16.9 |
| 1234yf | 41.6 | 39.7 | 37.8 | 37.8 | 33.9 | 29.5 |
| R134a | 19.7 | 21.8 | 23.9 | 23.9 | 28.0 | 32.8 |
| R32 | x | | | x | | |
| R125 approximate expression | −1.6667x + 51.167 | | | −1.3994x + 46.001 | | |
| 1234yf approximate expression | −6.2835x + 159.1 | | | −5.5605x + 145.15 | | |
| R134a approximate expression | 100-R32-R125-1234yf | | | 100-R32-R125-1234yf | | |

(3-4) Point M

For point M, the same calculations as those of point A were performed for the following ranges: 17.0 wt %≥x≥14.5 wt %, 18.0 wt %≥x≥17.0 wt %, 18.7 wt %≥x≥18.0 wt %, 19.3 wt %≥x≥18.7 wt %, and 20.8 wt %≥x≥19.3 wt %. Table 3-20 shows (R125 concentration (wt %)/1234yf concentration (wt %)/134a concentration (wt %)) for each concentration range, determined by the approximate expression of x when R32=x wt %.

TABLE 3-20

| Point M | | | | | | | | | |
|---|---|---|---|---|---|---|---|---|---|
| Item | 17.0 ≥ x ≥ 14.5 | | | | 18.0 ≥ x ≥ 17.0 | | | 18.7 ≥ x ≥ 18.0 | |
| R32 | 14.5 | 15.3 | 16.2 | 17.0 | 17.0 | 17.5 | 18.0 | 18.0 | 18.7 |
| R125 | 33.9 | 32.1 | 30.1 | 28.3 | 28.3 | 27.5 | 26.6 | 26.6 | 25.3 |
| 1234yf | 36.7 | 33.6 | 30.2 | 27.2 | 27.2 | 25.8 | 24.1 | 24.1 | 21.9 |
| R134a | 14.9 | 19.0 | 23.5 | 27.5 | 27.5 | 29.2 | 31.3 | 31.3 | 34.1 |
| R32 | x | | | | x | | | x | |
| R125 approximate expression | −2.238x + 66.348 | | | | −1.7x + 57.217 | | | −1.8571x + 60.029 | |
| 1234yf approximate expression | −3.8006x + 91.779 | | | | −0.6939x2 + 21.203x − 132.72 | | | −3.1386x + 80.613 | |
| R134a approximate expression | 100-R32-R125-1234yf | | | | 100-R32-R125-1234yf | | | 100-R32-R125-1234yf | |

| Point M | | | | | | |
|---|---|---|---|---|---|---|
| Item | 19.3 ≥ x ≥ 18.7 | | | 20.8 ≥ x ≥ 19.3 | | |
| R32 | 18.7 | 19.0 | 19.3 | 19.3 | 20.0 | 20.8 |
| R125 | 25.3 | 24.7 | 24.2 | 24.2 | 23.0 | 21.6 |
| 1234yf | 21.9 | 21.0 | 20.0 | 20.0 | 17.9 | 15.5 |
| R134a | 34.1 | 35.3 | 36.5 | 36.5 | 39.1 | 42.1 |
| R32 | x | | | x | | |
| R125 approximate expression | −1.8333x + 59.567 | | | −1.7337x + 57.666 | | |
| 1234yf approximate expression | −3.1952x + 81.665 | | | −3.0037x + 77.984 | | |
| R134a approximate expression | 100-R32-R125-1234yf | | | 100-R32-R125-1234yf | | |

(3-5) Point O

For point O, the same calculations as those of point A were performed for the following ranges: 20.0 wt %≥x≥17.5 wt %, 20.8 wt %≥x≥20.0 wt %, 21.2 wt %≥x≥20.8 wt %, and 22.6 wt %≥x≥21.2 wt %. Table 3-21 shows (R125 concentration (wt %)/1234yf concentration (wt %)/134a concentration (wt %)) for each concentration range, determined by the approximate expression of x when R32=x wt %.

TABLE 3-21

| Point O | | | | | | | | |
|---|---|---|---|---|---|---|---|---|
| Item | 20.0 ≥ x ≥ 17.5 | | | | | | 20.8 ≥ x ≥ 20.0 | |
| R32 | 17.5 | 18.0 | 18.7 | 19.0 | 19.3 | 20.0 | 20.0 | 20.8 |
| R125 | 33.8 | 32.2 | 30.0 | 29.1 | 28.1 | 25.9 | 25.9 | 23.1 |
| 1234yf | 35.1 | 35.7 | 36.4 | 36.8 | 37.1 | 37.9 | 37.9 | 39.2 |
| R134a | 13.6 | 14.1 | 14.9 | 15.1 | 15.5 | 16.2 | 16.2 | 16.9 |
| R32 | x | | | | | | x | |
| R125 approximate expression | −3.1554x + 89.013 | | | | | | −3.5x + 95.9 | |
| 1234yf approximate expression | 1.1108x + 15.673 | | | | | | 1.5661x + 6.5807 | |
| R134a approximate expression | 100-R32-R125-1234yf | | | | | | 100-R32-R125-1234yf | |

| Point O | | | | | |
|---|---|---|---|---|---|
| Item | 21.2 ≥ x ≥ 20.8 | | 22.6 ≥ x ≥ 21.2 | | |
| R32 | 20.8 | 21.2 | 21.2 | 21.6 | 22.6 |
| R125 | 23.1 | 22.2 | 22.2 | 21.5 | 20.2 |
| 1234yf | 39.2 | 39.3 | 39.3 | 36.7 | 31.8 |
| R134a | 16.9 | 17.3 | 17.3 | 20.2 | 25.4 |
| R32 | x | | x | | |
| R125 approximate expression | −2.25x + 69.9 | | 0.3214x2 − 15.507x + 206.49 | | |
| 1234yf approximate expression | 0.3629x + 31.605 | | 1.2477x2 − 60.003x + 750.62 | | |
| R134a approximate expression | 100-R32-R125-1234yf | | 100-R32-R125-1234yf | | |

(3-6) Point P

For point P, the same calculations as those of point A were performed for the following ranges: 20.0 wt %≥x≥17.5 wt %, 20.8 wt %≥x≥20.0 wt %, 21.2 wt %≥x≥20.8 wt %, and 22.6 wt %≥x≥21.2 wt. Table 3-22 shows (R125 concentration (wt %)/1234yf concentration (wt %)/134a concentration (wt %)) for each concentration range, determined by the approximate expression of x when R32=x wt %.

TABLE 3-22

| Point P | | | | | | | | |
|---|---|---|---|---|---|---|---|---|
| Item | 20.0 ≥ x ≥ 17.5 | | | | | | 20.8 ≥ x ≥ 20.0 | |
| R32 | 17.5 | 18.0 | 18.7 | 19.0 | 19.3 | 20.0 | 20.0 | 20.8 |
| R125 | 33.9 | 32.8 | 31.4 | 30.8 | 30.2 | 28.9 | 28.9 | 27.5 |
| 1234yf | 35.0 | 33.2 | 30.7 | 29.7 | 28.7 | 26.5 | 26.5 | 24.1 |
| R134a | 13.6 | 16.0 | 19.2 | 20.5 | 21.8 | 24.6 | 24.6 | 27.6 |
| R32 | x | | | | | | x | |
| R125 approximate expression | 0.0698x2 − 4.6141x + 93.254 | | | | | | −1.75x + 63.9 | |
| 1234yf approximate expression | 0.1361x2 − 8.5106x + 142.27 | | | | | | −2.9691x + 85.881 | |
| R134a approximate expression | 100-R32-R125-1234yf | | | | | | 100-R32-R125-1234yf | |

| Point P | | | | | |
|---|---|---|---|---|---|
| Item | 21.2 ≥ x ≥ 20.8 | | 22.6 ≥ x ≥ 21.2 | | |
| R32 | 20.8 | 21.2 | 21.2 | 21.6 | 22.6 |
| R125 | 27.5 | 26.8 | 26.8 | 26.1 | 24.5 |
| 1234yf | 24.1 | 22.9 | 22.9 | 21.6 | 18.7 |
| R134a | 27.6 | 29.1 | 29.1 | 30.7 | 34.2 |
| R32 | x | | x | | |
| R125 approximate expression | −1.75x + 63.9 | | 0.1071x2 − 6.3357x + 112.96 | | |

TABLE 3-22-continued

| | | |
|---|---|---|
| 1234yf approximate expression | −3.0619x + 87.812 | 0.25x2 − 13.95x + 206.28 |
| R134a approximate expression | 100-R32-R125-1234yf | 100-R32-R125-1234yf |

(3-7) Point Q

For point Q, the same calculations as those of point A were performed for the following ranges: 20.8 wt %≥x≥17.5 wt %, 23.2 wt %≥x≥20.8 wt %, 23.2 wt %≥x≥20.8 wt %, 25.6 wt %≥x≥23.2 wt %, and 26.6 wt %≥x≥25.6 wt %. Table 3-23 shows (R125 concentration (wt %)/1234yf concentration (wt %)/134a concentration (wt %)) for each concentration range, determined by the approximate expression of x when R32=x wt %.

TABLE 3-23

| Point Q | | | | | | | |
|---|---|---|---|---|---|---|---|
| Item | 20.8 ≥ x ≥ 17.5 | | | | | | |
| R32 | 17.5 | 18.0 | 18.7 | 19.0 | 19.3 | 20.0 | 20.8 |
| R125 | 10.4 | 11.4 | 12.8 | 13.4 | 14.0 | 15.4 | 16.9 |
| 1234yf | 24.2 | 25.1 | 26.2 | 26.7 | 27.2 | 28.3 | 29.5 |
| R134a | 47.9 | 45.5 | 42.3 | 40.9 | 39.5 | 36.3 | 32.8 |
| R32 | x | | | | | | |
| R125 approximate expression | −0.0198x2 + 27.157x − 31.225 | | | | | | |
| 1234yf approximate expression | −0.0377x2 + 3.0486x − 17.594 | | | | | | |
| R134a approximate expression | 100-R32-R125-1234yf | | | | | | |

| Point Q | | | | | | | | | | | |
|---|---|---|---|---|---|---|---|---|---|---|---|
| Item | 23.2 ≥ x ≥ 20.8 | | | | | 25.6 ≥ x ≥ 23.2 | | | | 26.6 ≥ x ≥ 25.6 | |
| R32 | 20.8 | 21.2 | 21.6 | 22.6 | 23.2 | 23.2 | 24.7 | 25.4 | 25.6 | 25.6 | 26.6 |
| R125 | 16.9 | 17.7 | 18.5 | 20.3 | 21.3 | 21.3 | 24.0 | 25.2 | 25.6 | 25.6 | 33.8 |
| 1234yf | 29.5 | 30.0 | 30.5 | 31.7 | 32.4 | 32.4 | 34.2 | 35.0 | 35.1 | 35.1 | 30.1 |
| R134a | 32.8 | 31.3 | 29.4 | 25.4 | 23.1 | 23.1 | 17.1 | 14.4 | 13.7 | 13.7 | 9.5 |
| R32 | x | | | | | x | | | | x | |
| R125 approximate expression | −0.0984x2 + 6.1633x − 68.728 | | | | | −0.0115x2 + 2.3422x − 26.868 | | | | 8.2x − 184.32 | |
| 1234yf approximate expression | −0.0617x2 + 3.9141x − 25.243 | | | | | −0.1077x2 + 6.4104x − 58.357 | | | | −5x + 163.1 | |
| R134a approximate expression | 100-R32-R125-1234yf | | | | | 100-R32-R125-1234yf | | | | 100-R32-R125-1234yf | |

(3-8) Point R

For point R, the same calculations as those of point A were performed for the following ranges: 20.8 wt %≥x≥17.5 wt %, 23.2 wt %≥x≥20.8 wt %, 23.2 wt %≥x≥20.8 wt %, 25.6 wt %≥x≥23.2 wt %, and 26.6 wt %≥x≥25.6 wt %. Table 3-24 shows (R125 concentration (wt %)/1234yf concentration (wt %)/134a concentration (wt %)) for each concentration range, determined by the approximate expression of x when R32=x wt %.

TABLE 3-24

| Point R | | | | | | | |
|---|---|---|---|---|---|---|---|
| Item | 20.8 ≥ x ≥ 17.5 | | | | | | |
| R32 | 17.5 | 18.0 | 18.7 | 19.0 | 19.3 | 20.0 | 20.8 |
| R125 | 21.4 | 22.2 | 23.3 | 23.7 | 24.2 | 25.2 | 26.3 |
| 1234yf | 17.0 | 17.8 | 19.0 | 19.5 | 20.0 | 21.1 | 22.4 |

TABLE 3-24-continued

| | | | | | | | |
|---|---|---|---|---|---|---|---|
| R134a | 44.1 | 42.0 | 39.0 | 37.8 | 36.5 | 33.7 | 30.5 |
| R32 | x | | | | | | |
| R125 approximate expression | −0.0401x2 + 3.0217x − 19.198 | | | | | | |
| 1234yf approximate expression | −0.0297x2 + 2.7774x − 22.544 | | | | | | |
| R134a approximate expression | 100-R32-R125-1234yf | | | | | | |

| Point R | | | | | | | | | | | |
|---|---|---|---|---|---|---|---|---|---|---|---|
| Item | 23.2 ≥ x ≥ 20.8 | | | | | 25.6 ≥ x ≥ 23.2 | | | | 26.6 ≥ x ≥ 25.6 | |
| R32 | 20.8 | 21.2 | 21.6 | 22.6 | 23.2 | 23.2 | 24.7 | 25.4 | 25.6 | 25.6 | 26.6 |
| R125 | 26.3 | 26.8 | 27.4 | 28.8 | 29.6 | 29.6 | 31.6 | 32.3 | 32.5 | 32.6 | 33.8 |
| 1234yf | 22.3 | 22.9 | 23.5 | 25.0 | 25.8 | 25.8 | 27.8 | 28.6 | 28.8 | 28.9 | 30.1 |
| R134a | 30.5 | 29.1 | 27.5 | 23.6 | 21.4 | 21.4 | 15.9 | 13.7 | 13.1 | 12.9 | 9.5 |
| R32 | x | | | | | x | | | | x | |
| R125 approximate expression | −0.0031x2 + 1.5234x − 4.0783 | | | | | −0.1398x2 + 8.0281x − 81.391 | | | | 1.2x + 1.88 | |
| 1234yf approximate expression | −0.0503x2 + 3.6856x − 32.627 | | | | | −0.0932x2 + 5.7935x − 58.514 | | | | 1.246x − 3.0431 | |
| R134a approximate expression | 100-R32-R125-1234yf | | | | | 100-R32-R125-1234yf | | | | 100-R32-R125-1234yf | |

(3-9) Point S

For point S, the same calculations as those of point A were performed for the following ranges: 17.0 wt %≥x≥14.2 wt %, 19.0 wt %≥x≥17.0 wt %, 20.8 wt %≥x≥19.0 wt %, 23.2 wt %≥x≥20.8 wt %, and 25.4 wt %≥x≥23.2 wt %. Table 3-25 shows (R125 concentration (wt %)/1234yf concentration (wt %)/134a concentration (wt %)) for each concentration range, determined by the approximate expression of x when R32=x wt %.

TABLE 3-25

| Point S | | | | | | | | | | |
|---|---|---|---|---|---|---|---|---|---|---|
| Item | 17.0 ≥ x ≥ 14.2 | | | | | 19.0 ≥ x ≥ 17.0 | | | | |
| R32 | 14.2 | 14.5 | 15.3 | 16.2 | 17.0 | 17.0 | 17.5 | 18.0 | 18.7 | 19.0 |
| R125 | 20.2 | 20.4 | 20.9 | 21.2 | 21.6 | 21.6 | 22.0 | 22.2 | 22.4 | 22.4 |
| 1234yf | 43.7 | 43.4 | 42.7 | 42.1 | 41.5 | 41.5 | 41.1 | 40.8 | 40.4 | 40.3 |
| R134a | 21.9 | 21.7 | 21.1 | 20.5 | 19.9 | 19.9 | 19.4 | 19.0 | 18.5 | 18.3 |
| R32 | x | | | | | x | | | | |
| R125 approximate expression | 100-R32-1234yf-R134a | | | | | 100-R32-1234yf-R134a | | | | |
| 1234yf approximate expression | 0.0508x2 − 2.3591x + 66.946 | | | | | 0.1108x2 − 4.5904x + 87.503 | | | | |
| R134a approximate expression | −0.0008x2 − 0.6861x + 31.798 | | | | | 0.0939x2 − 4.1798x + 63.826 | | | | |

| Point S | | | | | | | | | | | |
|---|---|---|---|---|---|---|---|---|---|---|---|
| Item | 20.8 ≥ x ≥ 19.0 | | | | 23.2 ≥ x ≥ 20.8 | | | | | 25.4 ≥ x ≥ 23.2 | | |
| R32 | 19.0 | 19.3 | 20.0 | 20.8 | 20.8 | 21.2 | 21.6 | 22.6 | 23.2 | 23.2 | 24.7 | 25.4 |
| R125 | 22.4 | 22.5 | 22.8 | 23.0 | 23.1 | 23.4 | 23.4 | 23.8 | 23.8 | 23.8 | 24.8 | 25.2 |
| 1234yf | 40.3 | 40.1 | 39.6 | 39.2 | 39.2 | 38.6 | 38.5 | 37.7 | 37.4 | 37.4 | 35.8 | 35.0 |
| R134a | 18.3 | 18.1 | 17.6 | 17.0 | 16.9 | 16.8 | 16.5 | 15.9 | 15.6 | 15.6 | 14.7 | 14.4 |
| R32 | x | | | | x | | | | | x | | |
| R125 approximate expression | 100-R32-1234yf-R134a | | | | 100-R32-1234yf-R134a | | | | | 100-R32-1234yf-R134a | | |
| 1234yf approximate expression | 0.1263x2 − 5.6749x + 102.56 | | | | 0.1017x2 − 5.1872x + 102.99 | | | | | −0.0317x2 + 0.4511x + 43.979 | | |
| R134a approximate expression | −0.029x2 + 0.4298x + 20.594 | | | | 0.0034x2 − 0.7313x + 30.692 | | | | | 0.075x2 − 4.1913x + 72.494 | | |

(3-10) Point T

For point T, the same calculations as those of point A were performed for the following ranges: 17.0 wt %≥x≥14.2 wt %, 19.0 wt %≥x≥17.0 wt %, 20.8 wt %≥x≥19.0 wt %, 23.2 wt %≥x≥20.8 wt %, and 25.4 wt %≥x≥23.2 wt %. Table 3-26 shows (R125 concentration (wt %)/1234yf concentration (wt %)/134a concentration (wt %)) for each concentration range, determined by the approximate expression of x when R32=x wt %.

TABLE 3-26

| Point T | | | | | | | | | | |
|---|---|---|---|---|---|---|---|---|---|---|
| Item | 17.0 ≥ x ≥ 14.2 | | | | | 19.0 ≥ x ≥17.0 | | | | |
| R32 | 14.2 | 14.5 | 15.3 | 16.2 | 17.0 | 17.0 | 17.5 | 18.0 | 18.7 | 19.0 |
| R125 | 27.8 | 27.9 | 28.1 | 28.2 | 28.3 | 28.3 | 28.5 | 28.7 | 28.9 | 28.8 |
| 1234yf | 27.9 | 27.8 | 27.7 | 27.4 | 27.2 | 27.2 | 27.2 | 27.1 | 26.9 | 26.9 |
| R134a | 30.1 | 29.8 | 28.9 | 28.2 | 27.5 | 27.5 | 26.8 | 26.2 | 25.5 | 25.3 |
| R32 | x | | | | | x | | | | |
| R125 approximate expression | 100-R32-1234yf-R134a | | | | | 100-R32-1234yf-R134a | | | | |
| 1234yf approximate expression | −0.0415x2 + 1.0547x + 21.254 | | | | | −0.0766x2 + 2.5779x + 5.5242 | | | | |
| R134a approximate expression | 0.0863x2 − 3.628x + 64.252 | | | | | 0.2286x2 − 9.3441x + 120.28 | | | | |

| Point T | | | | | | | | | | | | |
|---|---|---|---|---|---|---|---|---|---|---|---|---|
| Item | 20.8 ≥ x ≥ 19.0 | | | | 23.2 ≥ x ≥ 20.8 | | | | | 25.4 ≥ x ≥ 23.2 | | |
| R32 | 19.0 | 19.3 | 20.0 | 20.8 | 20.8 | 21.2 | 21.6 | 22.6 | 23.2 | 23.2 | 24.7 | 25.4 |
| R125 | 28.8 | 28.8 | 28.9 | 29.1 | 29.1 | 29.1 | 29.1 | 29.3 | 29.6 | 29.6 | 29.8 | 29.9 |
| 1234yf | 26.9 | 26.8 | 26.5 | 26.4 | 26.4 | 26.3 | 26.2 | 26.0 | 25.8 | 21.4 | 20.3 | 19.6 |
| R134a | 25.3 | 25.1 | 24.6 | 23.7 | 23.7 | 23.4 | 23.1 | 22.1 | 21.4 | 25.8 | 25.2 | 25.1 |
| R32 | x | | | | x | | | | | x | | |
| R125 approximate expression | 100-R32-1234yf-R134a | | | | 100-R32-1234yf-R134a | | | | | 100-R32-1234yf-R134a | | |
| 1234yf approximate expression | 0.1451x2 − 6.0744x + 89.981 | | | | −0.0318x2 + 1.1657x + 15.869 | | | | | 0.1142x2 − 5.8724x + 100.55 | | |
| R134a approximate expression | −0.2364x2 + 8.5372x − 51.582 | | | | −0.123x2 + 4.4541x − 15.735 | | | | | −0.1186x2 + 4.9464x − 29.535 | | |

(4) Method for Determining Intersections U, V, W, X, Y, Z, and α

(4-1) Intersection U of Line Segment JK and Line Segment ST

In the case of x=R32=14.5 wt %, when y=R125 concentration (wt %) and z=R134a concentration (wt %), line segment JK is represented by z=−4.6376y+151.27, and line segment ST is represented by z=−2.0815y+85.873, as shown in Table 3-27. Intersection U of line segment JK and line segment ST is (R125 concentration (wt %)/1234yf concentration (wt %)/134a concentration (wt %))=(25.6/32.6/27.3), as shown in Table 3-27, obtained by solving these formulas. Moreover, the approximate expression of intersection U in the range of 15.3 wt %≥x≥14.2 wt % is calculated in the same manner as in point A. Table 3-27 shows intersection U (R125 concentration (wt %)/1234yf concentration (wt %)/134a concentration (wt %)) determined by the approximate expression of x when R32=x wt %.

TABLE 3-27

| R32 = 14.5% Line segment JK and line segment ST | | | | |
|---|---|---|---|---|
| Item | J | K | S | T |
| x = R32 | 14.5 | 14.5 | 14.5 | 14.5 |
| y = R125 | 23.6 | 26.9 | 20.4 | 27.9 |
| z = 1234yf | 41.8 | 26.5 | 43.4 | 27.8 |
| R134a | 20.1 | 32.1 | 21.7 | 29.8 |
| Line segment JK | z = −4.6376 | | y + 151.27 | |
| Line segment ST | z = −2.0815 | | y + 85.873 | |

| Intersection U | | | |
|---|---|---|---|
| | 15.3 ≥ x ≥ 14.2 | | |
| Item | U = K = T | Intersection U | U = J = S |
| x = R32 | 14.2 | 14.5 | 15.3 |
| y = R125 | 27.8 | 25.6 | 20.9 |
| z = 1234yf | 27.9 | 32.6 | 42.7 |
| R134a | 30.1 | 27.3 | 21.1 |
| R32 | | x | |
| R125 approximate expression | | 1.3896 × 2 − 47.266x + 418.78 | |

TABLE 3-27-continued

| | |
|---|---|
| 1234yf approximate expression | −2.8422 × 2 + 97.299x − 780.65 |
| R134a approximate expression | 100 − R32 − R125 − 1234yf |

(4-2) Intersection V of Line Segment LM and Line Segment ST Intersection V when x=R32=17.5 wt % was calculated from the formulas of line segments shown in Table 3-28 in the same manner as for intersection U. Moreover, the approximate expression of intersection V in the range of 18.0 wt %≥x≥17.0 wt % was calculated in the same manner as for point A. Table 3-28 shows intersection V (R125 concentration (wt %)/1234yf concentration (wt %)/134a concentration (wt %)) represented by the approximate expression of x when R32=x wt %.

TABLE 3-28

| R32 = 17.5% Line segment LM and line segment ST | | | | |
|---|---|---|---|---|
| Item | L | M | S | T |
| x = R32 | 17.5 | 17.5 | 17.5 | 17.5 |
| y = R125 | 23.9 | 27.5 | 22.0 | 28.5 |
| z = 1234yf | 40.1 | 25.8 | 41.1 | 27.2 |
| R134a | 18.5 | 29.2 | 19.4 | 26.8 |
| Line segment LM | z = −3.9728 | | y + 135.08 | |
| Line segment ST | z = −2.1399 | | y + 88.187 | |

| Intersection V | | | |
|---|---|---|---|
| | 18.0 ≥ x ≥ 17.0 | | |
| Item | V = M = T | Intersection V | V = L = S |
| x = R32 | 17.0 | 17.5 | 18.0 |
| y = R125 | 28.3 | 25.6 | 22.2 |
| z = 1234yf | 27.2 | 33.4 | 40.8 |
| R134a | 27.5 | 23.5 | 19.0 |
| R32 | | x | |
| R125 approximate expression | | −1.3362 × 2 + 40.667x − 276.87 | |
| 1234yf approximate expression | | 2.2412 × 2 − 64.842x + 481.81 | |
| R134a approximate expression | | 100 − R32 − R125 − 1234yf | |

(4-3) Intersection W of Line Segment OP and Line Segment ST

Intersection W when x=R32=20.4 wt % was calculated from the formulas of line segments shown in Table 3-29 in the same manner as for intersection U. Moreover, the approximate expression of intersection W in the range of 20.8 wt %≥x≥20.0 wt % was calculated in the same manner as for point A. Table 3-29 shows intersection W (R125 concentration (wt %)/1234yf concentration (wt %)/134a concentration (wt %)) represented by the approximate expression of x when R32=x wt %.

TABLE 3-29

| R32 = 20.4% Line segment OP and line segment ST | | | | |
|---|---|---|---|---|
| Item | O | P | S | T |
| x = R32 | 20.4 | 20.4 | 20.4 | 20.4 |
| y = R125 | 24.5 | 28.2 | 23.0 | 29.0 |
| z = 1234yf | 38.5 | 25.3 | 39.4 | 26.4 |
| R134a | 16.6 | 26.1 | 17.3 | 24.2 |
| Line segment OP | z = −3.5676 | | y + 125.91 | |
| Line segment ST | z = −2.1667 | | y + 89.233 | |

TABLE 3-29-continued

| Intersection W | | | |
|---|---|---|---|
| | 20.8 ≥ x ≥ 20.0 | | |
| Item | W = P = T | Intersection W | W = O = S |
| x = R32 | 20.0 | 20.4 | 20.8 |
| y = R125 | 28.9 | 26.2 | 23.0 |
| z = 1234yf | 26.5 | 32.5 | 39.2 |
| R134a | 24.6 | 20.9 | 17.0 |
| R32 | | x | |
| R125 approximate expression | | −1.4439 × 2 + 51.537x − 424.27 | |
| 1234yf approximate expression | | 2.1733 × 2 − 72.785x + 612.88 | |
| R134a approximate expression | | 100 − R32 − R125 − 1234yf | |

(4-4) Intersection X of Line Segment JK and Line Segment QR

Intersection X when x=R32=18.0 wt % was calculated from the formulas of line segments shown in Table 3-30 in the same manner as for intersection U. Moreover, the approximate expression of intersection X in the range of 19.0 wt %≥x≥17.5 wt % was calculated in the same manner as for point A. Table 3-30 shows intersection X (R125 concentration (wt %)/1234yf concentration (wt %)/134a concentration (wt %)) represented by the approximate expression of x when R32=x wt %.

TABLE 3-30

| Item | J | K | Q | R |
|---|---|---|---|---|
| x = R32 | 18.0 | 18.0 | 18.0 | 18.0 |
| y = R125 | 14.8 | 20.2 | 11.4 | 22.1 |
| z = 1234yf | 32.5 | 14.9 | 25.1 | 17.6 |
| R134a | 34.7 | 46.9 | 45.5 | 42.3 |
| Line segment JK | z = −3.2639 | | y + 80.806 | |
| Line segment QR | z = −0.6949 | | y + 32.976 | |

| Intersection X | | | |
|---|---|---|---|
| | 19.0 ≥ x ≥ 17.5 | | |
| Item | X = K = R | Intersection X | X = J = Q |
| x = R32 | 17.5 | 18.0 | 19.0 |
| y = R125 | 21.1 | 18.6 | 13.4 |
| z = 1234yf | 16.5 | 20.0 | 26.7 |
| R134a | 44.9 | 43.4 | 40.9 |
| R32 | | x | |
| R125 approximate expression | | −0.1696 × 2 + 1.0575x + 54.537 | |
| 1234yf approximate expression | | −0.2271 × 2 + 15.05x − 177.28 | |
| R134a approximate expression | | 100 − R32 − R125 − 1234yf | |

(4-5) Intersection Y of Line Segment LM and Line Segment QR

Intersection Y when x=R32=20.0 wt % was calculated from the formulas of line segments shown in Table 3-31 in the same manner as for intersection U. Moreover, the approximate expression of intersection Y in the range of 20.8 wt %≥x≥19.3 wt % was calculated in the same manner as for point A. Table 3-31 shows intersection Y (R125 concentration (wt %)/1234yf concentration (wt %%)/134a concentration (wt %)) represented by the approximate expression of x when R32=x wt %.

TABLE 3-31

| R32 = 20.0% Line segment LM and line segment QR | | | | |
|---|---|---|---|---|
| Item | L | M | Q | R |
| x = R32 | 20.0 | 20.0 | 20.0 | 20.0 |
| y = R125 | 18.0 | 23.0 | 15.4 | 25.2 |
| z = 1234yf | 33.9 | 17.9 | 28.3 | 21.1 |
| R134a | 28.1 | 39.1 | 36.3 | 33.7 |
| Line segment LM | z = −3.195 | | y + 91.409 | |
| Line segment QR | z = −0.7337 | | y + 39.621 | |

| Intersection Y | | | |
|---|---|---|---|
| | 20.8 ≥ x ≥ 19.3 | | |
| Item | Y = M = R | Intersection Y | Y = L = Q |
| x = R32 | 19.3 | 20.0 | 20.8 |
| y = R125 | 24.2 | 21.0 | 16.9 |
| z = 1234yf | 20.0 | 24.2 | 29.5 |
| R134a | 36.5 | 34.8 | 32.8 |
| R32 | | x | |
| R125 approximate expression | | −0.4421 × 2 + 12.862x − 59.353 | |
| 1234yf approximate expression | | 0.4405 × 2 − 11.34x + 74.783 | |
| R134a approximate expression | | 100 − R32 − R125 − 1234yf | |

(4-6) Intersection Z of Line Segment OP and Line Segment QR

Intersection Z when x=R32=21.6 wt % was calculated from the formulas of line segments shown in Table 3-32 in the same manner as for intersection U. Moreover, the approximate expression of intersection Z in the range of 22.6 wt %≥x≥21.2 wt % was calculated in the same manner as for point A. Table 3-32 shows intersection Z (R125 concentration (wt %)/1234yf concentration (wt %)/134a concentration (wt %)) represented by the approximate expression of x when R32=x wt %.

TABLE 3-32

| R32 = 21.6% Line segment OP and line segment QR | | | | |
|---|---|---|---|---|
| Item | O | P | Q | R |
| x = R32 | 21.6 | 21.6 | 21.6 | 21.6 |
| y = R125 | 21.5 | 26.1 | 18.5 | 27.4 |
| z = 1234yf | 36.7 | 21.6 | 30.5 | 23.5 |
| R134a | 20.2 | 30.7 | 29.4 | 27.5 |
| Line segment OP | z = −3.2736 | | y + 107.04 | |
| Line segment QR | z = −0.792 | | y + 45.201 | |

| Intersection Z | | | |
|---|---|---|---|
| | 22.6 ≥ x ≥ 21.2 | | |
| Item | Z = P = R | Intersection Z | Z = O = Q |
| x = R32 | 21.2 | 21.6 | 22.6 |
| y = R125 | 26.8 | 24.9 | 20.2 |
| z = 1234yf | 22.9 | 25.5 | 31.8 |
| R134a | 29.1 | 28.0 | 25.4 |
| R32 | | x | |

TABLE 3-32-continued

| | |
|---|---|
| R125 approximate expression | −0.0118 × 2 − 4.1976x + 121.09 |
| 1234yf approximate expression | −0.0544 × 2 + 8.7425x − 137.98 |
| R134a approximate expression | 100 − R32 − R125 − 1234yf |

(4-7) Intersection a of Line Segment ST and Line Segment QR

Intersection a when x=R32=21.6 wt % was calculated from the formulas of line segments shown in Table 3-33 in the same manner as for intersection U. Moreover, the approximate expression of intersection a in the range of 25.4 wt %≥x≥23.2 wt % was calculated in the same manner as for point A. Table 3-33 shows intersection a (R125 concentration (wt %)/1234yf concentration (wt %)/134a concentration (wt %)) represented by the approximate expression of x when R32=x wt %.

TABLE 3-33

| Item | S | T | Q | R |
|---|---|---|---|---|
| x = R32 | 24.7 | 24.7 | 24.7 | 24.7 |
| y = R125 | 24.0 | 31.6 | 24.8 | 29.8 |
| z = 1234yf | 34.2 | 27.8 | 35.8 | 25.2 |
| R134a | 17.1 | 15.9 | 14.7 | 20.3 |
| Line segment ST | z = −0.8459 | | y + 54.53 | |
| Line segment QR | z = −2.1205 | | y + 88.391 | |

| Intersection α | | | |
|---|---|---|---|
| | 25.4 ≥ x ≥ 23.2 | | |
| Item | α = T = R | Intersection α | α = S = Q |
| x = R32 | 23.2 | 24.7 | 25.4 |
| y = R125 | 29.6 | 26.6 | 25.2 |
| z = 1234yf | 25.8 | 32.1 | 35.0 |
| R134a | 21.4 | 16.6 | 14.4 |
| R32 | | x | |
| R125 approximate expression | | 0.0324 × 2 − 3.5746x + 95.092 | |
| 1234yf approximate expression | | 0.0193 × 2 + 3.2487x − 59.944 | |
| R134a approximate expression | | 100 − R32 − R125 − 1234yf | |

The mixture (at least one of the mixtures described above) contained in the composition of the first embodiment of the present invention may further contain water as another component, in addition to the four basic components (R32, R125, R134a, and 1234yf).

The concentration of water contained in the mixture is preferably 200 weight ppm or less based on the 1234yf content of the mixture. The lower limit of the water concentration based on the 1234yf content of the mixture is not particularly limited, as long as the effect of improving the stability of the composition is exhibited. For example, the lower limit of the water concentration can be 0.1 weight ppm.

The presence of water in the mixture results in an unexpected effect such that the chemical stability of the composition comprising the mixture increases. The reason for this is considered as follows. Specifically, because the mixture contains water, the double bonds in the molecules of the unsaturated fluorinated hydrocarbons contained in the composition can be stably present, and oxidation of the unsaturated fluorinated hydrocarbons is less likely to occur, consequently improving the stability of the composition.

The mixture contained in the composition of the first embodiment of the present invention may contain other component(s) (fluorinated hydrocarbon(s) that are different from the four basic components) in addition to the four basic components (R32, R125, R134a, and 1234yf). The fluorinated hydrocarbon(s) as other component(s) are not particularly limited, and are, for example, at least one fluorinated hydrocarbon selected from the group consisting of HCFC-1122, HCFC-124, CFC-1113, and 3,3,3-trifluoropropyne.

The mixture contained in the composition of the first embodiment of the present invention may contain, in addition to the four basic components (R32, R125, R134a, and 1234yf), at least one halogenated organic compound represented by formula (1): $C_mH_nX_p$, wherein each X independently represents a fluorine atom, a chlorine atom, or a bromine atom, m is 1 or 2, 2m+2≥n+p, and p≥1, as other component(s). The at least one halogenated organic compound as other component(s) is not particularly limited. Preferable examples include difluorochloromethane, chloromethane, 2-chloro-1,1,1,2,2-pentafluoroethane, 2-chloro-1,1,1,2-tetrafluoroethane, 2-chloro-1,1-difluoroethylene, trifluoroethylene, and the like.

The mixture contained in the composition of the first embodiment of the present invention may contain, in addition to the four basic components (R32, R125, R134a, and 1234yf), at least one organic compound represented by formula (2): $C_mH_nX_p$, wherein each X independently represents an atom that is not a halogen atom, m is 1 or 2, 2m+2≥n+p, and p≥1, as other component(s). The at least one organic compound as other component(s) is not particularly limited. Preferable examples include propane, isobutane, and the like.

As described above, when the mixture contains other components, the content of other components in the mixture, whether other components are used singly or in a combination of two or more, is preferably 0.5 wt % or less, more preferably 0.3 wt % or less, and even more preferably 0.1 wt % or less, as the total content amount.

Second Embodiment to Fourth Embodiment

The composition of the second embodiment of the present invention is a composition comprising a mixture of fluorinated hydrocarbons, wherein the mixture comprises R32, R125, R134a, 1234yf, and at least one fluorinated hydrocarbon selected from the group consisting of HCFC-1122, HCFC-124, CFC-1113, and 3,3,3-trifluoropropyne. That is, in addition to the four basic components (R32, R125, R134a, and 1234yf), at least one member selected from the group consisting of HCFC-1122, HCFC-124, CFC-1113, and 3,3,3-trifluoropropyne is contained as other component(s) (fluorinated hydrocarbon(s) that are different from the four basic components).

Moreover, the composition of the third embodiment of the present invention is a composition comprising a mixture of fluorinated hydrocarbons, wherein the mixture comprises R32, R125, R134a, 1234yf, and at least one halogenated organic compound represented by formula (1): $C_mH_nX_p$, wherein each X independently represents a fluorine atom, a chlorine atom, or a bromine atom, m is 1 or 2, 2m+2≥n+p, and p≥1. That is, in addition to the four basic components (R32, R125, R134a, and 1234yf), at least one halogenated organic compound represented by formula (1) is contained as other component(s).

Furthermore, the composition of the fourth embodiment of the present invention is a composition comprising a mixture of fluorinated hydrocarbons, wherein the mixture comprises R32, R125, R134a, 1234yf, and at least one organic compound represented by formula (2): $C_mH_nX_p$, wherein each X independently represents an atom that is not a halogen atom, m is 1 or 2, 2m+2≥n+p, and p≥1. That is, in addition to the four basic components (R32 R125, R134a, and 1234yf), at least one organic compound represented by formula (2) is contained as other component(s).

The compositions of the second to fourth embodiments of the present invention can be the same as the composition of the first embodiment of the present invention, except that the composition ratio of R32, R125, R134a, and 1234yf contained in the mixture is not particularly limited. In the compositions of the second to fourth embodiments of the present invention, the content of other components in the mixture is preferably 0.5 wt % or less, more preferably 0.3 wt % or less, and particularly preferably 0.1 wt % or less, as in the first embodiment.

Fifth Embodiment

The composition of the fifth embodiment of the present invention is a composition comprising a mixture of fluorinated hydrocarbons, wherein the mixture comprises difluoromethane (R32), pentafluoroethane (R125), 1,1,1,2-tetrafluoroethane (R134a), 2,3,3,3-tetrafluoropropene (1234yf), and water. That is, in addition to the four basic components (R32 R125, R134a, and 1234yf), water is contained as another component. In the composition of the fifth embodiment of the present invention, the content of water as another component in the mixture is preferably 0.5 wt % or less, more preferably 0.3 wt % or less, and particularly preferably 0.1 wt % or less, as in the first embodiment.

The composition ratio of R32, R125, R134a, and 1234yf contained in the mixture contained in the composition of the fifth embodiment of the present invention is not particularly limited.

The concentration of water contained in the mixture is preferably 200 weight ppm or less based on the 1234yf content of the mixture. The lower limit of the water concentration based on the 1234yf content of the mixture is not particularly limited, as long as the effect of improving the stability of the composition is exhibited. For example, the lower limit of the water concentration can be 0.1 weight ppm.

The presence of water in the mixture results in an unexpected effect such that the chemical stability of the composition comprising the mixture increases. The reason for this is considered as follows. That is, because the mixture contains water, the double bonds in the molecules of the unsaturated fluorinated hydrocarbons contained in the composition can be stably present, and oxidation of the unsaturated fluorinated hydrocarbons is less likely to occur, consequently improving the stability of the composition.

The composition of the fifth embodiment of the present invention can be the same as the composition of the first embodiment of the present invention, except that the composition ratio of R32, R125, R134a, and 1234yf contained in the mixture is not particularly limited.

Optional Additives

The compositions of the first to fifth embodiments of the present invention may appropriately contain various additives in addition to the mixture of fluorinated hydrocarbons.

The compositions of the present invention may further contain a refrigerant oil. The refrigerant oil is not particularly limited and can be suitably selected from commonly used refrigerant oils. In this case, a refrigerant oil that is more excellent in terms of, for example, the effect of improving miscibility with the mixture, stability of the mixture, etc., may be appropriately selected, if necessary.

Although there is no particular limitation, the stability of the mixture can be evaluated by a commonly used method.

Examples of such methods include an evaluation method using the amount of free fluorine ions as an index according to ASHRAE Standard 97-2007, and the like. There is, for example, another evaluation method using the total acid number as an index. This method can be performed, for example, according to ASTM D 974-06.

Preferred as the type of the refrigerant oil is, specifically, for example, at least one member selected from the group consisting of polyalkylene glycol (PAG), polyol ester (POE), and polyvinyl ether (PVE).

The refrigerant oil to be used may have, for example, a kinematic viscosity at 40° C. of 5 to 400 cSt. When the refrigerant oil has a kinematic viscosity within this range, it is preferable in terms of lubricity.

The concentration of the refrigerant oil is not particularly limited, and may be generally 10 to 50 wt %, relative to the entire composition.

The compositions of the first to fifth embodiments of the present invention may further contain one or more tracers. The one or more tracers are added to the compositions of the present invention at a detectable concentration so that, when the compositions of the present invention are diluted, contaminated, or undergo any other change, the change can be traced. There is no limitation on the tracers. Preferable examples include hydrofluorocarbons, deuterated hydrocarbons, deuterated hydrofluorocarbons, perfluorocarbons, fluoroethers, brominated compounds, iodinated compounds, alcohols, aldehydes, ketones, nitrous oxide ($N_2O$), and the like. Particularly preferred are hydrofluorocarbons or fluoroethers.

The compositions of the first to fifth embodiments of the present invention may further contain a compatibilizer. The type of compatibilizer is not particularly limited. Preferable examples include polyoxyalkylene glycol ethers, amides, nitriles, ketones, chlorocarbons, esters, lactones, aryl ethers, fluoroethers, 1,1,1-trifluoroalkans, and the like. Particularly preferred are polyoxyalkylene glycol ethers.

The compositions of the first to fifth embodiments of the present invention may further contain one or more ultraviolet fluorescent dyes. There is no limitation on the ultraviolet fluorescent dyes. Preferable examples include naphthalimide, coumarin, anthracene, phenanthrene, xanthene, thioxanthene, naphthoxanthene, fluorescein, and derivatives thereof. Either naphthalimide or coumarin, or both, are particularly preferable.

The compositions of the first to fifth embodiments of the present invention may further contain a stabilizer, a polymerization inhibitor, etc., if necessary.

Examples of stabilizers include, but are not particularly limited to, (i) aliphatic nitro compounds, such as nitromethane and nitroethane; and aromatic nitro compounds, such as nitrobenzene and nitrostyrene; (ii) ethers, such as 1,4-dioxane; amines, such as 2,2,3,3,3-pentafluoropropylamine and diphenylamine; butylhydroxyxylene, benzotriazole, and the like. The stabilizers can be used singly or in a combination of two or more.

The concentration of the stabilizer varies depending on the type of stabilizer, but can be determined within a range in which the properties of the composition are not impaired. The concentration of the stabilizer is generally preferably about 0.01 to 5 parts by weight, and more preferably about 0.05 to 2 parts by weight, per 100 parts by weight of the mixture.

Examples of polymerization inhibitors include, but are not particularly limited to, 4-methoxy-1-naphthol, hydroquinone, hydroquinonemethyl ether, dimethyl-t-butylphenol, 2,6-di-tert-butyl-p-cresol, benzotriazole, and the like.

The concentration of the polymerization inhibitor is generally preferably 0.01 to 5 parts by weight, and more preferably about 0.05 to 2 parts by weight, per 100 parts by weight of the mixture.

An object can be refrigerated by a method comprising the step of operating a refrigeration cycle using the compositions of the first to fifth embodiments of the present invention. For example, the composition can be circulated via a compressor to form the refrigeration cycle.

It is also possible to obtain a device for forming a refrigeration cycle in which each of the above compositions is circulated via a compressor. In a refrigeration method using such a device, because the composition ratio of R32, R125, R134a, and 1234yf contained in the mixture is the above specific composition ratio, the outlet temperature of the compressor can, for example, be set to 110° C. or less. Because the outlet temperature of the compressor is set within this range, when the composition comprises a refrigerant oil, the deterioration of the refrigerant oil can be suppressed.

Examples of refrigerating devices that can use the compositions of the first to fifth embodiments of the present invention include, but are not limited to, refrigerators, freezers, water coolers, ice machines, refrigerating showcases, freezing showcases, freezing and refrigerating units, refrigerating devices used, for example, for freezing and refrigerating warehouses, chillers (chilling units), turbo refrigerators, screw refrigerators, and the like.

EXAMPLES

The present invention is described in detail below with reference to Examples and Comparative Examples. However, the present invention is not limited to the Examples.

Examples 1-1 to 3-139 and Comparative Examples 1-1 to 3-115

The GWP of each of R404A and compositions comprising a mixture of R32, R125, R134a, and 1234yf was evaluated based on the values described in the Fourth Assessment Report of the Intergovernmental Panel on Climate Change (IPCC). The refrigerating capacity of each of R404A and the compositions comprising a mixture of R32, R125, R134a, and 1234yf was determined by performing refrigeration cycle theoretical calculations for the mixed refrigerants using the National Institute of Science and Technology (NIST) and Reference Fluid Thermodynamic and Transport Properties Database (REFPROP 9.0) under the following conditions.

Evaporation temperature −40° C.
Condensation temperature 40° C.
Superheating temperature 20 K
Supercooling temperature 0 K
Compressor efficiency 70%

The flammability was determined based on the ASHRAE flammability classification.

Further, Tables 4-1 to 6-21 show the GWP, COP, compressor outlet pressure, compressor outlet temperature, and refrigerating capacity calculated based on these results. Table 5 shows the COP, refrigerating capacity, and compressor outlet pressure each relative to those of R22, and Table 6 shows the COP and refrigerating capacity each relative to those of R404A.

The coefficient of performance (COP) was calculated according to the following equation.

COP=(refrigerating capacity or heating capacity)/amount of electrical power consumed In FIGS. 15 to 27, 30, 31, 33, 36, 44, and 45, open circles (○) represent the compositions of the Examples other than the reference signs, and open triangles (Δ) represent the compositions of the Comparative Examples other than the reference signs.

TABLE 4-1

| Item | | Unit | Comparative Example 1-1 A | Example 1-1 D | Example 1-2 G | Example 1-3 H | Example 1-4 I | Example 1-5 G' | Example 1-6 H' | Example 1-7 I' | Example 1-8 N |
|---|---|---|---|---|---|---|---|---|---|---|---|
| Composition | R32 | mass % | 10.8 | 10.8 | 10.8 | 10.8 | 10.8 | 10.8 | 10.8 | 10.8 | 10.8 |
| | R125 | mass % | 40.7 | 7.3 | 34.5 | 11.6 | 0.0 | 34.0 | 12.6 | 0.0 | 0.0 |
| | 1234yf | mass % | 48.5 | 0.0 | 39.4 | 50.3 | 22.5 | 38.8 | 49.0 | 18.7 | 0.0 |
| | R134a | mass % | 0.0 | 81.9 | 15.3 | 27.3 | 66.7 | 16.4 | 27.6 | 70.5 | 89.2 |
| GWP | | Year | 1500 | 1500 | 1500 | 871 | 1028 | 1500 | 911 | 1082 | 1348 |
| ASHRAE non-flammability | | — | Flammable | Non-flammable | Non-flammable | Non-flammable | Non-flammable | Non-flammable | Non-flammable | Non-flammable | Non-flammable |

TABLE 4-2

| Item | | Unit | Comparative Example 1-2 A | Example 1-9 D | Example 1-10 G | Example 1-11 H | Example 1-12 I | Example 1-13 G' | Example 1-14 H' | Example 1-15 I' | Example 1-16 N |
|---|---|---|---|---|---|---|---|---|---|---|---|
| Composition | R32 | mass % | 12.4 | 12.4 | 12.4 | 12.4 | 12.4 | 12.4 | 12.4 | 12.4 | 12.4 |
| | R125 | mass % | 40.4 | 7.9 | 34.5 | 13.1 | 0.0 | 34.0 | 14.1 | 0.0 | 0.0 |
| | 1234yf | mass % | 47.2 | 0.0 | 38.5 | 48.8 | 18.1 | 37.9 | 47.5 | 14.3 | 0.0 |
| | R134a | mass % | 0.0 | 79.7 | 14.6 | 25.7 | 69.5 | 15.7 | 26.0 | 73.3 | 87.6 |
| GWP | | Year | 1500 | 1500 | 1500 | 912 | 1078 | 1500 | 951 | 1132 | 1336 |
| ASHRAE non-flammability | | — | Flammable | Non-flammable | Non-flammable | Non-flammable | Non-flammable | Non-flammable | Non-flammable | Non-flammable | Non-flammable |

TABLE 4-3

| Item | | Unit | Comparative Example 1-3 A | Example 1-17 D | Example 1-18 G | Example 1-19 H | Example 1-20 I | Example 1-21 G' | Example 1-22 H' | Example 1-23 I' | Example 1-24 N |
|---|---|---|---|---|---|---|---|---|---|---|---|
| Composition | R32 | mass % | 14.8 | 14.8 | 14.8 | 14.8 | 14.8 | 14.8 | 14.8 | 14.8 | 14.8 |
| | R125 | mass % | 40.0 | 8.8 | 34.4 | 15.4 | 0.0 | 34.0 | 16.5 | 0.0 | 0.0 |
| | 1234yf | mass % | 45.2 | 0.0 | 37.2 | 46.5 | 11.7 | 36.5 | 45.1 | 7.9 | 0.0 |
| | R134a | mass % | 0.0 | 76.4 | 13.6 | 23.3 | 73.5 | 14.7 | 23.6 | 77.3 | 85.2 |
| GWP | | Year | 1500 | 1500 | 1500 | 974 | 1151 | 1500 | 1017 | 1206 | 1318 |
| ASHRAE non-flammability | | — | Flammable | Non-flammable | Non-flammable | Non-flammable | Non-flammable | Non-flammable | Non-flammable | Non-flammable | Non-flammable |

TABLE 4-4

| Item | | Unit | Comparative Example 1-4 A | Example 1-25 D | Example 1-26 G | Example 1-27 H | Example 1-28 I | Example 1-29 G' | Example 1-30 H' | Example 1-31 I' | Example 1-32 N |
|---|---|---|---|---|---|---|---|---|---|---|---|
| Composition | R32 | mass % | 16.1 | 16.1 | 16.1 | 16.1 | 16.1 | 16.1 | 16.1 | 16.1 | 16.1 |
| | R125 | mass % | 39.7 | 9.3 | 34.4 | 16.5 | 0.0 | 33.9 | 17.6 | 0.0 | 0.0 |
| | 1234yf | mass % | 44.2 | 0.0 | 36.4 | 45.3 | 8.6 | 35.8 | 43.9 | 4.8 | 0.0 |
| | R134a | mass % | 0.0 | 74.6 | 13.1 | 22.1 | 75.3 | 14.2 | 22.4 | 79.1 | 83.9 |
| GWP | | Year | 1500 | 1500 | 1500 | 1004 | 1186 | 1500 | 1047 | 1240 | 1308 |
| ASHRAE non-flammability | | — | Flammable | Non-flammable | Non-flammable | Non-flammable | Non-flammable | Non-flammable | Non-flammable | Non-flammable | Non-flammable |

TABLE 4-5

| Item | | Unit | Comparative Example 1-5 A | Example 1-33 D | Example 1-34 G | Example 1-35 H | Example 1-36 I | Example 1-37 G' | Example 1-38 H' | Example 1-39 I' = N |
|---|---|---|---|---|---|---|---|---|---|---|
| Composition | R32 | mass % | 18.1 | 18.1 | 18.1 | 18.1 | 18.1 | 18.1 | 18.1 | 18.1 |
| | R125 | mass % | 39.3 | 10.0 | 34.3 | 18.3 | 0.0 | 33.9 | 19.4 | 0.0 |
| | 1234yf | mass % | 42.6 | 0.0 | 35.3 | 43.5 | 3.9 | 34.7 | 42.1 | 0.0 |
| | R134a | mass % | 0.0 | 71.9 | 12.3 | 20.1 | 78.0 | 13.3 | 20.4 | 81.9 |
| GWP | | Year | 1500 | 1500 | 1500 | 1052 | 1238 | 1500 | 1095 | 1293 |
| ASHRAE non-flammability | | — | Flammable | Non-flammable | Non-flammable | Non-flammable | Non-flammable | Non-flammable | Non-flammable | Non-flammable |

TABLE 4-6

| Item | | Unit | Comparative Example 1-6 A | Example 1-40 D | Example 1-41 G | Example 1-42 H | Example 1-43 I | Example 1-44 G' | Example 1-45 H' | Example 1-46 I' | Example 1-47 N |
|---|---|---|---|---|---|---|---|---|---|---|---|
| Composition | R32 | mass % | 19.0 | 19.0 | 19.0 | 19.0 | 19.0 | 19.0 | 19.0 | 19.0 | 19.0 |
| | R125 | mass % | 39.1 | 10.3 | 34.3 | 19.2 | 0.0 | 33.8 | 20.3 | 0.8 | 0.0 |
| | 1234yf | mass % | 41.9 | 0.0 | 34.8 | 42.7 | 2.0 | 34.3 | 41.3 | 0.0 | 0.0 |
| | R134a | mass % | 0.0 | 70.7 | 11.9 | 19.1 | 79.0 | 12.9 | 19.4 | 80.2 | 81.0 |
| GWP | | Year | 1500 | 1500 | 1500 | 1075 | 1258 | 1500 | 1118 | 1303 | 1287 |
| ASHRAE non-flammability | | — | Flammable | Non-flammable | Non-flammable | Non-flammable | Non-flammable | Non-flammable | Non-flammable | Non-flammable | Non-flammable |

TABLE 4-7

| Item | | Unit | Comparative Example 1-7 A | Example 1-48 D | Example 1-49 G | Example 1-50 H | Example 1-51 I = N | Example 1-52 G' | Example 1-53 H' | Example 1-54 I' |
|---|---|---|---|---|---|---|---|---|---|---|
| Composition | R32 | mass % | 20.0 | 20.0 | 20.0 | 20.0 | 20.0 | 20.0 | 20.0 | 20.0 |
| | R125 | mass % | 38.9 | 10.7 | 34.2 | 20.1 | 0.0 | 33.8 | 21.2 | 1.8 |
| | 1234yf | mass % | 41.1 | 0.0 | 34.3 | 41.8 | 0.0 | 33.7 | 40.4 | 0.0 |
| | R134a | mass % | 0.0 | 69.3 | 11.5 | 18.1 | 80.0 | 12.5 | 18.4 | 78.2 |
| GWP | | Year | 1500 | 1500 | 1500 | 1099 | 1279 | 1500 | 1142 | 1316 |
| ASHRAE non-flammability | | — | Flammable | Non-flammable | Non-flammable | Non-flammable | Non-flammable | Non-flammable | Non-flammable | Non-flammable |

TABLE 4-8

| Item | | Unit | Comparative Example 1-8 A | Example 1-55 D | Example 1-56 G | Example 1-57 H | Example 1-58 I | Example 1-59 G' | Example 1-60 H' | Example 1-61 I' |
|---|---|---|---|---|---|---|---|---|---|---|
| Composition | R32 | mass % | 21.6 | 21.6 | 21.6 | 21.6 | 21.6 | 21.6 | 21.6 | 21.6 |
| | R125 | mass % | 38.6 | 11.2 | 34.2 | 21.4 | 1.7 | 33.8 | 22.5 | 3.5 |
| | 1234yf | mass % | 39.8 | 0.0 | 33.4 | 40.3 | 0.0 | 32.9 | 38.9 | 0.0 |
| | R134a | mass % | 0.0 | 67.2 | 10.8 | 16.7 | 76.7 | 11.7 | 17.0 | 74.9 |
| GWP | | Year | 1500 | 1500 | 1500 | 1135 | 1302 | 1500 | 1178 | 1339 |
| ASHRAE non-flammability | | — | Flammable | Non-flammable | Non-flammable | Non-flammable | Non-flammable | Non-flammable | Non-flammable | Non-flammable |

TABLE 4-9

| Item | | Unit | Comparative Example 1-9 A | Example 1-62 D | Example 1-63 G | Example 1-64 H | Example 1-65 I | Example 1-66 G' | Example 1-67 H' | Example 1-68 I' |
|---|---|---|---|---|---|---|---|---|---|---|
| Composition | R32 | mass % | 22.6 | 22.6 | 22.6 | 22.6 | 22.6 | 22.6 | 22.6 | 22.6 |
| | R125 | mass % | 38.4 | 11.6 | 34.2 | 22.1 | 2.7 | 33.8 | 23.3 | 4.6 |
| | 1234yf | mass % | 39.0 | 0.0 | 32.8 | 39.4 | 0.0 | 32.3 | 38.0 | 0.0 |
| | R134a | mass % | 0.0 | 65.8 | 10.4 | 15.9 | 74.7 | 11.3 | 16.1 | 72.8 |
| GWP | | Year | 1500 | 1500 | 1500 | 1155 | 1315 | 1500 | 1200 | 1114 |
| ASHRAE non-flammability | | — | Flammable | Non-flammable | Non-flammable | Non-flammable | Non-flammable | Non-flammable | Non-flammable | Non-flammable |

TABLE 4-10

| Item | | Unit | Comparative Example 1-10 A | Example 1-69 D | Example 1-70 G | Example 1-71 H | Example 1-72 I | Example 1-73 G' | Example 1-74 H' | Example 1-75 I' |
|---|---|---|---|---|---|---|---|---|---|---|
| Composition | R32 | mass % | 23.2 | 23.2 | 23.2 | 23.2 | 23.2 | 23.2 | 23.2 | 23.2 |
| | R125 | mass % | 38.3 | 11.8 | 34.2 | 22.6 | 3.3 | 33.8 | 23.8 | 5.2 |
| | 1234yf | mass % | 38.5 | 0.0 | 32.5 | 38.8 | 0.0 | 32.0 | 37.4 | 0.0 |
| | R134a | mass % | 0.0 | 65.0 | 10.1 | 15.4 | 73.5 | 11.0 | 15.6 | 71.6 |
| GWP | | Year | 1500 | 1500 | 1500 | 1169 | 1323 | 1500 | 1214 | 1362 |
| ASHRAE non-flammability | | — | Flammable | Non-flammable | Non-flammable | Non-flammable | Non-flammable | Non-flammable | Non-flammable | Non-flammable |

TABLE 4-11

| Item | | Unit | Comparative Example 1-11 A | Example 1-76 D | Example 1-77 G | Example 1-78 H | Example 1-79 I | Example 1-80 G' | Example 1-81 H' | Example 1-82 I' |
|---|---|---|---|---|---|---|---|---|---|---|
| Composition | R32 | mass % | 24.5 | 24.5 | 24.5 | 24.5 | 24.5 | 24.5 | 24.5 | 24.5 |
| | R125 | mass % | 38.1 | 12.3 | 34.2 | 23.6 | 4.5 | 33.9 | 24.8 | 6.4 |
| | 1234yf | mass % | 37.4 | 0.0 | 31.8 | 37.6 | 0.0 | 31.2 | 36.2 | 0.0 |
| | R134a | mass % | 0.0 | 63.2 | 9.5 | 14.3 | 71.0 | 10.4 | 14.5 | 69.1 |
| GWP | | Year | 1500 | 1500 | 1500 | 1197 | 1338 | 1500 | 1242 | 1378 |
| ASHRAE non-flammability | | — | Flammable | Non-flammable | Non-flammable | Non-flammable | Non-flammable | Non-flammable | Non-flammable | Non-flammable |

TABLE 4-12

| Item | | Unit | Comparative Example 1-12 A | Example 1-83 D | Example 1-84 G | Example 1-85 H | Example 1-86 I | Example 1-87 G' | Example 1-88 H' | Example 1-89 I' |
|---|---|---|---|---|---|---|---|---|---|---|
| Composition | R32 | mass % | 25.6 | 25.6 | 25.6 | 25.6 | 25.6 | 25.6 | 25.6 | 25.6 |
| | R125 | mass % | 37.9 | 12.6 | 34.2 | 24.3 | 5.6 | 33.9 | 25.6 | 7.5 |
| | 1234yf | mass % | 36.5 | 0.0 | 31.2 | 36.6 | 0.0 | 30.6 | 35.1 | 0.0 |
| | R134a | mass % | 0.0 | 61.8 | 9.0 | 13.5 | 68.8 | 9.9 | 13.7 | 66.9 |
| GWP | | Year | 1500 | 1500 | 1500 | 1218 | 1353 | 1500 | 1266 | 1392 |
| ASHRAE non-flammability | | — | Flammable | Non-flammable | Non-flammable | Non-flammable | Non-flammable | Non-flammable | Non-flammable | Non-flammable |

TABLE 4-13

| Item | | Unit | Comparative Example 1-13 A | Example 1-90 D | Example 1-91 G | Example 1-92 H | Example 1-93 I | Example 1-94 G' | Example 1-95 H' | Example 1-96 I' |
|---|---|---|---|---|---|---|---|---|---|---|
| Composition | R32 | mass % | 26.6 | 26.6 | 26.6 | 26.6 | 26.6 | 26.6 | 26.6 | 26.6 |
| | R125 | mass % | 37.7 | 13.0 | 34.2 | 25.1 | 6.6 | 33.8 | 26.3 | 8.6 |
| | 1234yf | mass % | 35.7 | 0.0 | 30.6 | 25.6 | 0.0 | 30.1 | 34.2 | 0.0 |
| | R134a | mass % | 0.0 | 60.4 | 8.6 | 12.7 | 66.8 | 9.5 | 12.9 | 64.8 |
| GWP | | Year | 1500 | 1500 | 1500 | 1241 | 1366 | 1500 | 1286 | 1407 |
| ASHRAE non-flammability | | — | Flammable | Non-flammable | Non-flammable | Non-flammable | Non-flammable | Non-flammable | Non-flammable | Non-flammable |

TABLE 5-1

| Item | | Unit | Comparative Example | Comparative Example 2-1 A | Comparative Example 2-2 D | Example 2-1 G' = B = C | Comparative Example 2-3 H' | Comparative Example 2-4 I' | Example 2-2 E | Example 2-3 F | Example 2-4 B' |
|---|---|---|---|---|---|---|---|---|---|---|---|
| Composition | R32 | mass % | R22 | 10.8 | 10.8 | 10.8 | 10.8 | 10.8 | 10.8 | 10.8 | 10.8 |
| | R125 | mass % | | 40.7 | 7.3 | 34.0 | 12.6 | 0.0 | 24.9 | 26.9 | 31.8 |
| | 1234yf | mass % | | 48.5 | 0.0 | 38.8 | 49.0 | 18.7 | 43.1 | 28.5 | 39.9 |
| | R134a | mass % | | 0.0 | 81.9 | 16.4 | 27.6 | 70.5 | 21.2 | 33.8 | 17.5 |
| | GWP | Year | 1810 | 1500 | 1500 | 1500 | 911 | 1082 | 1249 | 1500 | 1438 |
| Performance | Coefficient of performance | (relative to R22 %) | 100 | 89.10 | 97.20 | 90.73 | 93.01 | 96.60 | 91.75 | 92.44 | 90.98 |
| | Refrigerating capacity | (relative to R22 %) | 100 | 84 | 64 | 80 | 71 | 64 | 76 | 76 | 79 |
| | Outlet temperature | ° C. | 149 | 95 | 116 | 99 | 101 | 112 | 100 | 104 | 99 |
| | Outlet pressure | (relative to R22 %) | 100 | 107.1 | 83.0 | 102.5 | 91.2 | 82.1 | 97.5 | 97.5 | 101.25 |

| Item | | Unit | Comparative Example | Example 2-5 C' | Example 2-6 E' | Example 2-7 F' | Example 2-8 | Comparative Example 2-5 |
|---|---|---|---|---|---|---|---|---|
| Composition | R32 | mass % | R22 | 10.8 | 10.8 | 10.8 | 10.8 | 10.8 |
| | R125 | mass % | | 32.2 | 27.2 | 28.7 | 30.0 | 40.0 |
| | 1234yf | mass % | | 36.2 | 42.0 | 31.1 | 39.2 | 29.2 |
| | R134a | mass % | | 20.8 | 20.0 | 29.4 | 20.0 | 20.0 |
| | GWP | Year | 1810 | 1500 | 1313 | 1500 | 1410 | 1760 |
| Performance | Coefficient of performance | (relative to R22 %) | 100 | 91.16 | 91.50 | 92.01 | 91.29 | 90.46 |
| | Refrigerating capacity | (relative to R22 %) | 100 | 79 | 77 | 77 | 78 | 82 |
| | Outlet temperature | ° C. | 149 | 100 | 100 | 103 | 100 | 101 |
| | Outlet pressure | (relative to R22 %) | 100 | 101.25 | 98.75 | 98.75 | 100.18 | 105.5 |

TABLE 5-2

| Item | | Unit | Comparative Example | Comparative Example 2-6 A | Comparative Example 2-7 D | Comparative Example 2-8 G' | Comparative Example 2-9 H' | Comparative Example 2-10 I' | Example 2-9 B | Example 2-10 C | Example 2-11 E |
|---|---|---|---|---|---|---|---|---|---|---|---|
| Composition | R32 | mass % | R22 | 12.4 | 12.4 | 12.4 | 12.4 | 12.4 | 12.4 | 12.4 | 12.4 |
| | R125 | mass % | | 40.4 | 7.9 | 34.0 | 14.1 | 0.0 | 29.7 | 30.6 | 20.4 |
| | 1234yf | mass % | | 47.2 | 0.0 | 37.9 | 47.5 | 14.4 | 40.0 | 33.0 | 44.5 |
| | R134a | mass % | | 0.0 | 79.7 | 15.7 | 26.0 | 73.2 | 17.9 | 24.0 | 22.7 |
| | GWP | Year | 1810 | 1500 | 1500 | 1500 | 951 | 1131 | 1381 | 1500 | 1124 |
| Performance | Coefficient of performance | (relative to R22 %) | 100 | 89.30 | 97.11 | 90.85 | 92.95 | 96.90 | 91.33 | 91.66 | 92.32 |

TABLE 5-2-continued

| | | | | | | | | | | | |
|---|---|---|---|---|---|---|---|---|---|---|---|
| | Refrigerating capacity | (relative to R22 %) | 100 | 86 | 66 | 82 | 74 | 65 | 80 | 80 | 76 |
| | Outlet temperature | ° C. | 149 | 97 | 118 | 101 | 103 | 115 | 101 | 103 | 102 |
| | Outlet pressure | (relative to R22 %) | 100 | 109.5 | 85.2 | 105.0 | 94.3 | 83.5 | 102.5 | 102.5 | 97.5 |

| | Item | Unit | Comparative Example | Example 2-12 F | Example 2-13 B' | Example 2-14 C' | Example 2-15 E' | Example 2-16 F' | Example 2-17 | Comparative Example 2-11 |
|---|---|---|---|---|---|---|---|---|---|---|
| Composition | R32 | mass % | R22 | 12.4 | 12.4 | 12.4 | 12.4 | 12.4 | 12.4 | 12.4 |
| | R125 | mass % | | 24.0 | 27.4 | 28.9 | 22.8 | 25.6 | 25.0 | 15.0 |
| | 1234yf | mass % | | 23.4 | 41.1 | 30.5 | 43.3 | 25.7 | 37.6 | 37.6 |
| | R134a | mass % | | 40.2 | 19.1 | 28.2 | 21.5 | 36.3 | 25.0 | 35.0 |
| | GWP | Year | 1810 | 1500 | 1317 | 1500 | 1191 | 1500 | 1318 | 1111 |
| Performance | Coefficient of performance | (relative to R22 %) | 100 | 93.24 | 91.59 | 92.07 | 92.08 | 92.86 | 92.14 | 93.46 |
| | Refrigerating capacity | (relative to R22 %) | 100 | 76 | 79 | 79 | 77 | 77 | 78 | 74 |
| | Outlet temperature | ° C. | 149 | 107 | 102 | 104 | 102 | 106 | 103 | 105 |
| | Outlet pressure | (relative to R22 %) | 100 | 97.5 | 101.25 | 101.25 | 98.75 | 98.75 | 99.6 | 94.0 |

TABLE 5-3

| | Item | Unit | Comparative Example | Comparative Example 2-12 A | Comparative Example 2-13 D | Comparative Example 2-14 G' | Example 2-18 H' = E | Comparative Example 2-15 I' | Example 2-19 B | Example 2-20 C | Example 2-21 F |
|---|---|---|---|---|---|---|---|---|---|---|---|
| Composition | R32 | mass % | R22 | 14.1 | 14.1 | 14.1 | 14.1 | 14.1 | 14.1 | 14.1 | 14.1 |
| | R125 | mass % | | 40.1 | 8.5 | 34.0 | 15.8 | 0.0 | 25.2 | 27.5 | 21.1 |
| | 1234yf | mass % | | 45.8 | 0.0 | 36.9 | 45.8 | 9.8 | 41.2 | 27.5 | 18.2 |
| | R134a | mass % | | 0.0 | 77.4 | 15.0 | 24.3 | 76.1 | 19.5 | 30.9 | 46.6 |
| | GWP | Year | 1810 | 1500 | 1500 | 1500 | 997 | 1184 | 1256 | 1500 | 1500 |
| Performance | Coefficient of performance | (relative to R22 %) | 100 | 89.50 | 97.02 | 90.97 | 92.87 | 97.22 | 91.94 | 92.51 | 94.02 |
| | Refrigerating rapacity | (relative to R22 %) | 100 | 89 | 68 | 85 | 77 | 67 | 81 | 81 | 77 |
| | Outlet temperature | ° C. | 149 | 99 | 119 | 103 | 104 | 118 | 104 | 107 | 111 |
| | Outlet pressure | (relative to R22 %) | 100 | 1121 | 87.5 | 107.5 | 97.5 | 84.9 | 102.5 | 102.5 | 97.5 |

| | Item | Unit | Comparative Example | Example 2-22 B' | Example 2-23 C' | Example 2-24 E' | Example 2-25 F' | Example 2-26 | Comparative Example 2-16 |
|---|---|---|---|---|---|---|---|---|---|
| Composition | R32 | mass % | R22 | 14.1 | 14.1 | 14.1 | 14.1 | 14.1 | 14.1 |
| | R125 | mass % | | 22.9 | 25.9 | 18.1 | 22.7 | 20.0 | 30.0 |
| | 1234yf | mass % | | 42.3 | 25.1 | 44.6 | 20.5 | 35.9 | 35.9 |
| | R134a | mass % | | 20.7 | 34.9 | 23.2 | 42.7 | 30.0 | 20.0 |
| | GWP | Year | 1810 | 1194 | 1500 | 1062 | 1500 | 1226 | 1433 |
| Performance | Coefficient of performance | (relative to R22 %) | 100 | 92.17 | 92.88 | 92.65 | 93.64 | 92.95 | 91.60 |
| | Refrigerating capacity | (relative to R22 %) | 100 | 80 | 80 | 78 | 78 | 78 | 83 |
| | Outlet temperature | ° C. | 149 | 104 | 108 | 104 | 110 | 106 | 104 |
| | Outlet pressure | (relative to R22 %) | 100 | 101.25 | 101.25 | 98.75 | 98.75 | 99.0 | 104.9 |

TABLE 5-4

| Item | | Unit | Comparative Example | Comparative Example 2-17 A | Comparative Example 2-18 D | Comparative Example 2-19 G' | Example 2-27 H' = E' | Comparative Example 2-20 I' | Example 2-28 B | Example 2-29 C | Example 2-30 E |
|---|---|---|---|---|---|---|---|---|---|---|---|
| Composition | R32 | mass % | R22 | 14.8 | 14.8 | 14.8 | 14.8 | 14.8 | 14.8 | 14.8 | 14.8 |
| | R125 | mass % | | 40.0 | 8.8 | 34.0 | 16.5 | 0.0 | 23.3 | 26.3 | 14.6 |
| | 1234yf | mass % | | 45.2 | 0.0 | 36.5 | 45.1 | 7.9 | 41.7 | 25.3 | 40.8 |
| | R134a | mass % | | 0.0 | 76.4 | 14.7 | 23.6 | 77.3 | 20.2 | 33.6 | 29.8 |
| | GWP | Year | 1810 | 1500 | 1500 | 1500 | 1017 | 1206 | 1206 | 1500 | 1039 |
| Performance | Coefficient of performance | (relative to R22 %) | 100 | 89.58 | 96.98 | 91.02 | 92.84 | 97.36 | 92.17 | 92.83 | 93.34 |
| | Refrigerating capacity | (relative to R22 %) | 100 | 90 | 69 | 86 | 78 | 67 | 81 | 81 | 77 |
| | Outlet temperature | ° C. | 149 | 100 | 120 | 103 | 105 | 119 | 105 | 109 | 107 |
| | Outlet pressure | (relative to R22 %) | 100 | 113.1 | 88.4 | 108.6 | 98.75 | 85.4 | 102.5 | 102.5 | 97.5 |

| Item | | Unit | Comparative Example | Example 2-31 F | Example 2-32 B' | Example 2-33 C' | Example 2-34 F' | Example 2-35 | Comparative Example 2-21 |
|---|---|---|---|---|---|---|---|---|---|
| Composition | R32 | mass % | R22 | 14.8 | 14.8 | 14.8 | 14.8 | 14.8 | 14.8 |
| | R125 | mass % | | 20.1 | 21.0 | 24.7 | 21.6 | 20.0 | 30.0 |
| | 1234yf | mass % | | 16.4 | 42.9 | 23.1 | 18.6 | 35.2 | 25.2 |
| | R134a | mass % | | 48.7 | 21.3 | 37.4 | 45.0 | 30.0 | 30.0 |
| | GWP | Year | 1810 | 1500 | 1141 | 1500 | 1500 | 1230 | 1580 |
| Performance | Coefficient of performance | (relative to R22 %) | 100 | 94.29 | 92.40 | 93.20 | 93.94 | 93.01 | 92.33 |
| | Refrigerating capacity | (relative to R22 %) | 100 | 77 | 80 | 80 | 78 | 79 | 83 |
| | Outlet temperature | ° C. | 149 | 113 | 105 | 110 | 112 | 107 | 108 |
| | Outlet pressure | (relative to R22 %) | 100 | 97.5 | 101.25 | 101.25 | 98.75 | 99.94 | 104.75 |

TABLE 5-5

| Item | | Unit | Comparative Example | Comparative Example 2-22 A | Comparative Example 2-23 D | Comparative Example 2-24 G' | Example 2-36 H' = B' | Comparative Example 2-25 I' | Example 2-37 B | Example 2-38 C | Example 2-39 E |
|---|---|---|---|---|---|---|---|---|---|---|---|
| Composition | R32 | mass % | R22 | 16.1 | 16.1 | 16.1 | 16.1 | 16.1 | 16.1 | 16.1 | 16.1 |
| | R125 | mass % | | 39.7 | 9.3 | 33.9 | 17.6 | 0.0 | 19.9 | 24.2 | 12.9 |
| | 1234yf | mass % | | 44.2 | 0.0 | 35.8 | 43.9 | 4.8 | 42.8 | 21.7 | 33.4 |
| | R134a | mass % | | 0.0 | 74.6 | 14.2 | 22.4 | 79.1 | 21.2 | 38.0 | 37.6 |
| | GWP | Year | 1810 | 1500 | 1500 | 1500 | 1047 | 1240 | 1110 | 1500 | 1099 |
| Performance | Coefficient of performance | (relative to R22 %) | 100 | 89.73 | 96.91 | 91.11 | 92.79 | 97.57 | 92.57 | 93.38 | 94.03 |
| | Refrigerating capacity | (relative to R22 %) | 100 | 92 | 71 | 88 | 81 | 68 | 82 | 81 | 78 |
| | Outlet temperature | ° C. | 149 | 101 | 121 | 105 | 106 | 121 | 106 | 111 | 110 |
| | Outlet pressure | (relative to R22 %) | 100 | 115.0 | 90.2 | 110.4 | 101.25 | 86.3 | 102.5 | 102.5 | 97.5 |

| Item | | Unit | Comparative Example | Example 2-40 F | Example 2-41 C' | Example 2-42 E' | Example 2-43 F' | Example 2-44 | Comparative Example 2-26 |
|---|---|---|---|---|---|---|---|---|---|
| Composition | R32 | mass % | R22 | 16.1 | 16.1 | 16.1 | 16.1 | 16.1 | 16.1 |
| | R125 | mass % | | 18.1 | 22.7 | 14.4 | 19.6 | 20.0 | 10.0 |
| | 1234yf | mass % | | 12.9 | 19.5 | 36.8 | 15.0 | 23.9 | 53.9 |
| | R134a | mass % | | 52.9 | 41.7 | 32.7 | 49.3 | 40.0 | 20.0 |
| | GWP | Year | 1810 | 1500 | 1500 | 1500 | 1500 | 1382 | 747 |
| Performance | Coefficient of performance | (relative to R22 %) | 100 | 94.81 | 93.74 | 94.47 | 94.47 | 93.78 | 93.14 |
| | Refrigerating capacity | (relative to R22 %) | 100 | 77 | 80 | 78 | 78 | 80 | 78 |

TABLE 5-5-continued

| | | | | | | | | | |
|---|---|---|---|---|---|---|---|---|---|
| | Outlet temperature | ° C. | 149 | 116 | 113 | 115 | 115 | 112 | 105 |
| | Outlet pressure | (relative to R22 %) | 100 | 97.5 | 101.25 | 98.75 | 98.75 | 100.3 | 97.8 |

TABLE 5-6

| | Item | Unit | Comparative Example | Comparative Example 2-27 A | Comparative Example 2-28 D | Comparative Example 2-29 G' | Example 2-45 H' = B | Comparative Example 2-30 I' | Example 2-46 C | Example 2-47 E | Example 2-48 F |
|---|---|---|---|---|---|---|---|---|---|---|---|
| Composition | R32 | mass % | R22 | 16.8 | 16.8 | 16.8 | 16.8 | 16.8 | 16.8 | 16.8 | 16.8 |
| | R125 | mass % | | 39.6 | 9.5 | 33.9 | 18.3 | 0.0 | 23.1 | 12.1 | 17.2 |
| | 1234yf | mass % | | 43.6 | 0.0 | 35.4 | 43.3 | 3.1 | 19.7 | 29.7 | 11.2 |
| | R134a | mass % | | 0.0 | 73.7 | 13.9 | 21.6 | 80.1 | 40.4 | 41.4 | 54.8 |
| | GWP | Year | 0 | 1810 | 1500 | 1500 | 1065 | 1259 | 1500 | 1130 | 1500 |
| Performance | Coefficient of performance | (relative to R22 %) | 100 | 89.80 | 96.87 | 91.15 | 92.75 | 97.69 | 93.68 | 94.37 | 95.05 |
| | Refrigerating capacity | (relative to R22 %) | 100 | 94 | 72 | 90 | 82 | 69 | 82 | 78 | 77 |
| | Outlet temperature | ° C. | 149 | 102 | 122 | 106 | 107 | 123 | 113 | 112 | 117 |
| | Outlet pressure | (relative to R22 %) | 100 | 116.0 | 91.1 | 111.4 | 102.5 | 86.8 | 102.5 | 97.5 | 97.5 |

| | Item | Unit | Comparative Example | Example 2-49 B' | Example 2-50 C' | Example 2-51 E' | Example 2-52 F' | Example 2-53 | Comparative Example 2-31 |
|---|---|---|---|---|---|---|---|---|---|
| Composition | R32 | mass % | R22 | 16.8 | 16.8 | 16.8 | 16.8 | 16.8 | 16.8 |
| | R125 | mass % | | 16.6 | 21.7 | 13.5 | 18.6 | 15.0 | 10.0 |
| | 1234yf | mass % | | 39.6 | 17.6 | 32.8 | 13.2 | 33.2 | 13.2 |
| | R134a | mass % | | 27.0 | 43.9 | 36.9 | 51.4 | 35.0 | 60.0 |
| | GWP | Year | R22 | 0 | 1500 | 1115 | 1500 | 1140 | 1322 |
| Performance | Coefficient of performance | (relative to R22 %) | 100 | 93.19 | 94.01 | 94.00 | 94.73 | 93.79 | 95.78 |
| | Refrigerating capacity | (relative to R22 %) | 100 | 81 | 81 | 79 | 78 | 80 | 74 |
| | Outlet temperature | ° C. | 149 | 108 | 114 | 111 | 116 | 111 | 118 |
| | Outlet pressure | (relative to R22 %) | 100 | 101.25 | 101.25 | 98.75 | 98.75 | 99.6 | 93.9 |

TABLE 5-7

| | Item | Unit | Comparative Example | Comparative Example 2-32 A | Comparative Example 2-33 D | Comparative Example 2-34 G' | Comparative Example 2-35 H' | Comparative Example 2-36 I' | Example 2-54 B | Example 2-55 C | Example 2-56 E |
|---|---|---|---|---|---|---|---|---|---|---|---|
| Composition | R32 | mass % | R22 | 18.1 | 18.1 | 18.1 | 18.1 | 18.1 | 18.1 | 18.1 | 18.1 |
| | R125 | mass % | | 39.3 | 10.0 | 33.9 | 19.4 | 0.0 | 16.4 | 21.3 | 10.7 |
| | 1234yf | mass % | | 42.6 | 0.0 | 34.7 | 42.1 | 0.0 | 35.6 | 16.4 | 23.2 |
| | R134a | mass % | | 0.0 | 71.9 | 13.3 | 20.4 | 81.9 | 29.9 | 44.2 | 48.0 |
| | GWP | Year | 1810 | 1500 | 1500 | 1500 | 1095 | 1293 | 1125 | 1500 | 1184 |
| Performance | Coefficient of performance | (relative to R22 %) | 100 | 89.94 | 96.80 | 91.22 | 92.71 | 97.91 | 93.48 | 94.15 | 94.97 |
| | Refrigerating capacity | (relative to R22 %) | 100 | 96 | 74 | 92 | 85 | 70 | 82 | 82 | 78 |
| | Outlet temperature | ° C. | 149 | 103 | 123 | 107 | 108 | 125 | 111 | 116 | 116 |
| | Outlet pressure | (relative to R22 %) | 100 | 117.8 | 92.8 | 113.3 | 105.0 | 87.6 | 102.5 | 102.5 | 97.5 |

TABLE 5-7-continued

| Item | | Unit | Comparative Example | Example 2-57 F | Example 2-58 B' | Example 2-59 C' | Example 2-60 E' | Example 2-61 F' | Example 2-62 | Comparative Example 2-37 |
|---|---|---|---|---|---|---|---|---|---|---|
| Composition | R32 | mass % | R22 | 18.1 | 18.1 | 18.1 | 18.1 | 18.1 | 18.1 | 18.1 |
| | R125 | mass % | | 15.4 | 15.0 | 19.8 | 12.1 | 16.9 | 15.0 | 20.0 |
| | 1234yf | mass % | | 7.9 | 32.6 | 14.3 | 26.3 | 10.1 | 45.0 | 30.0 |
| | R134a | mass % | | 58.6 | 34.3 | 47.8 | 43.5 | 54.9 | 21.9 | 31.9 |
| | GWP | Year | 1810 | 1500 | 1139 | 1500 | 1169 | 1500 | 1292 | 1252 |
| Performance | Coefficient of performance | (relative to R22 %) | 100 | 95.52 | 93.84 | 94.49 | 94.60 | 95.17 | 94.55 | 93.26 |
| | Refrigerating capacity | (relative to R22 %) | 100 | 78 | 81 | 81 | 79 | 79 | 80 | 84 |
| | Outlet temperature | ° C. | 149 | 120 | 112 | 117 | 115 | 119 | 115 | 111 |
| | Outlet pressure | (relative to R22 %) | 100 | 97.5 | 101.25 | 101.25 | 98.75 | 98.75 | 99.7 | 104.1 |

TABLE 5-8

| Item | | Unit | Comparative Example | Comparative Example 2-38 A | Comparative Example 2-39 D | Comparative Example 2-40 G' | Comparative Example 2-41 H' | Comparative Example 2-42 I' | Example 2-63 B | Example 2-64 C | Example 2-65 E |
|---|---|---|---|---|---|---|---|---|---|---|---|
| Composition | R32 | mass % | R22 | 18.7 | 18.7 | 18.7 | 18.7 | 18.7 | 18.7 | 18.7 | 18.7 |
| | R125 | mass % | | 39.2 | 10.2 | 33.9 | 20.0 | 0.6 | 15.7 | 20.5 | 10.1 |
| | 1234yf | mass % | | 42.1 | 0.0 | 34.4 | 41.6 | 0.0 | 32.4 | 15.0 | 20.6 |
| | R134a | mass % | | 0.0 | 71.1 | 13.0 | 19.6 | 80.7 | 33.2 | 45.8 | 50.6 |
| | GWP | Year | 0 | 0 | 1500 | 1500 | 1108 | 1301 | 1152 | 1500 | 1204 |
| Performance | Coefficient of performance | (relative to R22 %) | 100 | 90.00 | 96.76 | 91.25 | 92.66 | 97.83 | 93.77 | 94.35 | 95.22 |
| | Refrigerating capacity | (relative to R22 %) | 100 | 97 | 75 | 93 | 86 | 71 | 83 | 82 | 78 |
| | Outlet temperature | ° C. | 149 | 104 | 124 | 107 | 109 | 125 | 112 | 117 | 117 |
| | Outlet pressure | (relative to R22 %) | 100 | 118.6 | 93.6 | 114.1 | 106.2 | 88.5 | 102.5 | 102.6 | 97.5 |

| Item | | Unit | Comparative Example | Example 2-66 F | Example 2-67 B' | Example 2-68 C' | Example 2-69 E' | Example 2-70 F' | Example 2-71 | Comparative Example 2-43 |
|---|---|---|---|---|---|---|---|---|---|---|
| Composition | R32 | mass % | R22 | 18.7 | 18.7 | 18.7 | 18.7 | 18.7 | 18.7 | 18.7 |
| | R125 | mass % | | 14.7 | 14.3 | 19.0 | 11.5 | 16.1 | 15.0 | 25.0 |
| | 1234yf | mass % | | 6.6 | 29.4 | 12.8 | 23.5 | 8.6 | 16.3 | 6.3 |
| | R134a | mass % | | 60.0 | 37.6 | 49.5 | 46.3 | 56.6 | 50.0 | 50.0 |
| | GWP | Year | R22 | 0 | 1166 | 1500 | 1192 | 1500 | 1367 | 1301 |
| Performance | Coefficient of performance | (relative to R22 %) | 100 | 95.70 | 94.13 | 94.70 | 94.86 | 95.38 | 94.94 | 97.83 |
| | Refrigerating capacity | (relative to R22 %) | 100 | 78 | 81 | 81 | 79 | 79 | 80 | 71 |
| | Outlet temperature | ° C. | 149 | 121 | 114 | 118 | 116 | 120 | 118 | 125 |
| | Outlet pressure | (relative to R22 %) | 100 | 97.5 | 101.25 | 101.25 | 98.75 | 98.75 | 99.5 | 88.5 |

TABLE 5-9

| Item | | Unit | Comparative Example | Comparative Example 2-44 A | Comparative Example 2-45 D | Comparative Example 2-46 G' | Comparative Example 2-47 H' | Comparative Example 2-48 I' | Example 2-72 B | Example 2-73 C | Example 2-74 E |
|---|---|---|---|---|---|---|---|---|---|---|---|
| Composition | R32 | mass % | R22 | 20.0 | 20.0 | 20.0 | 20.0 | 20.0 | 20.0 | 20.0 | 20.0 |
| | R125 | mass % | | 38.9 | 10.7 | 33.8 | 21.2 | 1.8 | 14.4 | 18.8 | 9.0 |
| | 1234yf | mass % | | 41.1 | 0.0 | 33.7 | 40.4 | 0.0 | 26.2 | 11.8 | 15.0 |
| | R134a | mass % | | 0.0 | 69.3 | 12.5 | 18.4 | 78.2 | 39.4 | 49.4 | 56.0 |
| | GWP | Year | 0 | 0 | 1500 | 1500 | 1142 | 1316 | 1203 | 1500 | 1251 |

TABLE 5-9-continued

| | | | | | | | | | | | |
|---|---|---|---|---|---|---|---|---|---|---|---|
| Perfor-mance | Coefficient of performance | (relative to R22 %) | 100 | 90.13 | 96.68 | 91.33 | 92.60 | 97.67 | 94.33 | 94.80 | 95.73 |
| | Refrigerating capacity | (relative to R22 %) | 100 | 99 | 76 | 95 | 88 | 73 | 83 | 83 | 78 |
| | Outlet temperature | ° C. | 149 | 105 | 125 | 109 | 110 | 127 | 116 | 120 | 121 |
| | Outlet pressure | (relative to R22 %) | 100 | 120.3 | 95.4 | 115.9 | 108.6 | 90.6 | 102.5 | 102.5 | 97.5 |

| | Item | Unit | Compar-ative Example | Exam-ple 2-75 F | Exam-ple 2-76 B' | Exam-ple 2-77 C' | Exam-ple 2-78 E' | Exam-ple 2-79 F' | Exam-ple 2-80 | Compar-ative Example 2-49 |
|---|---|---|---|---|---|---|---|---|---|---|
| Compo-sition | R32 | mass % | R22 | 20.0 | 20.0 | 20.0 | 20.0 | 20.0 | 20.0 | 20.0 |
| | R125 | mass % | | 13.1 | 13.0 | 17.3 | 10.4 | 14.5 | 14.0 | 20.0 |
| | 1234yf | mass % | | 3.5 | 23.3 | 9.6 | 17.9 | 5.5 | 13.0 | 30.0 |
| | R134a | mass % | | 63.4 | 43.7 | 53.1 | 51.7 | 60.0 | 53.0 | 30.0 |
| | GWP | Year | R22 | 0 | 1216 | 1500 | 1239 | 1500 | 1383 | 1265 |
| Perfor-mance | Coefficient of performance | (relative to R22 %) | 100 | 96.12 | 94.69 | 95.15 | 95.36 | 95.80 | 95.29 | 93.39 |
| | Refrigerating capacity | (relative to R22 %) | 100 | 78 | 82 | 81 | 80 | 79 | 80 | 86 |
| | Outlet temperature | ° C. | 149 | 123 | 117 | 121 | 119 | 123 | 120 | 113 |
| | Outlet pressure | (relative to R22 %) | 100 | 97.5 | 101.25 | 101.25 | 98.75 | 98.75 | 99.9 | 106.4 |

TABLE 5-10

| | Item | Unit | Compar-ative Example | Compar-ative Example 2-50 A | Exam-ple 2-81 D = F | Compar-ative Example 2-51 G' | Compar-ative Example 2-52 H' | Compar-ative Example 2-53 I' | Exam-ple 2-82 B | Exam-ple 2-83 C | Exam-ple 2-84 E |
|---|---|---|---|---|---|---|---|---|---|---|---|
| Compo-sition | R32 | mass % | R22 | 21.6 | 21.6 | 21.6 | 21.6 | 21.6 | 21.6 | 21.6 | 21.6 |
| | R125 | mass % | | 38.6 | 11.3 | 33.8 | 22.5 | 3.5 | 13.0 | 16.8 | 7.8 |
| | 1234yf | mass % | | 39.8 | 0.0 | 32.9 | 38.9 | 0.0 | 19.3 | 8.0 | 8.8 |
| | R134a | mass % | | 0.0 | 67.1 | 11.7 | 17.0 | 74.9 | 46.1 | 53.6 | 61.8 |
| | GWP | Year | 1810 | 1500 | 1500 | 1500 | 1178 | 1339 | 1261 | 1500 | 1303 |
| Perfor-mance | Coefficient of performance | (relative to R22 %) | 100 | 90.28 | 96.59 | 91.40 | 92.54 | 97.45 | 94.95 | 95.31 | 96.30 |
| | Refrigerating capacity | (relative to R22 %) | 100 | 101 | 79 | 97 | 91 | 75 | 83 | 83 | 79 |
| | Outlet temperature | ° C. | 149 | 107 | 127 | 110 | 111 | 128 | 120 | 123 | 124 |
| | Outlet pressure | (relative to R22 %) | 100 | 122.4 | 97.5 | 118.1 | 111.4 | 93.2 | 102.5 | 102.5 | 97.5 |

| | Item | Unit | Compar-ative Example | Exam-ple 2-85 B' | Exam-ple 2-86 C' | Exam-ple 2-87 E' | Exam-ple 2-88 F' | Exam-ple 2-89 | Compar-ative Example 2-54 |
|---|---|---|---|---|---|---|---|---|---|
| Compo-sition | R32 | mass % | R22 | 21.6 | 21.6 | 21.6 | 21.6 | 21.6 | 21.6 |
| | R125 | mass % | | 11.7 | 15.4 | 9.1 | 12.7 | 15.0 | 15.0 |
| | 1234yf | mass % | | 16.9 | 6.0 | 11.4 | 2.0 | 8.4 | 33.4 |
| | R134a | mass % | | 49.8 | 57.0 | 57.9 | 63.7 | 55.0 | 30.0 |
| | GWP | Year | 1810 | 1268 | 1500 | 1293 | 1500 | 1458 | 1101 |
| Perfor-mance | Coefficient of performance | (relative to R22 %) | 100 | 95.27 | 101.01 | 95.96 | 96.27 | 95.50 | 93.80 |
| | Refrigerating capacity | (relative to R22 %) | 100 | 82 | 87 | 80 | 80 | 82 | 87 |
| | Outlet temperature | ° C. | 149 | 121 | 124 | 123 | 126 | 123 | 115 |
| | Outlet pressure | (relative to R22 %) | 100 | 101.25 | 101.25 | 98.75 | 98.75 | 101.5 | 106.0 |

TABLE 5-11

| | Item | Unit | Comparative Example | Comparative Example 2-55 A | Example 2-90 D = F' | Comparative Example 2-56 G' | Comparative Example 2-57 H' | Comparative Example 2-58 I' | Example 2-91 B | Example 2-92 C | Example 2-93 E |
|---|---|---|---|---|---|---|---|---|---|---|---|
| Composition | R32 | mass % | R22 | 22.6 | 22.6 | 22.6 | 22.6 | 22.6 | 22.6 | 22.6 | 22.6 |
| | R125 | mass % | | 38.4 | 11.6 | 33.8 | 23.3 | 4.6 | 12.2 | 15.6 | 7.2 |
| | 1234yf | mass % | | 39.0 | 0.0 | 32.3 | 38.0 | 0.0 | 15.4 | 5.8 | 5.3 |
| | R134a | mass % | | 0.0 | 65.8 | 11.3 | 16.1 | 72.8 | 49.8 | 56.0 | 64.9 |
| | GWP | Year | 1810 | 1500 | 1500 | 1500 | 1200 | 1355 | 1292 | 1500 | 1333 |
| Performance | Coefficient of performance | (relative to R22 %) | 100 | 90.37 | 96.54 | 91.45 | 92.49 | 97.31 | 95.30 | 95.61 | 96.61 |
| | Refrigerating capacity | (relative to R22 %) | 100 | 103 | 80 | 99 | 93 | 77 | 83 | 83 | 79 |
| | Outlet temperature | ° C. | 149 | 108 | 127 | 111 | 112 | 129 | 122 | 125 | 127 |
| | Outlet pressure | (relative to R22 %) | 100 | 123.6 | 98.75 | 119.4 | 113.2 | 94.9 | 102.5 | 102.5 | 97.5 |

| | Item | Unit | Comparative Example | Example 2-94 F | Example 2-95 B' | Example 2-96 C' | Example 2-97 E' | Example 2-98 | Comparative Example 2-59 |
|---|---|---|---|---|---|---|---|---|---|
| Composition | R32 | mass % | R22 | 22.6 | 22.6 | 22.6 | 22.6 | 22.6 | 22.6 |
| | R125 | mass % | | 9.4 | 11.0 | 14.3 | 8.4 | 12.5 | 20.0 |
| | 1234yf | mass % | | 0.0 | 13.0 | 3.9 | 7.7 | 4.9 | 7.4 |
| | R134a | mass % | | 68.0 | 53.4 | 59.2 | 61.3 | 60.0 | 50.0 |
| | GWP | Year | 1810 | 1454 | 1302 | 1500 | 1322 | 1448 | 1568 |
| Performance | Coefficient of performance | (relative to R22 %) | 100 | 96.78 | 95.61 | 95.91 | 101.57 | 96.04 | 94.96 |
| | Refrigerating capacity | (relative to R22 %) | 100 | 79 | 82 | 82 | 85 | 82 | 86 |
| | Outlet temperature | ° C. | 149 | 128 | 123 | 126 | 125 | 126 | 123 |
| | Outlet pressure | (relative to R22 %) | 100 | 97.5 | 101.3 | 101.25 | 98.75 | 100.4 | 105.5 |

TABLE 5-12

| | Item | Unit | Comparative Example | Comparative Example 2-60 A | Comparative Example 2-61 D | Comparative Example 2-62 G | Comparative Example 2-63 H' | Example 2-99 I' = E = F | Example 2-100 B | Example 2-101 C | Example 2-102 B' |
|---|---|---|---|---|---|---|---|---|---|---|---|
| Composition | R32 | mass % | R22 | 24.2 | 24.2 | 24.2 | 24.2 | 24.2 | 24.2 | 24.2 | 24.2 |
| | R125 | mass % | | 38.1 | 12.2 | 33.9 | 24.6 | 6.2 | 11.1 | 13.9 | 9.9 |
| | 1234yf | mass % | | 37.7 | 0.0 | 31.4 | 36.5 | 0.0 | 9.8 | 2.5 | 7.2 |
| | R134a | mass % | | 0.0 | 63.6 | 10.5 | 14.8 | 69.6 | 54.9 | 59.4 | 58.7 |
| | GWP | Year | 1810 | 1500 | 1500 | 1500 | 1237 | 1376 | 1337 | 1500 | 1350 |
| Performance | Coefficient of performance | (relative to R22 %) | 100 | 90.52 | 96.43 | 91.50 | 92.43 | 97.09 | 95.80 | 96.04 | 96.13 |
| | Refrigerating capacity | (relative to R22 %) | 100 | 105 | 82 | 101 | 96 | 79 | 84 | 84 | 83 |
| | Outlet temperature | ° C. | 149 | 109 | 129 | 113 | 114 | 130 | 126 | 128 | 127 |
| | Outlet pressure | (relative to R22 %) | 100 | 125.6 | 100.9 | 121.6 | 116.0 | 97.5 | 102.5 | 102.5 | 101.25 |

| | Item | Unit | Comparative Example | Example 2-103 C' | Example 2-104 E' | Example 2-105 F' | Example 2-106 | Comparative Example 2-64 |
|---|---|---|---|---|---|---|---|---|
| Composition | R32 | mass % | R22 | 24.2 | 24.2 | 24.2 | 24.2 | 24.2 |
| | R125 | mass % | | 12.6 | 7.4 | 8.5 | 10.0 | 25.0 |
| | 1234yf | mass % | | 0.6 | 2.4 | 0.0 | 0.8 | 30.8 |
| | R134a | mass % | | 62.6 | 66.0 | 67.3 | 65.0 | 20.0 |
| | GWP | Year | 1810 | 1500 | 1366 | 1423 | 1443 | 1326 |
| Performance | Coefficient of performance | (relative to R22 %) | 100 | 96.34 | 96.78 | 96.84 | 96.62 | 92.72 |

TABLE 5-12-continued

| | | | | | | | | |
|---|---|---|---|---|---|---|---|---|
| | Refrigerating capacity | (relative to R22 %) | 100 | 83 | 81 | 81 | 81 | 96 |
| | Outlet temperature | ° C. | 149 | 129 | 129 | 130 | 129 | 115 |
| | Outlet pressure | (relative to R22 %) | 100 | 101.25 | 98.75 | 98.75 | 99.8 | 115.4 |

TABLE 5-13

| | Item | Unit | Comparative Example | Comparative Example 2-65 A | Example 2-107 D = C' | Comparative Example 2-66 G' | Comparative Example 2-67 H' | Example 2-108 I' | Example 2-109 B | Example 2-110 C | Example 2-111 B' |
|---|---|---|---|---|---|---|---|---|---|---|---|
| Composition | R32 | mass % | R22 | 24.5 | 24.5 | 24.5 | 24.5 | 24.5 | 24.5 | 24.5 | 24.5 |
| | R125 | mass % | | 38.1 | 12.3 | 33.9 | 24.8 | 6.4 | 10.8 | 13.6 | 9.6 |
| | 1234yf | mass % | | 37.4 | 0.0 | 31.2 | 36.2 | 0.0 | 8.7 | 1.9 | 6.3 |
| | R134a | mass % | | 0.0 | 63.2 | 10.4 | 14.5 | 69.1 | 56.0 | 60.0 | 59.6 |
| | GWP | Year | 0 | 1500 | 1500 | 1500 | 1242 | 1378 | 1345 | 1500 | 1354 |
| Performance | Coefficient of performance | (relative to R22 %) | 100 | 90.54 | 96.42 | 91.52 | 92.42 | 97.06 | 95.91 | 96.12 | 96.23 |
| | Refrigerating capacity | (relative to R22 %) | 100 | 106 | 83 | 102 | 97 | 80 | 84 | 84 | 83 |
| | Outlet temperature | ° C. | 149 | 110 | 129 | 113 | 114 | 130 | 126 | 128 | 128 |
| | Outlet pressure | (relative to R22 %) | 100 | 126.0 | 101.25 | 122.0 | 116.5 | 97.9 | 102.5 | 102.5 | 101.25 |

| | Item | Unit | Comparative Example | Example 2-112 E' | Example 2-113 F' | Example 2-114 | Comparative Example 2-68 |
|---|---|---|---|---|---|---|---|
| Composition | R32 | mass % | R22 | 24.5 | 24.5 | 24.5 | 24.5 |
| | R125 | mass % | | 7.2 | 7.9 | 10.0 | 10.0 |
| | 1234yf | mass % | | 1.6 | 0.0 | 0.5 | 15.5 |
| | R134a | mass % | | 66.7 | 67.6 | 65.0 | 50.0 |
| | GWP | Year | R22 | 1371 | 1409 | 1445 | 1231 |
| Performance | Coefficient of performance | (relative to R22 %) | 100 | 96.85 | 96.90 | 96.63 | 95.52 |
| | Refrigerating capacity | (relative to R22 %) | 100 | 81 | 81 | 82 | 85 |
| | Outlet temperature | ° C. | 149 | 130 | 130 | 129 | 124 |
| | Outlet pressure | (relative to R22 %) | 100 | 98.75 | 98.75 | 100.1 | 103.4 |

TABLE 5-14

| | Item | Unit | Comparative Example | Comparative Example 2-69 A | Example 2-115 D | Comparative Example 2-70 G' | Comparative Example 2-71 H' | Example 2-116 I' = E' = F' | Example 2-117 B | Example 2-118 C | Example 2-119 B' |
|---|---|---|---|---|---|---|---|---|---|---|---|
| Composition | R32 | mass % | R22 | 25.1 | 25.1 | 25.1 | 25.1 | 25.1 | 25.1 | 25.1 | 25.1 |
| | R125 | mass % | | 38.0 | 12.5 | 33.9 | 25.2 | 7.1 | 10.5 | 13.0 | 9.3 |
| | 1234yf | mass % | | 36.9 | 0.0 | 30.9 | 35.6 | 0.0 | 6.6 | 0.7 | 4.3 |
| | R134a | mass % | | 0.0 | 62.4 | 10.1 | 14.1 | 67.8 | 57.8 | 61.2 | 61.3 |
| | GWP | Year | 1810 | 1500 | 1500 | 1500 | 1244 | 1381 | 1364 | 1500 | 1372 |
| Performance | Coefficient of performance | (relative to R22 %) | 100 | 90.59 | 96.38 | 91.54 | 92.48 | 97.01 | 96.09 | 96.27 | 96.40 |
| | Refrigerating capacity | (relative to R22 %) | 100 | 106 | 84 | 103 | 97 | 81 | 84 | 84 | 83 |
| | Outlet temperature | ° C. | 149 | 110 | 130 | 114 | 114 | 131 | 128 | 129 | 129 |
| | Outlet pressure | (relative to R22 %) | 100 | 126.3 | 102.0 | 122.8 | 116.7 | 98.75 | 102.5 | 102.5 | 101.25 |

TABLE 5-14-continued

| Item | | Unit | Comparative Example | Example 2-120 C' |
|---|---|---|---|---|
| Composition | R32 | mass % | R22 | 25.1 |
| | R125 | mass % | | 11.1 |
| | 1234yf | mass % | | 0.0 |
| | R134a | mass % | | 63.8 |
| GWP | | Year | 1810 | 1470 |
| Performance | Coefficient of performance | (relative to R22 %) | 100 | 96.54 |
| | Refrigerating capacity | (relative to R22 %) | 100 | 83 |
| | Outlet temperature | ° C. | 149 | 130 |
| | Outlet pressure | (relative to R22 %) | 100 | 101.25 |

TABLE 6-1

| Item | | Unit | Comparative Example | Comparative Example 3-1 A | Comparative Example 3-2 D | Example 3-1 G' = J = K | Comparative Example 3-3 H' | Comparative Example 3-4 I' | Comparative Example 3-5 Q | Comparative Example 3-6 R | Comparative Example 3-7 S |
|---|---|---|---|---|---|---|---|---|---|---|---|
| Composition | R32 | mass % | R404A | 11.6 | 11.6 | 11.6 | 11.6 | 11.6 | 11.6 | 11.6 | 11.6 |
| | R125 | mass % | | 40.6 | 7.6 | 34.0 | 13.4 | 00 | 0.0 | 10.6 | 18.9 |
| | 1234yf | mass % | | 47.8 | 0.0 | 38.3 | 48.2 | 16.5 | 9.8 | 4.3 | 45.6 |
| | R134a | mass % | | 0.0 | 80.8 | 16.1 | 26.8 | 71.9 | 78.6 | 73.5 | 23.9 |
| GWP | | Year | 3922 | 1500 | 1500 | 1500 | 932 | 1107 | 1203 | 1500 | 1083 |
| Performance | Coefficient of performance | (relative to R404A %) | 100 | 103.97 | 113.25 | 105.83 | 108.38 | 112.78 | 113.37 | 112.39 | 107.75 |
| | Refrigerating capacity | (relative to R404A %) | 100 | 89 | 68 | 85 | 76 | 68 | 67 | 70 | 78 |
| | Outlet temperature | ° C. | 93 | 96 | 117 | 100 | 102 | 113 | 115 | 115 | 101 |
| ASHRAE non-flammability | | — | Non-flammable | Flammable | Non-flammable | Non-flammable | Non-flammable | Non-flammable | Non-flammable | Non-flammable | Non-flammable |

| Item | | Unit | Comparative Example | Comparative Example 3-8 T |
|---|---|---|---|---|
| Composition | R32 | mass % | R404A | 11.6 |
| | R125 | mass % | | 27.1 |
| | 1234yf | mass % | | 28.3 |
| | R134a | mass % | | 33.0 |
| GWP | | Year | 3922 | 1500 |
| Performance | Coefficient of performance | (relative to R404A %) | 100 | 107.75 |
| | Refrigerating capacity | (relative to R404A %) | 100 | 81 |
| | Outlet temperature | ° C. | 93 | 105 |
| ASHRAE non-flammability | | — | Non-flammable | Non-flammable |

TABLE 6-2

| | Item | Unit | Comparative Example | Comparative Example 3-9 A | Comparative Example 3-10 D | Example 3-2 G' | Comparative Example 3-11 H' | Comparative Example 3-12 I' | Example 3-3 J | Example 3-4 K = T | Comparative Example 3-13 Q |
|---|---|---|---|---|---|---|---|---|---|---|---|
| Composition | R32 | mass % | R404A | 14.2 | 14.2 | 14.2 | 14.2 | 14.2 | 14.2 | 14.2 | 142 |
| | R125 | mass % | | 40.1 | 8.6 | 34.0 | 15.9 | 0.0 | 24.7 | 27.8 | 3.5 |
| | 1234yf | mass % | | 45.7 | 0.0 | 36.9 | 45.7 | 9.5 | 41.5 | 27.9 | 17.5 |
| | R134a | mass % | | 0.0 | 77.2 | 14.9 | 24.2 | 76.3 | 19.6 | 30.1 | 64.8 |
| | GWP | Year | 3922 | 1500 | 1500 | 1500 | 1000 | 1187 | 1242 | 1500 | 1146 |
| Performance | Coefficient of performance | (relative to R404A %) | 100 | 104.34 | 113.08 | 106.04 | 108.25 | 113.35 | 107.21 | 107.75 | 112.18 |
| | Refrigerating capacity | (relative to R404A %) | 100 | 94 | 72 | 90 | 81 | 70 | 85 | 85 | 72 |
| | Outlet temperature | ° C. | 93 | 99 | 119 | 103 | 104 | 118 | 104 | 107 | 115 |
| ASHRAE non-flammability | | — | Non-flammable | Flammable | Non-flammable | Non-flammable | Non-flammable | Non-flammable | Non-flammable | Non-flammable | Non-flammable |

| | Item | Unit | Comparative Example | Comparative Example 3-14 R | Comparative Example 3-15 S | Example 3-5 | Comparative Example 3-16 |
|---|---|---|---|---|---|---|---|
| Composition | R32 | mass % | R404A | 14.2 | 14.2 | 14.2 | 14.2 |
| | R125 | mass % | | 15.7 | 20.2 | 30.0 | 20.0 |
| | 1234yf | mass % | | 10.4 | 43.7 | 35.8 | 35.8 |
| | R134a | mass % | | 59.7 | 21.9 | 20.0 | 30.0 |
| | GWP | Year | 3922 | 1500 | 1118 | 1433 | 1226 |
| Performance | Coefficient of performance | (relative to R404A %) | 100 | 111.09 | 107.75 | 106.79 | 108.36 |
| | Refrigerating capacity | (relative to R404A %) | 100 | 77 | 83 | 87 | 82 |
| | Outlet temperature | ° C. | 93 | 115 | 104 | 104 | 106 |
| ASHRAE non-flammability | | — | Non-flammable | Non-flammable | Non-flammable | Non-flammable | Non-flammable |

TABLE 6-3

| | Item | Unit | Comparative Example | Comparative Example 3-17 A | Comparative Example 3-18 D | Example 3-6 G' = L = M | Comparative Example 3-19 H' | Comparative Example 3-20 I' | Example 3-7 J | Example 3-8 K | Comparative Example 3-21 Q |
|---|---|---|---|---|---|---|---|---|---|---|---|
| Composition | R32 | mass % | R404A | 14.5 | 14.5 | 14.5 | 14.5 | 14.5 | 14.5 | 14.5 | 14.5 |
| | R125 | mass % | | 40.0 | 8.7 | 34.0 | 16.2 | 0.0 | 23.6 | 26.9 | 4.2 |
| | 1234yf | mass % | | 45.5 | 0.0 | 36.7 | 45.5 | 8.7 | 41.8 | 26.5 | 18.2 |
| | R134a | mass % | | 0.0 | 76.8 | 14.8 | 23.9 | 76.8 | 20.1 | 32.1 | 63.1 |
| | GWP | Year | 3922 | 1500 | 1500 | 1500 | 1008 | 1196 | 1213 | 1500 | 1148 |
| Performance | Coefficient of performance | (relative to R404A %) | 100 | 104.38 | 113.06 | 106.07 | 108.23 | 113.41 | 107.37 | 108.01 | 112.03 |
| | Refrigerating capacity | (relative to R404A %) | 100 | 94 | 72 | 90 | 82 | 70 | 85 | 85 | 73 |
| | Outlet temperature | ° C. | 93 | 99 | 120 | 103 | 105 | 118 | 104 | 108 | 115 |
| ASHRAE non-flammability | | — | Non-flammable | Flammable | Non-flammable | Non-flammable | Non-flammable | Non-flammable | Non-flammable | Non-flammable | Non-flammable |

| | Item | Unit | Comparative Example | Comparative Example 3-22 R | Comparative Example 3-23 S | Example 3-9 T | Example 3-10 U | Example 3-11 | Comparative Example 3-24 |
|---|---|---|---|---|---|---|---|---|---|
| Composition | R32 | mass % | R404A | 14.5 | 14.5 | 14.5 | 14.5 | 14.5 | 14.5 |
| | R125 | mass % | | 16.2 | 20.4 | 27.9 | 25.6 | 27.0 | 20.0 |
| | 1234yf | mass % | | 11.0 | 43.4 | 27.8 | 32.6 | 28.5 | 45.5 |
| | R134a | mass % | | 58.3 | 21.7 | 29.8 | 27.3 | 30.0 | 20.0 |
| | GWP | Year | 3922 | 1500 | 1124 | 1500 | 1386 | 1473 | 1435 |

TABLE 6-3-continued

| | | | | | | | | | |
|---|---|---|---|---|---|---|---|---|---|
| Perfor-mance | Coefficient of performance | (relative to R404A %) | 100 | 110.96 | 107.75 | 107.75 | 107.74 | 107.84 | 106.82 |
| | Refrigerating capacity | (relative to R404A %) | 100 | 77 | 83 | 66 | 85 | 85 | 88 |
| | Outlet temperature | ° C. | 93 | 115 | 104 | 107 | 106 | 107 | 104 |
| | ASHRAE non-flammability | — | Non-flam-mable | Non-flam-mable | Non-flam-mable | Non-flam-mable | Non-flam-mable | Non-flam-mable | Non-flam-mable |

TABLE 6-4

| | Item | Unit | Compar-ative Example | Compar-ative Example 3-25 A | Compar-ative Example 3-26 D | Exam-ple 3-12 G' | Compar-ative Example 3-27 H' | Compar-ative Example 3-28 I' | Exam-ple 3-13 J = S | Exam-ple 3-14 K | Exam-ple 3-15 L |
|---|---|---|---|---|---|---|---|---|---|---|---|
| Compo-sition | R32 | mass % | R404A | 15.3 | 15.3 | 15.3 | 15.3 | 15.3 | 15.3 | 15.3 | 15.3 |
| | R125 | mass % | | 39.9 | 9.0 | 34.0 | 16.9 | 0.0 | 20.9 | 25.3 | 31.3 |
| | 1234yf | mass % | | 44.8 | 0.0 | 36.2 | 44.7 | 6.7 | 42.7 | 23.7 | 37.6 |
| | R134a | mass % | | 0.0 | 75.7 | 14.5 | 23.1 | 78.0 | 21.1 | 35.7 | 15.8 |
| | GWP | Year | 3922 | 1500 | 1500 | 1500 | 1027 | 1219 | 1138 | 1500 | 1426 |
| Perfor-mance | Coefficient of performance | (relative to R404A %) | 100 | 104.48 | 113.01 | 106.13 | 108.19 | 113.58 | 107.75 | 108.51 | 106.47 |
| | Refrigerating capacity | (relative to R404A %) | 100 | 96 | 73 | 91 | 83 | 71 | 85 | 85 | 90 |
| | Outlet temperature | ° C. | 93 | 100 | 121 | 104 | 106 | 120 | 105 | 110 | 104 |
| | ASHRAE non-flammability | — | Non-flam-mable | Flam-mable | Non-flam-mable | Non-flam-mable | Non-flam-mable | Non-flam-mable | Non-flam-mable | Non-flam-mable | Non-flam-mable |

| | Item | Unit | Compar-ative Example | Exam-ple 3-16 M | Compar-ative Example 3-29 Q | Compar-ative Example 3-30 R | Exam-ple 3-17 T |
|---|---|---|---|---|---|---|---|
| Compo-sition | R32 | mass % | R404A | 15.3 | 15.3 | 15.3 | 15.3 |
| | R125 | mass % | | 32.1 | 5.8 | 17.7 | 28.1 |
| | 1234yf | mass % | | 33.6 | 19.7 | 12.6 | 27.7 |
| | R134a | mass % | | 19.0 | 59.2 | 54.4 | 28.9 |
| | GWP | Year | 3922 | 1500 | 1154 | 1500 | 1500 |
| Perfor-mance | Coefficient of performance | (relative to R404A %) | 100 | 106.64 | 111.68 | 110.59 | 107.75 |
| | Refrigerating capacity | (relative to R404A %) | 100 | 90 | 75 | 80 | 87 |
| | Outlet temperature | ° C. | 93 | 105 | 115 | 115 | 108 |
| | ASHRAE non-flammability | — | Non-flam-mable | Non-flam-mable | Non-flam-mable | Non-flam-mable | Non-flam-mable |

TABLE 6-5

| | Item | Unit | Compar-ative Example | Compar-ative Example 3-31 A | Compar-ative Example 3-32 D | Exam-ple 3-18 G' | Exam-ple 3-19 H' = J | Compar-ative Example 3-33 I' | Exam-ple 3-20 K | Exam-ple 3-21 L | Exam-ple 3-22 M |
|---|---|---|---|---|---|---|---|---|---|---|---|
| Compo-sition | R32 | mass % | R404A | 16.2 | 16.2 | 16.2 | 16.2 | 16.2 | 16.2 | 16.2 | 16.2 |
| | R125 | mass % | | 39.7 | 9.3 | 33.9 | 17.7 | 0.0 | 23.5 | 28.3 | 30.1 |
| | 1234yf | mass % | | 44.1 | 0.0 | 35.8 | 43.8 | 4.6 | 20.6 | 38.6 | 30.2 |
| | R134a | mass % | | 0.0 | 74.5 | 14.1 | 22.3 | 79.2 | 39.7 | 16.9 | 23.5 |
| | GWP | Year | 3922 | 1500 | 1500 | 1500 | 1049 | 1242 | 1500 | 1343 | 1500 |
| Perfor-mance | Coefficient of performance | (relative to R404A %) | 100 | 104.60 | 112.95 | 106.20 | 108.16 | 113.75 | 109.05 | 106.91 | 107.25 |
| | Refrigerating capacity | (relative to R404A %) | 100 | 97 | 75 | 93 | 85 | 72 | 85 | 90 | 90 |

TABLE 6-5-continued

| | | | | | | | | | | |
|---|---|---|---|---|---|---|---|---|---|---|
| Outlet temperature | ° C. | 93 | 101 | 121 | 105 | 106 | 121 | 112 | 105 | 108 |
| ASHRAE non-flammability | — | Non-flam-mable | Flam-mable | Non-flam-mable | Non-flam-mable | Non-flam-mable | Non-flam-mable | Non-flam-mable | Non-flam-mable | Non-flam-mable |

| Item | | Unit | Compar-ative Example | Compar-ative Example 3-34 Q | Compar-ative Example 3-35 R | Exam-ple 3-23 S | Exam-ple 3-24 T | Exam-ple 3-25 | Compar-ative Example 3-36 |
|---|---|---|---|---|---|---|---|---|---|
| Compo-sition | R32 | mass % | R404A | 16.2 | 16.2 | 16.2 | 16.2 | 16.2 | 16.2 |
| | R125 | mass % | | 7.7 | 19.2 | 21.2 | 28.2 | 25.0 | 10.0 |
| | 1234yf | mass % | | 21.7 | 14.4 | 42.1 | 27.4 | 28.8 | 13.8 |
| | R134a | mass % | | 54.4 | 50.2 | 20.5 | 28.2 | 30.0 | 60.0 |
| | GWP | Year | 3922 | 1158 | 1500 | 1146 | 1500 | 1415 | 1318 |
| Perfor-mance | Coefficient of performance | (relative to R404A %) | 100 | 111.25 | 110.22 | 107.75 | 107.75 | 108.16 | 111.59 |
| | Refrigerating capacity | (relative to R404A %) | 100 | 77 | 82 | 87 | 89 | 87 | 77 |
| | Outlet temperature | ° C. | 93 | 115 | 115 | 106 | 109 | 109 | 117 |
| | ASHRAE non-flammability | — | Non-flam-mable | Non-flam-mable | Non-flam-mable | Non-flam-mable | Non-flam-mable | Non-flam-mable | Non-flam-mable |

TABLE 6-6

| Item | | Unit | Compar-ative Example | Compar-ative Example 3-37 A | Compar-ative Example 3-38 D | Exam-ple 3-26 G' | Exam-ple 3-27 H' | Compar-ative Example 3-39 I' | Exam-ple 3-28 J | Exam-ple 3-29 K | Exam-ple 3-30 L |
|---|---|---|---|---|---|---|---|---|---|---|---|
| Compo-sition | R32 | mass % | R404A | 17.0 | 17.0 | 17.0 | 17.0 | 17.0 | 17.0 | 17.0 | 17.0 |
| | R125 | mass % | | 39.5 | 9.6 | 33.9 | 18.4 | 0.0 | 16.4 | 22.0 | 25.6 |
| | 1234yf | mass % | | 43.5 | 0.0 | 35.3 | 43.1 | 2.6 | 38.7 | 18.1 | 39.5 |
| | R134a | mass % | | 0.0 | 73.4 | 13.8 | 21.5 | 80.4 | 27.9 | 42.9 | 17.9 |
| | GWP | Year | 3922 | 1500 | 1500 | 1500 | 1068 | 1265 | 1089 | 1500 | 1268 |
| Perfor-mance | Coefficient of performance | (relative to R404A %) | 100 | 104.70 | 112.90 | 106.26 | 108.12 | 113.91 | 108.72 | 109.49 | 107.29 |
| | Refrigerating capacity | (relative to R404A %) | 100 | 98 | 76 | 94 | 87 | 72 | 85 | 85 | 90 |
| | Outlet temperature | ° C. | 93 | 102 | 122 | 106 | 107 | 123 | 109 | 114 | 107 |
| | ASHRAE non-flammability | — | Non-flam-mable | Flam-mable | Non-flam-mable | Non-flam-mable | Non-flam-mable | Non-flam-mable | Non-flam-mable | Non-flam-mable | Non-flam-mable |

| Item | | Unit | Compar-ative Example | Exam-ple 3-31 M = T | Compar-ative Example 3-40 Q | Compar-ative Example 3-41 R | Exam-ple 3-32 S |
|---|---|---|---|---|---|---|---|
| Compo-sition | R32 | mass % | | 17.0 | 17.0 | 17.0 | 17.0 |
| | R125 | mass % | R404A | 28.3 | 9.4 | 20.5 | 21.6 |
| | 1234yf | mass % | | 27.2 | 23.3 | 15.8 | 41.5 |
| | R134a | mass % | | 27.5 | 50.3 | 46.7 | 19.9 |
| | GWP | Year | 3922 | 1500 | 1164 | 1500 | 1157 |
| Perfor-mance | Coefficient of performance | (relative to R404A %) | 100 | 107.78 | 110.88 | 109.90 | 107.75 |
| | Refrigerating capacity | (relative to R404A %) | 100 | 90 | 80 | 84 | 88 |
| | Outlet temperature | ° C. | 93 | 110 | 115 | 115 | 107 |
| | ASHRAE non-flammability | — | Non-flam-mable | Non-flam-mable | Non-flam-mable | Non-flam-mable | Non-flam-mable |

TABLE 6-7

| | Item | Unit | Comparative Example | Comparative Example 3-42 A | Comparative Example 3-43 D | Example 3-33 G' = O = P | Example 3-34 H' | Comparative Example 3-44 I' | Example 3-35 J | Example 3-36 K = R | Example 3-37 L |
|---|---|---|---|---|---|---|---|---|---|---|---|
| Composition | R32 | mass % | R404A | 17.5 | 17.5 | 17.5 | 17.5 | 17.5 | 17.5 | 17.5 | 17.5 |
| | R125 | mass % | | 39.4 | 9.8 | 33.9 | 18.9 | 0.0 | 15.6 | 21.1 | 23.9 |
| | 1234yf | mass % | | 43.1 | 0.0 | 35.0 | 42.6 | 1.4 | 35.5 | 16.5 | 40.1 |
| | R134a | mass % | | 0.0 | 72.7 | 13.6 | 21.0 | 81.1 | 31.4 | 44.9 | 18.5 |
| | GWP | Year | 3922 | 1500 | 1500 | 1500 | 1082 | 1278 | 1115 | 1500 | 1221 |
| Performance | Coefficient of performance | (relative to R404A %) | 100 | 104.77 | 112.86 | 106.29 | 108.09 | 114.01 | 109.07 | 109.76 | 107.52 |
| | Refrigerating capacity | (relative to R404A %) | 100 | 99 | 77 | 95 | 88 | 73 | 85 | 85 | 90 |
| | Outlet temperature | ° C. | 93 | 103 | 123 | 106 | 108 | 124 | 110 | 115 | 107 |
| ASHRAE non-flammability | | — | Non-flammable | Flammable | Non-flammable | Non-flammable | Non-flammable | Non-flammable | Non-flammable | Non-flammable | Non-flammable |

| | Item | Unit | Comparative Example | Example 3-38 M | Comparative Example 3-45 Q | Example 3-39 S | Example 3-40 T | Example 3-41 V |
|---|---|---|---|---|---|---|---|---|
| Composition | R32 | mass % | | 17.5 | 17.5 | 17.5 | 17.5 | 17.5 |
| | R125 | mass % | R404A | 27.5 | 10.4 | 22.0 | 28.5 | 25.6 |
| | 1234yf | mass % | | 25.8 | 24.2 | 41.1 | 27.2 | 33.4 |
| | R134a | mass % | | 29.2 | 47.9 | 19.4 | 26.8 | 23.5 |
| | GWP | Year | 3922 | 1500 | 1168 | 1167 | 1500 | 1352 |
| Performance | Coefficient of performance | (relative to R404A %) | 100 | 108.03 | 110.67 | 107.75 | 107.75 | 107.75 |
| | Refrigerating capacity | (relative to R404A %) | 100 | 90 | 81 | 89 | 91 | 90 |
| | Outlet temperature | ° C. | 93 | 111 | 115 | 107 | 110 | 109 |
| ASHRAE non-flammability | | — | Non-flammable | Non-flammable | Non-flammable | Non-flammable | Non-flammable | Non-flammable |

TABLE 6-8

| | Item | Unit | Comparative Example | Comparative Example 3-46 A | Comparative Example 3-47 D | Example 3-42 G' | Example 3-43 H' | Comparative Example 3-48 I' | Example 3-44 J | Comparative Example 3-49 K | Example 3-45 L = S |
|---|---|---|---|---|---|---|---|---|---|---|---|
| Composition | R32 | mass % | R404A | 18.0 | 18.0 | 18.0 | 18.0 | 18.0 | 18.0 | 18.0 | 18.0 |
| | R125 | mass % | | 39.3 | 10.0 | 33.9 | 19.3 | 0.0 | 14.8 | 20.2 | 22.2 |
| | 1234yf | mass % | | 42.7 | 0.0 | 34.8 | 42.2 | 0.2 | 32.5 | 14.9 | 40.8 |
| | R134a | mass % | | 0.0 | 72.0 | 13.4 | 20.5 | 81.8 | 34.7 | 46.9 | 19.0 |
| | GWP | Year | 3922 | 1500 | 1500 | 1500 | 1092 | 1291 | 1137 | 1500 | 1172 |
| Performance | Coefficient of performance | (relative to R404A %) | 100 | 104.83 | 112.83 | 106.33 | 108.07 | 114.11 | 109.41 | 110.03 | 107.73 |
| | Refrigerating capacity | (relative to R404A %) | 100 | 100 | 77 | 96 | 89 | 73 | 85 | 85 | 90 |
| | Outlet temperature | ° C. | 93 | 103 | 123 | 107 | 108 | 125 | 112 | 116 | 108 |
| ASHRAE non-flammability | | — | Non-flammable | Flammable | Non-flammable | Non-flammable | Non-flammable | Non-flammable | Non-flammable | Non-flammable | Non-flammable |

| | Item | Unit | Comparative Example | Example 3-46 M | Example 3-47 O | Example 3-48 P | Comparative Example 3-50 Q | Example 3-49 R | Example 3-50 T | Example 3-51 X | Example 3-52 |
|---|---|---|---|---|---|---|---|---|---|---|---|
| Composition | R32 | mass % | R404A | 18.0 | 18.0 | 18.0 | 18.0 | 18.0 | 18.0 | 18.0 | 18.0 |
| | R125 | mass % | | 26.6 | 32.2 | 32.8 | 11.4 | 22.2 | 28.7 | 18.6 | 20.0 |
| | 1234yf | mass % | | 24.1 | 35.7 | 33.2 | 25.1 | 17.8 | 27.1 | 43.3 | 32.0 |
| | R134a | mass % | | 31.3 | 14.1 | 16.0 | 45.5 | 42.1 | 26.2 | 20.0 | 30.0 |
| | GWP | Year | 3922 | 1500 | 1452 | 1500 | 1172 | 1500 | 1500 | 1394 | 1252 |

TABLE 6-8-continued

| | | | | | | | | | | | |
|---|---|---|---|---|---|---|---|---|---|---|---|
| Performance | Coefficient of performance | (relative to R404A %) | 100 | 108.30 | 106.53 | 106.62 | 110.46 | 109.49 | 107.75 | 109.84 | 108.70 |
| | Refrigerating capacity | (relative to R404A %) | 100 | 90 | 95 | 95 | 82 | 87 | 92 | 85 | 88 |
| | Outlet temperature | ° C. | 93 | 112 | 107 | 107 | 115 | 115 | 110 | 115 | 111 |
| ASHRAE non-flammability | | — | Non-flammable | Non-flammable | Non-flammable | Non-flammable | Non-flammable | Non-flammable | Non-flammable | Non-flammable | Non-flammable |

| Item | | Unit | Comparative Example | Comparative Example 3-51 |
|---|---|---|---|---|
| Composition | R32 | mass % | R404A | 18.0 |
| | R125 | mass % | | 10.0 |
| | 1234yf | mass % | | 52.0 |
| | R134a | mass % | | 20.0 |
| GWP | | Year | 3922 | 760 |
| Performance | Coefficient of performance | (relative to R404A %) | 100 | 108.72 |
| | Refrigerating capacity | (relative to R404A %) | 100 | 85 |
| | Outlet temperature | ° C. | 93 | 107 |
| ASHRAE non-flammability | | — | Non-flammable | Flammable |

TABLE 6-9

| Item | | Unit | Comparative Example | Comparative Example 3-52 A | Comparative Example 3-53 D | Example 3-53 G' | Example 3-54 H' = L | Comparative Example 3-54 I' | Example 3-55 J | Comparative Example 3-55 K | Example 3-56 M |
|---|---|---|---|---|---|---|---|---|---|---|---|
| Composition | R32 | mass % | R404A | 18.7 | 18.7 | 18.7 | 18.7 | 18.7 | 18.7 | 18.7 | 18.7 |
| | R125 | mass % | | 39.2 | 10.2 | 33.9 | 20.0 | 0.6 | 13.9 | 19.0 | 25.3 |
| | 1234yf | mass % | | 42.1 | 0.0 | 34.4 | 41.6 | 0.0 | 28.6 | 12.8 | 21.9 |
| | R134a | mass % | | 0.0 | 71.1 | 13.0 | 19.7 | 80.7 | 38.8 | 49.5 | 34.1 |
| GWP | | Year | 3922 | 1500 | 1500 | 1500 | 1110 | 1301 | 1169 | 1500 | 1500 |
| Performance | Coefficient of performance | (relative to R404A %) | 100 | 104.90 | 112.79 | 106.37 | 108.02 | 114.04 | 109.87 | 110.39 | 108.69 |
| | Refrigerating capacity | (relative to R404A %) | 100 | 101 | 78 | 97 | 90 | 74 | 85 | 85 | 90 |
| | Outlet temperature | ° C. | 93 | 104 | 124 | 107 | 109 | 125 | 114 | 118 | 114 |
| ASHRAE non-flammability | | — | Non-flammable | Flammable | Non-flammable | Non-flammable | Non-flammable | Non-flammable | Non-flammable | Non-flammable | Non-flammable |

| Item | | Unit | Comparative Example | Example 3-57 O | Example 3-58 P | Comparative Example 3-56 Q | Example 3-59 R | Example 3-60 S | Example 3-61 T | Example 3-62 X |
|---|---|---|---|---|---|---|---|---|---|---|
| Composition | R32 | mass % | R404A | 18.7 | 18.7 | 18.7 | 18.7 | 18.7 | 18.7 | 18.7 |
| | R125 | mass % | | 30.0 | 31.4 | 12.8 | 23.3 | 22.4 | 28.9 | 15.0 |
| | 1234yf | mass % | | 36.4 | 30.7 | 26.2 | 19.0 | 40.4 | 26.9 | 24.7 |
| | R134a | mass % | | 14.9 | 19.2 | 42.3 | 39.0 | 18.5 | 25.5 | 41.6 |
| GWP | | Year | 3922 | 1391 | 1500 | 1180 | 1500 | 1176 | 1500 | 1247 |
| Performance | Coefficient of performance | (relative to R404A %) | 100 | 106.85 | 107.05 | 110.17 | 109.23 | 107.75 | 107.75 | 109.98 |
| | Refrigerating capacity | (relative to R404A %) | 100 | 95 | 95 | 84 | 88 | 91 | 93 | 85 |
| | Outlet temperature | ° C. | 93 | 108 | 109 | 115 | 115 | 109 | 111 | 115 |
| ASHRAE non-flammability | | — | Non-flammable | Non-flammable | Non-flammable | Non-flammable | Non-flammable | Non-flammable | Non-flammable | Non-flammable |

TABLE 6-10

| | Item | Unit | Comparative Example | Comparative Example 3-57 A | Comparative Example 3-58 D | Example 3-63 G' | Example 3-64 H' | Comparative Example 3-59 I' | Example 3-65 J = Q | Comparative Example 3-60 K | Example 3-66 L |
|---|---|---|---|---|---|---|---|---|---|---|---|
| Composition | R32 | mass % | R404A | 19.0 | 19.0 | 19.0 | 19.0 | 19.0 | 19.0 | 19.0 | 19.0 |
| | R125 | mass % | | 39.1 | 10.3 | 33.8 | 20.3 | 0.8 | 13.4 | 18.5 | 19.5 |
| | 1234yf | mass % | | 41.9 | 0.0 | 34.3 | 41.3 | 0.0 | 26.7 | 11.9 | 39.7 |
| | R134a | mass % | | 0.0 | 70.7 | 12.9 | 19.4 | 80.2 | 40.9 | 50.6 | 21.8 |
| | GWP | Year | 3922 | 1500 | 1500 | 1500 | 1118 | 1303 | 1183 | 1500 | 1124 |
| Performance | Coefficient of performance | (relative to R404A %) | 100 | 104.94 | 112.77 | 106.40 | 108.00 | 114.00 | 110.05 | 110.54 | 108.23 |
| | Refrigerating capacity | (relative to R404A %) | 100 | 102 | 79 | 98 | 91 | 75 | 85 | 85 | 90 |
| | Outlet temperature | ° C. | 93 | 104 | 124 | 108 | 109 | 126 | 115 | 119 | 110 |
| | ASHRAE non-flammability | | Non-flammable | Flammable | Non-flammable | Non-flammable | Non-flammable | Non-flammable | Non-flammable | Non-flammable | Non-flammable |

| | Item | Unit | Comparative Example | Example 3-67 M | Example 368 O | Comparative Example 3-61 P | Example 3-69 R | Example 3-70 S | Example 3-71 T |
|---|---|---|---|---|---|---|---|---|---|
| Composition | R32 | mass % | R404A | 19.0 | 19.0 | 19.0 | 19.0 | 19.0 | 19.0 |
| | R125 | mass % | | 24.7 | 29.1 | 30.8 | 23.7 | 22.4 | 28.8 |
| | 1234yf | mass % | | 21.0 | 36.8 | 29.7 | 19.5 | 40.3 | 26.9 |
| | R134a | mass % | | 35.3 | 15.1 | 20.5 | 37.8 | 18.3 | 25.3 |
| | GWP | Year | 3922 | 1500 | 1364 | 1500 | 1500 | 1176 | 1500 |
| Performance | Coefficient of performance | (relative to R404A %) | 100 | 108.86 | 106.97 | 107.22 | 109.13 | 107.75 | 107.75 |
| | Refrigerating capacity | (relative to R404A %) | 100 | 90 | 95 | 95 | 89 | 92 | 93 |
| | Outlet temperature | ° C. | 93 | 114 | 108 | 110 | 115 | 109 | 111 |
| | ASHRAE non-flammability | — | Non-flammable | Non-flammable | Non-flammable | Non-flammable | Non-flammable | Non-flammable | Non-flammable |

TABLE 6-11

| | Item | Unit | Comparative Example | Comparative Example 3-62 A | Comparative Example 3-63 D | Example 3-72 G' | Example 3-73 H' | Comparative Example 3-64 I' | Example 3-74 L | Example 3-75 M = R | Example 3-76 O |
|---|---|---|---|---|---|---|---|---|---|---|---|
| Composition | R32 | mass % | R404A | 19.3 | 19.3 | 19.3 | 19.3 | 19.3 | 19.3 | 19.3 | 19.3 |
| | R125 | mass % | | 39.0 | 10.4 | 33.9 | 20.6 | 1.1 | 19.0 | 24.2 | 28.1 |
| | 1234yf | mass % | | 41.7 | 0.0 | 34.1 | 41.0 | 0.0 | 37.8 | 20.0 | 37.1 |
| | R134a | mass % | | 0.0 | 70.3 | 12.7 | 19.1 | 79.6 | 23.9 | 36.5 | 15.5 |
| | GWP | Year | 3922 | 1500 | 1500 | 1500 | 1126 | 1307 | 1139 | 1500 | 1337 |
| Performance | Coefficient of performance | (relative to R404A %) | 100 | 104.98 | 112.75 | 106.40 | 107.98 | 113.96 | 108.44 | 109.01 | 107.11 |
| | Refrigerating capacity | (relative to R404A %) | 100 | 102 | 79 | 98 | 91 | 75 | 90 | 90 | 95 |
| | Outlet temperature | ° C. | 93 | 104 | 124 | 108 | 109 | 126 | 111 | 115 | 109 |
| | ASHRAE non-flammability | — | Non-flammable | Flammable | Non-flammable | Non-flammable | Non-flammable | Non-flammable | Non-flammable | Non-flammable | Non-flammable |

| | Item | Unit | Comparative Example | Example 3-77 P | Example 3-78 Q | Example 3-79 S | Example 3-80 T |
|---|---|---|---|---|---|---|---|
| Composition | R32 | mass % | R404A | 19.3 | 19.3 | 19.3 | 19.3 |
| | R125 | mass % | | 30.2 | 14.0 | 22.5 | 28.8 |
| | 1234yf | mass % | | 28.7 | 27.2 | 40.1 | 26.8 |
| | R134a | mass % | | 21.8 | 39.5 | 18.1 | 25.1 |
| | GWP | Year | 3922 | 1500 | 1186 | 1178 | 1500 |

TABLE 6-11-continued

| | | | | | | | |
|---|---|---|---|---|---|---|---|
| Perfor-mance | Coefficient of performance | (relative to R404A %) | 100 | 107.40 | 109.93 | 107.75 | 107.75 |
| | Refrigerating capacity | (relative to R404A %) | 100 | 95 | 86 | 92 | 94 |
| | Outlet temperature | ° C. | 93 | 111 | 115 | 109 | 112 |
| ASHRAE non-flammability | | — | Non-flam-mable | Non-flam-mable | Non-flam-mable | Non-flam-mable | Non-flam-mable |

TABLE 6-12

| Item | | Unit | Compar-ative Example | Compar-ative Example 3-65 A | Compar-ative Example 3-66 D | Exam-ple 3-81 G' | Exam-ple 3-82 H' | Compar-ative Example 3-67 I' | Exam-ple 3-83 L | Compar-ative Example 3-68 M | Exam-ple 3-84 O |
|---|---|---|---|---|---|---|---|---|---|---|---|
| Compo-sition | R32 | mass % | R404A | 20.0 | 20.0 | 20.0 | 20.0 | 20.0 | 20.0 | 20.0 | 20.0 |
| | R125 | mass % | | 38.9 | 10.7 | 33.8 | 21.2 | 1.8 | 18.0 | 23.0 | 25.9 |
| | 1234yf | mass % | | 41.1 | 0.0 | 33.7 | 40.4 | 0.0 | 33.9 | 17.9 | 37.9 |
| | R134a | mass % | | 0.0 | 69.3 | 12.5 | 18.4 | 78.2 | 28.1 | 39.1 | 16.2 |
| GWP | | Year | 3922 | 1500 | 1500 | 1500 | 1142 | 1316 | 1168 | 1500 | 1275 |
| Perfor-mance | Coefficient of performance | (relative to R404A %) | 100 | 105.06 | 112.70 | 106.46 | 107.94 | 113.85 | 108.87 | 109.37 | 107.41 |
| | Refrigerating capacity | (relative to R404A %) | 100 | 103 | 80 | 99 | 93 | 76 | 90 | 90 | 95 |
| | Outlet temperature | ° C. | 93 | 105 | 125 | 109 | 110 | 127 | 113 | 117 | 110 |
| ASHRAE non-flammability | | — | Non-flam-mable | Flam-mable | Non-flam-mable | Non-flam-mable | Non-flam-mable | Non-flam-mable | Non-flam-mable | Non-flam-mable | Non-flam-mable |

| Item | | Unit | Compar-ative Example | Exam-ple 3-85 P = T | Exam-ple 3-86 Q | Exam-ple 3-87 R | Exam-ple 3-88 S | Exam-ple 3-89 Y |
|---|---|---|---|---|---|---|---|---|
| Compo-sition | R32 | mass % | R404A | 20.0 | 20.0 | 20.0 | 20.0 | 20.0 |
| | R125 | mass % | | 28.9 | 15.4 | 25.2 | 22.8 | 21.0 |
| | 1234yf | mass % | | 26.5 | 28.3 | 21.1 | 39.6 | 24.2 |
| | R134a | mass % | | 24.6 | 36.3 | 33.7 | 17.6 | 34.8 |
| GWP | | Year | 3922 | 1500 | 1194 | 1500 | 1186 | 1369 |
| Perfor-mance | Coefficient of performance | (relative to R404A %) | 100 | 107.75 | 109.65 | 108.78 | 107.75 | 109.16 |
| | Refrigerating capacity | (relative to R404A %) | 100 | 95 | 88 | 92 | 93 | 90 |
| | Outlet temperature | ° C. | 93 | 112 | 115 | 115 | 110 | 115 |
| ASHRAE non-flammability | | — | Non-flam-mable | Non-flam-mable | Non-flam-mable | Non-flam-mable | Non-flam-mable | Non-flam-mable |

TABLE 6-13

| Item | | Unit | Compar-ative Example | Compar-ative Example 3-69 A | Compar-ative Example 3-70 D | Exam-ple 3-90 G' | Exam-ple 3-91 H' | Compar-ative Example 3-71 I' | Exam-ple 3-92 L = Q | Compar-ative Example 3-72 M | Exam-ple 3-93 O = S |
|---|---|---|---|---|---|---|---|---|---|---|---|
| Compo-sition | R32 | mass % | R404A | 20.8 | 20.8 | 20.8 | 20.8 | 20.8 | 20.8 | 20.8 | 20.8 |
| | R125 | mass % | | 38.7 | 11.0 | 33.8 | 21.8 | 2.7 | 16.9 | 21.6 | 23.0 |
| | 1234yf | mass % | | 40.5 | 0.0 | 33.3 | 39.7 | 0.0 | 29.5 | 15.5 | 39.2 |
| | R134a | mass % | | 0.0 | 68.2 | 12.1 | 17.7 | 76.5 | 32.8 | 42.1 | 17.0 |
| GWP | | Year | 3922 | 1500 | 1500 | 1500 | 1158 | 1329 | 1202 | 1500 | 1190 |
| Perfor-mance | Coefficient of performance | (relative to R404A %) | 100 | 105.15 | 112.64 | 106.50 | 107.91 | 113.71 | 109.35 | 109.77 | 107.76 |
| | Refrigerating capacity | (relative to R404A %) | 100 | 105 | 81 | 101 | 94 | 77 | 90 | 90 | 95 |

TABLE 6-13-continued

| | | | | | | | | | | |
|---|---|---|---|---|---|---|---|---|---|---|
| Outlet temperature | ° C. | 93 | 106 | 126 | 109 | 111 | 127 | 115 | 118 | 111 |
| ASHRAE non-flammability | — | Non-flam-mable | Flam-mable | Non-flam-mable | Non-flam-mable | Non-flam-mable | Non-flam-mable | Non-flam-mable | Non-flam-mable | Non-flam-mable |

| Item | | Unit | Compar-ative Example | Exam-ple 3-94 P | Exam-ple 3-95 R | Exam-ple 3-96 T |
|---|---|---|---|---|---|---|
| Compo-sition | R32 | mass % | R404A | 20.8 | 20.8 | 20.8 |
| | R125 | mass % | | 27.5 | 26.3 | 29.1 |
| | 1234yf | mass % | | 24.1 | 22.4 | 26.4 |
| | R134a | mass % | | 27.6 | 30.5 | 23.7 |
| GWP | | Year | 3922 | 1500 | 1500 | 1500 |
| Perfor-mance | Coefficient of performance | (relative to R404A %) | 100 | 108.19 | 108.51 | 107.76 |
| | Refrigerating capacity | (relative to R404A %) | 100 | 95 | 94 | 96 |
| | Outlet temperature | ° C. | 93 | 114 | 115 | 113 |
| ASHRAE non-flammability | | — | Non-flam-mable | Non-flam-mable | Non-flam-mable | Non-flam-mable |

TABLE 6-14

| Item | | Unit | Compar-ative Example | Compar-ative Example 3-73 A | Compar-ative Example 3-74 D | Exam-ple 3-97 G' | Exam-ple 3-98 H' = O | Compar-ative Example 3-75 I' | Exam-ple 3-99 P = R | Exam-ple 3-100 Q | Exam-ple 3-101 S |
|---|---|---|---|---|---|---|---|---|---|---|---|
| Compo-sition | R32 | mass % | R404A | 21.2 | 21.2 | 21.2 | 21.2 | 21.2 | 21.2 | 21.2 | 21.2 |
| | R125 | mass % | | 38.7 | 11.1 | 33.8 | 22.2 | 31 | 26.8 | 17.7 | 23.3 |
| | 1234yf | mass % | | 40.1 | 0.0 | 33.0 | 39.3 | 0.0 | 22.9 | 30.0 | 38.8 |
| | R134a | mass % | | 0.0 | 67.7 | 11.9 | 17.3 | 75.7 | 29.1 | 31.1 | 16.7 |
| | GWP | Year | 3922 | 1500 | 1500 | 1500 | 1169 | 1334 | 1500 | 1228 | 1199 |
| Perfor-mance | Coefficient of performance | (relative to R404A %) | 100 | 105.19 | 112.62 | 106.52 | 107.88 | 113.65 | 108.39 | 108.70 | 107.75 |
| | Refrigerating capacity | (relative to R404A %) | 100 | 105 | 82 | 101 | 95 | 78 | 95 | 95 | 96 |
| | Outlet temperature | ° C. | 93 | 106 | 126 | 110 | 111 | 128 | 115 | 115 | 111 |
| ASHRAE non-flammability | | — | Non-flam-mable | Flam-mable | Non-flam-mable | Non-flam-mable | Non-flam-mable | Non-flam-mable | Non-flam-mable | Non-flam-mable | Non-flam-mable |

| Item | | Unit | Compar-ative Sample | Exam-ple 3-102 T |
|---|---|---|---|---|
| Compo-sition | R32 | mass % | R404A | 21.2 |
| | R125 | mass % | | 29.1 |
| | 1234yf | mass % | | 26.3 |
| | R134a | mass % | | 23.4 |
| GWP | | Year | 3922 | 1500 |
| Perfor-mance | Coefficient of performance | (relative to R404A %) | 100 | 107.75 |
| | Refrigerating capacity | (relative to R404A %) | 100 | 97 |
| | Outlet temperature | ° C. | 93 | 113 |
| ASHRAE non-flammability | | — | Non-flam-mable | Non-flam-mable |

TABLE 6-15

| Item | | Unit | Comparative Example | Comparative Example 3-76 A | Comparative Example 3-77 D | Example 3-103 G' | Example 3-104 H' | Comparative Example 3-78 I' | Example 3-105 O | Example 3-106 P | Example 3-107 Q |
|---|---|---|---|---|---|---|---|---|---|---|---|
| Composition | R32 | mass % | R404A | 21.6 | 21.6 | 21.6 | 21.6 | 21.6 | 21.6 | 21.6 | 21.6 |
| | R125 | mass % | | 38.6 | 11.2 | 33.8 | 22.5 | 3.5 | 21.5 | 26.1 | 18.5 |
| | 1234yf | mass % | | 39.8 | 0.0 | 32.9 | 38.9 | 0.0 | 36.7 | 21.6 | 30.5 |
| | R134a | mass % | | 0.0 | 67.2 | 11.7 | 17.0 | 74.9 | 20.2 | 30.7 | 29.4 |
| GWP | | Year | 3922 | 1500 | 1500 | 1500 | 1178 | 1339 | 1189 | 1500 | 1215 |
| Performance | Coefficient of performance | (relative to R404A %) | 100 | 105.23 | 112.60 | 106.54 | 107.86 | 107.86 | 108.17 | 108.60 | 109.05 |
| | Refrigerating capacity | (relative to R404A %) | 100 | 106 | 82 | 102 | 96 | 79 | 95 | 95 | 92 |
| | Outlet temperature | ° C. | 93 | 107 | 127 | 110 | 111 | 128 | 112 | 116 | 115 |
| ASHRAE non-flammability | | — | Non-flammable | Flammable | Non-flammable | Non-flammable | Non-flammable | Non-flammable | Non-flammable | Non-flammable | Non-flammable |

| Item | | Unit | Comparative Example | Example 3-108 R | Example 3-109 S | Example 3-110 T | Example 3-111 Z |
|---|---|---|---|---|---|---|---|
| Composition | R32 | mass % | R404A | 21.6 | 21.6 | 21.6 | 21.6 |
| | R125 | mass % | | 27.4 | 23.4 | 29.1 | 24.9 |
| | 1234yf | mass % | | 23.5 | 38.5 | 26.2 | 25.5 |
| | R134a | mass % | | 27.5 | 16.5 | 23.1 | 28.0 |
| GWP | | Year | 3922 | 1500 | 1202 | 1500 | 1419 |
| Performance | Coefficient of performance | (relative to R404A %) | 100 | 108.25 | 107.75 | 107.75 | 108.48 |
| | Refrigerating capacity | (relative to R404A %) | 100 | 96 | 96 | 98 | 95 |
| | Outlet temperature | ° C. | 93 | 115 | 111 | 114 | 115 |
| ASHRAE non-flammability | | — | Non-flammable | Non-flammable | Non-flammable | Non-flammable | Non-flammable |

TABLE 6-16

| Item | | Unit | Comparative Example | Comparative Example 3-79 A | Comparative Example 3-80 D | Example 3-112 G' | Example 3-113 H' | Comparative Example 3-81 I' | Example 3-114 O = Q | Comparative Example 3-82 P | Example 3-115 R |
|---|---|---|---|---|---|---|---|---|---|---|---|
| Composition | R32 | mass % | R404A | 22.6 | 22.6 | 22.6 | 22.6 | 22.6 | 22.6 | 22.6 | 22.6 |
| | R125 | mass % | | 38.4 | 11.6 | 33.8 | 23.3 | 4.6 | 20.3 | 24.5 | 28.8 |
| | 1234yf | mass % | | 39.0 | 0.0 | 32.3 | 38.0 | 0.0 | 31.7 | 18.7 | 25.0 |
| | R134a | mass % | | 0.0 | 65.8 | 11.3 | 16.1 | 72.8 | 25.4 | 34.2 | 23.6 |
| GWP | | Year | 3922 | 1500 | 1500 | 1500 | 1200 | 1355 | 1228 | 1500 | 1500 |
| Performance | Coefficient of performance | (relative to R404A %) | 100 | 105.34 | 112.52 | 106.60 | 107.81 | 113.42 | 108.70 | 109.07 | 107.93 |
| | Refrigerating capacity | (relative to R404A %) | 100 | 108 | 84 | 104 | 98 | 81 | 95 | 95 | 99 |
| | Outlet temperature | ° C. | 93 | 108 | 127 | 111 | 112 | 129 | 115 | 118 | 115 |
| ASHRAE non-flammability | | — | Non-flammable | Flammable | Non-flammable | Non-flammable | Non-flammable | Non-flammable | Non-flammable | Non-flammable | Non-flammable |

| Item | | Unit | Comparative Example | Example 3-116 S | Example 3-117 T | Example 3-118 | Comparative Example 3-83 |
|---|---|---|---|---|---|---|---|
| Composition | R32 | mass % | R404A | 22.6 | 22.6 | 22.6 | 22.6 |
| | R125 | mass % | | 23.8 | 29.3 | 25.0 | 15.0 |
| | 1234yf | mass % | | 37.7 | 26.0 | 32.4 | 42.4 |
| | R134a | mass % | | 159 | 22.1 | 20.0 | 20.0 |
| GWP | | Year | 3922 | 1214 | 1500 | 1315 | 1425 |
| Performance | Coefficient of performance | (relative to R404A %) | 100 | 107.75 | 107.75 | 107.96 | 114.07 |

TABLE 6-16-continued

| | | | | | | | |
|---|---|---|---|---|---|---|---|
| | Refrigerating capacity | (relative to R404A %) | 100 | 98 | 99 | 98 | 91 |
| | Outlet temperature | ° C. | 93 | 112 | 115 | 114 | 117 |
| | ASHRAE non-flammability | — | Non-flam-mable | Non-flam-mable | Non-flam-mable | Non-flam-mable | Flam-mable |

TABLE 6-17

| | Item | Unit | Compar-ative Example | Compar-ative Example 3-84 A | Compar-ative Example 3-85 D | Exam-ple 3-119 G' | Exam-ple 3-120 H' | Compar-ative Example 3-86 I' | Compar-ative Example 3-87 O | Compar-ative Example 3-88 P | Exam-ple 3-121 Q |
|---|---|---|---|---|---|---|---|---|---|---|---|
| Compo-sition | R32 | mass % | R404A | 23.2 | 23.2 | 23.2 | 23.2 | 23.2 | 23.2 | 23.2 | 23.2 |
| | R125 | mass % | | 38.3 | 11.8 | 33.8 | 23.8 | 5.2 | 19.5 | 23.5 | 21.3 |
| | 1234yf | mass % | | 38.5 | 0.0 | 32.0 | 37.4 | 0.0 | 28.8 | 17.0 | 32.4 |
| | R134a | mass % | | 0.0 | 65.0 | 11.0 | 15.6 | 71.6 | 28.5 | 36.3 | 23.1 |
| | GWP | Year | 3922 | 1500 | 1500 | 1500 | 1214 | 1362 | 1248 | 1500 | 1234 |
| Perfor-mance | Coefficient of performance | (relative to R404A %) | 100 | 105.40 | 112.48 | 106.62 | 107.79 | 113.33 | 109.03 | 109.35 | 108.51 |
| | Refrigerating capacity | (relative to R404A %) | 100 | 109 | 85 | 105 | 99 | 82 | 95 | 95 | 97 |
| | Outlet temperature | ° C. | 93 | 108 | 128 | 112 | 113 | 129 | 117 | 120 | 115 |
| | ASHRAE non-flammability | — | Non-flam-mable | Flam-mable | Non-flam-mable | Non-flam-mable | Non-flam-mable | Non-flam-mable | Non-flam-mable | Non-flam-mable | Non-flam-mable |

| | Item | Unit | Compar-ative Sample | Exam-ple 3-122 R = T | Exam-ple 3-123 S | Exam-ple 3-124 | Compar-ative Example 3-89 |
|---|---|---|---|---|---|---|---|
| Compo-sition | R32 | mass % | R404A | 23.2 | 23.2 | 23.2 | 23.2 |
| | R125 | mass % | | 29.6 | 23.8 | 25.0 | 15.0 |
| | 1234yf | mass % | | 25.8 | 37.4 | 31.8 | 41.8 |
| | R134a | mass % | | 21.4 | 15.6 | 20.0 | 20.0 |
| | GWP | Year | 3922 | 1500 | 1214 | 1319 | 969 |
| Perfor-mance | Coefficient of performance | (relative to R404A %) | 100 | 107.75 | 107.75 | 108.00 | 108.75 |
| | Refrigerating capacity | (relative to R404A %) | 100 | 101 | 99 | 99 | 95 |
| | Outlet temperature | ° C. | 93 | 115 | 113 | 114 | 114 |
| | ASHRAE non-flammability | — | Non-flam-mable | Non-flam-mable | Non-flam-mable | Non-flam-mable | Flam-mable |

TABLE 6-18

| | Item | Unit | Compar-ative Example | Compar-ative Example 3-90 A | Compar-ative Example 3-91 D | Exam-ple 3-125 G' | Exam-ple 3-126 H' | Compar-ative Example 3-92 I' | Compar-ative Example 3-93 O | Compar-ative Example 3-94 P | Exam-ple 3-127 Q |
|---|---|---|---|---|---|---|---|---|---|---|---|
| Compo-sition | R32 | mass % | R404A | 24.7 | 24.7 | 24.7 | 24.7 | 24.7 | 24.7 | 24.7 | 24.7 |
| | R125 | mass % | | 38.1 | 12.3 | 33.9 | 24.9 | 6.6 | 17.8 | 21.3 | 24.0 |
| | 1234yf | mass % | | 37.2 | 0.0 | 31.1 | 36.0 | 0.0 | 22.0 | 13.0 | 34.2 |
| | R134a | mass % | | 0.0 | 63.0 | 10.3 | 14.4 | 68.7 | 35.5 | 41.0 | 17.1 |
| | GWP | Year | 3922 | 1500 | 1500 | 1500 | 1270 | 1403 | 1298 | 1500 | 1253 |
| Perfor-mance | Coefficient of performance | (relative to R404A %) | 100 | 105.55 | 112.38 | 106.73 | 107.67 | 112.97 | 109.77 | 109.99 | 107.98 |
| | Refrigerating capacity | (relative to R404A %) | 100 | 111 | 87 | 107 | 102 | 85 | 95 | 95 | 101 |
| | Outlet temperature | ° C. | 93 | 110 | 129 | 113 | 114 | 130 | 121 | 123 | 115 |

TABLE 6-18-continued

| | | | | | | | | | | |
|---|---|---|---|---|---|---|---|---|---|---|
| ASHRAE non-flammability | | — | Non-flammable | Flammable | Non-flammable | Non-flammable | Non-flammable | Non-flammable | Non-flammable | Non-flammable | Non-flammable |

| Item | | Unit | Comparative Example | Example 3-128 R | Example 3-129 S | Example 3-130 T | Example 3-131 α |
|---|---|---|---|---|---|---|---|
| Composition | R32 | mass % | R404A | 24.7 | 24.7 | 24.7 | 24.7 |
| | R125 | mass % | | 31.6 | 24.8 | 29.8 | 26.6 |
| | 1234yf | mass % | | 27.8 | 35.8 | 25.2 | 32.1 |
| | R134a | mass % | | 15.9 | 14.7 | 20.3 | 16.6 |
| GWP | | Year | 3922 | 1500 | 1246 | 1500 | 1336 |
| Performance | Coefficient of performance | (relative to R404A %) | 100 | 107.29 | 107.75 | 107.75 | 107.75 |
| | Refrigerating capacity | (relative to R404A %) | 100 | 105 | 102 | 103 | 103 |
| | Outlet temperature | ° C. | 93 | 115 | 114 | 116 | 115 |
| ASHRAE non-flammability | | — | Non-flammable | Non-flammable | Non-flammable | Non-flammable | Non-flammable |

TABLE 6-19

| Item | | Unit | Comparative Example | Comparative Example 3-95 A | Comparative Example 3-96 D | Example 3-132 G' | Example 3-133 H' | Comparative Example 3-97 I' | Comparative Example 3-98 O | Comparative Example 3-99 P | Example 3-134 Q = S |
|---|---|---|---|---|---|---|---|---|---|---|---|
| Composition | R32 | mass % | R404A | 25.4 | 25.4 | 25.4 | 25.4 | 25.4 | 25.4 | 25.4 | 25.4 |
| | R125 | mass % | | 37.9 | 12.6 | 33.9 | 25.4 | 7.3 | 17.1 | 20.3 | 25.2 |
| | 1234yf | mass % | | 36.7 | 0.0 | 30.7 | 35.3 | 0.0 | 19.1 | 11.2 | 35.0 |
| | R134a | mass % | | 0.0 | 62.0 | 10.0 | 13.9 | 67.3 | 38.4 | 43.1 | 14.4 |
| GWP | | Year | 3922 | 1500 | 1500 | 1500 | 1261 | 1389 | 1320 | 1500 | 1261 |
| Performance | Coefficient of performance | (relative to R404A %) | 100 | 105.63 | 112.32 | 106.72 | 107.70 | 113.00 | 110.08 | 110.27 | 107.75 |
| | Refrigerating capacity | (relative to R404A %) | 100 | 112 | 88 | 108 | 104 | 85 | 95 | 95 | 103 |
| | Outlet temperature | ° C. | 93 | 111 | 130 | 114 | 115 | 131 | 122 | 124 | 115 |
| ASHRAE non-flammability | | — | Non-flammable | Flammable | Non-flammable | Non-flammable | Non-flammable | Non-flammable | Non-flammable | Non-flammable | Non-flammable |

| Item | | Unit | Comparative Example | Example 3-135 R | Comparative Example 3-100 T |
|---|---|---|---|---|---|
| Composition | R32 | mass % | R404A | 25.4 | 25.4 |
| | R125 | mass % | | 32.3 | 29.9 |
| | 1234yf | mass % | | 28.6 | 25.1 |
| | R134a | mass % | | 13.7 | 19.6 |
| GWP | | Year | 3922 | 1500 | 1500 |
| Performance | Coefficient of performance | (relative to R404A %) | 100 | 107.12 | 107.75 |
| | Refrigerating capacity | (relative to R404A %) | 100 | 107 | 104 |
| | Outlet temperature | ° C. | 93 | 115 | 117 |
| ASHRAE non-flammability | | — | Non-flammable | Non-flammable | Non-flammable |

TABLE 6-20

| Item | | Unit | Comparative Example | Comparative Example 3-101 A | Comparative Example 3-102 D | Example 3-136 G' | Example 3-137 H' = Q | Comparative Example 3-103 I' | Comparative Example 3-104 O | Comparative Example 3-105 P | Example 3-138 R |
|---|---|---|---|---|---|---|---|---|---|---|---|
| Composition | R32 | mass % | R404A | 25.6 | 25.6 | 25.6 | 25.6 | 25.6 | 25.6 | 25.6 | 25.6 |
| | R125 | mass % | | 37.9 | 12.6 | 33.9 | 25.6 | 7.5 | 16.9 | 20.0 | 32.5 |
| | 1234yf | mass % | | 36.5 | 0.0 | 30.6 | 35.1 | 0.0 | 18.3 | 10.6 | 28.8 |
| | R134a | mass % | | 0.0 | 61.8 | 9.9 | 13.7 | 66.9 | 39.2 | 43.8 | 13.1 |
| GWP | | Year | 3922 | 1500 | 1500 | 1500 | 1266 | 1392 | 1326 | 1500 | 1500 |
| Performance | Coefficient of performance | (relative to R404A %) | 100 | 105.64 | 112.31 | 106.72 | 107.68 | 112.97 | 110.17 | 110.36 | 107.08 |
| | Refrigerating capacity | (relative to R404A %) | 100 | 113 | 88 | 109 | 104 | 86 | 95 | 95 | 107 |
| | Outlet temperature | ° C. | 93 | 111 | 130 | 114 | 115 | 131 | 123 | 125 | 115 |
| ASHRAE non-flammability | | — | Non-flammable | Flammable | Non-flammable | Non-flammable | Non-flammable | Non-flammable | Non-flammable | Non-flammable | Non-flammable |

| Item | | Unit | Comparative Example | Comparative Example 3-106 S | Comparative Example 3-107 T |
|---|---|---|---|---|---|
| Composition | R32 | mass % | R404A | 25.6 | 25.6 |
| | R125 | mass % | | 25.3 | 29.9 |
| | 1234yf | mass % | | 34.8 | 25.0 |
| | R134a | mass % | | 14.3 | 19.5 |
| GWP | | Year | 3922 | 1264 | 1500 |
| Performance | Coefficient of performance | (relative to R404A %) | 100 | 107.75 | 107.75 |
| | Refrigerating capacity | (relative to R404A %) | 100 | 104 | 105 |
| | Outlet temperature | ° C. | 93 | 115 | 117 |
| ASHRAE non-flammability | | — | Non-flammable | Non-flammable | Non-flammable |

TABLE 6-21

| Item | | Unit | Comparative Example | Comparative Example 3-108 A | Comparative Example 3-109 D | Example 3-139 G' = Q = R | Comparative Example 3-110 H' | Comparative Example 3-111 I' | Comparative Example 3-112 O | Comparative Example 3-113 P | Comparative Example 3-114 S |
|---|---|---|---|---|---|---|---|---|---|---|---|
| Composition | R32 | mass % | R404A | 26.6 | 26.6 | 26.6 | 26.6 | 26.6 | 26.6 | 26.6 | 26.6 |
| | R125 | mass % | | 37.7 | 13.0 | 33.8 | 26.3 | 8.6 | 16.0 | 18.6 | 25.8 |
| | 1234yf | mass % | | 35.7 | 0.0 | 30.1 | 34.2 | 0.0 | 14.4 | 8.1 | 33.5 |
| | R134a | mass % | | 0.0 | 60.4 | 9.5 | 12.9 | 64.8 | 43.0 | 46.7 | 14.1 |
| GWP | | Year | 3922 | 1500 | 1500 | 1500 | 1286 | 1407 | 1355 | 1500 | 1286 |
| Performance | Coefficient of performance | (relative to R404A %) | 100 | 105.75 | 112.23 | 106.78 | 107.64 | 112.80 | 110.58 | 110.75 | 107.75 |
| | Refrigerating capacity | (relative to R404A %) | 100 | 114 | 90 | 110 | 106 | 88 | 95 | 95 | 105 |
| | Outlet temperature | ° C. | 93 | 112 | 131 | 115 | 116 | 132 | 125 | 127 | 116 |
| ASHRAE non-flammability | | — | Non-flammable | Flammable | Non-flammable | Non-flammable | Non-flammable | Non-flammable | Non-flammable | Non-flammable | Non-flammable |

| Item | | Unit | Comparative Example | Comparative Example 3-115 T |
|---|---|---|---|---|
| Composition | R32 | mass % | R404A | 26.6 |
| | R125 | mass % | | 29.9 |
| | 1234yf | mass % | | 24.4 |
| | R134a | mass % | | 19.1 |
| GWP | | Year | 3922 | 1500 |

TABLE 6-21-continued

| | | | | |
|---|---|---|---|---|
| Performance | Coefficient of performance | (relative to R404A %) | 100 | 107.75 |
| | Refrigerating capacity | (relative to R404A %) | 100 | 106 |
| | Outlet temperature | ° C. | 93 | 118 |
| ASHRAE non-flammability | | — | Non-flammable | Non-flammable |

Examples 3-52 and 3-124, and Comparative Examples 3-51 and 3-89

The flammability of Examples 3-52 and 3-124, and Comparative Examples 3-51 and 3-89 was examined according to ASHRAE34-2013.

In order to determine WCFF, leak calculations were performed for the following seven cases using REFPROP 9.0.

Storage/Shipping Condition

Leak temperature: (1) boiling point+10° C. (because the boiling point+10° C. is higher than −40° C.), (2) 23° C., (3) 54.4° C.

Equipment Condition

Leak temperature: (4) boiling point+10° C. (because the boiling point+10° C. is higher than −40° C.), (5) 23° C., (6) 60° C.

Leak/Recharge Testing

Leak temperature: (7) 23±3° C.

Tables 7 and 8 show the results. In all cases, the vapor phase during cylinder-filling at (1) boiling point+10° C. was WCFF under the storage/shipping condition.

TABLE 7

| Example Comparative Example | Refrigerant | R32 (wt %) | R125 (wt %) | 1234yf (wt %) | R134a (wt %) | (2) | (4) | (2) − (4) | Flammability determination from non-flammability limit of binary mixed refrigerant |
|---|---|---|---|---|---|---|---|---|---|
| Example 3-52 | Composition | 18.0 | 20.0 | 32.0 | 30.0 | — | — | — | — |
| | WCFF (−33.9° C. (boiling point + 10° C.) storage/shipping condition) | 34.0 | 27.0 | 23.2 | 15.8 | 7.032 | −0.686 | 7.717 | Non-flammable |
| Comparative Example 3-51 | Composition | 18.0 | 10.0 | 52.0 | 20.0 | — | — | — | — |
| | WCFF (−31.3° C. (boiling point + 10° C.) storage/shipping condition) | 37.5 | 13.8 | 37.4 | 11.3 | −11.62 | 18.56 | −30.18 | Flammable |

TABLE 8

| Example Comparative Example | Refrigerant | R32 (wt %) | R125 (wt %) | 1234yf (wt %) | R134a (wt %) | (2) | (4) | (2) − (4) | Flammability determination from non-flammability limit of binary mixed refrigerant |
|---|---|---|---|---|---|---|---|---|---|
| Example 3-124 | Composition | 23.2 | 25.0 | 31.8 | 20.0 | — | — | — | — |
| | WCFF (−36.2° C. (boiling point + 10° C.) storage/shipping condition) | 39.0 | 30.4 | 21.3 | 9.3 | 7.495 | 1.629 | 5.867 | Non-flammable |
| Comparative Example 3-89 | Composition | 23.2 | 15.0 | 41.8 | 20.0 | — | — | — | — |
| | WCFF (−35.6° C. (boiling point + 10° C.) storage/shipping condition) | 42.3 | 19.1 | 28.8 | 9.8 | −7.85 | 12.96 | −20.81 | Flammable |

When a combustion test was conducted according to ASTM E681 (a standard test method for concentration limits of flammability) for the WCFF shown in Examples 3-52 and 3-124, and Comparative Examples 3-51 and 3-89, flame propagation was not observed in the WCFF compositions of the Examples, and flame propagation was observed in the WCFF compositions of the Comparative Examples.

The results showed that the Examples were classified as being ASHRAE non-flammable (Class 1), and the Comparative Examples were classified as being ASHRAE flammable (Class 2 or 3).

REFERENCE SIGNS LIST

A: Composition ratio in which GWP=1500 and the concentration (wt %) of R134a is 0 wt %

D: Composition ratio in which GWP=1500 and the concentration (wt %) of 1234yf is 0 wt %

G: Composition ratio in which GWP=1500 and which shows an ASHRAE non-flammability limit (when the WCFF becomes a liquid phase composition after 95% leak under the storage/shipping conditions)

H: Composition ratio showing an ASHRAE non-flammability limit (when the WCFF becomes a liquid phase composition after 95% leak under the storage/shipping conditions, and becomes a vapor phase composition at the time of 0% leak)

I: Composition ratio showing an ASHRAE non-flammability limit, in which the concentration (wt %) of 1234yf is 0 wt % (the WCFF is a vapor phase composition at the time of 0% leak under the storage/shipping conditions)

G': Composition ratio showing an intersection of a line segment in which GWP=1500 and a line segment obtained by adding 1 wt % of non-flammable refrigerant R134a to line segment GH, which shows an ASHRAE non-flammability limit, in order to take into consideration safety ratio of non-flammability H': Composition ratio showing an intersection of a line segment obtained by adding 1 wt % of non-flammable refrigerant R134a to line segment GH, which shows an ASHRAE non-flammability limit, and a line segment obtained by adding 1 wt % of non-flammable refrigerant R125 to line segment HI I': Composition ratio on a line segment obtained by adding 1 wt % of non-flammable refrigerant R125 to line segment HI, which shows an ASHRAE non-flammability limit, in order to take into consideration safety ratio of non-flammability, in which the concentration (wt %) of 1234yf is 0 wt %

B: Composition ratio present on line segments G'H'I', in which the compressor outlet pressure is 102.5% of the R22 pressure C: Composition ratio in which GWP=1500 and the compressor outlet pressure is 102.5% of the R22 pressure E: Composition ratio present on line segments G'H'I', in which the compressor outlet pressure is 97.5% of the R22 pressure F: Composition ratio in which GWP=1500 and the compressor outlet pressure is 97.5% of the R22 pressure B': Composition ratio present on line segments G'H'I', in which the compressor outlet pressure is 101.25% of the R22 pressure C': Composition ratio in which GWP=1500 and the compressor outlet pressure is 101.25% of the R22 pressure E': Composition ratio present on line segments G'H'I', in which the compressor outlet pressure is 98.75% of the R22 pressure F': Composition ratio in which GWP=1500 and the compressor outlet pressure is 98.75% of the R22 pressure J: Composition ratio present on line segments G'H'I', in which the refrigerating capacity relative to that of R404 is 85%

K: Composition ratio in which GWP=1500 and the refrigerating capacity relative to that of R404 is 85%

L: Composition ratio present on line segments G'H'I', in which the refrigerating capacity relative to that of R404 is 90%

M: Composition ratio in which GWP=1500 and the refrigerating capacity relative to that of R404 is 90%

O: Composition ratio present on line segments G'H'I', in which the refrigerating capacity relative to that of R404 is 95%

P: Composition ratio in which GWP=1500 and the refrigerating capacity relative to that of R404 is 95%

Q: Composition ratio present on line segments G'H'I', in which the compressor outlet temperature is 115° C.

R: Composition ratio in which GWP=1500 and the compressor outlet temperature is 115° C.

S: Composition ratio present on line segments G'H'I', in which COP is 107.75% of that of R404A T: Composition ratio in which GWP=1500, and COP is 107.75% of that of R404A U: Intersection of line segment ST and line segment JK V: Intersection of line segment ST and line segment LM W: Intersection of line segment ST and line segment OP X: Intersection of line segment QR and line segment JK Y: Intersection of line segment OR and line segment LM Z: Intersection of line segment QR and line segment OP α: Intersection of line segment ST and line segment QR N: Point in which R125=0 and R134a=0 (0/0/100−x)

The invention claimed is:

1. A composition comprising a mixture or mixtures of fluorinated hydrocarbons;

the composition comprising at least one member selected from the group consisting of the following mixtures 1 to 6, wherein the composition ratio of the fluorinated hydrocarbons contained in each mixture is indicated in a ternary composition diagram in which the sum of the concentrations of R125, 1234yf, and R134a is represented by (100−x) wt %, when the sum of the concentrations of R32, R125, 1234yf, and R134a is 100 wt %, and the concentration of R32 is x wt %:

mixture 1 having a composition ratio in which (1)-1. 14.8 wt %>x≥10.8 wt %, and (2)-1. the concentrations of R125, 1234yf, and 134a (R125 concentration (wt %)/1234yf concentration (wt %)/134a concentration (wt %)) fall within a pentagon having the following points as vertices:

point G (100−R32−1234yf−R134a/−0.5493x+45.325/−0.4243x+19.875), point H (100−R32−1234yf−R134a/−0.9507x+60.575/−x+38.1), point I (0/100−R32−1234yf−R134a/1.6974x+48.4), point N (0/0/100−x), and point D (0.375x+3.25/0/100−R32-R125−1234yf);

mixture 2 having a composition ratio in which (1)-2. 18.1 wt %>x≥14.8 wt %, and (2)-2. the concentrations of R125, 1234yf, and 134a (R125 concentration (wt %)/1234yf concentration (wt %)/134a concentration (wt %)) fall within a pentagon having the following points as vertices:

point G (100−R32−R125−1234yf/−0.5736x+45.669/−0.3945x+19.443), point H (100−R32−1234yf−R134a/−0.9083x+59.936/−0.9723x+37.714), point I (0/100−R32−1234yf−R134a/1.3625x+53.346), point N (0/0/100−x), and point D (0.3625x+3.4461/0/100−R32−R125−1234yf);

mixture 3 having a composition ratio in which (1)-3. 20.0 wt %>x≥18.1 wt %, and (2)-3. the concentrations of R125, 1234yf, and 134a (R125 concentration (wt %)/1234yf concentration (wt %)/134a concentration (wt %)) fall within a pentagon having the following points as vertices:

point G (100−R32−1234yf−R134a/−0.5258x+44.808/−0.4207x+19.907), point H (100−R32−1234yf−R134a/−0.8948x+59.698/−1.0517x+39.117), point I (0/100−R32−1234yf−R134a/1.0517x+58.983), point N (0/0/100−x), and point D (0.369x+3.31/0/100−R32−R125−1234yf);

mixture 4 having a composition ratio in which (1)-4. 22.6 wt %>x≥20.0 wt %, and (2)-4. the concentrations of R125, 1234yf, and 134a (R125 concentration (wt %)/1234yf concentration (wt %)/134a concentration (wt %)) fall within a quadrilateral having the following points as vertices:

point G (100−R32−1234yf−R134a/−0.5756x+45.817/−0.4244x+19.983), point H (100−R32−1234yf−R134a/−0.9244x+60.283/−0.8488x+35.065), point I (100−R32−1234yf−R134a/0/−2.0407x+120.8), and point D (0.3430x+3.826/0/100−R32−R125−1234yf);

mixture 5 having a composition ratio in which (1)-5. 24.5 wt %>x≥22.6 wt %, and (2)-5. the concentrations of R125, 1234yf, and 134a (R125 concentration (wt %)/1234yf concentration (wt %)/134a concentration (wt %)) fall within a quadrilateral having the following points as vertices:

point G (100−R32−1234yf−R134a/−0.5283x+44.746/−0.4717x+21.054), point H (100−R32−1234yf−R134a/−0.9435x+60.078/−0.8428x+34.949), point I (100−R32−1234yf−R134a/0/−1.9435x+118.61), and point D (0.3710x+3.2057/0/100−R32−R125−1234yf); and mixture 6 having a composition ratio in which (1)-6. 26.6 wt %≥x≥24.5 wt %, and (2)-6. the concentrations of R125, 1234yf, and 134a (R125 concentration (wt %)/1234yf concentration (wt %)/134a concentration (wt %)) fall within a quadrilateral having the following points as vertices:

point G (100−R32−1234yf−R134a/−0.5710x+45.798/−0.4290x+20.002), point H (100−R32−1234yf−R134a/−0.9517x+60.931/−0.7613x+32.965), point I (100−R32−1234yf−R134a/0/−2.0000x+120.00), and point D (0.3323x+4.1369/0/100−R32−R125−1234yf);

wherein the mixture or mixtures of fluorinated hydrocarbons may contain, in addition to the four basic components R32, R125, 1234yf, and R134a, other components different from the four basic components, and when the mixture or mixtures contain the other components, the content of the other components in the mixture or mixtures is 0.5 wt % or less.

2. A composition comprising a mixture or mixtures of fluorinated hydrocarbons;

the composition comprising at least one member selected from the group consisting of the following mixtures 1 to 6, wherein the composition ratio of the fluorinated hydrocarbons contained in each mixture is indicated in a ternary composition diagram in which the sum of the concentrations of R125, 1234yf, and R134a is represented by (100−x) wt %, when the sum of the concentrations of R32, R125, 1234yf, and R134a is 100 wt %, and the concentration of R32 is x wt %:

mixture 1 having a composition ratio in which (1)-1. 14.8 wt %>x≥10.8 wt %, and (2)-1. the concentrations of R125, 1234yf, and 134a (R125 concentration (wt %)/1234yf concentration (wt %)/134a concentration (wt %)) fall within a pentagon having the following points as vertices:

point G' (100−R32−1234yf−R134a/−0.5757x+45.025/−0.4243x+20.975), point H' (100−R32−1234yf−R134a/−0.9770x+59.575/−x+38.4), point I' (0/100−R32−1234yf−R134a/1.7007x+52.125), point N (0/0/100−x), and point D (0.375x+3.25/0/100−R32−R125−1234yf);

mixture 2 having a composition ratio in which (1)-2. 18.1 wt %>x≥14.8 wt %, and (2)-2. the concentrations of R125, 1234yf, and 134a (R125 concentration (wt %)/1234yf concentration (wt %)/134a concentration (wt %)) fall within a pentagon having the following points as vertices:

point G' (100−R32−1234yf−R134a/−0.5458x+44.582/−0.4264x+21.031), point H' (100−R32−1234yf−R134a/−0.9083x+58.536/−0.9723x+38.014), point I' (0/100−R32−1234yf−R134a/1.3945x+56.657), point N (0/0/100−x), and point D (0.3625x+3.4461/0/100−R32−R125−1234yf);

mixture 3 having a composition ratio in which (1)-3. 20.0 wt %>x≥18.1 wt %, and (2)-3. the concentrations of R125, 1234yf, and 134a (R125 concentration (wt %)/1234yf concentration (wt %)/134a concentration (wt %)) fall within a quadrilateral having the following points as vertices:

point G' (100−R32−1234yf−R134a/−0.5277x+44.277/−0.4207x+20.907), point H' (100−R32−1234yf−R134a/−0.8948x+58.298/−1.0517x+39.417), point I' (100−R32−1234yf−R134a/0/1.9483x+117.18), and point D (0.369x+3.31/0/100−R32−R125−1234yf);

mixture 4 having a composition ratio in which (1)-4. 22.6 wt %>x≥20.0 wt %, and (2)-4. the concentrations of R125, 1234yf, and 134a (R125 concentration (wt %)/1234yf concentration (wt %)/134a concentration (wt %)) fall within a quadrilateral having the following points as vertices:

point G' (100−R32−1234yf−R134a/−0.5349x+44.413/−0.4651x+21.787), point H' (100−R32−1234yf−R134a/−0.9244x+58.883/−0.8837x+36.078), point I' (100−R32−1234yf−R134a/0/−2.0756x+119.72), and point D (0.343x+3.826/0/100−R32−R125−1234yf);

mixture 5 having a composition ratio in which (1)-5. 24.5 wt %>x≥22.6 wt %, and (2)-5. the concentrations of R125, 1234yf, and 134a (R125 concentration (wt %)/1234yf concentration (wt %)/134a concentration (wt %)) fall within a quadrilateral having the following points as vertices:

point G' (100−R32−1234yf−R134a/−0.5848x+45.537/−0.4717x+21.954), point H' (100−R32−1234yf−R134a/−0.9435x+59.308/−0.8428x+35.149), point I' (100−R32−1234yf−R134a/0/−1.9435x+116.71), and point D (0.3710x+3.2057/0/100−R32−R125−1234yf); and mixture 6 having a composition ratio in which (1)-6. 26.6 wt %≥x≥24.5 wt %, and (2)-6. the concentrations of R125, 1234yf, and 134a (R125 concentration (wt %)/1234yf concentration (wt %)/134a concentration (wt %)) fall within a quadrilateral having the following points as vertices:

point G' (100−R32−1234yf−R134a/−0.5242x+44.035/−0.4290x+20.902), point H' (100−R32−1234yf−R134a/−x+60.7/−0.7145x+32.001), point I' (100−R32−1234yf−R134a/0/−2.0468x+119.26), and point D (0.3323x+4.1369/0/100−R32−R125−1234yf);

wherein the mixture or mixtures of fluorinated hydrocarbons may contain, in addition to the four basic components R32, R125, 1234yf, and R134a, other components different from the four basic components, and when the mixture or mixtures contain the other components, the content of the other components in the mixture or mixtures is 0.5 wt % or less.

3. A composition comprising a mixture or mixtures of fluorinated hydrocarbons;

the composition comprising at least one member selected from the group consisting of the following mixtures 1 to 7, wherein the composition ratio of the fluorinated hydrocarbons contained in each mixture is indicated in a ternary composition diagram in which the sum of the concentrations of R125, 1234yf, and R134a is represented by (100−x) wt %, when the sum of the concentrations of R32, R125, 1234yf, and R134a is 100 wt %, and the concentration of R32 is x wt %:

mixture 1 having a composition ratio in which (1)-1. 14.1 wt %>x≥10.8 wt %, and (2)-1. the concentrations of R125, 1234yf, and 134a (R125 concentration (wt %)/1234yf concentration (wt %)/134a concentration (wt %)) fall within a quadrilateral having the following points as vertices:

point B (−2.6665x+62.786/0.7204x+31.027/100−R32−R125−1234yf), point C (0.0914$x^2$−4.2444x+69.184/0.1181$x^2$−6.3648x+93.765/100−R32−R125−1234yf), point F (0.0323$x^2$−2.5621x+50.802/0.0346$x^2$−3.9904x+67.56/100−R32−R125−1234yf), and point E (0.0501$x^2$−3.9756x+61.989/−0.0296$x^2$+1.5133x+30.248/100−R32−R125−1234yf);

mixture 2 having a composition ratio in which (1)-2. 16.1 wt %>x≥14.1 wt %, and (2)-2. the concentrations of R125, 1234yf, and 134a (R125 concentration (wt %)/1234yf concentration (wt %)/134a concentration (wt %)) fall within a pentagon having the following points as vertices:

point B (−2.6456x+62.484/0.7929x+29.984/100−R32−R125−1234yf), point C (0.0495$x^2$−3.1434x+61.991/0.1723$x^2$−8.1236x+107.78/100−R32−R125−1234yf), point F (−1.5049x+42.339/−2.6349x+55.315/100−R32−R125−1234yf), point E (0.2747$x^2$−9.7967x+99.415/0.6366$x^2$−25.375x+276.93/100−R32−R125−1234yf), and when 14.8 wt %>x≥14.1 wt %, point H' (100−R32−1234yf−R134a/−0.9770x+59.575/−x+38.4), or when 16.1 wt %>x≥14.8 wt %, point H' (100−R32−1234yf−R134a/−0.9083x+58.536/−0.9723x+38.014);

mixture 3 having a composition ratio in which (1)-3. 16.8 wt %>x≥16.1 wt %, and (2)-3. the concentrations of R125, 1234yf, and 134a (R125 concentration (wt %)/1234yf concentration (wt %)/134a concentration (wt %)) fall within a pentagon having the following points as vertices:

point B (−2.2857x+56.7/0.7747x+30.285/100−R32−R125−1234yf), point C (−1.5714x+49.5/−2.8043x+66.812/100−R32−R125−1234yf), point F (−1.2857x+38.8/−2.4954x+53.076/100−R32−R125−1234yf), point E (−1.1429x+31.3/−5.3142x+118.96/100−R32−R125−1234yf), and point H' (100−R32−1234yf−R134a/−0.9083x+58.536/−0.9723x+38.014);

mixture 4 having a composition ratio in which (1)-4. 18.1 wt %>x≥16.8 wt %, and (2)-4. the concentrations of R125, 1234yf, and 134a (R125 concentration (wt %)/1234yf concentration (wt %)/134a concentration (wt %)) fall within a quadrilateral having the following points as vertices:

point B (−1.4615x+42.854/−5.931x+142.94/100−R32−1234yf−R134a), point C (−1.3846x+46.362/−2.5156x+61.961/100−R32−R125−1234yf), point F (−1.3846x+40.462/−2.5401x+53.827/100−R32−R125−1234yf), and point E (−1.0769x+30.192/−4.9692x+113.16/100−R32−R125−1234yf);

mixture 5 having a composition ratio in which (1)-5. 20.0 wt %>x≥18.1 wt %, and (2)-5. the concentrations of R125, 1234yf, and 134a (R125 concentration (wt %)/1234yf concentration (wt %)/134a concentration (wt %)) fall within a quadrilateral having the following points as vertices:

point B (−1.0442x+35.27/0.2703$x^2$−15.221x+222.52/100−R32−1234yf−R134a), point C (−1.3145x+45.088/−2.4404x+60.615/100−R32−1234yf−R134a), point F (−1.2138x+37.381/−0.1576$x^2$+3.716x−7.7649/100−R32−1234yf−R134a), and point E (−0.8869x+26.726/−4.3267x+101.52/100−R32−1234yf−R134a);

mixture 6 having a composition ratio in which (1)-6. 21.6 wt %>x≥20.0 wt %, and (2)-6. the concentrations of R125, 1234yf, and 134a (R125 concentration (wt %)/1234yf concentration (wt %)/134a concentration (wt %)) fall within a quadrilateral having the following points as vertices:

point B (−0.875x+31.9/−4.3372x+112.98/100−R32−1234yf−R134a), point C (−1.25x+43.8/−2.375x+59.3/100−R32−1234yf−R134a), point F (−1.125x+35.6/−2.1875x+47.25/100−R32−1234yf−R134a), and point E (−0.75x+24/−3.8831x+92.657/100−R32−1234yf−R134a); and mixture 7 having a composition ratio in which (1)-7. 24.2 wt %>x≥21.6 wt %, and (2)-7. the concentrations of R125, 1234yf, and 134a (R125 concentration (wt %)/1234yf concentration (wt %)/134a concentration (wt %)) fall within a quadrilateral having the following points as vertices:

point B (−0.7267x+28.67/0.1603$x^2$−10.987x+181.821/00−R32−1234yf−R134a), point C (0.0529$x^2$−3.5375x+68.536/0.0431$x^2$−4.1038x+76.546/100−R32−1234yf−R134a), point F (−1.9651x+53.771/0/100−R32−1234yf−R134a), and point E (−0.6163x+21.118/0.0663$x^2$−6.4133x+116.38/100−R32−1234yf−R134a);

wherein the mixture or mixtures of fluorinated hydrocarbons may contain, in addition to the four basic components R32, R125, 1234yf, and R134a, other components different from the four basic components, and when the mixture or mixtures contain the other components, the content of the other components in the mixture or mixtures is 0.5 wt % or less.

4. A composition comprising a mixture or mixtures of fluorinated hydrocarbons, the composition comprising at least one member selected from the group consisting of the following mixtures 1 to 9, wherein the composition ratio of the fluorinated hydrocarbons contained in each mixture is indicated in a ternary composition diagram in which the sum of the concentrations of R125, 1234yf, and R134a is represented by (100−x) wt %, when the sum of the concentrations of R32, R125, 1234yf, and R134a is 100 wt %, and the concentration of R32 is x wt %:

mixture 1 having a composition ratio in which (1)-1. 14.2 wt %>x≥11.6 wt %, and (2)-1. the concentrations of R125, 1234yf, and 134a (R125 concentration (wt %)/1234yf concentration (wt %)/134a concentration (wt %)) fall within a triangle having the following points as vertices:

point G' (100−R32−1234yf−R134a/−0.5757x+45.025/−0.4243x+20.975), point J $(-3.5769x+75.492/1.2204x+24.143/100-R32-R125-1234yf)$, and point K $(-2.3846x+61.662/-4.0172x+84.9/100-R32-R125-1234yf)$;

mixture 2 having a composition ratio in which (1)-2. 15.3 wt %>x≥14.2 wt %, and (2)-2. the concentrations of R125, 1234yf, and 134a (R125 concentration (wt %)/1234yf concentration (wt %)/134a concentration (wt %)) fall within a triangle having the following points as vertices:

when 14.8 wt %>x≥14.2 wt %, point G' $(100-R32-1234yf-R134a/-0.5757x+45.025/-0.4243x+20.975)$ or when 15.3 wt %>x≥14.8 wt %, point G' $(100-R32-1234yf-R134a/-0.5458x+44.582/-0.4264x+21.031)$, and point J $(-3.4381x+73.493/1.1236x+25.522/100-R32-R125-1234yf)$, and point K $(0.9091x^2-29.091x+257.58/0.8579x^2-29.085x+267.88/100-R32-R125-1234yf)$;

mixture 3 having a composition ratio in which (1)-3. 16.2 wt %>x≥15.3 wt %, and (2)-3. the concentrations of R125, 1234yf, and 134a (R125 concentration (wt %)/1234yf concentration (wt %)/134a concentration (wt %)) fall within a triangle having the following points as vertices:

point G' $(100-R32-1234yf-R134a/-0.5458x+44.582/-0.4264x+21.031)$, point J $(-3.5556x+75.3/1.2095x+24.209/100-R32-R125-1234yf)$, and point K $(-2x+55.9/-3.4439x+76.392/100-R32-R125-1234yf)$;

mixture 4 having a composition ratio in which (1)-4. 17.5 wt %>x≥16.2 wt %, and (2)-4. the concentrations of R125, 1234yf, and 134a (R125 concentration (wt %)/1234yf concentration (wt %)/134a concentration (wt %)) fall within a quadrilateral having the following points as vertices:

point G' $(100-R32-1234yf-R134a/-0.5458x+44.582/-0.4264x+21.031)$, point H' $(100-R32-1234yf-R134a/-0.9083x+58.536/-0.9723x+38.014)$, point J $(-1.6163x+43.882/-6.3674x+146.95/100-R32-R125-1234yf)$, and point K $(-1.8488x+53.445/-3.1206x+71.153/100-R32-R125-1234yf)$;

mixture 5 having a composition ratio in which (1)-5. 19.0 wt %>x≥17.5 wt %, and (2)-5. the concentrations of R125, 1234yf, and 134a (R125 concentration (wt %)/1234yf concentration (wt %)/134a concentration (wt %)) fall within a pentagon having the following points as vertices:

when 18.1 wt %>x≥17.5 wt %, point G' $(100-R32-1234yf-R134a/-0.5458x+44.582/-0.4264x+21.031)$, and point H' $(100-R32-1234yf-R134a/-0.9083x+58.536/-0.9723x+38.014)$, or when 19.0 wt %>x≥18.1 wt %, point G' $(100-R32-1234yf-R134a/-0.5277x+44.277/-0.4207x+20.907)$, and point H' $(100-R32-1234yf-R134a/-0.8948x+58.298/-1.0517x+39.417)$, and point J $(0.1273x^2-6.1109x+83.553/0.1532x^2-11.484x+189.57/100-R32-R125-1234yf)$, point X $(-0.1696x^2+1.0575x+54.537/-0.2271x^2+15.05x-177.28/100-R32-R125-1234yf)$, and point R $(-0.0401x^2+3.0217x-19.198/-0.0297x^2+2.7774x-22.544/100-R32-R125-1234yf)$;

mixture 6 having a composition ratio in which (1)-6. 20.8 wt %>x≥19.0 wt %, and (2)-6. the concentrations of R125, 1234yf, and 134a (R125 concentration (wt %)/1234yf concentration (wt %)/134a concentration (wt %)) fall within a quadrilateral having the following points as vertices:

when 20.0 wt %>x≥19.0 wt %, point G' $(100-R32-1234yf-R134a/-0.5277x+44.277/-0.4207x+20.907)$, and point H' $(100-R32-1234yf-R134a/-0.8948x+58.298/-1.0517x+39.417)$, or when 20.8 wt %>x≥20.0 wt %, point G' $(100-R32-1234yf-R134a/-0.5349x+44.413/-0.4651x+21.787)$, and point H' $(100-R32-1234yf-R134a/-0.9244x+58.883/-0.8837x+36.078)$, and point Q $(-0.0198x^2+27.157x-31.225/-0.0377x^2+3.0486x-17.594/100-R32-R125-1234yf)$, and point R $(-0.0401x^2+3.0217x-19.198/-0.0297x^2+2.7774x-22.544/100-R32-R125-1234yf)$;

mixture 7 having a composition ratio in which (1)-7. 23.2 wt %>x≥20.8 wt %, and (2)-7. the concentrations of R125, 1234yf, and 134a (R125 concentration (wt %)/1234yf concentration (wt %)/134a concentration (wt %)) fall within a quadrilateral having the following points as vertices:

when 22.6 wt %>x≥20.8 wt %, point G' $(100-R32-1234yf-R134a/-0.5349x+44.413/-0.4651x+21.787)$, and point H' $(100-R32-1234yf-R134a/-0.9244x+58.883/-0.8837x+36.078)$, or when 23.2 wt %>x≥22.6 wt %, point G' $(100-R32-1234yf-R134a/-0.5848x+45.537/-0.4717x+21.954)$, and point H' $(100-R32-1234yf-R134a/-0.9435x+59.308/-0.8428x+35.149)$, and point Q $(-0.0984x^2+6.1633x-68.728/-0.0617x^2+3.9141x-25.243/100-R32-R125-1234yf)$, and point R $(-0.0031x^2+1.5234x-4.0783/-0.0503x^2+3.6856x-32.627/100-R32-R125-1234yf)$;

mixture 8 having a composition ratio in which (1)-8. 25.6 wt %>x≥23.2 wt %, and (2)-8. the concentrations of R125, 1234yf, and 134a (R125 concentration (wt %)/1234yf concentration (wt %)/134a concentration (wt %)) fall within a quadrilateral having the following points as vertices:

when 24.5 wt %>x≥23.2 wt %, point G' $(100-R32-1234yf-R134a/-0.5848x+45.537/-0.4717x+21.954)$, and point H' $(100-R32-1234yf-R134a/-0.9435x+59.308/-0.8428x+35.149)$, or when 25.6 wt %>x≥24.5 wt %, point G' $(100-R32-1234yf-R134a/-0.5242x+44.035/-0.4290x+20.902)$, and point H' $(100-R32-1234yf-R134a/-x+60.7/-0.7145x+32.001)$, and point Q $(-0.0115x^2+2.3422x-26.868/-0.1077x^2+6.4104x-58.357/100-R32-R125-1234yf)$, and point R $(-0.1398x^2+8.0281x-81.391/-0.0932x^2+5.7935x-58.514/100-R32-R125-1234yf)$; and mixture 9 having a composition ratio in which (1)-9. 26.6 wt %≥x≥25.6 wt %, and (2)-9. the concentrations of R125, 1234yf, and 134a (R125 concentration (wt %)/1234yf concentration (wt %)/134a concentration (wt %)) fall within a triangle having the following points as vertices:

point G' (100−R32−1234yf−R134a/−0.5242x+44.035/−0.4290x+20.902), point Q (8.2x−184.32/−5x+163.1/100−R32−R125−1234yf), and point R (1.2x+1.88/1.246x−3.0431/100−R32−R125−1234yf);

wherein the mixture or mixtures of fluorinated hydrocarbons may contain, in addition to the four basic components R32, R125, 1234yf, and R134a, other components different from the four basic components, and when the mixture or mixtures contain the other components, the content of the other components in the mixture or mixtures is 0.5 wt % or less.

5. A composition comprising a mixture or mixtures of fluorinated hydrocarbons;

the composition comprising at least one member selected from the group consisting of the following mixtures 1 to 7, wherein the composition ratio of the fluorinated hydrocarbons contained in each mixture is indicated in a ternary composition diagram in which the sum of the concentrations of R125, 1234yf, and R134a is represented by (100−x) wt %, when the sum of the concentrations of R32, R125, 1234yf, and R134a is 100 wt %, and the concentration of R32 is x wt %:

mixture 1 having a composition ratio in which (1)-1. 15.3 wt %>x≥14.2 wt %, and (2)-1. the concentrations of R125, 1234yf, and 134a (R125 concentration (wt %)/1234yf concentration (wt %)/134a concentration (wt %)) fall within a triangle having the following points as vertices:

point T (100−R32−1234yf−R134a/0.0415$x^2$+1.0547x+21.254/0.0863$x^2$−3.628x+64.252), point K (0.9091$x^2$−29.091x+257.58/0.8579$x^2$−29.085x+267.88/100−R32−R125−1234yf), and point U (1.3896$x^2$−47.266x+418.78/−2.8422$x^2$+97.299x−780.65/100−R32−R125−1234yf);

mixture 2 having a composition ratio in which (1)-2. 16.2 wt %>x≥15.3 wt %, and (2)-2. the concentrations of R125, 1234yf, and 134a (R125 concentration (wt %)/1234yf concentration (wt %)/134a concentration (wt %)) fall within a quadrilateral having the following points as vertices:

point S (100−R32−1234yf−R134a/0.0508$x^2$−2.3591x+66.946/−0.0008$x^2$−0.6861x+31.798), point T (100−R32−1234yf−R134a/−0.0415$x^2$+1.0547x+21.254/0.0863$x^2$−3.628x+64.252), point K (−2x+55.9/−3.4439x+76.392/100−R32−R125−1234yf), and point J (−3.5556x+75.3/1.2095x+24.209/100−R32−R125−1234yf);

mixture 3 having a composition ratio in which (1)-3. 17.5 wt %>x≥16.2 wt %, and (2)-3. the concentrations of R125, 1234yf, and 134a (R125 concentration (wt %)/1234yf concentration (wt %)/134a concentration (wt %)) fall within a pentagon having the following points as vertices:

when 17.0 wt %>x≥16.2 wt %, point S (100−R32−1234yf−R134a/0.0508$x^2$−2.3591x+66.946/−0.0008$x^2$−0.6861x+31.798), and point T (100−R32−1234yf−R134a/−0.0415$x^2$+1.0547x+21.254/0.0863$x^2$−3.628x+64.252), or when 17.5 wt %>x≥17.0 wt %, point S (100−R32−1234yf−R134a/0.1108$x^2$−4.5904x+87.503/0.0939$x^2$−4.1798x+63.826), and point T (100−R32−1234yf−R134a/−0.0766$x^2$+2.5779x+5.5242/0.2286$x^2$−9.3441x+120.28), and point K (−1.8488x+53.445/−3.1206x+71.153/100−R32−R125−1234yf), point J (−1.6163x+43.882/−6.3674x+146.95/100−R32−R125−1234yf), and point H' (100−R32−1234yf−R134a/−0.9083x+58.536/−0.9723x+38.014);

mixture 4 having a composition ratio in which (1)-4. 19.0 wt %>x≥17.5 wt %, and (2)-4. the concentrations of R125, 1234yf, and 134a (R125 concentration (wt %)/1234yf concentration (wt %)/134a concentration (wt %)) fall within a hexagon having the following points as vertices:

point S (100−R32−1234yf−R134a/0.1108$x^2$−4.5904x+87.503/0.0939$x^2$−4.1798x+63.826), point T (100−R32−1234yf−R134a/−0.0766$x^2$+2.5779x+5.5242/0.2286$x^2$−9.3441x+120.28), point R (−0.0401$x^2$+3.0217x−19.198/−0.0297$x^2$+2.7774x−22.544/100−R32−R125−1234yf), point X (−0.1696$x^2$+1.0575x+54.537/−0.2271$x^2$+15.05x−177.28/100−R32−R125−1234yf), point J (0.1273$x^2$−6.1109x+83.553/0.1532$x^2$−11.484x+189.57/100−R32−R125−1234yf), and when 18.1 wt %>x≥17.5 wt %, point H' (100−R32−1234yf−R134a/−0.9083x+58.536/−0.9723x+38.014), or when 19.0 wt %>x≥18.1 wt %, point H' (100−R32−1234yf−R134a/−0.8948x+58.298/−1.0517x+39.417);

mixture 5 having a composition ratio in which (1)-5. 20.8 wt %>x≥19.0 wt %, and (2)-5. the concentrations of R125, 1234yf, and 134a (R125 concentration (wt %)/1234yf concentration (wt %)/134a concentration (wt %)) fall within a pentagon having the following points as vertices:

point S (100−R32−1234yf−R134a/0.1263$x^2$−5.6749x+102.56/−0.029$x^2$+0.4298x+20.594), point T (100−R32−1234yf−R134a/0.1451$x^2$−6.0744x+89.981/−0.2364$x^2$+8.5372x−51.582), point R (−0.0401$x^2$+3.0217x−19.198/−0.0297$x^2$+2.7774x−22.544/100−R32−R125−1234yf), point Q (−0.0198$x^2$+27.157x−31.225/−0.0377$x^2$+3.0486x−17.594/100−R32−R125−1234yf), and when 20.0 wt %>x≥19.0 wt %, point H' (100−R32−1234yf−R134a/−0.8948x+58.298/−1.0517x+39.417), or when 20.8 wt %>x≥20.0 wt %, point H' (100−R32−1234yf−R134a/−0.9244x+58.883/−0.8837x+36.078);

mixture 6 having a composition ratio in which (1)-6. 23.2 wt %>x≥20.8 wt %, and (2)-6. the concentrations of R125, 1234yf, and 134a (R125 concentration (wt %)/1234yf concentration (wt %)/134a concentration (wt %)) fall within a pentagon having the following points as vertices:

point S (100−R32−1234yf−R134a/0.1017$x^2$−5.1872x+102.99/0.0034$x^2$−0.7313x+30.692), point T (100−R32−1234yf−R134a/−0.0318$x^2$+1.1657x+15.869/−0.123$x^2$+4.4541x−15.735), point R (−0.0031$x^2$+1.5234x−4.0783/−0.0503$x^2$+3.6856x−32.627/100−R32−R125−1234yf), point Q (−0.0984$x^2$+6.1633x−68.728/−0.0617$x^2$+3.9141x−25.243/100−R32−R125−1234yf), and when 22.6 wt %>x≥20.8 wt %, point H' (100−R32−1234yf−R134a/−0.9244x+58.883/−0.8837x+36.078), or when 23.2 wt %>x≥22.6 wt %, point H' (100−R32−1234yf−R134a/−0.9435x+59.308/−0.8428x+35.149); and mixture 7 having a composition ratio in which (1)-7. 25.4 wt %≥x≥23.2 wt %, and (2)-7. the concentrations of R125, 1234yf, and 134a (R125 concentration (wt %)/1234yf concentration (wt %)/134a concentration (wt %)) fall within a triangle having the following points as vertices:

point S (100−R32−1234yf−R134a/−0.0317$x^2$+0.4511x+43.979/0.075$x^2$−4.1913x+72.494), point α (0.0324$x^2$−3.5746x+95.092/0.0193$x^2$+3.2487x−59.944/100−R32−R125−1234yf), and point Q (−0.0115$x^2$+2.3422x−26.868/−0.1077$x^2$+6.4104x−58.357/100−R32−R125−1234yf);

wherein the mixture or mixtures of fluorinated hydrocarbons may contain, in addition to the four basic components R32, R125, 1234yf, and R134a, other components different from the four basic components, and when the mixture or mixtures contain the other components, the content of the other components in the mixture or mixtures is 0.5 wt % or less.

6. A composition comprising a mixture of fluorinated hydrocarbons, the mixture comprising R32, R125, R134a, 1234yf, and at least one fluorinated hydrocarbon selected from the group consisting of HCFC-1122, HCFC-124, CFC-1113, and 3,3,3-trifluoropropyne;

wherein the content of other components different from the four basic components R32, R125, 1234yf, and R134a in the mixture is 0.5 wt % or less.

7. A composition comprising a mixture of fluorinated hydrocarbons, the mixture comprising R32, R125, R134a, 1234yf, and at least one halogenated organic compound represented by formula (1): $C_mH_nX_p$, wherein each X independently represents a fluorine atom, a chlorine atom, or a bromine atom, m is 1 or 2, 2m+2≥n+p, and p≥1;

wherein the content of other components different from the four basic components R32, R125, 1234yf, and R134a in the mixture is 0.5 wt % or less.

8. A composition comprising a mixture of fluorinated hydrocarbons, the mixture comprising R32, R125, R134a, 1234yf, and at least one organic compound represented by formula (2): $C_mH_nX_p$, wherein each X independently represents an atom that is not a halogen atom, m is 1 or 2, 2m+2≥n+p, and p≥1;

wherein the content of other components different from the four basic components R32, R125, 1234yf, and R134a in the mixture is 0.5 wt % or less.

9. A composition comprising a mixture of fluorinated hydrocarbons, the mixture comprising R32, R125, R134a, 1234yf, and water;

wherein the content of other components including water different from the four basic components R32, R125, 1234yf, and R134a in the mixture is 0.5 wt % or less.

10. The composition according to claim 1, comprising a refrigerant oil.

11. The composition according to claim 10, wherein the refrigerant oil comprises at least one polymer selected from the group consisting of polyalkylene glycol (PAG), polyol ester (POE), and polyvinyl ether (PVE).

12. The composition according to claim 1, wherein the composition is an alternative refrigerant for R404A (R125/R134a/R143a=44/4/52 wt %), which is a mixed refrigerant.

13. The composition according to claim 1, wherein the composition is an alternative refrigerant for R22, which is an HCFC refrigerant.

14. The composition according to claim 1, comprising at least one substance selected from the group consisting of tracers, compatibilizers, ultraviolet fluorescence dyes, stabilizers, and polymerization inhibitors.

15. The composition according to claim 1, wherein the composition consists of the mixture of fluorinated hydrocarbons.

16. A refrigeration method comprising the step of operating a refrigeration cycle using the composition according to claim 1.

17. A method for operating a refrigerating device, comprising operating a refrigeration cycle using the composition according to claim 1.

18. A refrigerating device comprising the composition according to claim 1.

19. The composition according to claim 1, which is used for at least one member selected from the group consisting of refrigerators, freezers, water coolers, ice machines, refrigerating showcases, freezing showcases, freezing and refrigerating units, refrigerating devices for freezing and refrigerating warehouses, chillers (chilling units), turbo refrigerators, and screw refrigerators.

* * * * *